United States Patent
Yoon et al.

(10) Patent No.: US 12,486,267 B2
(45) Date of Patent: Dec. 2, 2025

(54) IMIDAZO[1,2-A]PYRIDINE AND [1,2,4]TRIAZOLO[1,5-A]PYRIDINE DERIVATIVES AS TLR9 INHIBITORS FOR THE TREATMENT OF FIBROSIS

(71) Applicant: BRISTOL-MYERS SQUIBB COMPANY, Princeton, NJ (US)

(72) Inventors: David S. Yoon, Ambler, PA (US); Alicia Regueiro-Ren, New Hope, PA (US); Andrew P. Degnan, Jamison, PA (US); Gang Wu, Princeton, NJ (US)

(73) Assignee: Bristol-Myers Squibb Company, Princeton, NJ (US)

( * ) Notice: Subject to any disclaimer, the term of this patent is extended or adjusted under 35 U.S.C. 154(b) by 478 days.

(21) Appl. No.: 18/042,036

(22) PCT Filed: Aug. 18, 2021

(86) PCT No.: PCT/US2021/046420
§ 371 (c)(1),
(2) Date: Feb. 17, 2023

(87) PCT Pub. No.: WO2022/040259
PCT Pub. Date: Feb. 24, 2022

(65) Prior Publication Data
US 2024/0067638 A1    Feb. 29, 2024

Related U.S. Application Data

(60) Provisional application No. 63/067,452, filed on Aug. 19, 2020.

(51) Int. Cl.
C07D 471/04 (2006.01)
(52) U.S. Cl.
CPC .................. C07D 471/04 (2013.01)
(58) Field of Classification Search
CPC ................................................ C07D 471/04
See application file for complete search history.

(56) References Cited

U.S. PATENT DOCUMENTS

| | | |
|---|---|---|
| 9,271,500 B2 | 3/2016 | Takahashi et al. |
| 10,071,079 B2 | 9/2018 | Dyckman et al. |
| 10,435,401 B2 | 10/2019 | Edmunds et al. |
| 10,478,424 B2 | 11/2019 | Dyckman et al. |
| 10,544,143 B2 | 1/2020 | Dyckman et al. |
| 10,660,877 B2 | 5/2020 | Dyckman et al. |
| 10,730,877 B2 | 8/2020 | Dyckman et al. |
| 10,912,766 B2 | 2/2021 | Dyckman et al. |
| 11,053,244 B1 | 7/2021 | Dyckman et al. |
| 11,130,756 B2 | 9/2021 | Dyckman et al. |
| 11,180,474 B2 | 11/2021 | Dyckman et al. |
| 11,299,501 B2 | 4/2022 | Dyckman et al. |
| 11,306,092 B2 | 4/2022 | Dyckman et al. |
| 11,420,958 B2 | 8/2022 | Dyckman et al. |
| 11,420,973 B2 | 8/2022 | Dyckman et al. |
| 11,427,580 B2 | 8/2022 | Dyckman et al. |
| 11,447,466 B2 | 9/2022 | Dyckman et al. |
| 2006/0235037 A1 | 10/2006 | Purandare et al. |
| 2009/0247504 A1 | 10/2009 | Churcher et al. |
| 2010/0197657 A1 | 8/2010 | Chang et al. |
| 2011/0071150 A1 | 3/2011 | Alam et al. |
| 2011/0275631 A1 | 11/2011 | Abeywardane et al. |
| 2013/0158049 A1 | 6/2013 | Alam et al. |
| 2013/0158066 A1 | 6/2013 | Alam et al. |
| 2017/0008885 A1 | 1/2017 | Koul et al. |
| 2018/0273529 A1 | 9/2018 | Matsuo et al. |

(Continued)

FOREIGN PATENT DOCUMENTS

| | | |
|---|---|---|
| WO | 2007115306 A2 | 10/2007 |
| WO | 20080006540 A1 | 1/2008 |
| WO | 20120088411 A1 | 6/2012 |
| WO | 20130043520 A1 | 3/2013 |
| WO | 2013156431 A1 | 10/2013 |
| WO | 2015088045 A1 | 6/2015 |
| WO | 20170058503 A1 | 4/2017 |
| WO | 20180089695 A1 | 5/2018 |
| WO | 20180165112 A1 | 9/2018 |
| WO | 2019125977 A1 | 6/2019 |
| WO | 20210141106 A1 | 7/2021 |

OTHER PUBLICATIONS

Fujimoto H, Kobayashi T, Azuma A. Idiopathic Pulmonary Fibrosis: Treatment and Prognosis. Clinical Medicine Insights: Circulatory, Respiratory and Pulmonary Medicine. 2016;9s1. doi:10.4137/CCRPM.S23321.*

(Continued)

*Primary Examiner* — Alicia L Otton
(74) *Attorney, Agent, or Firm* — Gary Greenblatt

(57) ABSTRACT

The present invention relates to imidazo[1,2-a]pyridine and [1,2,4]triazolo[1, 5-a]pyridine derivatives of formula (I) or a salt thereof. The present compounds are inhibitors of TLR9 and useful in treating preventing, or slowing fibrotic diseases, such as e.g. liver fibrosis, renal fibrosis, biliary fibrosis or pancreatic fibrosis, nonalcoholic steatohepatitis (NASH), non-alcoholic fatty liver disease (NAFLD), chronic kidney disease, diabetic kidney disease, primary sclerosing cholangitis (PSC) or primary biliary cirrhosis (PBC), or idiopathic pulmonary fibrosis (IPF).

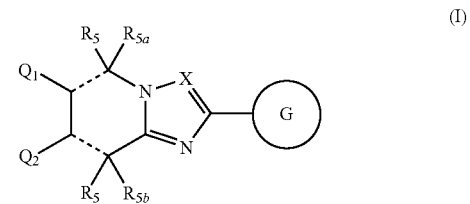

(I)

19 Claims, No Drawings

(56) References Cited

U.S. PATENT DOCUMENTS

2020/0308172 A1    10/2020    Dyckma et al.
2021/0070751 A1    3/2021    Dyckman et al.
2021/0253593 A1    8/2021    Dyckman et al.

OTHER PUBLICATIONS

Chattopadhyay, S et al . . . , "Tyrosine phosphorylation in Toll-like Receptor signaling", Cytokine & Growth Factor Reviews, 25 (2014) 533-541.
International Preliminary Report on Patentability for PCT/US2021/046420 issued Feb. 16, 2023.
Kawai, Taro, et al., "The role of pattern-recognition receptors in innate immunity: update on Toll-like receptors", Nature Immunology, 2010, vol. 11, No. 5, pp. 373-384.
Lamphier, M. et al., "Novel Small Molecule Inhibitors of TLR7 and TLR9: Mechanism of Action and Efficacy in Vivo", Mol Pharmacol, 2014, 85:429-440.
Le Bescont et al., Eur J Org Chemistry 14, 2101-2109 (2020) and Appendix A Supplementary Data 29(7) S1.
Lesuisse et al., Bioorg Med Chem Lett 29(7) 929-932 (2019).
Li et al., Green Chem 21, 4035-4039 (2019).
Moszczynski-Petkowski et al., Eur J Med Chem 155, 96-116 (2018).
Patra, Mahesh Chandra, et al., "Recent Progress in the Development of Toll-like Receptor (TLR) antagonists", Exp. Opin. on Therapeutic Patents, 2016, vol. 26, No. 6, 719-730.
Roy, et al., "Design and developmen of benzoxazole derivatives with toll-like receptor 9 antagonism", Eur J Med Chem, 2017, vol. 134, 334-347.
Sims, et al., "The IL-1 Family: Regulators of Immunity", Nature Rev. Immunol., 2010, 10, 89-102.
Thwaites et al., Frontier in Immunology 5 1-8 (2014).
Tu et al., Journal of Laboratory Automation Society for Laboratory Automation and Screening 21, 459-469 (2015).

\* cited by examiner

IMIDAZO[1,2-A]PYRIDINE AND [1,2,4]TRIAZOLO[1,5-A]PYRIDINE DERIVATIVES AS TLR9 INHIBITORS FOR THE TREATMENT OF FIBROSIS

CROSS REFERENCE

This application is a national phase application under 35 U.S.C. § 371 of International Patent Application No. PCT/US2021/046420, filed Aug. 18, 2021, which claims priority to U.S. Provisional Application Ser. 63/067,452, filed Aug. 19, 2020, the contents of which are specifically incorporated fully herein by reference.

DESCRIPTION

The present invention generally relates to substituted bicyclic compounds useful as inhibitors of signaling through Toll-like receptor 9 (TLR9). Provided herein are substituted bicyclic compounds, compositions comprising such compounds, and methods of their use. The invention further pertains to pharmaceutical compositions containing at least one compound according to the invention that are useful for the treatment of conditions related to TLR9 modulation, such as inflammatory and autoimmune diseases, and methods of inhibiting the activity of TLR9 in a mammal.

Toll-like receptors (TLRs) are transmembrane proteins having the ability to initiate an inflammatory response upon recognition of pattern-associated molecular patterns (PAMPs) or microbe-associated molecular patterns (MAMPs). A total of 10 human TLRs have been identified and can be located in the cell surface or, as in the case of TLR7, 8 and 9, in the endolysosomes. TLR9 recognizes unmethylated single-stranded DNA containing cytosine-phosphate-guanine (CpG) motifs that are typically found in bacterial and mitochondrial DNA (mtDNA). TLR9 may contribute to fibrogenesis by promoting inflammation via the MyD88-dependent signalling pathway that ultimately mediates activation of IL-6, IFN-α, IL-1β, and TNF-α among others cytokines. (Barton G M, Kagan J C (2009) *Nat. Rev. Immunol.* 9(8), 535-42, Li X, Jiang S, Tapping RI (2010), *Cytokine* 49(1), 1-9).

TLR9 levels are higher in lung biopsies of rapid idiopathic pulmonary fibrosis (IPF) progressors than in the healthy or stable IPF progressors (Sci. Transl. Med. 2010, 2(57):57ra82). Circulating mtDNA, the ligand for TLR9 has recently been identified as a mechanism-based prognostic biomarker of IPF (Am J. Resp. and Crit. Care Med. 2017, 196(12), 1502). In addition, it has been observed that TLR9 is up-regulated in human and murine non-alcoholic steatohepatitis (NASH) (Clin. Sci. 2017, 131(16), 2145), while hepatocyte mitochondrial DNA drives NASH via activation of TLR9 (J. Clin. Inv. 2016, 126(3), 859. Accordingly, inhibitors/antagonists of TLR9 are predicted to have efficacy as novel therapeutic agents to treat fibrotic diseases.

TLR9 inhibition has been recognized as a potential route to therapies for fibrotic diseases including idiopathic pulmonary fibrosis (Trujillo et al. *Sci. Transl. Med.* 2010, 2(57):57ra82; Yoshizaki et al. *Ann Rheum Dis.* 2016 October; 75(10):1858-65), non-alcoholic steatohepatitis (Garcia-Martinez et al. *J Clin Invest* 2016, 126: 859-864; Gabele et al. *Biochem Biophys Res Commun.* 2008; 376:271-276), hepatic injury (Shaker et al. *Biochem Pharmacol.* 2016. 112:90-101; Hoeque et al. *J. Immun.* 2013, 190:4297-304), and scleroderma (systemic sclerosis or SSc) (Yoshizaki et al. *Ann Rheum Dis.* 2016 October; 75(10):1858-65); as well as heart failure (Oka et al. *Nature* 485, pages 251-255(2012)), and hypertension (McCarthy et al. *Cardiovascular Research,* 2015, Pages 119-130).

There remains a need for compounds useful as inhibitors of TLR9. Additionally, there remains a need for compounds useful as inhibitors of TLR9 that have selectivity over TLR7 or TLR8.

In view of the conditions that may benefit by treatment involving modulation of Toll-like receptors, it is immediately apparent that new compounds capable of inhibiting TLR9 and methods of using these compounds could provide substantial therapeutic benefits to a wide variety of patients.

Applicants have found potent compounds that have activity as TLR9 inhibitors. Further, applicants have found compounds that have activity as TLR9 inhibitors and are selective over TLR7 or TLR8. These compounds are provided to be useful as pharmaceuticals with desirable stability, bioavailability, therapeutic index, and toxicity values that are important to their drugability.

SUMMARY OF THE INVENTION

The present invention relates to a new class of substituted bicyclic compounds found to be effective inhibitors of signaling through TLR9. These compounds are provided to be useful as pharmaceuticals with desirable stability, bioavailability, therapeutic index, and toxicity values that are important to their drugability.

The present invention provides compounds of Formula (I) that are useful as inhibitors of signaling through Toll-like receptor 9 and are useful for the treatment of fibrotic diseases, or stereoisomers, N-oxides, tautomers, pharmaceutically acceptable salts, solvates or prodrugs thereof.

The present invention also provides pharmaceutical compositions comprising a pharmaceutically acceptable carrier and at least one of the compounds of the present invention or stereoisomers, tautomers, pharmaceutically acceptable salts, solvates, or prodrugs thereof.

The present invention also provides a method for inhibition of Toll-like receptor 9 comprising administering to a host in need of such treatment a therapeutically effective amount of at least one of the compounds of the present invention or stereoisomers, tautomers, pharmaceutically acceptable salts, solvates, or prodrugs thereof.

The present invention also provides a method for treating fibrotic diseases, comprising administering to a host in need of such treatment a therapeutically effective amount of at least one of the compounds of the present invention or stereoisomers, tautomers, pharmaceutically acceptable salts, solvates, or prodrugs thereof.

The present invention also provides a method of treating a disease or disorder associated with Toll-like receptor 9 activity, the method comprising administering to a mammal in need thereof, at least one of the compounds of Formula (I) or salts, solvates, and prodrugs thereof.

The present invention also provides processes and intermediates for making the compounds of Formula (I) including salts, solvates, and prodrugs thereof.

The present invention also provides at least one of the compounds of Formula (I) or salts, solvates, and prodrugs thereof, for use in therapy.

The present invention also provides the use of at least one of the compounds of Formula (I) or salts, solvates, and prodrugs thereof, for the manufacture of a medicament for the treatment of prophylaxis of Toll-like receptor 9 related conditions, such as allergic disease, autoimmune diseases, inflammatory diseases, and proliferative diseases.

The compound of Formula (I) and compositions comprising the compounds of Formula (I) may be used in treating, preventing, or curing various Toll-like receptor 9 related conditions. Pharmaceutical compositions comprising these compounds are useful for treating, preventing, or slowing the progression of diseases or disorders in a variety of therapeutic areas, such as allergic disease, autoimmune diseases, inflammatory diseases, and proliferative diseases.

These and other features of the invention will be set forth in expanded form as the disclosure continues.

DETAILED DESCRIPTION

The first aspect of the present invention provides at least one compound of Formula (I):

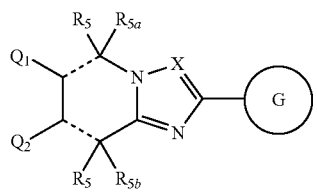

(I)

or stereoisomers, tautomer, solvates or salts thereof, wherein:
the two dashed lines represent either two single or two double bonds; and $R_{5a}$ and $R_{5b}$ are present only if said two dotted lines are two single bonds;
X is N or $CR_3$;
one of $Q_1$ and $Q_2$ is A and the other of $Q_1$ and $Q_2$ is $R_5$;
G is:
(i) phenyl substituted with 1 to 3 substituents independently selected from F, Cl, Br, $C_{1-2}$ alkoxy, $C_{1-2}$ fluoroalkoxy, $C_{3-4}$ cycloalkyl —$C(O)NR_yR_y$, —$S(O)_2CH_3$, —$S(O)_2$(phenyl), —$S(O)_2NR_xR_x$, and —$S(O)(NH)NR_xR_x$;

(ii)

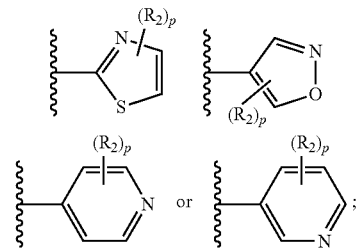

(iii)

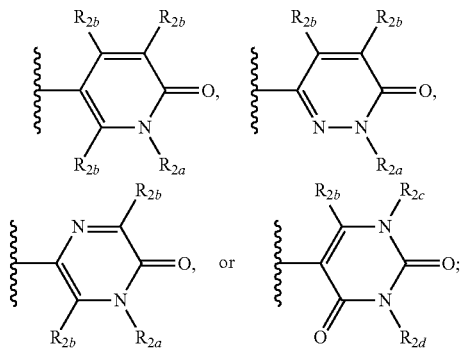

(iv)

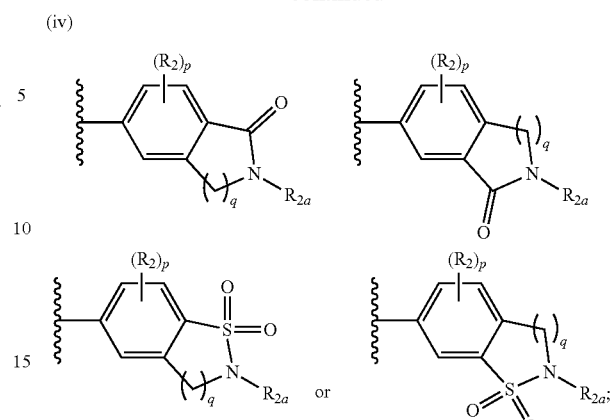

(v) a 9-membered heterocyclic ring selected from:

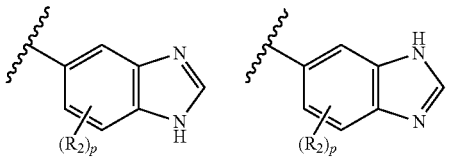

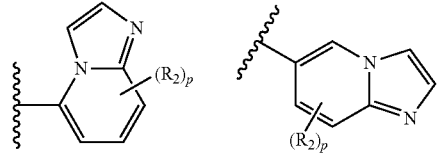

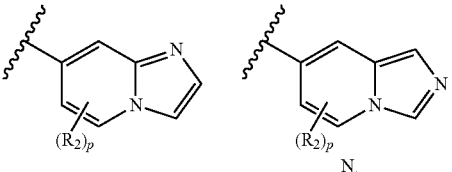

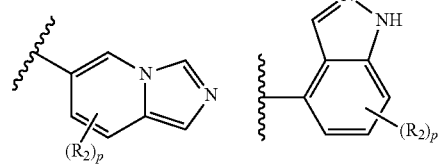

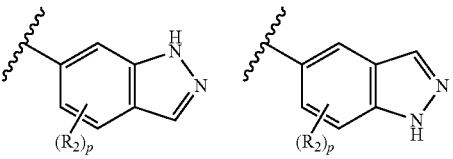

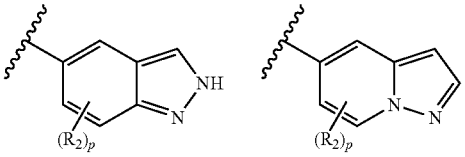

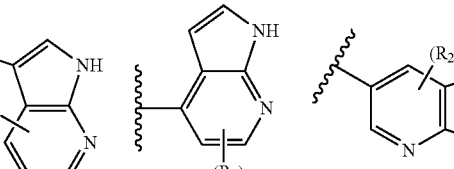

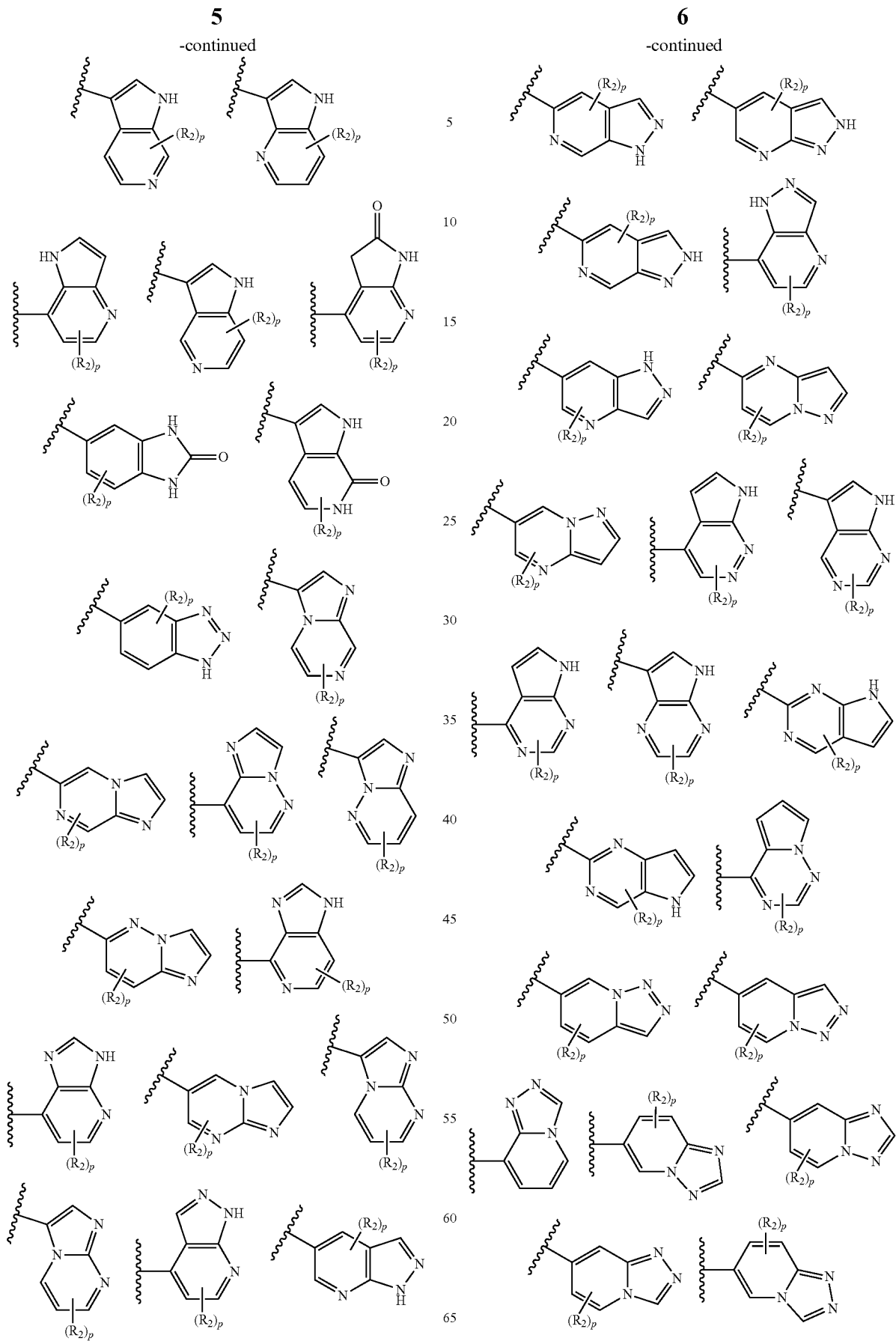

-continued
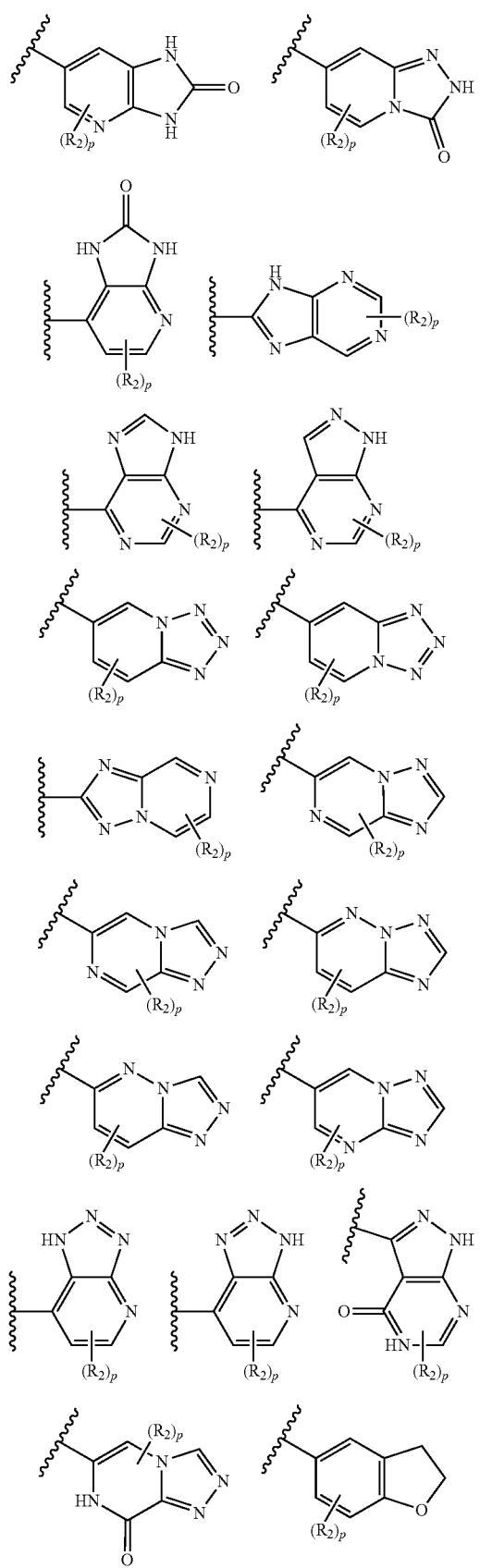
-continued
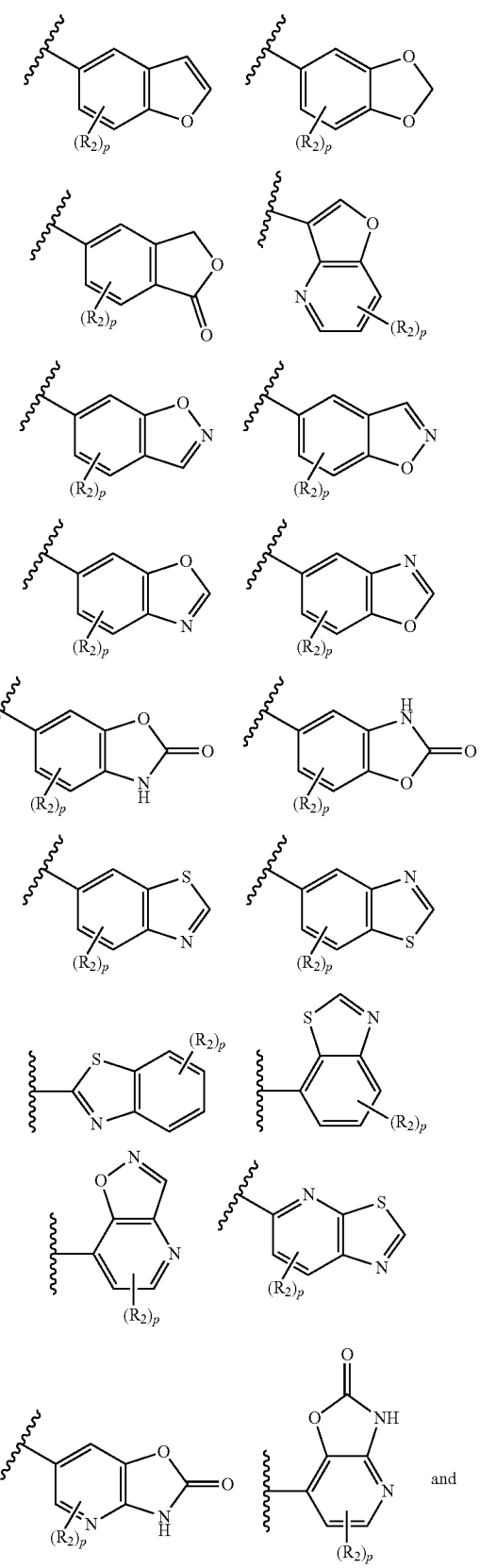
and

-continued

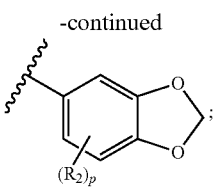

or
(vi) 10-membered heterocyclic ring selected from:

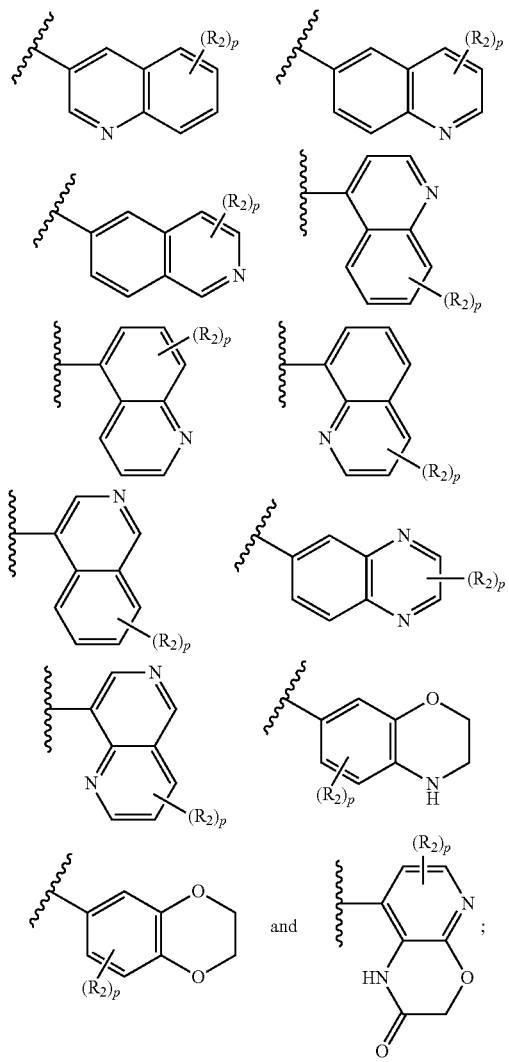

and

A is cyclohexyl, piperidinyl, phenyl, pyridinyl, pyrimidinyl, 6-azabicyclo[3.2.1]octanyl, or azabicyclo[3.2.1]octanyl, each substituted with -L-$R_4$ and zero to 1 $R_{4b}$;

L is a bond, —$CR_xR_x$— or —$C(O)(CR_xR_x)_{0-2}$—;

each $R_2$ is independently halo, —CN, —OH, —$NO_2$, $C_{1-4}$ alkyl, $C_{1-2}$ fluoroalkyl, $C_{1-2}$ cyanoalkyl, $C_{1-3}$ hydroxyalkyl, $C_{1-3}$ aminoalkyl, —$O(CH_2)_{1-2}OH$, —$(CH_2)_{0-4}O$($C_{1-4}$ alkyl), $C_{1-3}$ fluoroalkoxy, —$(CH_2)_{1-4}O(C_{1-3}$ alkyl), —$O(CH_2)_{1-2}OC(O)(C_{1-3}$ alkyl), —$O(CH_2)_{1-2}NR_xR_x$, —$C(O)O(C_{1-3}$ alkyl), —$(CH_2)_{0-2}C(O)NR_yR_y$, —$C(O)NR_x(C_{1-5}$ hydroxyalkyl), —$C(O)NR_x(C_{2-6}$ alkoxyalkyl), —$C(O)NR_x(C_{3-6}$ cycloalkyl), —$NR_yR_y$, —$NR_y(C_{1-3}$ fluoroalkyl), —$NR_y$($C_{1-4}$ hydroxyalkyl), —$NR_xCH_2$(phenyl), —$NR_xS(O)_2$($C_{3-6}$ cycloalkyl), —$NR_xC(O)(C_{1-3}$ alkyl), —$NR_xCH_2$($C_{3-6}$ cycloalkyl), —$S(O)_2(C_{1-3}$ alkyl), —$S(O)_2N(C_{1-3}$ alkyl)$_2$, —$S(O)(NH)N(C_{1-3}$ alkyl)$_2$, —$(CH_2)_{0-2}(C_{3-6}$ cycloalkyl), —$(CH_2)_{0-2}$(phenyl), morpholinyl, dioxothiomorpholinyl, dimethyl pyrazolyl, methylpiperidinyl, methylpiperazinyl, amino-oxadiazolyl, imidazolyl, triazolyl, or —C(O)(thiazolyl);

$R_{2a}$ is $C_{1-6}$ alkyl, $C_{1-3}$ fluoroalkyl, $C_{1-6}$ hydroxyalkyl, $C_{1-3}$ aminoalkyl, —$(CH_2)_{0-4}O(C_{1-3}$ alkyl), $C_{3-6}$ cycloalkyl, —$(CH_2)_{1-3}C(O)NR_xR_x$, —$CH_2(C_{3-6}$ cycloalkyl), —$CH_2$(phenyl), tetrahydrofuranyl, tetrahydropyranyl, or phenyl;

each $R_{2b}$ is independently hydrogen, halo, —CN, —$NR_xR_x$, $C_{1-6}$ alkyl, $C_{1-3}$ fluoroalkyl, $C_{1-3}$ hydroxyalkyl, $C_{1-3}$ fluoroalkoxy, —$(CH_2)_{0-2}O(C_{1-3}$ alkyl), —$(CH_2)_{0-3}C(O)NR_xR_x$, —$(CH_2)_{1-3}(C_{3-6}$ cycloalkyl), —$C(O)O(C_{1-3}$ alkyl), —$C(O)NR_x(C_{1-3}$ alkyl), —$CR_x=CR_xR_x$, or —$CR_x=CH(C_{3-6}$ cycloalkyl);

$R_{2c}$ is $R_{2a}$ or $R_{2b}$;

$R_{2d}$ is $R_{2a}$ or $R_{2b}$; provided that one of $R_{2c}$ and $R_{2d}$ is $R_{2a}$, and the other of $R_{2c}$ and $R_{2d}$ is $R_{2b}$;

$R_3$ is hydrogen, F, Cl, $C_{1-3}$ alkyl, $C_{1-2}$ fluoroalkyl, or $C_{3-4}$ cycloalkyl;

$R_4$ is:
(i) —$N(CH_3)_2$;
(ii) pyrrolidinyl, piperidinyl, piperazinyl, azepanyl, pyridinyl, azaspiro[3.3]heptanyl, azabicyclo[3.2.1]octanyl, or diazabicyclo[3.2.1]octanyl, each substituted with zero to 2 $R_{4a}$; or (iii)

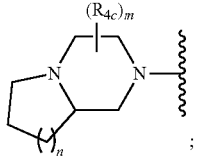

each $R_{4a}$ is independently $C_{1-6}$ alkyl, $C_{1-3}$ fluoroalkyl, —$(CH_2)_{0-2}O(C_{1-2}$ alkyl), $C_{3-6}$ cycloalkyl, —$CH_2(C_{3-6}$ cycloalkyl), —$C(O)(C_{1-4}$ alkyl), —$C(O)(C_{3-6}$ cycloalkyl), —C(O)(phenyl), —$C(O)CH_2(C_{3-6}$ cycloalkyl), —$C(O)CH_2$(phenyl), —$C(O)O(C_{1-4}$ alkyl), oxetanyl, tetrahydrofuran, or tetrahydropyranyl;

$R_{4b}$ is F, Cl, or —$CH_3$;

each $R_{4c}$ is independently $C_{1-6}$ alkyl, $C_{1-3}$ fluoroalkyl, —$CH_2(C_{3-6}$ cycloalkyl), —$C(O)(C_{1-4}$ alkyl), —C(O)(phenyl), —$C(O)CH_2$(phenyl), —$C(O)OCH_2CH_3$, or $C_{3-6}$ cycloalkyl; each $R_5$ is independently hydrogen, F, Cl, $C_{1-3}$ alkyl, $C_{1-2}$ fluoroalkyl, or $C_{3-4}$ cycloalkyl;

$R_{5a}$ and $R_{5b}$ are independently hydrogen, F, Cl, $C_{1-3}$ alkyl, $C_{1-2}$ fluoroalkyl, or $C_{3-4}$ cycloalkyl;

each $R_x$ is independently hydrogen or —$CH_3$;

each $R_y$ is independently hydrogen or $C_{1-6}$ alkyl;

m is zero, 1, or 2;

n is zero, 1, or 2;

p is zero, 1, 2, 3, or 4; and q is 1 or 2.

The second aspect of the present invention provides at least one compound of Formula (I):

(v) a 9-membered heterocyclic ring selected from:

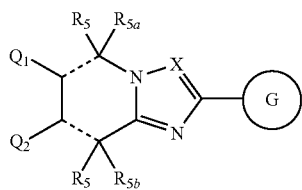

or a salt thereof, wherein:
the two dashed lines represent either two single or two double bonds; and $R_{5a}$ and $R_{5b}$ are present only if said two dotted lines are two single bonds;
X is N or $CR_3$;
one of $Q_1$ and $Q_2$ is A and the other of $Q_1$ and $Q_2$ is $R_5$;
G is:
(i) phenyl substituted with 1 to 3 substituents independently selected from F, Cl, Br, $C_{1-2}$ alkoxy, $C_{1-2}$ fluoroalkoxy, $C_{3-4}$ cycloalkyl —$C(O)NR_yR_y$, —$S(O)_2CH_3$, —$S(O)_2$(phenyl), —$S(O)_2NR_xR_x$, and —$S(O)(NH)NR_xR_x$;

(ii)

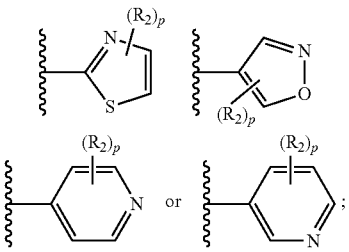

(iii)

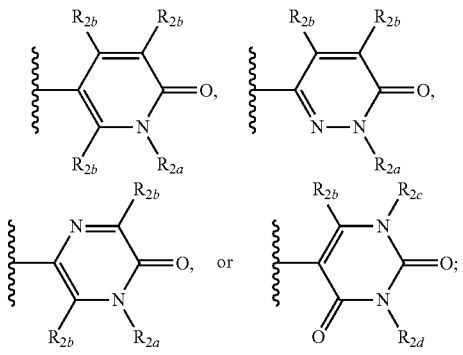

(iv)

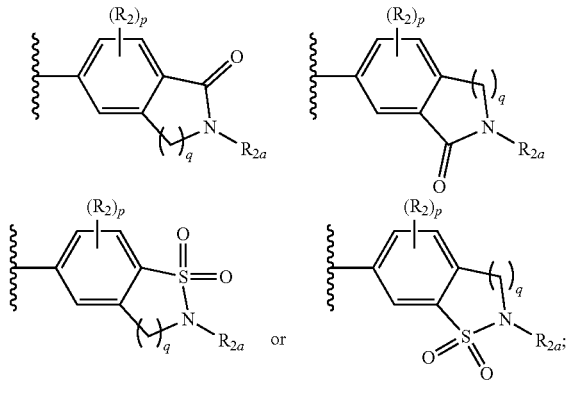

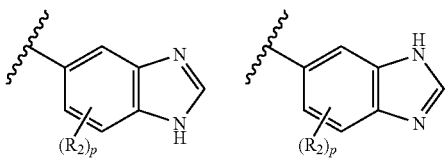

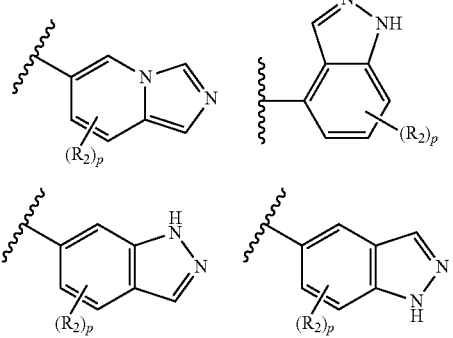

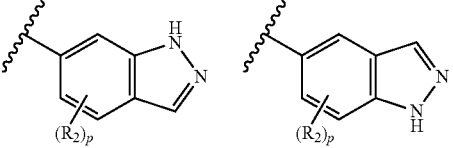

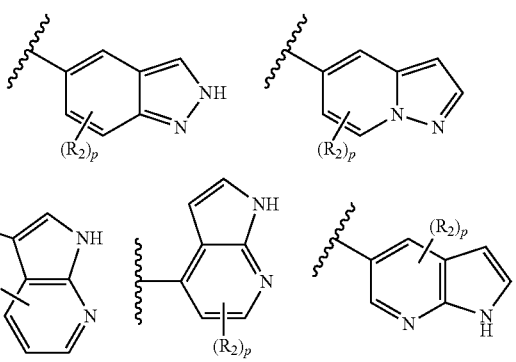

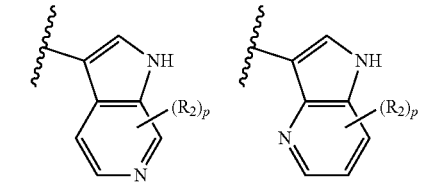

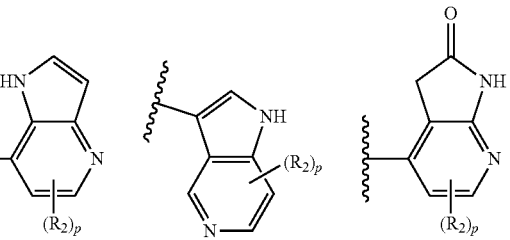

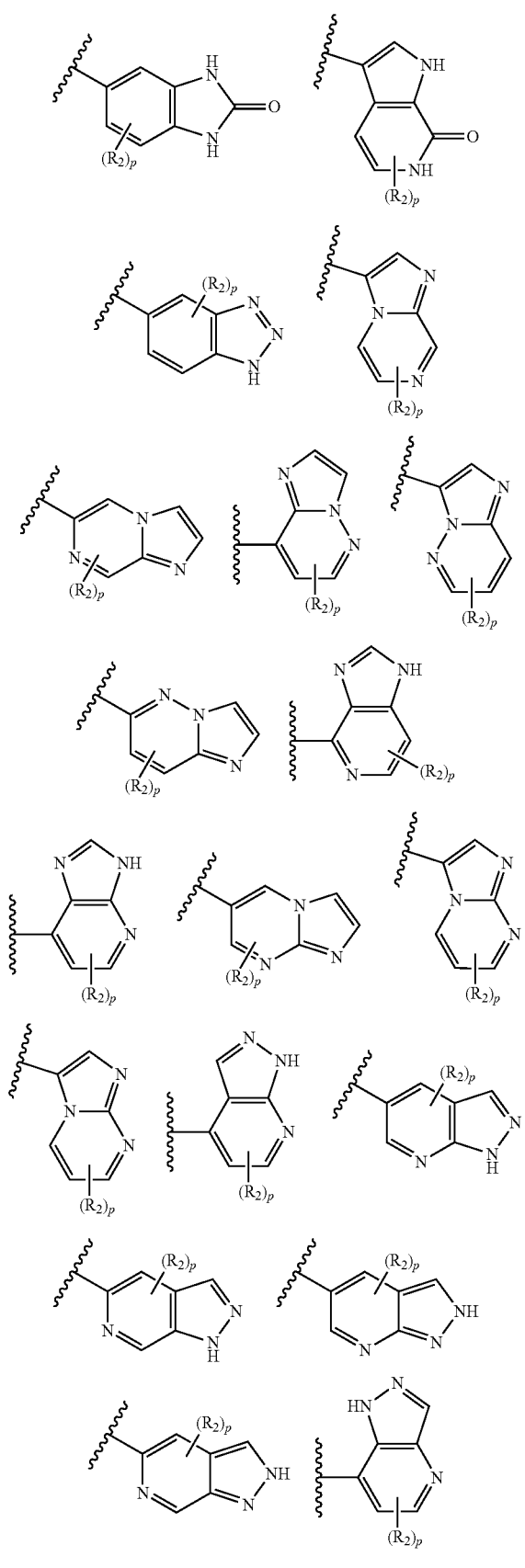
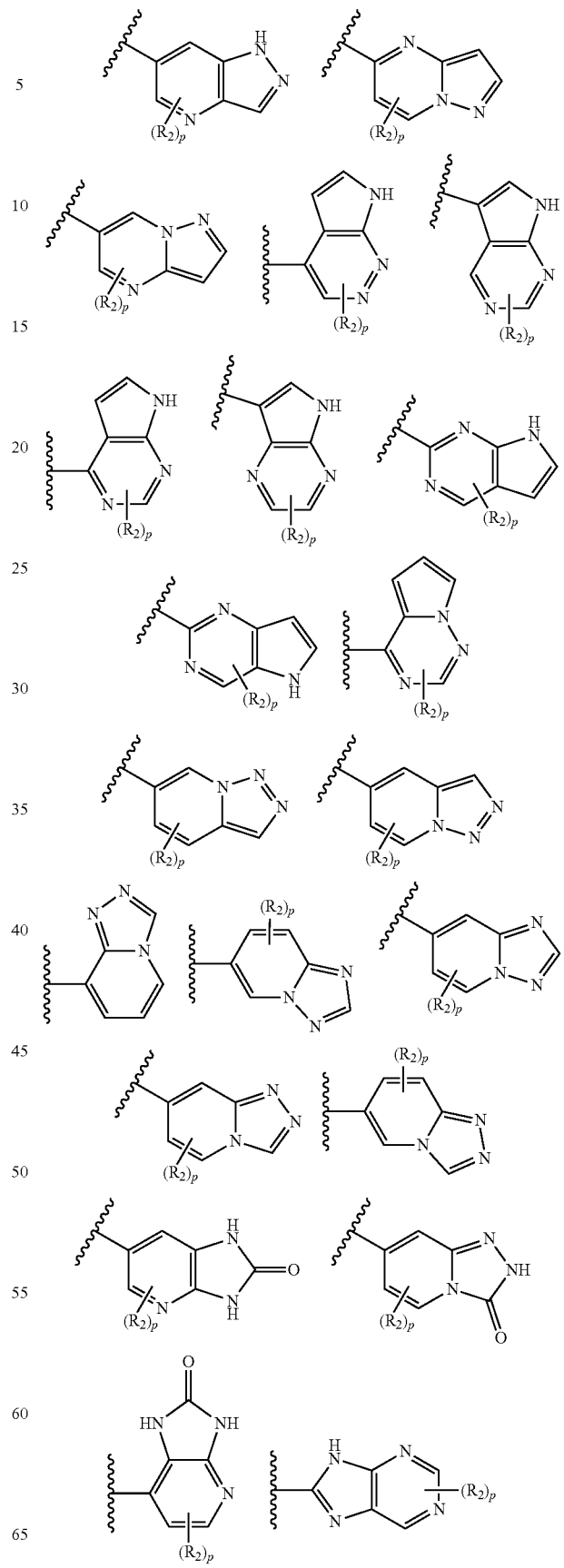

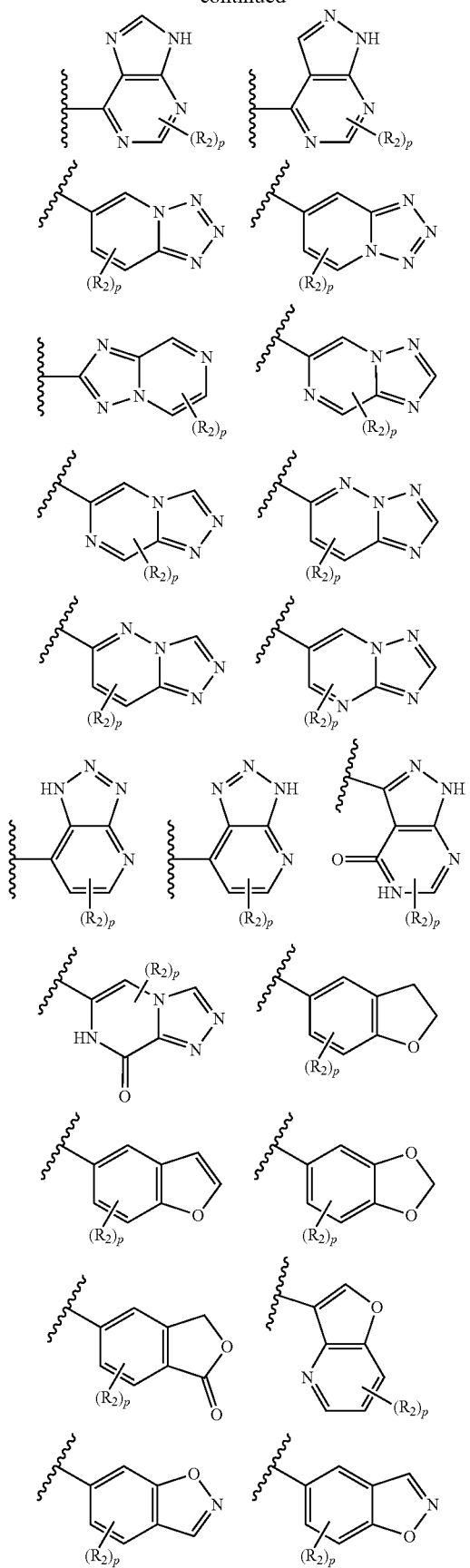
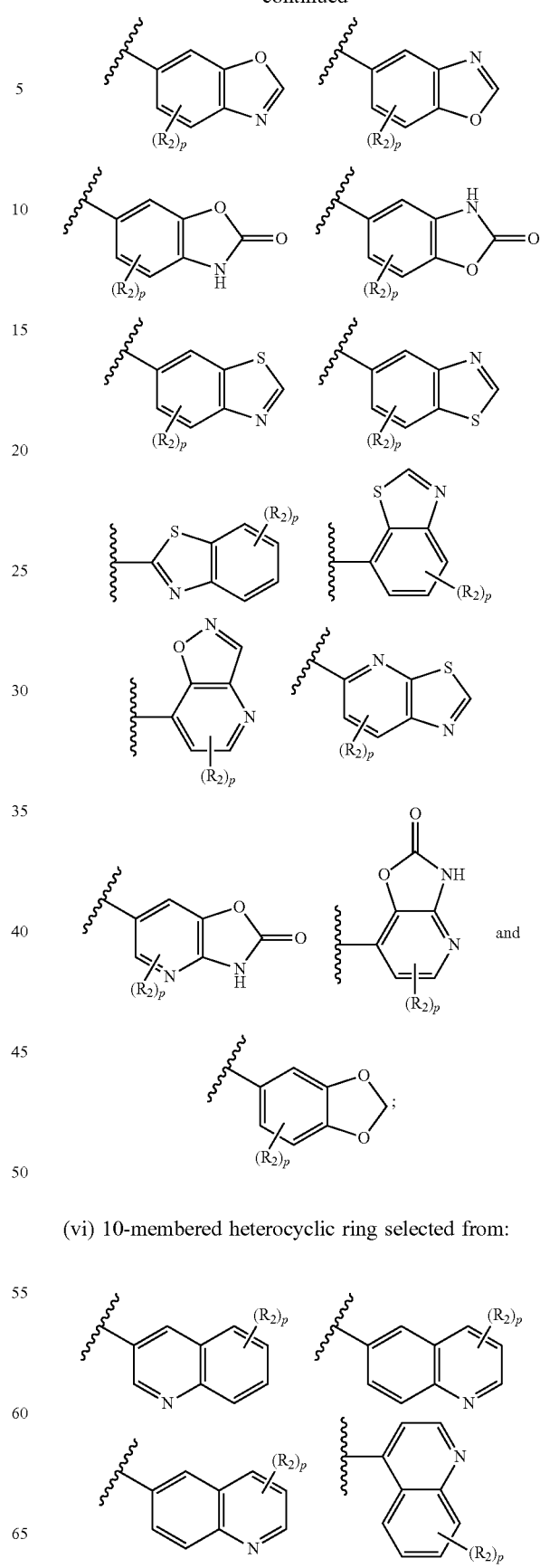
(vi) 10-membered heterocyclic ring selected from:
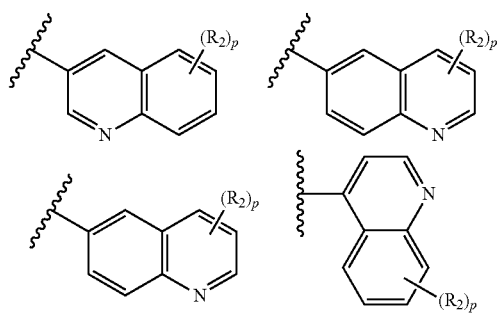

-continued

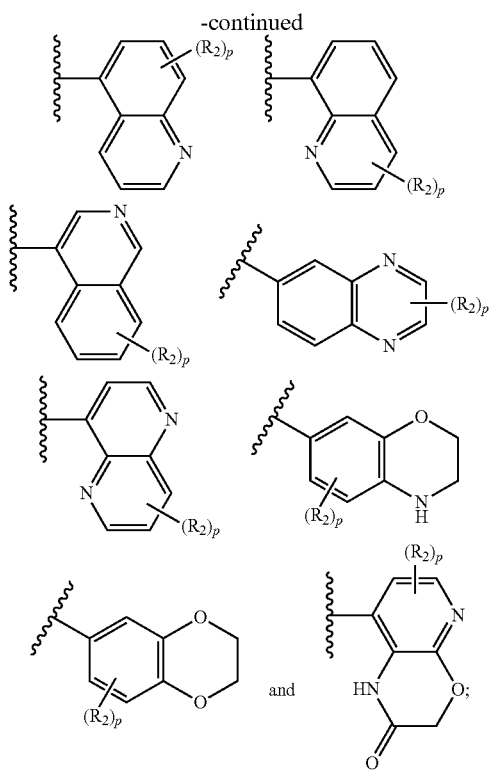

A is piperidinyl, phenyl, pyridinyl, pyrimidinyl, 6-azabicyclo[3.2.1]octanyl, or azabicyclo[3.2.1]octanyl, each substituted with -L-$R_4$ and zero to 1 $R_{4b}$;

L is a bond, —$CR_xR_x$— or —$C(O)(CR_xR_x)_{0-2}$—;

each $R_2$ is independently halo, —CN, —OH, —$NO_2$, $C_{1-4}$ alkyl, $C_{1-2}$ fluoroalkyl, $C_{1-2}$ cyanoalkyl, $C_{1-3}$ hydroxyalkyl, $C_{1-3}$ aminoalkyl, —$O(CH_2)_{1-2}OH$, —$(CH_2)_{0-4}O(C_{1-4}$ alkyl), $C_{1-3}$ fluoroalkoxy, —$(CH_2)_{1-4}O(C_{1-3}$ alkyl), —$O(CH_2)_{1-2}OC(O)(C_{1-3}$ alkyl), —$O(CH_2)_{1-2}NR_xR_x$, —$C(O)O(C_{1-3}$ alkyl), —$(CH_2)_{0-2}C(O)NR_xR_y$, —$C(O)NR_x(C_{1-5}$ hydroxyalkyl), —$C(O)NR_x(C_{2-6}$ alkoxyalkyl), —$C(O)NR_x(C_{3-6}$ cycloalkyl), —$NR_yR_y$, —$NR_y(C_{1-3}$ fluoroalkyl), —$NR_y(C_{1-4}$ hydroxyalkyl), —$NR_xCH_2(phenyl)$, —$NR_xS(O)_2(C_{3-6}$ cycloalkyl), —$NR_xC(O)(C_{1-3}$ alkyl), —$NR_xCH_2(C_{3-6}$ cycloalkyl), —$S(O)_2(C_{1-3}$ alkyl), —$S(O)_2N(C_{1-3}$ alkyl)$_2$, —$S(O)(NH)N(C_{1-3}$ alkyl)$_2$, —$(CH_2)_{0-2}(C_{3-6}$ cycloalkyl), —$(CH_2)_{0-2}(phenyl)$, morpholinyl, dioxothiomorpholinyl, dimethyl pyrazolyl, methylpiperidinyl, methylpiperazinyl, amino-oxadiazolyl, imidazolyl, triazolyl, or —C(O)(thiazolyl);

$R_{2a}$ is $C_{1-6}$ alkyl, $C_{1-3}$ fluoroalkyl, $C_{1-6}$ hydroxyalkyl, $C_{1-3}$ aminoalkyl, —$(CH_2)_{0-4}O(C_{1-3}$ alkyl), $C_{3-6}$ cycloalkyl, —$(CH_2)_{1-3}C(O)NR_xR_x$, —$CH_2(C_{3-6}$ cycloalkyl), —$CH_2(phenyl)$, tetrahydrofuranyl, tetrahydropyranyl, or phenyl;

each $R_{2b}$ is independently hydrogen, halo, —CN, —$NR_xR_x$, $C_{1-6}$ alkyl, $C_{1-3}$ fluoroalkyl, $C_{1-3}$ hydroxyalkyl, $C_{1-3}$ fluoroalkoxy, —$(CH_2)_{0-2}O(C_{1-3}$ alkyl), —$(CH_2)_{0-3}C(O)NR_xR_x$, —$(CH_2)_{1-3}(C_{3-6}$ cycloalkyl), —$C(O)O(C_{1-3}$ alkyl), —$C(O)NR_x(C_{1-3}$ alkyl), —$CR_x=CR_xR_x$, or —$CR_x=CH(C_{3-6}$ cycloalkyl);

$R_{2c}$ is $R_{2a}$ or $R_{2b}$;

$R_{2d}$ is $R_{2a}$ or $R_{2b}$; provided that one of $R_{2c}$ and $R_{2d}$ is $R_{2a}$, and the other of $R_{2c}$ and $R_{2d}$ is $R_{2b}$;

$R_3$ is hydrogen, F, Cl, $C_{1-3}$ alkyl, $C_{1-2}$ fluoroalkyl, or $C_{3-4}$ cycloalkyl;

$R_4$ is:
(i) —$N(CH_3)_2$;
(ii) pyrrolidinyl, piperidinyl, piperazinyl, pyridinyl, azaspiro[3.3]heptanyl, or azabicyclo[3.2.1]octanyl, each substituted with zero to 2 $R_{4a}$; or (iii)

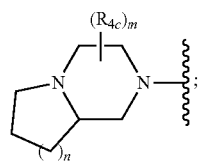

each $R_{4a}$ is independently $C_{1-6}$ alkyl, $C_{1-3}$ fluoroalkyl, $C_{3-6}$ cycloalkyl, —$CH_2(C_{3-6}$ cycloalkyl), —$C(O)(C_{1-4}$ alkyl), —$C(O)(C_{3-6}$ cycloalkyl), —C(O)(phenyl), —$C(O)CH_2(C_{3-6}$ cycloalkyl), —$C(O)CH_2(phenyl)$, or —$C(O)O(C_{1-4}$ alkyl);

$R_{4b}$ is F, Cl, or —$CH_3$;

each $R_{4c}$ is independently $C_{1-6}$ alkyl, $C_{1-3}$ fluoroalkyl, —$CH_2(C_{3-6}$ cycloalkyl), —$C(O)(C_{1-4}$ alkyl), —C(O)(phenyl), —$C(O)CH_2(phenyl)$, —$C(O)OCH_2CH_3$, or $C_{3-6}$ cycloalkyl; each $R_5$ is independently hydrogen, F, Cl, $C_{1-3}$ alkyl, $C_{1-2}$ fluoroalkyl, or $C_{3-4}$ cycloalkyl;

$R_{5a}$ and $R_{5b}$ are independently hydrogen, F, Cl, $C_{1-3}$ alkyl, $C_{1-2}$ fluoroalkyl, or $C_{3-4}$ cycloalkyl;

each $R_x$ is independently hydrogen or —$CH_3$;

each $R_y$ is independently hydrogen or $C_{1-6}$ alkyl;

m is zero, 1, or 2;

n is zero, 1, or 2;

p is zero, 1, 2, 3, or 4; and q is 1 or 2.

In one embodiment, a compound of Formula (I) or stereoisomers, tautomer, solvates or salts thereof is provided wherein the two dashed lines represent two double bonds. Compounds of this embodiment have the structure of Formula (II):

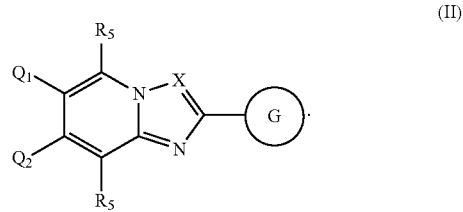

(II)

In one embodiment, a compound of Formula (I) or stereoisomers, tautomer, solvates or salts thereof is provided wherein the two dashed lines represent two double bonds and X is $CR_3$. Compounds of this embodiment have the structure of Formula (IIa):

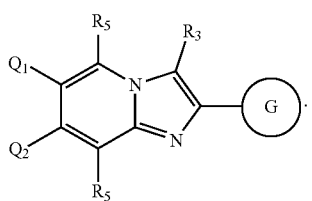
(IIa)

In one embodiment, a compound of Formula (I) or stereoisomers, tautomer, solvates or salts thereof is provided wherein the two dashed lines represent two double bonds and X is N. Compounds of this embodiment have the structure of Formula (IIb):

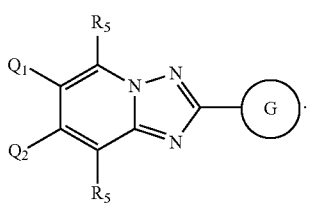
(IIb)

In one embodiment, a compound of Formula (I) or stereoisomers, tautomer, solvates or salts thereof is provided wherein the two dashed lines represent two double bonds; X is $CR_3$; $Q_1$ is A; and $Q_2$ is $R_5$. Compounds of this embodiment have the structure of Formula (IIa-1):

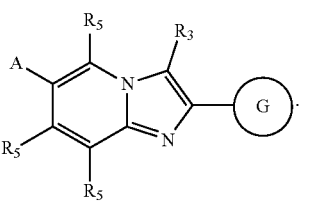
(IIa-1)

In one embodiment, a compound of Formula (I) or stereoisomers, tautomer, solvates or salts thereof is provided wherein the two dashed lines represent two double bonds; X is $CR_3$; $Q_1$ is $R_5$; and $Q_2$ is A. Compounds of this embodiment have the structure of Formula (IIa-2):

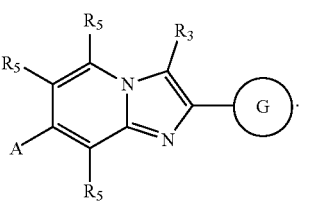
(IIa-2)

In one embodiment, a compound of Formula (I) or stereoisomers, tautomer, solvates or salts thereof is provided wherein the two dashed lines represent two double bonds; X is N; $Q_1$ is A; and $Q_2$ is $R_5$. Compounds of this embodiment have the structure of Formula (IIb-1):

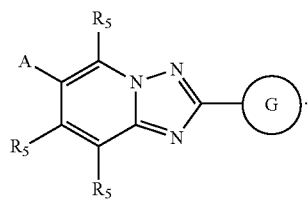
(IIb-1)

In one embodiment, a compound of Formula (I) or stereoisomers, tautomer, solvates or salts thereof is provided wherein the two dashed lines represent two double bonds; X is N; $Q_1$ is $R_5$; and $Q_2$ is A. Compounds of this embodiment have the structure of Formula (IIb-2):

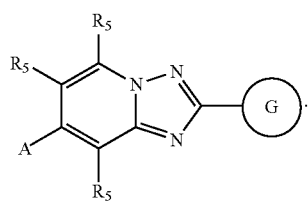
(IIb-2)

In one embodiment, a compound of Formula (I) or stereoisomers, tautomer, solvates or salts thereof is provided wherein the two dashed lines represent two single bonds. Compounds of this embodiment have the structure of Formula (III):

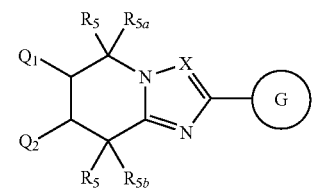
(III)

In one embodiment, a compound of Formula (I) or stereoisomers, tautomer, solvates or salts thereof is provided wherein the two dashed lines represent two single bonds and X is $CR_3$. Compounds of this embodiment have the structure of Formula (IIIa):

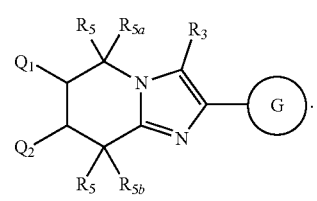
(IIIa)

In one embodiment, a compound of Formula (I) or stereoisomers, tautomer, solvates or salts thereof is provided wherein the two dashed lines represent two double bonds and X is N. Compounds of this embodiment have the structure of Formula (IIIb):

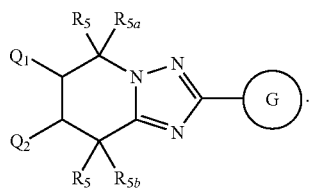
(IIIb)

In one embodiment, a compound of Formula (I) or stereoisomers, tautomer, solvates or salts thereof is provided wherein the two dashed lines represent two single bonds; X is $CR_3$; $Q_1$ is A; and $Q_2$ is $R_5$. Compounds of this embodiment have the structure of Formula (IIIa-1):

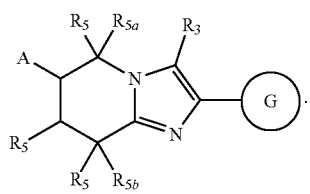
(IIIa-1)

In one embodiment, a compound of Formula (I) or stereoisomers, tautomer, solvates or salts thereof is provided wherein the two dashed lines represent two single bonds; X is $CR_3$; $Q_1$ is $R_5$; and $Q_2$ is A. Compounds of this embodiment have the structure of Formula (IIIa-2):

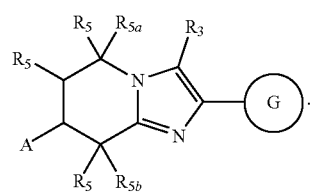
(IIIa-2)

In one embodiment, a compound of Formula (I) or stereoisomers, tautomer, solvates or salts thereof is provided wherein the two dashed lines represent two single bonds; X is N; $Q_1$ is A; and $Q_2$ is $R_5$. Compounds of this embodiment have the structure of Formula (IIIb-1):

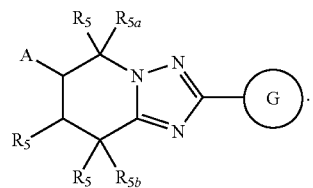
(IIIb-1)

In one embodiment, a compound of Formula (I) or stereoisomers, tautomer, solvates or salts thereof is provided wherein the two dashed lines represent two single bonds; X is N; $Q_1$ is $R_5$; and $Q_2$ is A. Compounds of this embodiment have the structure of Formula (IIIb-2):

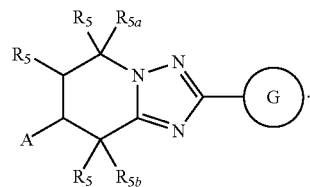
(IIIb-2)

In one embodiment, a compound of Formula (I) or stereoisomers, tautomer, solvates or salts thereof is provided wherein G is phenyl substituted with 1 to 2 substituents independently selected from F, $-OCH_3$, $-S(O)_2CH_3$, $-S(O)_2N(CH_3)_2$, and $-S(O)(NH)N(CH_3)_2$. Included in this embodiment are compounds in which G is phenyl substituted with 1 to 2 substituents independently selected from F, $-OCH_3$, and $-S(O)_2CH_3$. Also included in this embodiment are compounds in which G is:

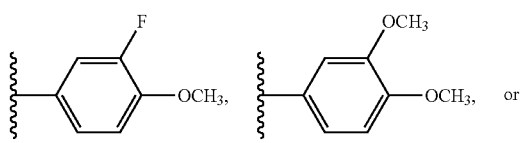

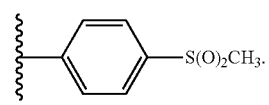

In one embodiment, a compound of Formula (I) or stereoisomers, tautomer, solvates or salts thereof is provided wherein G is

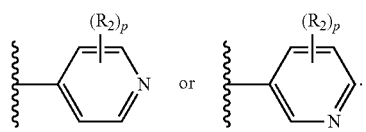

Included in this embodiment are compounds in which each $R_2$ is independently F, Cl, Br, $-CN$, $-OH$, $-CH_3$, $-CH_2CH_3$, $-CF_3$, $-CH_2OH$, $-C(CH_3)_2OH$, $-CH_2NH_2$, $-OCH_3$, $-OCH_2CH_3$, $-OCH(CH_3)_2$, $-OCH_2CH_2OCH_3$, $-OCH_2CH_2N(CH_3)_2$, $-OCHF_2$, $-C(O)OCH_3$, $-C(O)NH_2$, $-C(O)NH(CH_2CH_3)$, $-C(O)$(thiazolyl), $-NH_2$, $-NH(CH_3)$, $-NH(CH_2CH_3)$, $-N(CH_3)_2$, $-NHC(O)CH_3$, $-NHC(O)C(CH_3)_3$, $-NH(CH_2$-cyclopropyl), cyclopropyl, methylpiperidinyl, methylpiperazinyl, amino-oxadiazolyl, imidazolyl, or triazolyl. Also included in this embodiment are compounds in which each $R_2$ is independently F, Cl, $-CN$, $-CH_3$, $-OCH_3$, $-NH_2$, or cyclopropyl. Additionally, included in this embodiment are compounds in which p is 2; one $R_2$ is $-CH_3$; and the other $R_2$ is F, Cl, $-CN$, $-CH_3$, $-OCH_3$, $-NH_2$, or cyclopropyl.

In one embodiment, a compound of Formula (I) or stereoisomers, tautomer, solvates or salts thereof is provided wherein G is a 9-membered heterocyclic ring selected from:

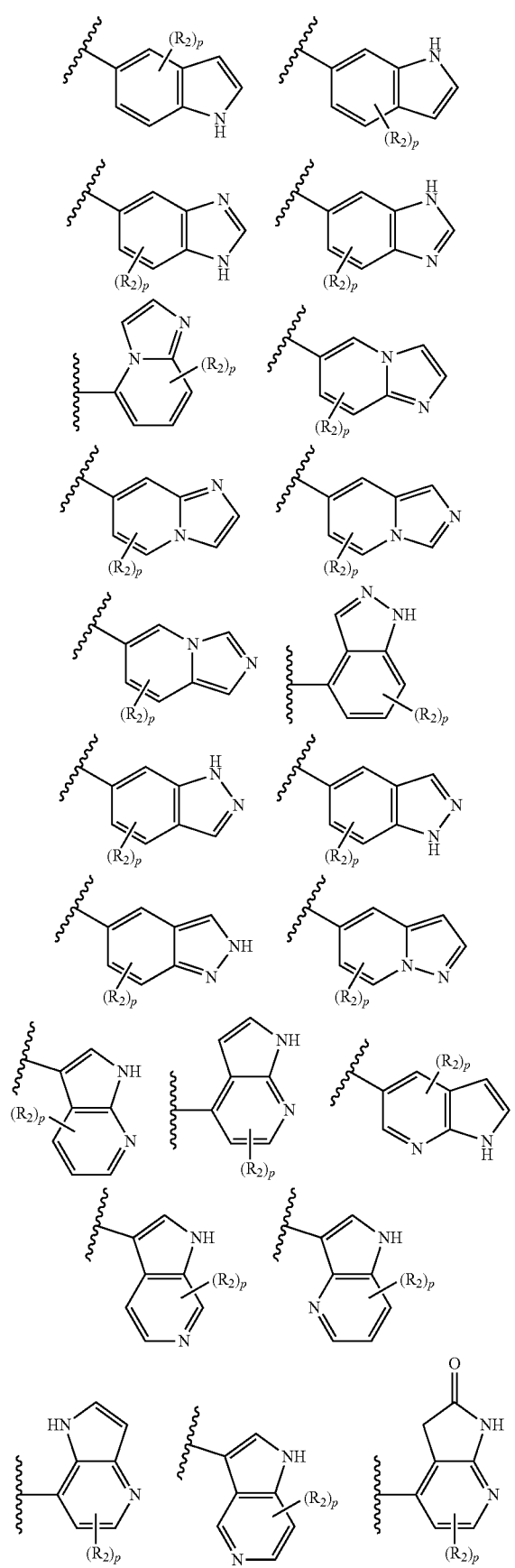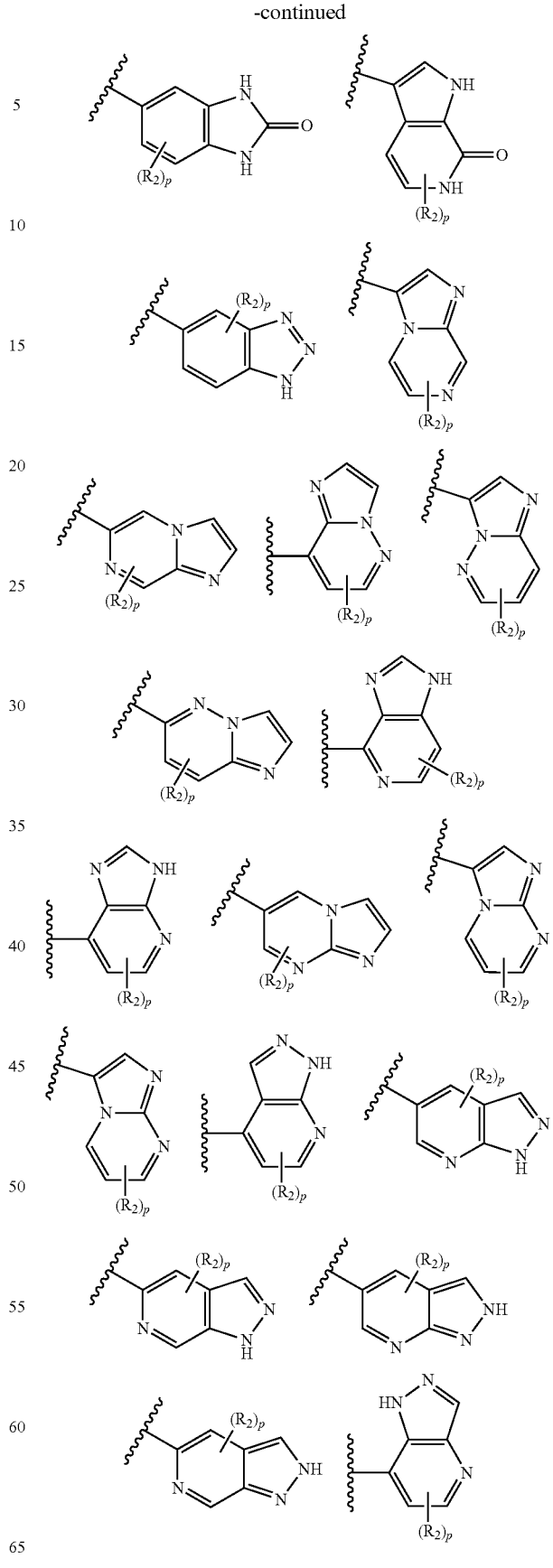

-continued
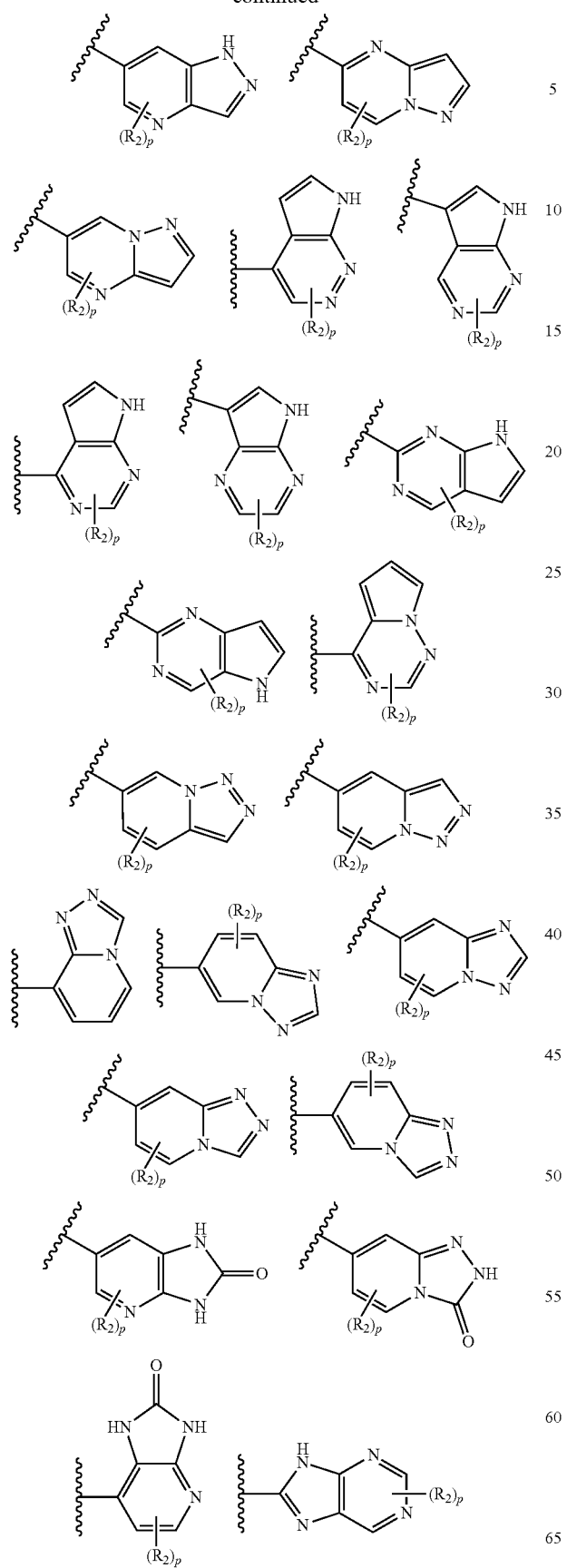
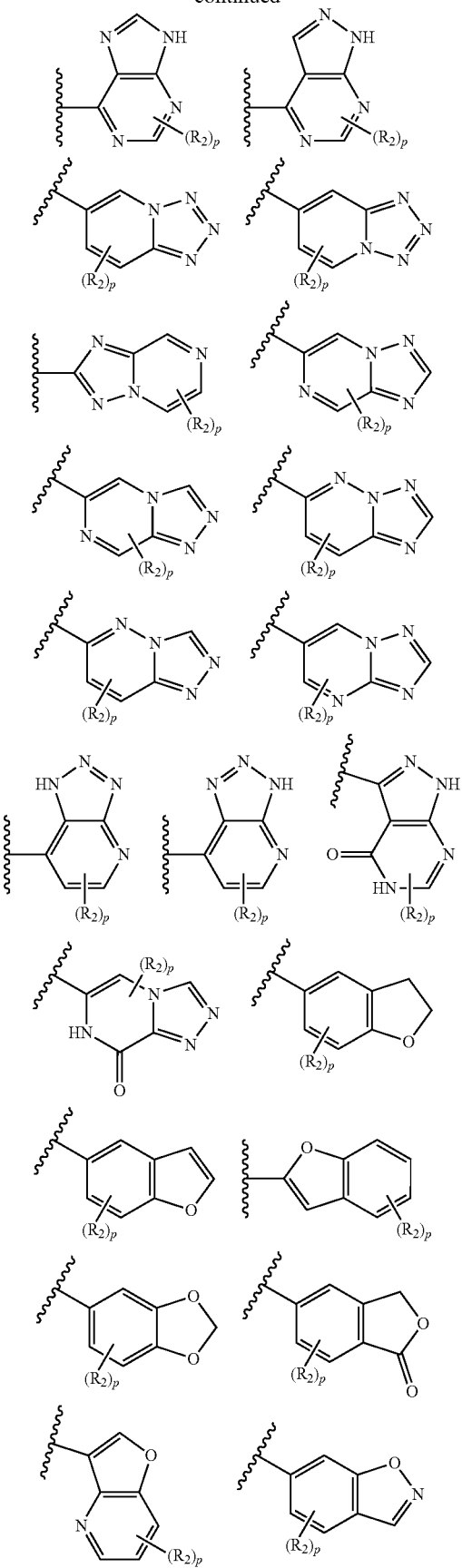

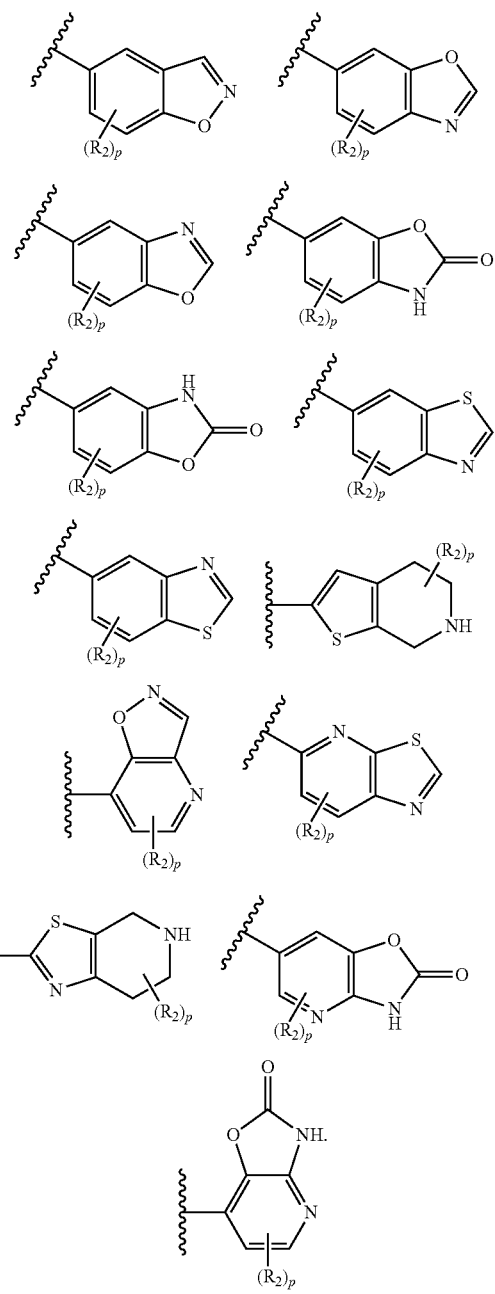
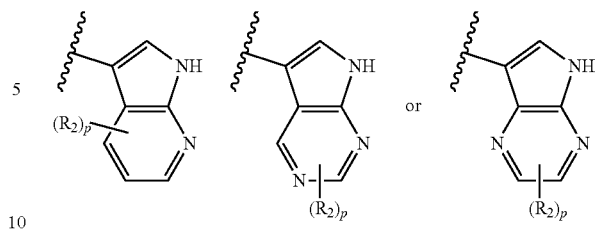
In one embodiment, a compound of Formula (I) or stereoisomers, tautomer, solvates or salts thereof is provided wherein G is a 10-membered heterocyclic ring selected from:
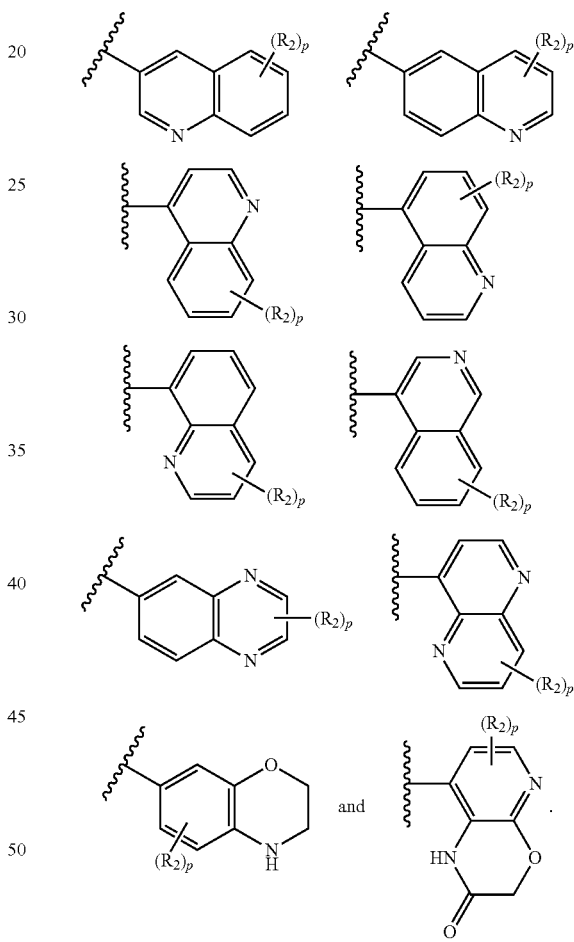
Included in this embodiment are compounds in which G is:
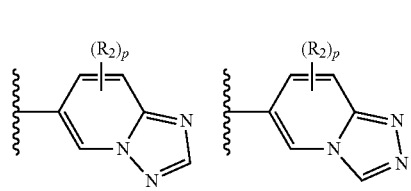
Included in this embodiment are compounds in which G is:
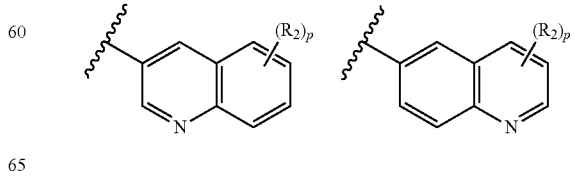

-continued

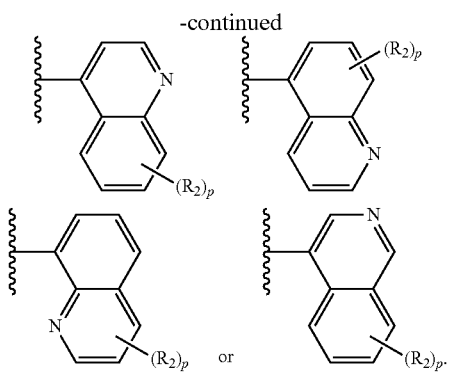

In one embodiment, a compound of Formula (I) or stereoisomers, tautomer, solvates or salts thereof is provided wherein G is:

(i) phenyl substituted with 1 to 2 substituents independently selected from —OCH$_3$, —S(O)$_2$CH$_3$, —S(O)$_2$N(CH$_3$)$_2$, and —S(O)(NH)N(CH$_3$)$_2$;

(ii)

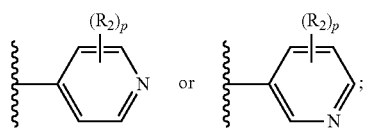

(iii)

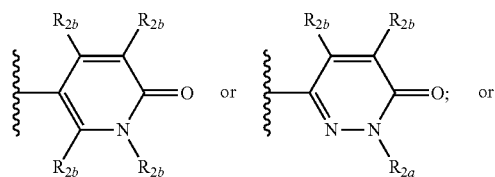

(iv)

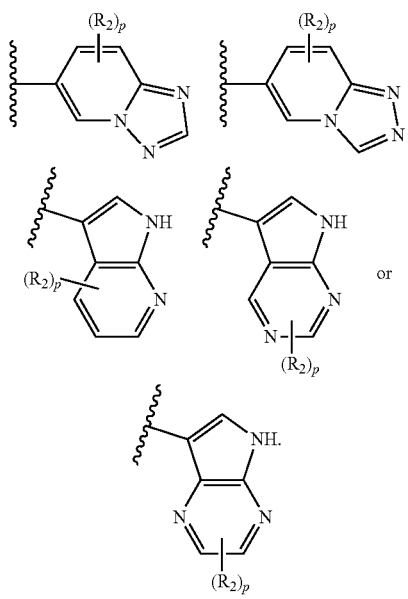

Included in this embodiment are compounds in which each R$_2$ is independently Cl, —CH$_3$, —CH$_2$CH$_3$, —CH$_2$OH, —CH$_2$CH$_2$OH, —CH$_2$CN, —OCH$_3$, —CH$_2$OCH$_3$, or —CH$_2$CH$_2$S(O)$_2$CH$_3$.

In one embodiment, a compound of Formula (I) or stereoisomers, tautomer, solvates or salts thereof is provided wherein p is zero, 1, 2, or 3. Included in this embodiment are compounds in which p is 1 or 2.

In one embodiment, a compound of Formula (I) or stereoisomers, tautomer, solvates or salts thereof is provided wherein A is cyclohexyl, piperidinyl, phenyl, pyridinyl, 6-azabicyclo[3.2.1]octanyl, or azabicyclo[3.2.1]octanyl, each substituted with -L-R$_4$ and zero to 1 R$_{4b}$. Included in this embodiment are compounds in which A is cyclohexyl, piperidinyl, phenyl, or 6-azabicyclo[3.2.1]octanyl, each substituted with -L-R$_4$.

In one embodiment, a compound of Formula (I) or stereoisomers, tautomer, solvates or salts thereof is provided wherein A is piperidinyl, phenyl, pyridinyl, pyrimidinyl, 6-azabicyclo[3.2.1]octanyl, or azabicyclo[3.2.1]octanyl, each substituted with -L-R$_4$ and zero to 1 R$_{4b}$. Included in this embodiment are compounds in which A is piperidinyl, phenyl, pyridinyl, pyrimidinyl, 6-azabicyclo[3.2.1]octanyl, or azabicyclo[3.2.1]octanyl, each substituted with -L-R$_4$. Also included in this embodiment are compounds in which A is piperidinyl or 6-azabicyclo[3.2.1]octanyl, each substituted with -L-R$_4$.

In one embodiment, a compound of Formula (I) or stereoisomers, tautomer, solvates or salts thereof is provided wherein A is piperidinyl, phenyl, or pyridinyl, each substituted with -L-R$_4$ and zero to 1 R$_{4b}$. Included in this embodiment are compounds in which A is piperidinyl or phenyl, each substituted with -L-R$_4$ and zero to 1 R$_{4b}$. Also, included in this embodiment are compounds in which A is phenyl or pyridinyl, each substituted with -L-R$_4$ and zero to 1 R$_{4b}$.

In one embodiment, a compound of Formula (I) or stereoisomers, tautomer, solvates or salts thereof is provided wherein A is piperidinyl, phenyl, pyridinyl, or pyrimidinyl, each substituted with -L-R$_4$ and zero to 1 R$_{4b}$; and L is a bond. Included in this embodiment are compounds in which A is piperidinyl, phenyl, or pyridinyl, each substituted with -L-R$_4$ and zero to 1 R$_{4b}$; and L is a bond.

In one embodiment, a compound of Formula (I) or stereoisomers, tautomer, solvates or salts thereof is provided wherein L is a bond.

In one embodiment, a compound of Formula (I) or stereoisomers, tautomer, solvates or salts thereof is provided wherein L is —CR$_x$R$_x$—. Included in this embodiment are compounds in which L is —CH$_2$—.

In one embodiment, a compound of Formula (I) or stereoisomers, tautomer, solvates or salts thereof is provided wherein L is —C(O)(CR$_x$R$_x$)$_{0-2}$—. Included in this embodiment are compounds in which L is —C(O)(CH$_2$)$_{0-2}$—. Also included in this embodiment are compounds in which L is —C(O)(CH$_2$)$_{0-1}$—. Additionally, included in this embodiment are compounds in which L is —C(O)—.

In one embodiment, a compound of Formula (I) or stereoisomers, tautomer, solvates or salts thereof is provided wherein L is —CR$_x$R$_x$— or —C(O)(CR$_x$R$_x$)$_{0-2}$—. Included in this embodiment are compounds in which L is —CR$_x$R$_x$— or —C(O)(CR$_x$R$_x$)$_{0-1}$—. Also included in this embodiment are compounds in which L is —CR$_x$R$_x$— or —C(O)—. Additionally, included in this embodiment are compounds in which each R$_x$ is hydrogen.

In one embodiment, a compound of Formula (I) or stereoisomers, tautomer, solvates or salts thereof is provided wherein L is a bond, —CH$_2$— or —C(O)(CH$_2$)$_{0-2}$—. Included in this embodiment are compounds in which L is a bond or —C(O)—.

In one embodiment, a compound of Formula (I) or stereoisomers, tautomer, solvates or salts thereof is provided wherein $R_4$ is $-N(CH_3)_2$.

In one embodiment, a compound of Formula (I) or a salt thereof is provided wherein $R_4$ is pyrrolidinyl, piperidinyl, piperazinyl, pyridinyl, azaspiro[3.3]heptanyl, or azabicyclo [3.2.1]octanyl, each substituted with zero to 2 $R_{4a}$. Included in this embodiment are compounds in which $R_4$ is piperidinyl, azaspiro[3.3]heptanyl, or azabicyclo[3.2.1]octanyl, each substituted with $R_{4a}$.

In one embodiment, a compound of Formula (I) or stereoisomers, tautomer, solvates or salts thereof is provided wherein $R_4$ is pyrrolidinyl, piperidinyl, piperazinyl, or pyridinyl, each substituted with zero to 2 $R_{4a}$. Included in this embodiment are compounds in which $R_4$ is piperidinyl, piperazinyl, or pyridinyl. Also included in this embodiment are compounds in which $R_4$ is piperidinyl or piperazinyl.

In one embodiment, a compound of Formula (I) or stereoisomers, tautomer, solvates or salts thereof is provided wherein $R_4$ is

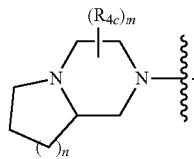

Included in this embodiment are compounds in which n is 1 or 2. Also included in this embodiment are compounds in which n is 1. Additionally, included in this embodiment are compounds in which n is 2.

In one embodiment, a compound of Formula (I) or stereoisomers, tautomer, solvates or salts thereof is provided wherein $R_4$ is pyrrolidinyl, piperidinyl, piperazinyl, or pyridinyl, each substituted with zero to 2 $R_{4a}$; or

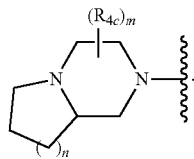

In one embodiment, a compound of Formula (I) or stereoisomers, tautomer, solvates or salts thereof is provided wherein each $R_{4a}$ is independently $C_{1-5}$ alkyl, $C_{1-2}$ fluoroalkyl, $-(CH_2)_{0-2}O(C_{1-2}$ alkyl), $C_{3-6}$ cycloalkyl, $-CH_2(C_{3-6}$ cycloalkyl), $-C(O)(C_{1-4}$ alkyl), $-C(O)(C_{3-6}$ cycloalkyl), $-C(O)(phenyl)$, $-C(O)CH_2(C_{3-6}$ cycloalkyl), $-C(O)CH_2$ (phenyl), $-C(O)O(C_{1-3}$ alkyl), oxetanyl, tetrahydrofuran, or tetrahydropyranyl.

Included in this embodiment are compounds in which each $R_{4a}$ is independently $-CH(CH_3)_2$, $-CH_2CH(CH_3)_2$, $-CH_2CH_2OCH_3$, $-C(O)CH(CH_3)_2$, $-C(O)(cyclopropyl)$, $-CH_2(cyclopropyl)$, $-CH_2(cyclobutyl)$, cyclopropyl, cyclobutyl, oxetanyl, or tetrahydropyranyl. Also included in this embodiment are compounds in which each $R_{4a}$ is independently $-CH(CH_3)_2$, $-CH_2CH(CH_3)_2$, $-C(O)CH(CH_3)_2$, $-C(O)(cyclopropyl)$, or $-CH_2(cyclopropyl)$, cyclopropyl, or cyclobutyl.

In one embodiment, a compound of Formula (I) or stereoisomers, tautomer, solvates or salts thereof is provided wherein $R_{4b}$ is F or Cl. Included in this embodiment are compounds in which $R_{4b}$ is F.

In one embodiment, a compound of Formula (I) or stereoisomers, tautomer, solvates or salts thereof is provided wherein each $R_{4c}$ is independently $C_{1-4}$ alkyl, $C_{1-2}$ fluoroalkyl, $-CH_2(C_{3-6}$ cycloalkyl), $-C(O)(C_{1-3}$ alkyl), $-C(O)$ (phenyl), $-C(O)CH_2(phenyl)$, $-C(O)OCH_2CH_3$, or $C_{3-6}$ cycloalkyl. Included in this embodiment are compounds in which each $R_{4c}$ is independently $C_{1-3}$ alkyl, $C_{1-2}$ fluoroalkyl, $-CH_2(C_{3-4}$ cycloalkyl), $-C(O)(C_{1-2}$ alkyl), $-C(O)(phenyl)$, $-C(O)CH_2(phenyl)$, $-C(O)OCH_2CH_3$, or $C_{3-4}$ cycloalkyl.

In one embodiment, a compound of Formula (I) or stereoisomers, tautomer, solvates or salts thereof is provided wherein each $R_2$ is independently F, Cl, $-CN$, $-OH$, $C_{1-3}$ alkyl, $C_{1-2}$ fluoroalkyl, $C_{1-2}$ cyanoalkyl, $C_{1-3}$ hydroxyalkyl, $C_{1-2}$ aminoalkyl, $-(CH_2)_{0-2}O(C_{1-3}$ alkyl), $C_{3-6}$ cycloalkyl, $-NR_xR_x$, $-(CH_2)_{0-2}C(O)NR_xR_x$, $-CH_2(C_{3-6}$ cycloalkyl), $-CH_2(phenyl)$, or phenyl. Included in this embodiment are compounds in which each $R_2$ is independently Cl, $-CH_3$, $-CH_2CH_3$, $-CH_2OH$, $-CH_2CH_2OH$, $-CH_2CN$, $-OCH_3$, $-CH_2OCH_3$, or $-CH_2CH_2S(O)_2CH_3$. Also, included in this embodiment are compounds in which each $R_2$ is independently Cl, $-CH_3$, $-CH_2OH$, or $-OCH_3$.

In one embodiment, a compound of Formula (I) or stereoisomers, tautomer, solvates or salts thereof is provided wherein $R_{2a}$ is $C_{1-4}$ alkyl, $C_{1-2}$ fluoroalkyl, $C_{1-4}$ hydroxyalkyl, $-(CH_2)_{1-3}OCH_3$, $C_{3-6}$ cycloalkyl, $-CH_2C(O)NR_xR_x$, $-CH_2(C_{3-6}$ cycloalkyl), $-CH_2(phenyl)$, tetrahydrofuranyl, or phenyl; and each $R_{2b}$ is independently H, F, Cl, $-CN$, $-NR_xR_x$, $C_{1-6}$ alkyl, $C_{1-2}$ fluoroalkyl, $C_{1-3}$ hydroxyalkyl, $-(CH_2)_{0-2}O(C_{1-2}$ alkyl), $-(CH_2)_{0-2}C(O)NR_xR_x$, $-(CH_2)_{1-3}(cyclopropyl)$, $-C(O)O(C_{1-2}$ alkyl), $-C(O)NR_x$ $(C_{1-3}$ alkyl), $-CR_x=CH_2$, or $-CH=CH(C_{3-6}$ cycloalkyl). Also included in this embodiment are compounds in which $R_{2a}$ is $-CH_3$; and each $R_{2b}$ is independently H, Cl, or $-CH_3$.

In one embodiment, a compound of Formula (I) or stereoisomers, tautomer, solvates or salts thereof is provided wherein $R_3$ is hydrogen, F, Cl, $C_{1-2}$ alkyl, or $C_{3-4}$ cycloalkyl. Included in this embodiment are compounds in which $R_3$ is hydrogen, $C_{1-2}$ alkyl, or cyclopropyl. Also included in this embodiment are compounds in which $R_3$ is hydrogen or $-CH_3$. Additionally, included in this embodiment are compounds in which $R_3$ is hydrogen.

In one embodiment, a compound of Formula (I) or stereoisomers, tautomer, solvates or salts thereof is provided wherein each $R_5$ is independently hydrogen, F, Cl, $-CH_3$, or cyclopropyl. Included in this embodiment are compounds in which each $R_5$ is independently hydrogen, $-CH_3$, or cyclopropyl. Also included are compounds in which each $R_5$ is hydrogen or $-CH_3$.

In one embodiment, a compound of Formula (I) or stereoisomers, tautomer, solvates or salts thereof is provided wherein G is phenyl substituted with 1 to 2 substituents independently selected from F, $-OCH_3$, and $-S(O)_2CH_3$; A is cyclohexyl, piperidinyl, phenyl, or 6-azabicyclo[3.2.1] octanyl, each substituted with -L-$R_4$; L is a bond; $R_3$ is hydrogen; $R_4$ is piperidinyl, piperazinyl, azepanyl, azaspiro [3.3]heptanyl, azabicyclo[3.2.1]octanyl, or diazabicyclo [3.2.1]octanyl, each substituted with $R_{4a}$; $R_{4a}$ is $-CH(CH_3)_2$, $-CH_2CH(CH_3)_2$, $-CH_2CH_2OCH_3$, $-C(O)$ $CH(CH_3)_2$, $-C(O)(cyclopropyl)$, $-CH_2(cyclopropyl)$, $-CH_2(cyclobutyl)$, cyclopropyl, cyclobutyl, oxetanyl, or tetrahydropyranyl; and each $R_5$ is hydrogen, F, or $-CH_3$.

In one embodiment, a compound of Formula (I) or stereoisomers, tautomer, solvates or salts thereof is provided wherein G is phenyl substituted with 1 to 2 substituents independently selected from F, —OCH$_3$, and —S(O)$_2$CH$_3$; A is piperidinyl or 6-azabicyclo[3.2.1]octanyl, each substituted with -L-R$_4$; L is a bond; R$_3$ is hydrogen; R$_4$ is piperidinyl, azaspiro[3.3]heptanyl, or azabicyclo[3.2.1]octanyl, each substituted with R$_{4a}$; R$_{4a}$ is —CH(CH$_3$)$_2$, —CH$_2$CH(CH$_3$)$_2$, —C(O)CH(CH$_3$)$_2$, —C(O)(cyclopropyl), or —CH$_2$(cyclopropyl), cyclopropyl, or cyclobutyl; and each R$_5$ is hydrogen or —CH$_3$.

One embodiment provides a compound of Formula (I) or stereoisomers, tautomer, solvates or salts thereof, wherein said compound is: 6-(1'-cyclopropyl-[1,4'-bipiperidin]-4-yl)-2-(3,4-dimethoxyphenyl)-8-methylimidazo[1,2-a]pyridine (1); 2-(3,4-dimethoxyphenyl)-6-(1'-isopropyl-[1,4'-bipiperidin]-4-yl)-8-methylimidazo[1,2-a]pyridine (2); 2-(3,4-dimethoxyphenyl)-6-(1'-isobutyl-[1,4'-bipiperidin]-4-yl)-8-methylimidazo[1,2-a]pyridine (3); 6-(1'-cyclopropyl-[1,4'-bipiperidin]-4-yl)-2-(3-fluoro-4-methoxyphenyl)-8-methylimidazo[1,2-a]pyridine (4); 2-(3-fluoro-4-methoxyphenyl)-6-(1'-isopropyl-[1,4'-bipiperidin]-4-yl)-8-methylimidazo[1,2-a]pyridine (5); 2-(3-fluoro-4-methoxyphenyl)-6-(1'-isobutyl-[1,4'-bipiperidin]-4-yl)-8-methylimidazo[1,2-a]pyridine (6); 6-(1'-cyclopropyl-[1,4'-bipiperidin]-4-yl)-8-methyl-2-(4-(methylsulfonyl)phenyl)imidazo[1,2-a]pyridine (7); 6-(1'-isopropyl-[1,4'-bipiperidin]-4-yl)-8-methyl-2-(4-(methylsulfonyl)phenyl) imidazo[1,2-a]pyridine (8); 6-(1'-isobutyl-[1,4'-bipiperidin]-4-yl)-8-methyl-2-(4-(methylsulfonyl)phenyl) imidazo[1,2-a]pyridine (9); 6-(1'-cyclopropyl-[1,4'-bipiperidin]-4-yl)-2-(3,4-dimethoxyphenyl)imidazo[1,2-a] pyridine (10); 2-(3,4-dimethoxyphenyl)-6-(1'-isopropyl-[1,4'-bipiperidin]-4-yl) imidazo[1,2-a]pyridine (11); 2-(3,4-dimethoxyphenyl)-6-(1'-isobutyl-[1,4'-bipiperidin]-4-yl)imidazo[1,2-a]pyridine (12); 2-(3,4-dimethoxyphenyl)-6-(1-(2-isopropyl-2-azaspiro[3.3]heptan-6-yl)piperidin-4-yl)-8-methylimidazo[1,2-a]pyridine (13); 6-(1-(2-cyclobutyl-2-azaspiro[3.3]heptan-6-yl)piperidin-4-yl)-2-(3,4-dimethoxyphenyl)-8-methylimidazo[1,2-a]pyridine (14); 2-(3,4-dimethoxyphenyl)-6-(1-(2-isobutyl-2-azaspiro[3.3]heptan-6-yl)piperidin-4-yl)-8-methylimidazo[1,2-a]pyridine (15); 6-(1-(2-(cyclopropylmethyl)-2-azaspiro[3.3]heptan-6-yl)piperidin-4-yl)-2-(3,4-dimethoxyphenyl)-8-methylimidazo[1,2-a]pyridine (16); 6-(1-(2-cyclopropyl-2-azaspiro[3.3]heptan-6-yl)piperidin-4-yl)-2-(3,4-dimethoxyphenyl)-8-methylimidazo[1,2-a]pyridine (17); 2-(3,4-dimethoxyphenyl)-6-(1-(8-isobutyl-8-azabicyclo[3.2.1]octan-3-yl) piperidin-4-yl)-8-methylimidazo[1,2-a]pyridine (18-19); 6-(1-(8-(cyclopropylmethyl)-8-azabicyclo[3.2.1]octan-3-yl)piperidin-4-yl)-2-(3,4-dimethoxyphenyl)-8-methylimidazo[1,2-a]pyridine (20-21); 2-(3,4-dimethoxyphenyl)-6-(1-(8-isopropyl-8-azabicyclo[3.2.1]octan-3-yl)piperidin-4-yl)-8-methylimidazo[1,2-a]pyridine (22-23); 6-(8-(1-cyclopropylpiperidin-4-yl)-8-azabicyclo[3.2.1]octan-3-yl)-2-(3,4-dimethoxyphenyl)-8-methylimidazo[1,2-a]pyridine (24); 6-(8-(1-cyclopropylpiperidin-4-yl)-8-azabicyclo[3.2.1]octan-3-yl)-2-(3,4-dimethoxyphenyl)-8-methylimidazo[1,2-a]pyridine (25-26); 2-(3,4-dimethoxyphenyl)-6-(8-(1-isobutylpiperidin-4-yl)-8-azabicyclo[3.2.1]octan-3-yl)-8-methylimidazo[1,2-a]pyridine (27-29); 2-(3,4-dimethoxyphenyl)-6-(8-(1-isopropylpiperidin-4-yl)-8-azabicyclo[3.2.1]octan-3-yl)-8-methylimidazo[1,2-a]pyridine (30); 2-(3,4-dimethoxyphenyl)-7-(1'-isopropyl-[1,4'-bipiperidin]-4-yl)-[1,2,4]triazolo[1,5-a] pyridine (60); 2-(3,4-dimethoxyphenyl)-7-(1'-isobutyl-[1,4'-bipiperidin]-4-yl)-[1,2,4]triazolo[1,5-a] pyridine (61); 6-(1-(8-isopropyl-8-azabicyclo[3.2.1]octan-3-yl)piperidin-4-yl)-8-methyl-2-(4-(methylsulfonyl)phenyl) imidazo[1,2-a]pyridine (62-63); 2-(3,4-dimethoxyphenyl)-8-methyl-6-(4-(4-(oxetan-3-yl) piperazin-1-yl)phenyl)imidazo[1,2-a]pyridine (64); 6-(4-(4-isopropylpiperazin-1-yl) phenyl)-8-methyl-2-(4-(methylsulfonyl)phenyl) imidazo[1,2-a]pyridine (65); 8-fluoro-6-(1'-isopropyl-[1,4'-bipiperidin]-4-yl)-2-(4-(methylsulfonyl)phenyl) imidazo[1,2-a]pyridine (67); 8-fluoro-6-(1-(8-isopropyl-8-azabicyclo[3.2.1]octan-3-yl)piperidin-4-yl)-2-(4-(methylsulfonyl)phenyl)imidazo[1,2-a]pyridine (68-69); 7-fluoro-6-(1'-isopropyl-[1,4'-bipiperidin]-4-yl)-2-(4-(methylsulfonyl)phenyl) imidazo[1,2-a]pyridine (70); 8-fluoro-6-(1-(1-isopropylazepan-4-yl)piperidin-4-yl)-2-(4-(methylsulfonyl)phenyl)imidazo[1,2-a]pyridine (71-72); 5-fluoro-6-(1'-isopropyl-[1,4'-bipiperidin]-4-yl)-2-(4-(methylsulfonyl) phenyl) imidazo[1,2-a]pyridine (73); 6-(1-(8-cyclobutyl-8-azabicyclo[3.2.1]octan-3-yl) piperidin-4-yl)-8-methyl-2-(4-(methylsulfonyl)phenyl)imidazo[1,2-a] pyridine (83-84); 6-(1-(8-isobutyl-8-azabicyclo[3.2.1]octan-3-yl)piperidin-4-yl)-8-methyl-2-(4-(methylsulfonyl)phenyl) imidazo[1,2-a]pyridine (85-86); 6-(1-(8-(cyclopropylmethyl)-8-azabicyclo[3.2.1]octan-3-yl) piperidin-4-yl)-8-methyl-2-(4-(methylsulfonyl)phenyl) imidazo[1,2-a]pyridine (87-88); 6-(1-(8-(cyclobutylmethyl)-8-azabicyclo[3.2.1]octan-3-yl)piperidin-4-yl)-8-methyl-2-(4-(methylsulfonyl)phenyl)imidazo[1,2-a]pyridine (89-90); 6-(1'-cyclobutyl-[1,4'-bipiperidin]-4-yl)-8-methyl-2-(4-(methylsulfonyl)phenyl) imidazo[1,2-a]pyridine (91); 6-(1'-(cyclopropylmethyl)-[1,4'-bipiperidin]-4-yl)-8-methyl-2-(4-(methylsulfonyl)phenyl)imidazo[1,2-a]pyridine (92); 6-(1'-(cyclobutylmethyl)-[1,4'-bipiperidin]-4-yl)-8-methyl-2-(4-(methylsulfonyl)phenyl)imidazo[1,2-a] pyridine (93); 2-(3,4-dimethoxyphenyl)-6-(4-(4-isobutylpiperazin-1-yl)phenyl)-8-methylimidazo[1,2-a] pyridine (94); 6-(4-(4-(cyclopropylmethyl)piperazin-1-yl) phenyl)-2-(3,4-dimethoxyphenyl)-8-methylimidazo[1,2-a] pyridine (95); 2-(3,4-dimethoxyphenyl)-6-(4-(4-isopropylpiperazin-1-yl)phenyl)-8-methylimidazo[1,2-a] pyridine (96); 2-(3,4-dimethoxyphenyl)-8-methyl-6-(4-(4-(tetrahydro-2H-pyran-4-yl)piperazin-1-yl)phenyl) imidazo [1,2-a]pyridine (97); 2-(3,4-dimethoxyphenyl)-6-(4-(4-(2-methoxyethyl) piperazin-1-yl)phenyl)-8-methylimidazo[1,2-a]pyridine (98); 6-(4-(4-isobutylpiperazin-1-yl)phenyl)-8-methyl-2-(4-(methylsulfonyl)phenyl) imidazo[1,2-a] pyridine (99); 6-(4-(4-(cyclopropylmethyl)piperazin-1-yl) phenyl)-8-methyl-2-(4-(methylsulfonyl)phenyl) imidazo[1,2-a]pyridine (100); 6-(4-(4-(cyclobutylmethyl)piperazin-1-yl)phenyl)-8-methyl-2-(4-(methylsulfonyl)phenyl)imidazo[1,2-a]pyridine (101); 6-(4-(4-cyclobutylpiperazin-1-yl) phenyl)-8-methyl-2-(4-(methylsulfonyl)phenyl) imidazo[1,2-a]pyridine (102); 8-methyl-2-(4-(methylsulfonyl)phenyl)-6-(4-(4-(oxetan-3-yl)piperazin-1-yl)phenyl)imidazo[1,2-a] pyridine (103); 8-methyl-2-(4-(methylsulfonyl)phenyl)-6-(4-(4-(tetrahydro-2H-pyran-4-yl) piperazin-1-yl)phenyl) imidazo[1,2-a]pyridine (104); 6-(4-(4-(2-methoxyethyl) piperazin-1-yl)phenyl)-8-methyl-2-(4-(methylsulfonyl) phenyl) imidazo[1,2-a]pyridine (105); 7-(1'-isobutyl-[1,4'-bipiperidin]-4-yl)-5-methyl-2-(4-(methylsulfonyl)phenyl) imidazo[1,2-a]pyridine (106); 8-fluoro-6-(1'-isobutyl-[1,4'-bipiperidin]-4-yl)-2-(4-(methylsulfonyl)phenyl) imidazo[1,2-a]pyridine (107); 6-(1'-cyclopropyl-[1,4'-bipiperidin]-4-yl)-8-fluoro-2-(4-(methylsulfonyl)phenyl) imidazo[1,2-a] pyridine (108); 6-(1'-(cyclopropylmethyl)-[1,4'-bipiperidin]-4-yl)-8-fluoro-2-(4-(methylsulfonyl)phenyl) imidazo[1,2-a]pyridine (109); 6-(1'-cyclobutyl-[1,4'-bipiperidin]-4-yl)-8-fluoro-2-(4-(methylsulfonyl)phenyl) imidazo[1,2-a]pyridine (110); 8-fluoro-2-(4-(methylsulfonyl)phenyl)-6-(1'-(oxetan-3-yl)-[1,4'-bipiperidin]-4-yl)imidazo[1,2-a]pyridine (111); 8-fluoro-2-(4-(methylsulfonyl)

phenyl)-6-(1'-(tetrahydro-2H-pyran-4-yl)-[1,4'-bipiperidin]-4-yl)imidazo[1,2-a]pyridine (112); 8-fluoro-6-(1-(8-isobutyl-8-azabicyclo[3.2.1]octan-3-yl)piperidin-4-yl)-2-(4-(methylsulfonyl)phenyl)imidazo[1,2-a]pyridine (113-114); 6-(1-(8-(cyclopropylmethyl)-8-azabicyclo[3.2.1]octan-3-yl)piperidin-4-yl)-8-fluoro-2-(4-(methylsulfonyl)phenyl)imidazo[1,2-a]pyridine (115-116); 6-(1-(8-cyclobutyl-8-azabicyclo[3.2.1]octan-3-yl)piperidin-4-yl)-8-fluoro-2-(4-(methylsulfonyl) phenyl)imidazo[1,2-a]pyridine (117); 6-(1-(8-cyclobutyl-8-azabicyclo[3.2.1]octan-3-yl) piperidin-4-yl)-8-fluoro-2-(4-(methylsulfonyl)phenyl)imidazo[1,2-a]pyridine (118); 8-fluoro-2-(4-(methylsulfonyl)phenyl)-6-(1-(8-(oxetan-3-yl)-8-azabicyclo[3.2.1]octan-3-yl)piperidin-4-yl)imidazo[1,2-a]pyridine (119-120); 8-fluoro-2-(4-(methylsulfonyl) phenyl)-6-(1-(8-(tetrahydro-2H-pyran-4-yl)-8-azabicyclo[3.2.1]octan-3-yl)piperidin-4-yl) imidazo[1,2-a]pyridine (121-122); 7-fluoro-6-(1'-isobutyl-[1,4'-bipiperidin]-4-yl)-2-(4-(methylsulfonyl)phenyl) imidazo[1,2-a]pyridine (123); 6-(1'-cyclopropyl-[1,4'-bipiperidin]-4-yl)-7-fluoro-2-(4-(methylsulfonyl)phenyl) imidazo [1,2-a]pyridine (124); 8-fluoro-6-(1-(1-isobutylazepan-4-yl)piperidin-4-yl)-2-(4-(methylsulfonyl)phenyl) imidazo[1,2-a]pyridine (125-126); 6-(1-(1-(cyclopropylmethyl)azepan-4-yl)piperidin-4-yl)-8-fluoro-2-(4-(methylsulfonyl)phenyl) imidazo[1,2-a]pyridine (127-128); 8-fluoro-2-(4-(methylsulfonyl)phenyl)-6-(1-(1-(tetrahydro-2H-pyran-4-yl)azepan-4-yl)piperidin-4-yl)imidazo[1,2-a]pyridine (129-130); 5-fluoro-6-(1'-isobutyl-[1,4'-bipiperidin]-4-yl)-2-(4-(methylsulfonyl)phenyl) imidazo[1,2-a]pyridine (131); 8-fluoro-7-(1'-isopropyl-[1,4'-bipiperidin]-4-yl)-2-(4-(methylsulfonyl)phenyl) imidazo[1,2-a]pyridine (132); or 8-fluoro-2-(4-(methylsulfonyl)phenyl)-7-(1'-(tetrahydro-2H-pyran-4-yl)-[1,4'-bipiperidin]-4-yl)imidazo[1,2-a]pyridine (133).

One embodiment provides a compound of Formula (I) or stereoisomers, tautomer, solvates or salts thereof, wherein said compound is: 2-(3,4-dimethoxyphenyl)-6-(1'-isobutyl-[1,4'-bipiperidin]-4-yl)-5,6,7,8-tetrahydroimidazo[1,2-a]pyridine (31-33); 2-(3,4-dimethoxyphenyl)-6-(1'-isopropyl-[1,4'-bipiperidin]-4-yl)-5,6,7,8-tetrahydroimidazo[1,2-a]pyridine (34-36); 6-(1'-cyclopropyl-[1,4'-bipiperidin]-4-yl)-2-(3,4-dimethoxyphenyl)-5,6,7,8-tetrahydroimidazo[1,2-a]pyridine (37-38); 1-(4-(2-(3,4-dimethoxyphenyl)-5,6,7,8-tetrahydroimidazo[1,2-a]pyridin-6-yl)-[1,4'-bipiperidin]-1'-yl)-2-methylpropan-1-one (39-41); cyclopropyl(4-(2-(3,4-dimethoxyphenyl)-5,6,7,8-tetrahydroimidazo[1,2-a]pyridin-6-yl)-[1,4'-bipiperidin]-1'-yl)methanone (42-44); -(3,4-dimethoxyphenyl)-6-(1-(2-isopropyl-2-azaspiro[3.3]heptan-6-yl)piperidin-4-yl)-5,6,7,8-tetrahydroimidazo[1,2-a]pyridine (45-47); 6-(1-(2-cyclobutyl-2-azaspiro[3.3]heptan-6-yl)piperidin-4-yl)-2-(3,4-dimethoxyphenyl)-5,6,7,8-tetrahydroimidazo[1,2-a]pyridine (48-50); 6-(1-(2-(cyclopropylmethyl)-2-azaspiro[3.3]heptan-6-yl)piperidin-4-yl)-2-(3,4-dimethoxyphenyl)-5,6,7,8-tetrahydroimidazo[1,2-a]pyridine (51); 2-(3,4-dimethoxyphenyl)-6-(1-(2-isobutyl-2-azaspiro[3.3]heptan-6-yl)piperidin-4-yl)-5,6,7,8-tetrahydroimidazo[1,2-a]pyridine (52-54); 6-(1'-(cyclopropylmethyl)-[1,4'-bipiperidin]-4-yl)-2-(3,4-dimethoxyphenyl)-5,6,7,8-tetrahydroimidazo[1,2-a]pyridine (55-57); (6R)-2-(3,4-dimethoxyphenyl)-6-(1-(8-isobutyl-8-azabicyclo[3.2.1]octan-3-yl)piperidin-4-yl)-5,6,7,8-tetrahydroimidazo[1,2-a]pyridine (75-76); (6S)-2-(3,4-dimethoxyphenyl)-6-(1-(8-isobutyl-8-azabicyclo[3.2.1]octan-3-yl)piperidin-4-yl)-5,6,7,8-tetrahydroimidazo[1,2-a]pyridine (77-78); (6R)-6-(1-(8-isobutyl-8-azabicyclo[3.2.1]octan-3-yl)piperidin-4-yl)-2-(4-(methylsulfonyl)phenyl)-5,6,7,8-tetrahydroimidazo[1,2-a]pyridine (79-80); (6S)-6-(1-(8-isobutyl-8-azabicyclo[3.2.1]octan-3-yl)piperidin-4-yl)-2-(4-(methylsulfonyl)phenyl)-5,6,7,8-tetrahydroimidazo[1,2-a]pyridine (81-82); (6R)-2-(3,4-dimethoxyphenyl)-6-(1-(8-isopropyl-8-azabicyclo[3.2.1]octan-3-yl)piperidin-4-yl)-5,6,7,8-tetrahydroimidazo[1,2-a]pyridine (134-135); (6S)-2-(3,4-dimethoxyphenyl)-6-(1-(8-isopropyl-8-azabicyclo[3.2.1]octan-3-yl)piperidin-4-yl)-5,6,7,8-tetrahydroimidazo[1,2-a]pyridine (136-137); (6R)-6-(1-(8-(cyclopropylmethyl)-8-azabicyclo[3.2.1]octan-3-yl)piperidin-4-yl)-2-(4-(methylsulfonyl)phenyl)-5,6,7,8-tetrahydroimidazo[1,2-a]pyridine (138-139); or (6S)-6-(1-(8-(cyclopropylmethyl)-8-azabicyclo[3.2.1]octan-3-yl)piperidin-4-yl)-2-(4-(methylsulfonyl)phenyl)-5,6,7,8-tetrahydroimidazo[1,2-a]pyridine (140-141).

One embodiment provides a compound of Formula (I) or stereoisomers, tautomer, solvates or salts thereof, wherein said compound is: 2-(3,4-dimethoxyphenyl)-7-(1'-isopropyl-[1,4'-bipiperidin]-4-yl)-5,6,7,8-tetrahydroimidazo[1,2-a]pyridine (58); or 2-(3,4-dimethoxyphenyl)-7-(1'-isobutyl-[1,4'-bipiperidin]-4-yl)-5,6,7,8-tetrahydroimidazo[1,2-a]pyridine (59).

One embodiment provides a compound of Formula (I) or stereoisomers, tautomer, solvates or salts thereof, wherein said compound is: 7-(1'-isopropyl-[1,4'-bipiperidin]-4-yl)-5-methyl-2-(4-(methylsulfonyl)phenyl) imidazo[1,2-a]pyridine (66); or 8-fluoro-7-(1'-isobutyl-[1,4'-bipiperidin]-4-yl)-2-(4-(methylsulfonyl)phenyl) imidazo[1,2-a]pyridine (74).

One embodiment provides a compound of Formula (I) or stereoisomers, tautomer, solvates or salts thereof, wherein said compound is: 2-(3,4-dimethoxyphenyl)-6-(4-(4-isopropylpiperazin-1-yl)phenyl)-8-methyl-[1,2,4]triazolo[1,5-a]pyridine (142); 6-(8-(1-cyclopropylpiperidin-4-yl)-8-azabicyclo[3.2.1]octan-3-yl)-2-(3,4-dimethoxyphenyl)-[1,2,4]triazolo[1,5-a]pyridine (146); 6-(4-(4-isopropylpiperazin-1-yl)phenyl)-8-methyl-2-(4-(methylsulfonyl)phenyl)-[1,2,4]triazolo[1,5-a]pyridine (147); 2-(3,4-dimethoxyphenyl)-6-(8-(1-isopropylpiperidin-4-yl)-8-azabicyclo[3.2.1]octan-3-yl)-[1,2,4]triazolo[1,5-a]pyridine (149); 2-(3,4-dimethoxyphenyl)-6-(4-(8-isopropyl-3,8-diazabicyclo[3.2.1]octan-3-yl)phenyl)-8-methyl-[1,2,4]triazolo[1,5-a]pyridine (151); 6-(4-(8-isopropyl-3,8-diazabicyclo[3.2.1]octan-3-yl)phenyl)-8-methyl-2-(4-(methylsulfonyl)phenyl)-[1,2,4]triazolo[1,5-a]pyridine (153); 6-(8-(1-cyclopropylpiperidin-4-yl)-8-azabicyclo[3.2.1]octan-3-yl)-2-(3,4-dimethoxyphenyl)-8-methyl-[1,2,4]triazolo[1,5-a]pyridine (155); 2-(3,4-dimethoxyphenyl)-6-(8-(1-isopropylpiperidin-4-yl)-8-azabicyclo[3.2.1]octan-3-yl)-8-methyl-[1,2,4]triazolo[1,5-a]pyridine (156); 6-(1'-cyclopropyl-[1,4'-bipiperidin]-4-yl)-2-(3,4-dimethoxyphenyl)-8-methyl-[1,2,4]triazolo[1,5-a]pyridine (157); 2-(3,4-dimethoxyphenyl)-6-(1'-isopropyl-[1,4'-bipiperidin]-4-yl)-8-methyl-[1,2,4]triazolo[1,5-a] pyridine (158); 6-(8-(1-cyclopropylpiperidin-4-yl)-8-azabicyclo[3.2.1]octan-3-yl)-8-methyl-2-(4-(methylsulfonyl)phenyl)-[1,2,4]triazolo[1,5-a]pyridine (159); 6-(8-(1-isopropylpiperidin-4-yl)-8-azabicyclo[3.2.1]octan-3-yl)-8-methyl-2-(4-(methylsulfonyl)phenyl)-[1,2,4]triazolo[1,5-a]pyridine (160); 6-(1'-cyclopropyl-[1,4'-bipiperidin]-4-yl)-8-methyl-2-(4-(methylsulfonyl)phenyl)-[1,2,4]triazolo[1,5-a]pyridine (161); 6-(1'-isopropyl-[1,4'-bipiperidin]-4-yl)-8-methyl-2-(4-(methylsulfonyl)phenyl)-[1,2,4]triazolo[1,5-a]pyridine (162); 6-(1'-isobutyl-[1,4'-bipiperidin]-4-yl)-8-methyl-2-(4-(methylsulfonyl)phenyl)-[1,2,4]triazolo[1,5-a]pyridine (163); 6-(1'-cyclopropyl-[1,4'-bipiperidin]-4-yl)-2-(3,4-dimethoxyphenyl)-[1,2,4]triazolo[1,5-a]pyridine (164); 2-(3,4-dimethoxyphenyl)-6-(4-(8-isopropyl-8-azabicyclo[3.2.1]octan-3-yl)phenyl)-[1,2,4]triazolo[1,5-a]pyridine (166); or 6-(4-(4-isopropylpiperazin-1-yl)phenyl)-2-(4-(methylsulfonyl)phenyl)-[1,2,4]triazolo[1,5-a]pyridine (167).

One embodiment provides a compound of Formula (I) or stereoisomers, tautomer, solvates or salts thereof, wherein said compound is: 2-(3,4-dimethoxyphenyl)-6-(4-(4-isopropylpiperazin-1-yl)cyclohexyl)-8-methyl-5,6,7,8-tetrahydro-[1,2,4]triazolo[1,5-a]pyridine (143); 2-(3,4-dimethoxyphenyl)-6-(4-(4-isopropylpiperazin-1-yl)phenyl)-8-methyl-5,6,7,8-tetrahydro-[1,2,4]triazolo[1,5-a]pyridine (144); 6-(8-(1-cyclopropylpiperidin-4-yl)-8-azabicyclo[3.2.1]octan-3-yl)-2-(3,4-dimethoxyphenyl)-5,6,7,8-tetrahydro-[1,2,4]triazolo[1,5-a]pyridine (145); 2-(3,4-dimethoxyphenyl)-6-(8-(1-isopropylpiperidin-4-yl)-8-azabicyclo[3.2.1]octan-3-yl)-5,6,7,8-tetrahydro-[1,2,4]triazolo[1,5-a]pyridine (148); 6-(4-(4-isopropylpiperazin-1-yl)phenyl)-8-methyl-2-(4-(methylsulfonyl)phenyl)-5,6,7,8-tetrahydro-[1,2,4]triazolo[1,5-a]pyridine (150); 2-(3,4-dimethoxyphenyl)-6-(4-(8-isopropyl-3,8-diazabicyclo[3.2.1]octan-3-yl)phenyl)-8-methyl-5,6,7,8-tetrahydro-[1,2,4]triazolo[1,5-a]pyridine (152); or 6-(4-(8-isopropyl-3,8-diazabicyclo[3.2.1]octan-3-yl)phenyl)-8-methyl-2-(4-(methylsulfonyl)phenyl)-5,6,7,8-tetrahydro-[1,2,4]triazolo[1,5-a]pyridine (154).

One embodiment provides a compound of Formula (I) or stereoisomers, tautomer, solvates or salts thereof, wherein said compound is: 2-(3,4-dimethoxyphenyl)-7-(1'-isopropyl-[1,4'-bipiperidin]-4-yl)-[1,2,4]triazolo[1,5-a] pyridine (60); 2-(3,4-dimethoxyphenyl)-7-(1'-isobutyl-[1,4'-bipiperidin]-4-yl)-[1,2,4]triazolo[1,5-a] pyridine (61); or 2-(3,4-dimethoxyphenyl)-6-(1'-isopropyl-[1,4'-bipiperidin]-4-yl)-[1,2,4]triazolo[1,5-a]pyridine (165).

One embodiment provides compounds of the Formula (I) having TLR9 $IC_{50}$ values of ≤0.6 μM.

One embodiment provides compounds of the Formula (I) having TLR9 $IC_{50}$ values of ≤0.1 μM.

One embodiment provides compounds of the Formula (I) having TLR9 $IC_{50}$ values of ≤0.05 μM.

One embodiment provides compounds of the Formula (I) having TLR9 $IC_{50}$ values of ≤0.025 μM.

One embodiment provides compounds of the Formula (I) having TLR9 $IC_{50}$ values of ≤0.015 μM.

One embodiment provides compounds of the Formula (I) having TLR9 $IC_{50}$ values of ≤0.01 μM.

In another embodiment, the present invention provides a composition comprising at least one of the compounds of the present invention, or a stereoisomer, a tautomer, or a pharmaceutically acceptable salt or a solvate thereof.

In another embodiment, the present invention provides a pharmaceutical composition comprising a pharmaceutically acceptable carrier and at least one of the compounds of the present invention or a stereoisomer, a tautomer, or a pharmaceutically acceptable salt or a solvate thereof.

In another embodiment, the present invention provides a pharmaceutical composition, comprising a pharmaceutically acceptable carrier and a therapeutically effective amount of at least one of the compounds of the present invention or a stereoisomer, a tautomer, or a pharmaceutically acceptable salt or a solvate thereof.

In another embodiment, the present invention provides a process for making a compound of the present invention.

In another embodiment, the present invention provides an intermediate for making a compound of the present invention.

In another embodiment, the present invention provides a pharmaceutical composition as defined above further comprising one or more additional therapeutic agents.

Definitions

The features and advantages of the invention may be more readily understood by those of ordinary skill in the art upon reading the following detailed description. It is to be appreciated that certain features of the invention that are, for clarity reasons, described above and below in the context of separate embodiments, may also be combined to form a single embodiment. Conversely, various features of the invention that are, for brevity reasons, described in the context of a single embodiment, may also be combined so as to form sub-combinations thereof. Embodiments identified herein as exemplary or preferred are intended to be illustrative and not limiting.

Unless specifically stated otherwise herein, references made in the singular may also include the plural. For example, "a" and "an" may refer to either one, or one or more.

As used herein, the phase "compounds" refers to at least one compound. For example, a compound of Formula (I) includes a compound of Formula (I) and two or more compounds of Formula (I).

Unless otherwise indicated, any heteroatom with unsatisfied valences is assumed to have hydrogen atoms sufficient to satisfy the valences.

The definitions set forth herein take precedence over definitions set forth in any patent, patent application, and/or patent application publication incorporated herein by reference.

Listed below are definitions of various terms used to describe the present invention. These definitions apply to the terms as they are used throughout the specification (unless they are otherwise limited in specific instances) either individually or as part of a larger group.

Throughout the specification, groups and substituents thereof may be chosen by one skilled in the field to provide stable moieties and compounds.

In accordance with a convention used in the art,

is used in structural formulas herein to depict the bond that is the point of attachment of the moiety or substituent to the core or backbone structure.

The terms "halo" and "halogen," as used herein, refer to F, Cl, Br, and I.

The term "cyano" refers to the group —CN.

The term "amino" refers to the group —$NH_2$.

The term "oxo" refers to the group =O.

The term "alkyl" as used herein, refers to both branched and straight-chain saturated aliphatic hydrocarbon groups containing, for example, from 1 to 12 carbon atoms, from 1 to 6 carbon atoms, and from 1 to 4 carbon atoms. Examples of alkyl groups include, but are not limited to, methyl (Me), ethyl (Et), propyl (e.g., n-propyl and i-propyl), butyl (e.g., n-butyl, i-butyl, sec-butyl, and t-butyl), and pentyl (e.g., n-pentyl, isopentyl, neopentyl), n-hexyl, 2-methylpentyl, 2-ethylbutyl, 3-methylpentyl, and 4-methylpentyl. When numbers appear in a subscript after the symbol "C", the subscript defines with more specificity the number of carbon atoms that a particular group may contain. For example, "$C_{1-6}$ alkyl" denotes straight and branched chain alkyl groups with one to six carbon atoms.

The term "fluoroalkyl" as used herein is intended to include both branched and straight-chain saturated aliphatic hydrocarbon groups substituted with one or more fluorine atoms. For example, "$C_{1-4}$ fluoroalkyl" is intended to include $C_1$, $C_2$, $C_3$, and $C_4$ alkyl groups substituted with one or more fluorine atoms. Representative examples of fluoroalkyl groups include, but are not limited to, —$CF_3$ and —$CH_2CF_3$.

The term "hydroxyalkyl" includes both branched and straight-chain saturated alkyl groups substituted with one or more hydroxyl groups. For example, "hydroxyalkyl" includes —$CH_2OH$, —$CH_2CH_2OH$, and $C_{1-4}$ hydroxyalkyl.

The term "aminoalkyl" includes both branched and straight-chain saturated alkyl groups substituted with one or more amine groups. For example, "aminoalkyl" includes —$CH_2NH_2$, —$CH_2CH_2NH_2$, and $C_{1-4}$ aminoalkyl.

The term "cyanoalkyl" includes both branched and straight-chain saturated alkyl groups substituted with one or more cyano groups. For example, "aminoalkyl" includes —$CH_2CN$, —$CH_2CH_2CN$, and $C_{1-4}$ cyanoalkyl.

The term "alkoxy," as used herein, refers to an alkyl group attached to the parent molecular moiety through an oxygen atom, for example, methoxy group (—$OCH_3$). For example, "$C_{1-3}$ alkoxy" denotes alkoxy groups with one to three carbon atoms.

The terms "fluoroalkoxy" and "—O(fluoroalkyl)" represent a fluoroalkyl group as defined above attached through an oxygen linkage (—O—). For example, "$C_{1-4}$ fluoroalkoxy" is intended to include $C_1$, $C_2$, $C_3$, and $C_4$ fluoroalkoxy groups.

The term "alkoxyalkyl," as used herein, refers to an alkoxy group attached through its oxygen atom to an alkyl group, which is attached to the parent molecular moiety through a carbon atom, for example, methoxymethyl group (—$CH_2OCH_3$). For example, "$C_{2-4}$ alkoxyalkyl" denotes alkoxyalkyl groups with two to four carbon atoms, such as —$CH_2OCH_3$, —$CH_2CH_2OCH_3$, —$CH_2OCH_2CH_3$, and —$CH_2CH_2OCH_2CH_3$.

The term "cycloalkyl," as used herein, refers to a group derived from a non-aromatic monocyclic or polycyclic hydrocarbon molecule by removal of one hydrogen atom from a saturated ring carbon atom. Representative examples of cycloalkyl groups include, but are not limited to, cyclopropyl, cyclopentyl, and cyclohexyl. When numbers appear in a subscript after the symbol "C", the subscript defines with more specificity the number of carbon atoms that a particular cycloalkyl group may contain. For example, "$C_{3-6}$ cycloalkyl" denotes cycloalkyl groups with three to six carbon atoms.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The compounds of Formula (I) can be provided as amorphous solids or crystalline solids. Lyophilization can be employed to provide the compounds of Formula (I) as amorphous solids.

It should further be understood that solvates (e.g., hydrates) of the compounds of Formula (I) are also within the scope of the present invention. The term "solvate" means a physical association of a compound of Formula (I) with one or more solvent molecules, whether organic or inorganic. This physical association includes hydrogen bonding. In certain instances the solvate will be capable of isolation, for example when one or more solvent molecules are incorporated in the crystal lattice of the crystalline solid. "Solvate" encompasses both solution-phase and isolable solvates. Exemplary solvates include hydrates, ethanolates, methanolates, isopropanolates, acetonitrile solvates, and ethyl acetate solvates. Methods of solvation are known in the art.

Various forms of prodrugs are well known in the art and are described in Rautio, J. et al., *Nature Review Drug Discovery*, 17, 559-587 (2018).

In addition, compounds of Formula (I), subsequent to their preparation, can be isolated and purified to obtain a composition containing an amount by weight equal to or greater than 99% of a compound of Formula (I), respectively ("substantially pure"), which is then used or formulated as described herein. Such "substantially pure" compounds of Formula (I) are also contemplated herein as part of the present invention.

"Stable compound" and "stable structure" are meant to indicate a compound that is sufficiently robust to survive isolation to a useful degree of purity from a reaction mixture, and formulation into an efficacious therapeutic agent. The present invention is intended to embody stable compounds.

"Therapeutically effective amount" is intended to include an amount of a compound of the present invention alone or an amount of the combination of compounds claimed or an amount of a compound of the present invention in combination with other active ingredients effective to act as an inhibitor of TLR9, or effective to treat or prevent disorders associated with a fibrotic disease or disorder, dysregulation of bile acids, such as pathological fibrosis.

As used herein, "treating" or "treatment" cover the treatment of a disease-state in a mammal, particularly in a human, and include: (a) preventing the disease-state from occurring in a mammal, in particular, when such mammal is predisposed to the disease-state but has not yet been diagnosed as having it; (b) inhibiting the disease-state, i.e., arresting its development; and/or (c) relieving the disease-state, i.e., causing regression of the disease state.

The compounds of the present invention are intended to include all isotopes of atoms occurring in the present compounds. Isotopes include those atoms having the same atomic number but different mass numbers. By way of general example and without limitation, isotopes of hydrogen include deuterium (D) and tritium (T). Isotopes of carbon include $^{13}C$ and $^{11}C$. Isotopically-labeled compounds of the invention can generally be prepared by conventional techniques known to those skilled in the art or by processes analogous to those described herein, using an appropriate isotopically-labeled reagent in place of the non-labeled reagent otherwise employed. For example, methyl (—$CH_3$) also includes deuterated methyl groups such as —$CD_3$.

Utility

The compounds of the invention are useful for inhibiting the TLR9 receptor.

One embodiment provides a method for the treatment of a disease, disorder, or condition associated with dysregulation of bile acids in a patient in need of such treatment, and the method comprises administering a therapeutically effective amount of a compound of the present invention, or a stereoisomer, a tautomer, or a pharmaceutically acceptable salt or solvate thereof, to the patient.

One embodiment provides a method for the treatment of a disease, disorder, or condition associated with activity of the TLR9 receptor in a patient in need of such treatment comprising administering a therapeutically effective amount of a compound of the present invention, or a stereoisomer, a tautomer, or a pharmaceutically acceptable salt or solvate thereof, to the patient.

One embodiment provides a method for the treatment of the disease, disorder, or condition comprising administering to a patient in need of such treatment a therapeutically effective amount of at least one of the compounds of the present invention, alone, or, optionally, in combination with another compound of the present invention and/or at least one other type of therapeutic agent.

One embodiment provides a method for eliciting an TLR9 receptor agonizing effect in a patient comprising administering a therapeutically effective amount of a compound of the present invention, or a stereoisomer, a tautomer, or a pharmaceutically acceptable salt or solvate thereof, to the patient.

In some embodiments, the disease, disorder, or condition is associated with TLR9 dysfunction include pathological fibrosis, cancer, inflammatory disorders, metabolic, or cholestatic disorders.

In some embodiments, the disease, disorder, or condition is associated with fibrosis, including liver, biliary, renal, cardiac, dermal, ocular, and pancreatic fibrosis.

In other embodiments, the disease, disorder, or condition is associated with cell-proliferative disorders, such as cancer. In some embodiments, the cancer includes solid tumor growth or neoplasia. In other embodiments, the cancer includes tumor metastasis. In some embodiments, the cancer is of the liver, gall bladder, small intestine, large intestine, kidney, prostate, bladder, blood, bone, brain, breast, central nervous system, cervix, colon, endometrium, esophagus, genitalia, genitourinary tract, head, larynx, lung, muscle tissue, neck, oral or nasal mucosa, ovary, pancreas, skin, spleen, stomach, testicle, or thyroid. In other embodiments, the cancer is a carcinoma, sarcoma, lymphoma, leukemia, melanoma, mesothelioma, multiple myeloma, or seminoma.

Examples of diseases, disorders, or conditions associated with the activity of FXR that can be prevented, modulated, or treated according to the present invention include, but are not limited to, transplant injection, fibrotic disorders (e. g., liver fibrosis, kidney fibrosis), inflammatory disorders (e.g., acute hepatitis, chronic hepatitis, non-alcoholic steatohepatitis (NASH), irritable bowel syndrome (IBS), inflammatory bowel disease (IBD)), as well as cell-proliferative disorders (e.g., cancer, myeloma, fibroma, hepatocellular carcinoma, colorectal cancer, prostate cancer, leukemia, Kaposi's sarcoma, solid tumors).

The fibrotic disorders, inflammatory disorders, as well as cell-proliferative disorders that are suitable to be prevented or treated by the compounds of the present invention include, but are not limited to, non-alcoholic fatty liver disease (NAFLD), alcoholic or non-alcoholic steatohepatitis (NASH), acute hepatitis, chronic hepatitis, liver cirrhosis, primary biliary cirrhosis, primary sclerosing cholangitis, drug-induced hepatitis, biliary cirrhosis, portal hypertension, regenerative failure, liver hypofunction, hepatic blood flow disorder, nephropathy, irritable bowel syndrome (IBS), inflammatory bowel disease (IBD), abnormal pancreatic secretion, benign prostatic hyperplasia, neuropathic bladder disease, diabetic nephropathy, focal segmental glomerulosclerosis, IgA nephropathy, nephropathy induced by drugs or transplantation, autoimmune nephropathy, lupus nephritis, liver fibrosis, kidney fibrosis, chronic kidney disease (CKD), diabetic kidney disease (DKD), skin fibrosis, keloids, systemic sclerosis, scleroderma, virally-induced fibrosis, idiopathic pulmonary fibrosis (IPF), interstitial lung disease, non-specific interstitial pneumonia (NSIP), usual interstitial pneumonia (UIP), radiation-induced fibrosis, familial pulmonary fibrosis, airway fibrosis, chronic obstructive pulmonary disease (COPD), spinal cord tumor, hernia of intervertebral disk, spinal canal stenosis, heart failure, cardiac fibrosis, vascular fibrosis, perivascular fibrosis, foot-and-mouth disease, cancer, myeloma, fibroma, hepatocellular carcinoma, colorectal cancer, prostate cancer, leukemia, chronic lymphocytic leukemia, Kaposi's sarcoma, solid tumors, cerebral infarction, cerebral hemorrhage, neuropathic pain, peripheral neuropathy, age-related macular degeneration (AMD), glaucoma, ocular fibrosis, corneal scarring, diabetic retinopathy, proliferative vitreoretinopathy (PVR), cicatricial pemphigoid glaucoma filtration surgery scarring, Crohn's disease or systemic lupus erythematosus; keloid formation resulting from abnormal wound healing; fibrosis occurring after organ transplantation, myelofibrosis, and fibroids. In one embodiment, the present invention provides a method for the treatment of a fibrotic disorder, an inflammatory disorder, or a cell-proliferative disorder, comprising administering to a patient in need of such treatment a therapeutically effective amount of at least one of the compounds of the present invention, alone, or, optionally, in combination with another compound of the present invention and/or at least one other type of therapeutic agent.

In another embodiment, the present invention provides a compound of the present invention for use in therapy.

In another embodiment, the present invention provides a compound of the present invention for use in therapy for the treatment of a fibrotic disorder, an inflammatory disorder, or a cell-proliferative disorder thereof.

In another embodiment, the present invention also provides the use of a compound of the present invention for the manufacture of a medicament for the treatment of a fibrotic disorder, an inflammatory disorder, or a cell-proliferative disorder thereof.

In another embodiment, the present invention provides a method for the treatment of a fibrotic disorder, an inflammatory disorder, or a cell-proliferative disorder, comprising administering to a patient in need thereof a therapeutically effective amount of a first and second therapeutic agent, wherein the first therapeutic agent is a compound of the present invention.

In another embodiment, the present invention provides a combined preparation of a compound of the present invention and additional therapeutic agent(s) for simultaneous, separate or sequential use in therapy.

In another embodiment, the present invention provides a combined preparation of a compound of the present invention and additional therapeutic agent(s) for simultaneous, separate or sequential use in the treatment of a fibrotic disorder, an inflammatory disorder, or a cell-proliferative disorder.

The compounds of the present invention may be employed in combination with additional therapeutic agent(s), such as one or more anti-fibrotic and/or anti-inflammatory therapeutic agents.

In one embodiment, additional therapeutic agent(s) used in combined pharmaceutical compositions or combined methods or combined uses, are selected from one or more, preferably one to three, of the following therapeutic agents: TGFβ receptor inhibitors (for example, galunisertib), inhibitors of TGFβ synthesis (for example, pirfenidone), inhibitors of vascular endothelial growth factor (VEGF), platelet-derived growth factor (PDGF) and fibroblast growth factor (FGF) receptor kinases (for example, nintedanib), humanized anti-αvβ6 integrin monoclonal antibody (for example, 3G9), human recombinant pentraxin-2, recombinant human Serum Amyloid P, recombinant human antibody against TGFβ-1, -2, and -3, endothelin receptor antagonists (for example, macitentan), interferon gamma, c-Jun amino-terminal kinase (JNK) inhibitor (for example, 4-[[9-[(3S)-tetrahydro-3-furanyl]-8-[(2,4,6-trifluorophenyl)amino]-9H-purin-2-yl]amino]-trans-cyclohexanol, 3-pentylbenzeneacetic acid (PBI-4050), tetra-substituted porphyrin derivative containing manganese (III), monoclonal antibody targeting eotaxin-2, interleukin-13 (IL-13) antibody (for example, lebrikizumab, tralokinumab), bispecific antibody targeting interleukin 4 (IL-4) and interleukin 13 (IL-13), NK1 tachykinin receptor agonist (for example, Sar$^9$, Met(O$_2$)$^{11}$-Substance P), Cintredekin Besudotox, human recombinant DNA-derived, IgG1 kappa monoclonal antibody to connective growth factor, and fully human IgG1 kappa antibody, selective for CC-chemokine ligand 2 (for example, carlumab, CCX140), antioxidants (for example, N-acetylcysteine), phosphodiesterase 5 (PDE5) inhibitors (for example, sildenafil), agents for treatment of obstructive airway diseases such as muscarinic antagonists (for example, tiotropium, ipatropium bromide), adrenergic β2 agonists (for example, salbutamol, salmeterol), corticosteroids (for example, triamcinolone, dexamethasone, fluticasone), immunosuppressive agents (for example, tacrolimus, rapamycin, pimecrolimus), and therapeutic agents useful for the treatment of fibrotic conditions, such as liver, biliary, and kidney fibrosis, Non-Alcoholic Fatty Liver Disease (NALFD), Non-Alcoholic Steato-Hepatitis (NASH), cardiac fibrosis, Idiopathic Pulmonary Fibrosis (IPF), and systemic sclerosis. The therapeutic agents useful for the treatment of such fibrotic conditions include, but are not limited to, FXR agonists (for example OCA, GS-9674, and LJN452), LOXL2 inhibitors (for example simtuzumab), LPA1 antagonists (for example, BMS-986020 and SAR 100842), PPAR modulators (for example, elafibrinor, pioglitazone, and saroglitazar, IVA337), SSAO/VAP-1 inhibitors (for example, PXS-4728A and SZE5302), ASK-1 inhibitors (for example GS-4997 or selonsertib), ACC inhibitors (for example, CP-640186 and NDI-010976 or GS-0976), FGF21 mimetics (for example, LY2405319 and BMS-986036), caspase inhibitors (for example, emricasan), NOX4 inhibitors (for example, GKT137831), MGAT2 inhibitor (for example, BMS-963272), aV integrin inhibitors (for example, abituzumab) and bile acid/fatty acid conjugates (for example aramchol). The FXR agonists of various embodiments of the present invention may also be used in combination with one or more therapeutic agents such as CCR2/5 inhibitors (for example, cenicriviroc), Galectin-3 inhibitors (for example, TD-139, GR-MD-02), leukotriene receptor antagonists (for example, tipelukast, montelukast), SGLT2 inhibitors (for example, dapagliflozin, remogliflozin), GLP-1 receptor agonists (for example, liraglutide and semaglutide), FAK inhibitors (for example, GSK-2256098), CB1 inverse agonists (for example, JD-5037), CB2 agonists (for example, APD-371 and JBT-101), autotaxin inhibitors (for example, GLPG1690), prolyl t-RNA synthetase inhibitors (for example, halofugenone), FPR2 agonists (for example, ZK-994), and THR agonists (for example, MGL:3196). In another embodiment, additional therapeutic agent(s) used in combined pharmaceutical compositions or combined methods or combined uses, are selected from one or more, preferably one to three, of immunoncology agents, such as Alemtuzumab, Atezolizumab, Ipilimumab, Nivolumab, Ofatumumab, Pembrolizumab, and Rituximab.

When the terms "TLR9-associated condition" or "TLR9-associated disease or disorder" are used herein, each is intended to encompass all of the conditions identified above as if repeated at length, as well as any other condition that is affected by inhibition of TLR9.

The above other therapeutic agents, when employed in combination with the compounds of the present invention, may be used, for example, in those amounts indicated in the Physicians' Desk Reference (PDR) or as otherwise determined by one of ordinary skill in the art. In the methods of the present invention, such other therapeutic agent(s) may be administered prior to, simultaneously with, or following the administration of the inventive compounds. The present invention also provides pharmaceutical compositions capable of treating TLR9-associated conditions.

The inventive compositions may contain other therapeutic agents as described above and may be formulated, for example, by employing conventional solid or liquid vehicles or diluents, as well as pharmaceutical additives of a type appropriate to the mode of desired administration (e.g., excipients, binders, preservatives, stabilizers, flavors, etc.) according to techniques such as those well known in the art of pharmaceutical formulation.

Accordingly, the present invention further includes compositions comprising one or more compounds of Formula (I) and a pharmaceutically acceptable carrier.

A "pharmaceutically acceptable carrier" refers to media generally accepted in the art for the delivery of biologically active agents to animals, in particular, mammals. Pharmaceutically acceptable carriers are formulated according to a number of factors well within the purview of those of ordinary skill in the art. These include without limitation the type and nature of the active agent being formulated; the subject to which the agent-containing composition is to be administered; the intended route of administration of the composition; and, the therapeutic indication being targeted. Pharmaceutically acceptable carriers include both aqueous and non-aqueous liquid media, as well as a variety of solid and semi-solid dosage forms. Such carriers can include a number of different ingredients and additives in addition to the active agent, such additional ingredients being included in the formulation for a variety of reasons, e.g., stabilization of the active agent, binders, etc., well known to those of ordinary skill in the art. Descriptions of suitable pharmaceutically acceptable carriers, and factors involved in their selection, are found in a variety of readily available sources such as, for example, *Remington: The Science and Practice of Pharmacy*, 22$^{nd}$ Edition (2013).

Compounds in accordance with Formula (I) can be administered by any means suitable for the condition to be treated, which can depend on the need for site-specific treatment or quantity of Formula (I) compound to be delivered.

The compounds of Formula (I) may be administered by any suitable route, preferably in the form of a pharmaceutical composition adapted to such a route, and in a dose effective for the treatment intended. The compounds and compositions of the present invention may, for example, be administered orally, mucosally, or parentally including intravascularly, intravenously, intraperitoneally, subcutaneously, intramuscularly, and intrasternally in dosage unit formulations containing conventional pharmaceutically acceptable carriers, adjuvants, and vehicles. For example, the pharmaceutical carrier may contain a mixture of mannitol or lactose and microcrystalline cellulose. The mixture may contain additional components such as a lubricating agent, e.g. magnesium stearate and a disintegrating agent such as crospovidone. The carrier mixture may be filled into a gelatin capsule or compressed as a tablet. The pharmaceutical composition may be administered as an oral dosage form or an infusion, for example.

For oral administration, the pharmaceutical composition may be in the form of, for example, a tablet, capsule, liquid capsule, suspension, or liquid. The pharmaceutical composition is preferably made in the form of a dosage unit containing a particular amount of the active ingredient. For example, the pharmaceutical composition may be provided as a tablet or capsule comprising an amount of active ingredient in the range of from about 0.1 to 1000 mg, preferably from about 0.25 to 250 mg, and more preferably from about 0.5 to 100 mg. A suitable daily dose for a human or other mammal may vary widely depending on the condition of the patient and other factors, but, can be determined using routine methods.

Any pharmaceutical composition contemplated herein can, for example, be delivered orally via any acceptable and suitable oral preparations. Exemplary oral preparations, include, but are not limited to, for example, tablets, troches, lozenges, aqueous and oily suspensions, dispersible powders or granules, emulsions, hard and soft capsules, liquid capsules, syrups, and elixirs. Pharmaceutical compositions intended for oral administration can be prepared according to any methods known in the art for manufacturing pharmaceutical compositions intended for oral administration. In order to provide pharmaceutically palatable preparations, a pharmaceutical composition in accordance with the invention can contain at least one agent selected from sweetening agents, flavoring agents, coloring agents, demulcents, antioxidants, and preserving agents.

A tablet can, for example, be prepared by admixing at least one compound of Formula (I) with at least one non-toxic pharmaceutically acceptable excipient suitable for the manufacture of tablets. Exemplary excipients include, but are not limited to, for example, inert diluents, such as, for example, calcium carbonate, sodium carbonate, lactose, calcium phosphate, and sodium phosphate; granulating and disintegrating agents, such as, for example, microcrystalline cellulose, sodium crosscarmellose, corn starch, and alginic acid; binding agents, such as, for example, starch, gelatin, polyvinyl-pyrrolidone, and acacia; and lubricating agents, such as, for example, magnesium stearate, stearic acid, and talc. Additionally, a tablet can either be uncoated, or coated by known techniques to either mask the bad taste of an unpleasant tasting drug, or delay disintegration and absorption of the active ingredient in the gastrointestinal tract thereby sustaining the effects of the active ingredient for a longer period. Exemplary water soluble taste masking materials, include, but are not limited to, hydroxypropyl-methylcellulose and hydroxypropyl-cellulose. Exemplary time delay materials, include, but are not limited to, ethyl cellulose and cellulose acetate butyrate.

Hard gelatin capsules can, for example, be prepared by mixing at least one compound of Formula (I) with at least one inert solid diluent, such as, for example, calcium carbonate; calcium phosphate; and kaolin.

Soft gelatin capsules can, for example, be prepared by mixing at least one compound of Formula (I) with at least one water soluble carrier, such as, for example, polyethylene glycol; and at least one oil medium, such as, for example, peanut oil, liquid paraffin, and olive oil.

An aqueous suspension can be prepared, for example, by admixing at least one compound of Formula (I) with at least one excipient suitable for the manufacture of an aqueous suspension. Exemplary excipients suitable for the manufacture of an aqueous suspension, include, but are not limited to, for example, suspending agents, such as, for example, sodium carboxymethylcellulose, methylcellulose, hydroxypropylmethyl-cellulose, sodium alginate, alginic acid, polyvinyl-pyrrolidone, gum tragacanth, and gum acacia; dispersing or wetting agents, such as, for example, a naturally-occurring phosphatide, e.g., lecithin; condensation products of alkylene oxide with fatty acids, such as, for example, polyoxyethylene stearate; condensation products of ethylene oxide with long chain aliphatic alcohols, such as, for example heptadecaethylene-oxycetanol; condensation products of ethylene oxide with partial esters derived from fatty acids and hexitol, such as, for example, polyoxyethylene sorbitol monooleate; and condensation products of ethylene oxide with partial esters derived from fatty acids and hexitol anhydrides, such as, for example, polyethylene sorbitan monooleate. An aqueous suspension can also contain at least one preservative, such as, for example, ethyl and n-propyl p-hydroxybenzoate; at least one coloring agent; at least one flavoring agent; and/or at least one sweetening agent, including but not limited to, for example, sucrose, saccharin, and aspartame.

Oily suspensions can, for example, be prepared by suspending at least one compound of Formula (I) in either a vegetable oil, such as, for example, *arachis* oil; olive oil; sesame oil; and coconut oil; or in mineral oil, such as, for example, liquid paraffin. An oily suspension can also contain at least one thickening agent, such as, for example, beeswax; hard paraffin; and cetyl alcohol. In order to provide a palatable oily suspension, at least one of the sweetening agents already described hereinabove, and/or at least one flavoring agent can be added to the oily suspension. An oily suspension can further contain at least one preservative, including, but not limited to, for example, an anti-oxidant, such as, for example, butylated hydroxyanisol, and alpha-tocopherol.

Dispersible powders and granules can, for example, be prepared by admixing at least one compound of Formula (I) with at least one dispersing and/or wetting agent; at least one suspending agent; and/or at least one preservative. Suitable dispersing agents, wetting agents, and suspending agents are as already described above. Exemplary preservatives include, but are not limited to, for example, anti-oxidants, e.g., ascorbic acid. In addition, dispersible powders and granules can also contain at least one excipient, including, but not limited to, for example, sweetening agents; flavoring agents; and coloring agents.

An emulsion of at least one compound of Formula (I) thereof can, for example, be prepared as an oil-in-water emulsion. The oily phase of the emulsions comprising compounds of Formula (I) may be constituted from known ingredients in a known manner. The oil phase can be provided by, but is not limited to, for example, a vegetable oil, such as, for example, olive oil and *arachis* oil; a mineral oil, such as, for example, liquid paraffin; and mixtures thereof. While the phase may comprise merely an emulsifier, it may comprise a mixture of at least one emulsifier with a fat or an oil or with both a fat and an oil. Suitable emulsifying agents include, but are not limited to, for example, naturally-occurring phosphatides, e.g., soy bean lecithin; esters or partial esters derived from fatty acids and hexitol anhydrides, such as, for example, sorbitan monooleate; and condensation products of partial esters with ethylene oxide, such as, for example, polyoxyethylene sorbitan monooleate. Preferably, a hydrophilic emulsifier is included together with a lipophilic emulsifier which acts as a stabilizer. It is also preferred to include both an oil and a fat. Together, the emulsifier(s) with or without stabilizer(s) make-up the so-called emulsifying wax, and the wax together with the oil and fat make up the so-called emulsifying ointment base which forms the oily dispersed phase of the cream formulations. An emulsion can also contain a sweetening agent, a flavoring agent, a preservative, and/or an antioxidant. Emulsifiers and emulsion stabilizers suitable for use in the formulation of the present invention include Tween 60, Span 80, cetostearyl alcohol, myristyl alcohol, glyceryl monostearate, sodium lauryl sulfate, glyceryl distearate alone or with a wax, or other materials well known in the art.

The compounds of Formula (I) can, for example, also be delivered intravenously, subcutaneously, and/or intramuscularly via any pharmaceutically acceptable and suitable injectable form. Exemplary injectable forms include, but are not limited to, for example, sterile aqueous solutions comprising acceptable vehicles and solvents, such as, for example, water, Ringer's solution, and isotonic sodium chloride solution; sterile oil-in-water microemulsions; and aqueous or oleaginous suspensions.

Formulations for parenteral administration may be in the form of aqueous or non-aqueous isotonic sterile injection solutions or suspensions. These solutions and suspensions may be prepared from sterile powders or granules using one or more of the carriers or diluents mentioned for use in the formulations for oral administration or by using other suitable dispersing or wetting agents and suspending agents. The compounds may be dissolved in water, polyethylene glycol, propylene glycol, ethanol, corn oil, cottonseed oil, peanut oil, sesame oil, benzyl alcohol, sodium chloride, tragacanth gum, and/or various buffers. Other adjuvants and modes of administration are well and widely known in the pharmaceutical art. The active ingredient may also be administered by injection as a composition with suitable carriers including saline, dextrose, or water, or with cyclodextrin (i.e. Captisol), cosolvent solubilization (i.e. propylene glycol) or micellar solubilization (i.e. Tween 80).

The sterile injectable preparation may also be a sterile injectable solution or suspension in a non-toxic parenterally acceptable diluent or solvent, for example as a solution in 1,3-butanediol. Among the acceptable vehicles and solvents that may be employed are water, Ringer's solution, and isotonic sodium chloride solution. In addition, sterile, fixed oils are conventionally employed as a solvent or suspending medium. For this purpose any bland fixed oil may be employed, including synthetic mono- or diglycerides. In addition, fatty acids such as oleic acid find use in the preparation of injectables.

A sterile injectable oil-in-water microemulsion can, for example, be prepared by 1) dissolving at least one compound of Formula (I) in an oily phase, such as, for example, a mixture of soybean oil and lecithin; 2) combining the Formula (I) containing oil phase with a water and glycerol mixture; and 3) processing the combination to form a microemulsion.

A sterile aqueous or oleaginous suspension can be prepared in accordance with methods already known in the art. For example, a sterile aqueous solution or suspension can be prepared with a non-toxic parenterally-acceptable diluent or solvent, such as, for example, 1,3-butane diol; and a sterile oleaginous suspension can be prepared with a sterile non-toxic acceptable solvent or suspending medium, such as, for example, sterile fixed oils, e.g., synthetic mono- or diglycerides; and fatty acids, such as, for example, oleic acid.

Pharmaceutically acceptable carriers, adjuvants, and vehicles that may be used in the pharmaceutical compositions of this invention include, but are not limited to, ion exchangers, alumina, aluminum stearate, lecithin, self-emulsifying drug delivery systems (SEDDS) such as d-alpha-tocopherol polyethyleneglycol 1000 succinate, surfactants used in pharmaceutical dosage forms such as Tweens, polyethoxylated castor oil such as CREMOPHOR surfactant (BASF), or other similar polymeric delivery matrices, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, cellulose-based substances, polyethylene glycol, sodium carboxymethylcellulose, polyacrylates, waxes, polyethylene-polyoxypropylene-block polymers, polyethylene glycol and wool fat. Cyclodextrins such as alpha-, beta-, and gamma-cyclodextrin, or chemically modified derivatives such as hydroxyalkylcyclodextrins, including 2- and 3-hydroxypropyl-cyclodextrins, or other solubilized derivatives may also be advantageously used to enhance delivery of compounds of the formulae described herein.

The pharmaceutically active compounds of this invention can be processed in accordance with conventional methods of pharmacy to produce medicinal agents for administration to patients, including humans and other mammals. The pharmaceutical compositions may be subjected to conventional pharmaceutical operations such as sterilization and/or may contain conventional adjuvants, such as preservatives, stabilizers, wetting agents, emulsifiers, buffers etc. Tablets and pills can additionally be prepared with enteric coatings. Such compositions may also comprise adjuvants, such as wetting, sweetening, flavoring, and perfuming agents.

The amounts of compounds that are administered and the dosage regimen for treating a disease condition with the compounds and/or compositions of this invention depends on a variety of factors, including the age, weight, sex, the medical condition of the subject, the type of disease, the severity of the disease, the route and frequency of administration, and the particular compound employed. Thus, the dosage regimen may vary widely, but can be determined routinely using standard methods. A daily dose of about 0.001 to 100 mg/kg body weight, preferably between about 0.0025 and about 50 mg/kg body weight and most preferably between about 0.005 to 10 mg/kg body weight, may be appropriate. The daily dose can be administered in one to four doses per day. Other dosing schedules include one dose per week and one dose per two day cycle.

For therapeutic purposes, the active compounds of this invention are ordinarily combined with one or more adjuvants appropriate to the indicated route of administration. If administered orally, the compounds may be admixed with lactose, sucrose, starch powder, cellulose esters of alkanoic acids, cellulose alkyl esters, talc, stearic acid, magnesium stearate, magnesium oxide, sodium and calcium salts of phosphoric and sulfuric acids, gelatin, acacia gum, sodium alginate, polyvinylpyrrolidone, and/or polyvinyl alcohol, and then tableted or encapsulated for convenient administration. Such capsules or tablets may contain a controlled-release formulation as may be provided in a dispersion of active compound in hydroxypropylmethyl cellulose.

Pharmaceutical compositions of this invention comprise at least one compound of Formula (I) and optionally an additional agent selected from any pharmaceutically acceptable carrier, adjuvant, and vehicle. Alternate compositions of this invention comprise a compound of the Formula (I) described herein, or a prodrug thereof, and a pharmaceutically acceptable carrier, adjuvant, or vehicle.

The present invention also encompasses an article of manufacture. As used herein, article of manufacture is intended to include, but not be limited to, kits and packages.

The article of manufacture of the present invention, comprises: (a) a first container; (b) a pharmaceutical composition located within the first container, wherein the composition, comprises: a first therapeutic agent, comprising: a compound of the present invention or a pharmaceutically acceptable salt form thereof; and, (c) a package insert stating that the pharmaceutical composition can be used for the treatment of a cardiovascular disorder, diuresis, and/or natriuresis. In another embodiment, the package insert states that the pharmaceutical composition can be used in combination (as defined previously) with a second therapeutic agent to treat cardiovascular disorder, diuresis, and/or natriuresis. The article of manufacture can further comprise: (d) a second container, wherein components (a) and (b) are located within the second container and component (c) is located within or outside of the second container. Located within the first and second containers means that the respective container holds the item within its boundaries.

The first container is a receptacle used to hold a pharmaceutical composition. This container can be for manufacturing, storing, shipping, and/or individual/bulk selling. First container is intended to cover a bottle, jar, vial, flask, syringe, tube (e.g., for a cream preparation), or any other container used to manufacture, hold, store, or distribute a pharmaceutical product.

The second container is one used to hold the first container and, optionally, the package insert. Examples of the second container include, but are not limited to, boxes (e.g., cardboard or plastic), crates, cartons, bags (e.g., paper or plastic bags), pouches, and sacks. The package insert can be physically attached to the outside of the first container via tape, glue, staple, or another method of attachment, or it can rest inside the second container without any physical means of attachment to the first container. Alternatively, the package insert is located on the outside of the second container. When located on the outside of the second container, it is preferable that the package insert is physically attached via tape, glue, staple, or another method of attachment. Alternatively, it can be adjacent to or touching the outside of the second container without being physically attached.

The package insert is a label, tag, marker, or other written sheet that recites information relating to the pharmaceutical composition located within the first container. The information recited will usually be determined by the regulatory agency governing the area in which the article of manufacture is to be sold (e.g., the United States Food and Drug Administration). Preferably, the package insert specifically recites the indications for which the pharmaceutical composition has been approved. The package insert may be made of any material on which a person can read information contained therein or thereon. Preferably, the package insert is a printable material (e.g., paper, plastic, cardboard, foil, adhesive-backed paper or plastic) on which the desired information has been formed (e.g., printed or applied).

Methods of Preparation

The compounds of the present invention can be prepared in a number of ways well known to one skilled in the art of organic synthesis. The compounds of the present invention can be synthesized using the methods described below, together with synthetic methods known in the art of synthetic organic chemistry, or variations thereon as appreciated by those skilled in the art. Preferred methods include, but are not limited to, those described below.

The reactions and techniques described in this section are performed in solvents appropriate to the reagents and materials employed and are suitable for the transformations being effected. Also, in the description of the synthetic methods described below, it is to be understood that all proposed reaction conditions, including choice of solvent, reaction atmosphere, reaction temperature, duration of the experiment and work up procedures, are chosen to be the conditions standard for that reaction, which should be readily recognized by one skilled in the art. It is understood by one skilled in the art of organic synthesis that the functionality present on various portions of the molecule must be compatible with the reagents and reactions proposed. Such restrictions to the substituents that are compatible with the reaction conditions will be readily apparent to one skilled in the art and alternate methods must then be used. This will sometimes require a judgment to modify the order of the synthetic steps or to select one particular process scheme over another in order to obtain a desired compound of the invention. It will also be recognized that another major consideration in the planning of any synthetic route in this field is the judicious choice of the protecting group used for protection of the reactive functional groups present in the compounds described in this invention. An authoritative account describing the many alternatives to the trained practitioner is Greene et al. (Protective Groups in Organic Synthesis, Third Edition, Wiley and Sons (1999)).

SCHEME 1

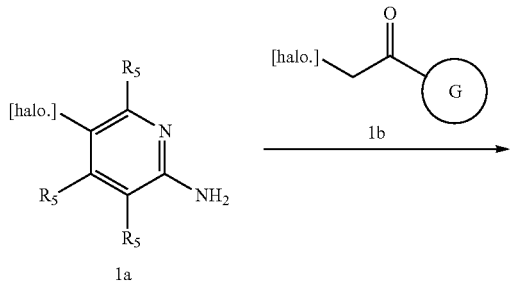

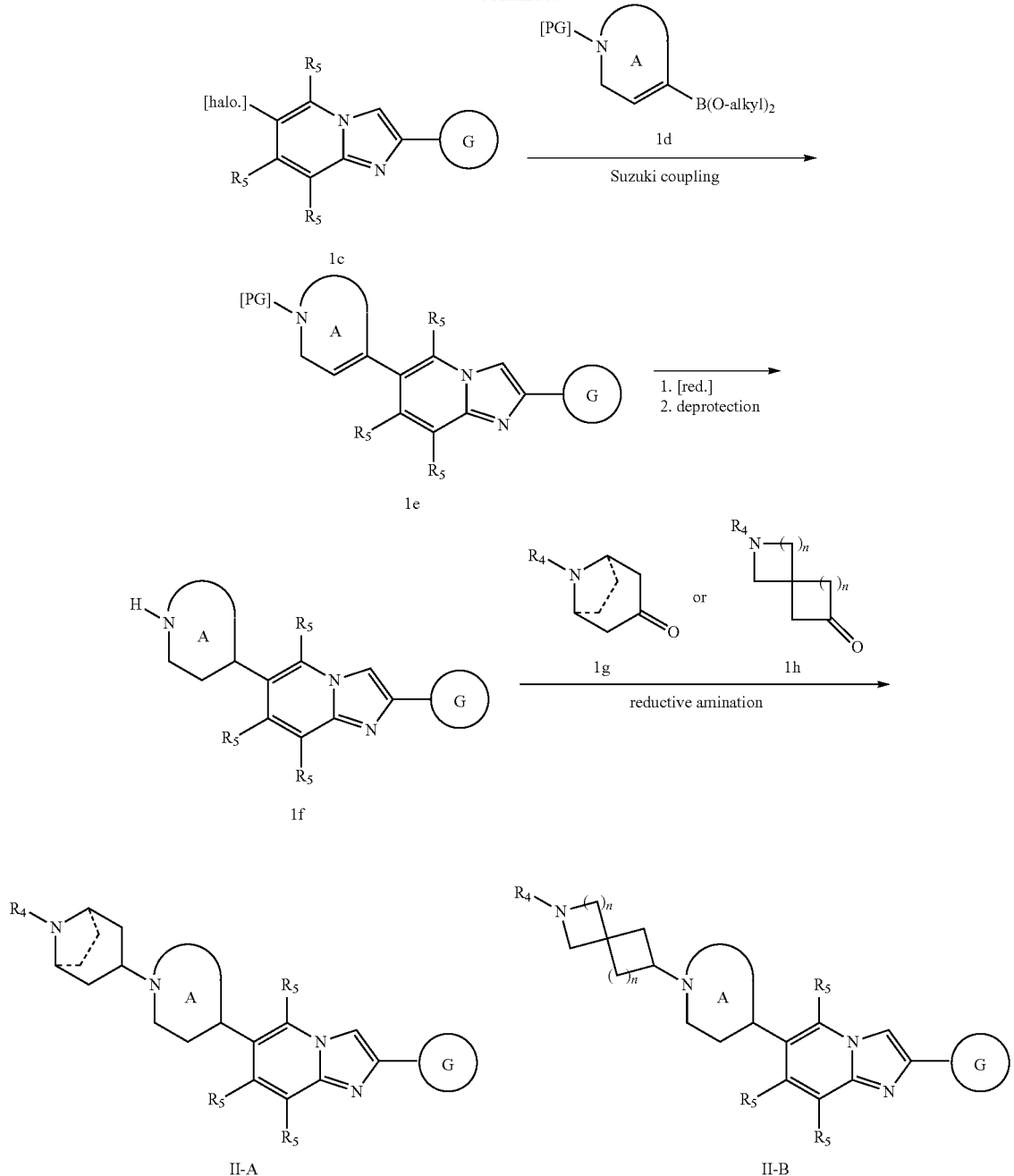

Scheme 1 describes the synthesis of compounds of Formula II-A and II-B, a subset of Formula II. The term "halo." in this scheme refers to any halogen that one of ordinary skill in the art would deem proper to achieve the intended transformation. The term "PG" refers to any suitable amino protective group, such as alkyl carbamate, alkyl amide, or alkyl. Ring A as shown in Formula II-A and II-B is substituted at the 6-position of the imidazo[1,2-a]pyridine ring, however, a person of ordinary skill can readily modify this synthetic scheme to install Ring A at the 7-position by using appropriate starting material.

Compound 1a can be reacted with alpha-halo-ketone 1b, in any typical reaction solvent (e.g. EtOH, DMF, DMSO) with or without heating. The reaction can be conducted in the presence of base such as potassium carbonate or sodium bicarbonate, but is not necessary. Compound 1c can be coupled with boronate ester 1d under standard Suzuki coupling conditions. The resultant alkene can be reduced by catalytic hydrogenation using a catalyst such as Pd or Pt. Protective group PG can be removed by one of ordinary skill in the art using appropriate reagents and conditions. Reductive amination of amine 1f with ketone 1g or 1h, can be achieved with a reducing agent such as sodium triacetoxyborohydride or sodium cyanoborohydride, with or without an acid catalyst (i.e. AcOH), to furnish compounds of Formula II-A and II-B.

SCHEME 2

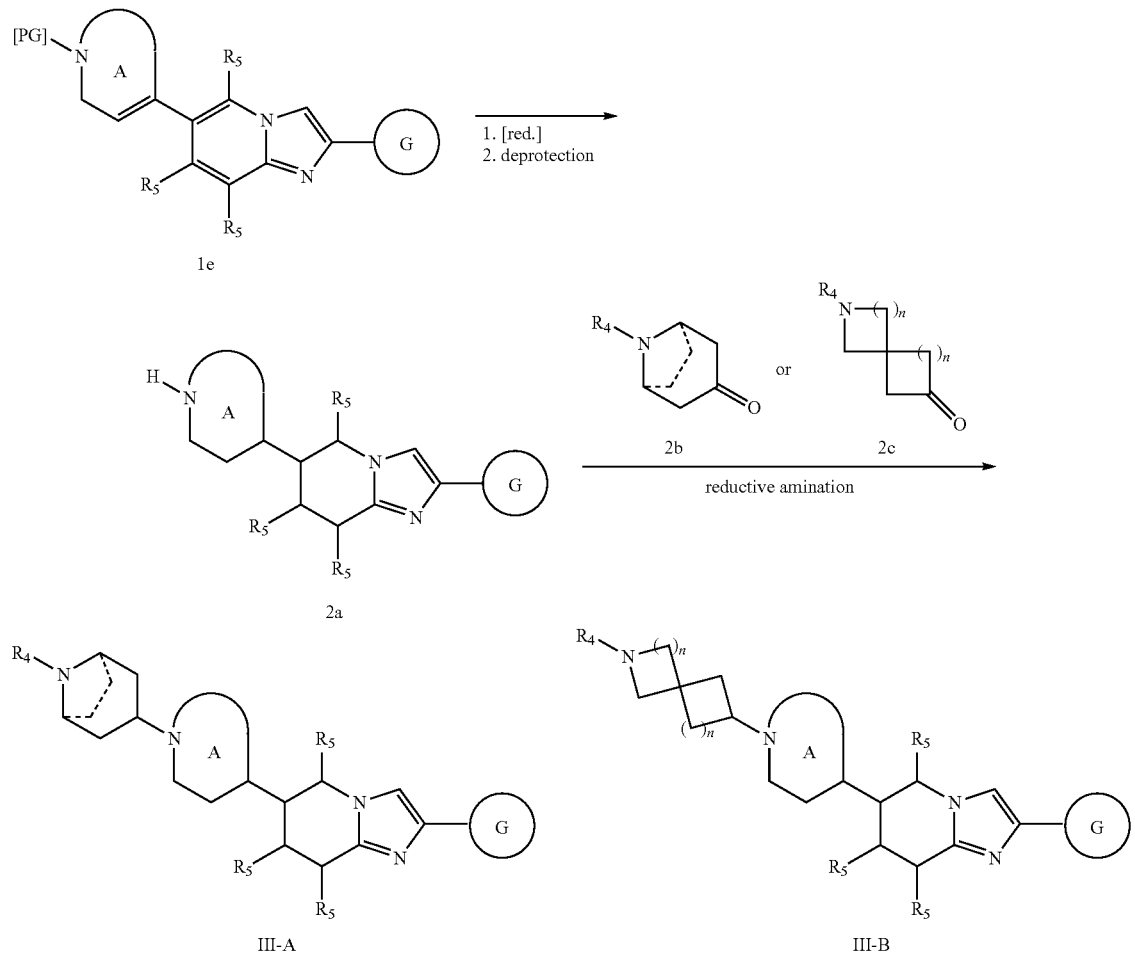

Scheme 2 describes the synthesis of compounds of Formula III-A and III-B, a subset of Formula III. The term "PG" refers to any suitable amino protective group, such as alkyl carbamate, alkyl amide, or alkyl. Ring A as shown in Formula III-A and III-B is substituted at the 6-position of the 5,6,7,8-tetrahydroimidazo[1,2-a]pyridine ring, however, a person of ordinary skill can readily modify this synthetic scheme to install Ring A at the 7-position by using appropriate starting material.

Compound 1e (see Scheme 1) can be reduced by catalytic hydrogenation using a catalyst such at Pd or Pt, at 1 atm or higher. Reaction times may vary, but is typically greater than 24 h. Reductive amination of amine 2a with ketone 2b or 2c, can be achieved with a reducing agent such as sodium triacetoxyborohydride or sodium cyanoborohydride, with or without an acid catalyst (i.e. AcOH), to furnish compounds of Formula III-A and III-B.

EXAMPLES

Compounds of the current invention and intermediates used in the preparation of compounds of the current invention can be prepared using procedures shown in the following examples and related procedures. The methods and conditions used in these examples, and the actual compounds prepared in these examples, are not meant to be limiting, but are meant to demonstrate how the compounds of the current invention can be prepared. Starting materials and reagents used in these examples, when not prepared by a procedure described herein, are generally either commercially available, or are reported in the chemical literature, or may be prepared by using procedures described in the chemical literature. The invention is further defined in the following Examples. It should be understood that the Examples are given by way of illustration only. From the above discussion and the Examples, one skilled in the art can ascertain the essential characteristics of the invention, and without departing from the spirit and scope thereof, can make various changes and modifications to adapt the invention to various uses and conditions. As a result, the invention is not limited by the illustrative examples set forth herein below, but rather defined by the claims appended hereto.

In the examples given, the phrase "dried and concentrated" generally refers to drying of a solution in an organic solvent over either sodium sulfate or magnesium sulfate, followed by filtration and removal of the solvent from the filtrate (generally under reduced pressure and at a temperature suitable to the stability of the material being dried and concentrated).

Chemical names were determined using ChemDraw Ultra, version 9.0.5 (CambridgeSoft). The following abbreviations are used:

aq. aqueous
brine saturated aqueous sodium chloride
DCM dichloromethane
DMAP dimethylaminopyridine
DMF N,N-dimethylformamide
DMSO dimethyl sulfoxide
EtOAc ethyl acetate
EtOH ethanol
g gram(s)
h hour(s)
HPLC High Performance Liquid Chromatography
LCMS Liquid Chromatography-Mass Spectroscopy
MeCN acetonitrile
MeOH methanol
pet ether petroleum ether
TEA triethylamine
TFA trifluoroacetic acid
THF tetrahydrofuran Preparation All reagents purchased from commercial sources were used without further purification unless otherwise noted. All reactions involving air or moisture sensitive reagents were performed under an inert atmosphere. Proton magnetic resonance spectra were recorded either on a Bruker Avance 400 or a JEOL Eclipse 500 spectrometer. LCMS analyses were performed on Waters Acquity UPLC system coupled with Waters TUV and SQ mass detector (Column: BEH C18 2.1×50 mm; Mobile Phase A: water with 0.05% TFA; Mobile Phase B: acetonitrile with 0.05% TFA; Gradient: 2-98% B over 1.6 minutes; Flow: 0.8 mL/min); HPLC analyses were performed on Shimadzu LC10-AT HPLC system coupled with SPD-10AV UV detector (Column YMC S5 Combiscreen ODS 4.6×50 mm; Mobile Phase A: 5:95 acetonitrile:water with 0.1% TFA; Mobile Phase B: 95:5 acetonitrile:water with 0.1% TFA; Gradient: 0-100% B over 40 minutes, then a 1-minute hold at 100% B; Flow: 1 mL/min); Preparative HPLC purifications were conducted on Shimadzu LC-8 preparative HPLC system coupled with SPD 20 UV detector. Detailed conditions are described in experimental procedures.

Analytical LC/MS Methods Method 1: Column: Waters XBridge C18, 2.1 mm×50 mm, 1.7 m particles; Mobile Phase A: 5:95 acetonitrile:water with 10 mM ammonium acetate; Mobile Phase B: 95:5 acetonitrile:water with 10 mM ammonium acetate; Temperature: 50° C.; Gradient: 0% B to 100% B over 3 min, then a 0.50 min hold at 100% B; Flow: 1 mL/min; Detection: MS and UV (220 nm).

Method 2: Column: Waters XBridge C18, 2.1 mm×50 mm, 1.7 m particles; Mobile Phase A: 5:95 acetonitrile:water with 0.1% trifluoroacetic acid; Mobile Phase B: 95:5 acetonitrile:water with 0.1% trifluoroacetic acid; Temperature: 50° C.; Gradient: 0% B to 100% B over 3 min, then a 0.50 min hold at 100% B; Flow: 1 mL/min; Detection: MS and UV (220 nm).

Method 3: Column: Waters Acquity BEH C18, 2.1×50 mm, 1.7 m particles; Mobile Phase A: 5:95 MeOH:water with 10 mM ammonium acetate; Mobile Phase B: 95:5 MeOH:water with 10 mM ammonium acetate; Temperature: 50° C.; Gradient: 0% B to 100% B over 3 min, then a 0.50 min hold at 100% B; Flow: 1 mL/min; Detection: MS and UV (220, 254 nm).

Method 4: Column: Waters Acquity BEH C18, 2.1×50 mm, 1.7 m particles; Mobile Phase A: 5:95 acetonitrile:water with 0.05% trifluoroacetic acid; Mobile Phase B: 95:5 acetonitrile:water with 0.05% trifluoroacetic acid; Temperature: 50° C.; Gradient: 0% B to 100% B over 3 min, then a 0.50 min hold at 100% B; Flow: 1 mL/min; Detection: MS and UV (220, 254 nm).

Method 5: Column: Waters Acquity BEH C18, 2.1×50 mm, 1.7 m particles; Mobile Phase A: 5:95 acetonitrile:water with 0.05% trifluoroacetic acid; Mobile Phase B: 95:5 acetonitrile:water with 0.05% trifluoroacetic acid; Temperature: 60° C.; Gradient: 2% B to 98% B over 1 min, then a 0.50 min hold at 98% B; Flow: 0.8 mL/min; Detection: MS and UV (220 nm).

Chiral Analytical Methods SFC Method 1: Instrument: Shimadzu Nexera UC SFC; Column: Chiral OD, 4.6×100 mm, 5 micron; Mobile Phase: 55% $CO_2$/45% MeOH w/0.1% DEA; Flow Conditions: 2 mL/min; Detector Wavelength: 220 nm.

SFC Method 2: Instrument: Shimadzu Nexera UC SFC; Column: Chiral OD, 4.6×100 mm, 5 micron; Mobile Phase: 60% $CO_2$/40% MeOH w/0.1% DEA; Flow Conditions: 2 mL/min Detector Wavelength: 220 nm.

SFC Method 3: Instrument: Shimadzu Nexera UC SFC; Column: Chiral OD, 4.6×100 mm, 5 micron; Mobile Phase: 75% $CO_2$/25% IPA-acetonitrile 50-50 w/0.1% DEA; Flow Conditions: 2 mL/min; Detector Wavelength: 220 nm.

SFC Method 4: Instrument: Shimadzu Nexera UC SFC; Column: Chiral OD, 4.6×100 mm, 5 micron; Mobile Phase: 55% $CO_2$/45% IPA w/0.1% DEA; Flow Conditions: 2 mL/min; Detector Wavelength: 220 nm.

SFC Method 5: Instrument: Berger SFC; Column: Chiral OD 4.6×250 mm, 5 micron; Mobile Phase: 70/30 $CO_2$/EtOH-0.1% DEA; Flow Conditions: 4 mL/min; Detector Wavelength: 220 nm.

SFC Method 6: Instrument: Shimadzu Nexera UC SFC; Column: Chiral OD, 4.6×100 mm, 5 micron; Mobile Phase: 65% $CO_2$/35% IPA w/0.6% DEA/0.1% TFA; Flow Conditions: 2 mL/min; Detector Wavelength: 220 nm.

SFC Method 7: Instrument: Shimadzu Nexera UC SFC; Column: Chiral OD, 4.6×100 mm, 5 micron; Mobile Phase: 80% $CO_2$/20% MeOH w/0.1% DEA; Flow Conditions: 2 mL/min; Detector Wavelength: 220 nm.

SFC Method 8: Instrument: Agilent SFC; Column: Chiralcel OD-H, 4.6×250 mm, 5 micron; Mobile Phase: 55% $CO_2$/40% MeOH-0.1% DEA; Flow Conditions: 2.0 mL/min, 120 bar, RT; Detector Wavelength: 220 nm SFC Method 9: Instrument: Agilent SFC; Column: Chiralcel OD-H, 4.6×250 mm, 5 micron; Mobile Phase: 65% $CO_2$/45% EtOH-0.1% DEA; Flow Conditions: 2.0 mL/min; Detector Wavelength: 220 nm Preparative HPLC Methods Prep Method 1: Column: XBridge C18, 200 mm×19 mm, 5-μm particles; Mobile Phase A: 5:95 acetonitrile:water with ammonium acetate; Mobile Phase B: 95:5 acetonitrile:water with ammonium acetate; Gradient: (variable; dependent on substrate) % B over 20 minutes, then a 0-minute hold at 100% B; Flow Rate: 20 mL/min; Column Temperature: 25° C. Fraction collection was triggered by MS and UV signals.

Prep Method 2: Column: XBridge C18, 200 mm×19 mm, 5-μm particles; Mobile Phase A: 5:95 acetonitrile:water with 0.05% trifluoroacetic acid; Mobile Phase B: 95:5 acetonitrile:water with 0.05% trifluoroacetic acid; Gradient: (variable; dependent on substrate) % B over 20 minutes, then a 0-minute hold at 100% B; Flow Rate: 20 mL/min; Column Temperature: 25° C. Fraction collection was triggered by MS signals.

Example 1

6-(1'-cyclopropyl-[1,4'-bipiperidin]-4-yl)-2-(3,4-dimethoxyphenyl)-8-methylimidazo[1,2-a]pyridine

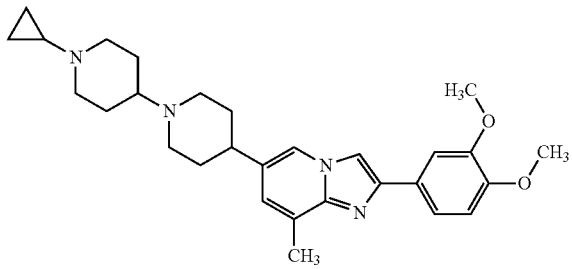

(1)

Step A. Intermediate 1A. Preparation of 6-bromo-2-(3,4-dimethoxyphenyl)-8-methylimidazo[1,2-a]pyridine (1A)

To a 250 mL round bottomed flask were added 5-bromo-3-methylpyridin-2-amine (2.5 g, 13 mmol), 2-bromo-1-(3,4-dimethoxyphenyl)ethan-1-one (4.5 g, 17 mmol), and EtOH (50 mL). The reaction mixture was stirred at reflux. After 18 h, a precipitate formed. The reaction mixture was cooled, stored at −20° C. for 1 h, and the precipitate was collected by vacuum filtration. The filter cake was washed with a minimal amount of ether and the product was dried in vacuo to afford the title compound (4.6 g, 13 mmol, 99% yield) as a tan solid. $^1$H NMR (500 MHz, METHANOL-$d_4$) δ 8.93-8.88 (m, 1H), 8.41 (s, 1H), 7.92-7.86 (m, 1H), 7.55 (s, 2H), 7.20-7.16 (m, 1H), 3.98 (s, 3H), 3.94 (s, 3H), 2.76-2.72 (m, 3H). Analytical LC/MS (Method 5): Observed Mass: 349.1; Retention Time: 0.66 min.

Step B. Intermediate 1B. Preparation of tert-butyl 4-(2-(3,4-dimethoxyphenyl)-8-methylimidazo[1,2-a]pyridin-6-yl)-3,6-dihydropyridine-1(2H)-carboxylate (1B)

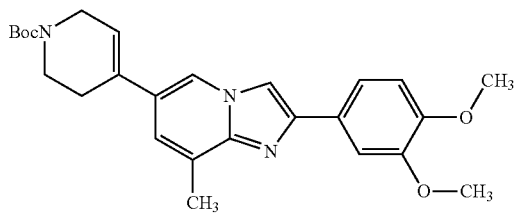

To a 200 mL pear shaped flask were added Intermediate 1A (2.8 g, 8.0 mmol), tert-butyl 4-(4,4,5,5-tetramethyl-1,3,2-dioxaborolan-2-yl)-3,6-dihydropyridine-1(2H)-carboxylate (3.0 g, 9.7 mmol), 1,4-dioxane (30 mL), followed by potassium phosphate (5.1 g, 24 mmol) dissolved in water (7 mL). The vessel was evacuated and purged with $N_2$ (2×), then 1,1'-bis(diphenylphosphino)ferrocene-palladium(II)dichloride dichloromethane complex (0.30 g, 0.37 mmol) was added. The vessel was evacuated and purged again and stirred at 75° C. After 18 h, the reaction mixture was cooled, diluted with water (200 mL) and extracted with EtOAc (2×100 mL). The organic phase was combined, washed with brine, dried over $MgSO_4$, filtered and concentrated. The residue was purified by flash column chromatography (120 g silica gel cartridge; A=Hex, B=EtOAc; 30 min grad.; 0% B to 100% B; flow rate=80 mL/min). The pure fractions were combined, concentrated and dried in vacuo to afford the title compound (3.5 g, 7.8 mmol, 98% yield) as a pale yellow solid. $^1$H NMR (500 MHz, METHANOL-$d_4$) δ 8.31-8.27 (m, 1H), 8.06 (s, 1H), 7.62-7.58 (m, 1H), 7.51-7.47 (m, 1H), 7.33-7.30 (m, 1H), 7.07-7.02 (m, 1H), 6.30-6.19 (m, 1H), 4.16-4.09 (m, 2H), 3.96 (s, 3H), 3.90 (s, 3H), 3.71-3.67 (m, 2H), 2.66-2.61 (m, 3H), 2.59-2.53 (m, 2H), 1.22 (s, 9H). Analytical LC/MS (Method 5): Observed Mass: 450.4; Retention Time: 0.81 min.

Step C. Intermediate 1C. Preparation of tert-butyl 4-(2-(3,4-dimethoxyphenyl)-8-methylimidazo[1,2-a]pyridin-6-yl)piperidine-1-carboxylate (1C)

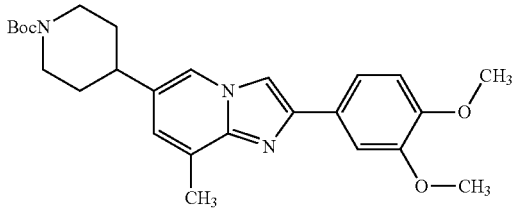

To a 1 L round bottomed flask were added Intermediate 1B (3.5 g, 7.8 mmol) and MeOH (150 mL). The vessel was evacuated and purged with $N_2$, then Pd—C (5% on carbon) (1.7 g, 0.78 mmol) was added and the reaction mixture was evacuated and purged again. The reaction mixture was stirred under hydrogen at 1 atm. After 1 h, $^1$H NMR shows complete conversion of starting material. The reaction mixture was filtered, the filtrate concentrated and the product was dried in vacuo to afford the title compound (3.1 g, 6.9 mmol, 88% yield) as a pale yellow solid. $^1$H NMR (500 MHz, METHANOL-$d_4$) δ 8.19-8.16 (m, 1H), 8.08 (s, 1H), 7.62-7.58 (m, 1H), 7.51-7.47 (m, 1H), 7.18-7.14 (m, 1H), 7.07-7.03 (m, 1H), 4.31-4.22 (m, 2H), 3.96 (s, 3H), 3.90 (s, 3H), 2.98-2.86 (m, 2H), 2.84-2.72 (m, 1H), 2.62 (s, 3H), 1.97-1.88 (m, 2H), 1.70-1.59 (m, 2H), 1.51 (s, 9H). Analytical LC/MS (Method 5): Observed Mass: 452.4; Retention Time: 1.18 min.

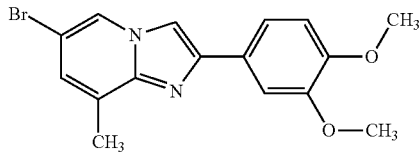

Step D. Intermediate 1D. Preparation of 2-(3,4-dimethoxyphenyl)-8-methyl-6-(piperidin-4-yl)imidazo[1,2-a]pyridine hydrochloride

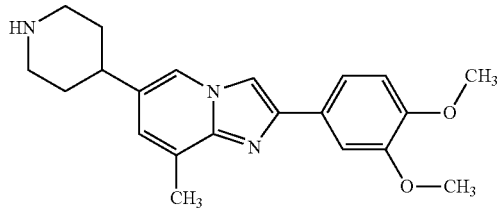
(1D)

To a 1 L round bottomed flask were added Intermediate 1C (3.1 g, 6.9 mmol), a minimal amount of MeOH to solubilize, followed by 4 M HCl in dioxane (150 mL). The reaction mixture was stirred. After 1 h, the solvent was concentrated and the residue was co-evaporated with toluene. The product was dried in vacuo to afford the title compound (2.1 g, 5.4 mmol, 78% yield) as an off white solid. $^1$H NMR (500 MHz, METHANOL-$d_4$) δ 8.60-8.55 (m, 1H), 8.45-8.40 (m, 1H), 7.75-7.70 (m, 1H), 7.58-7.53 (m, 2H), 7.20-7.15 (m, 1H), 3.99 (s, 3H), 3.94 (s, 3H), 3.62-3.57 (m, 2H), 3.28-3.20 (m, 2H), 3.17-3.11 (m, 1H), 2.74 (s, 3H), 2.28-2.20 (m, 2H), 2.10-1.98 (m, 2H). Analytical LC/MS (Method 5): Observed Mass: 352.2; Retention Time: 0.68 min.

Step E. Preparation of Example 1

To a 40 mL vial were added Intermediate 1D (70 mg, 0.18 mmol), 1-cyclopropylpiperidin-4-one (130 mg, 0.90 mmol), AcOH (0.011 mL, 0.20 mmol), DMF (2 mL), and MgSO$_4$ (220 mg, 1.8 mmol). The reaction mixture was stirred for 20 min, then sodium triacetoxyborohydride (170 mg, 0.80 mmol) was added and the reaction mixture was stirred. After 24 h, the reaction mixture was filtered and the filter cake was washed with 10% IPA/chloroform (20 mL). The filtrate was washed with 10% aqueous NaOH (10 mL), brine, dried over MgSO$_4$, filtered and concentrated. The crude material was purified via preparative HPLC (Prep Method 1) to afford the title compound (51 mg, 0.11 mmol, 60% yield). $^1$H NMR (500 MHz, DMSO-$d_6$) δ 8.24-8.21 (m, 1H), 8.19-8.13 (m, 1H), 7.57-7.52 (m, 1H), 7.51-7.46 (m, 1H), 7.05-6.99 (m, 2H), 3.86 (s, 3H), 3.80 (s, 3H), 3.53-3.34 (m, 1H), 3.09-2.93 (m, 4H), 2.45-2.32 (m, 3H), 2.20-2.12 (m, 2H), 1.89-1.81 (m, 2H), 1.80-1.74 (m, 2H), 1.73-1.62 (m, 2H), 1.62-1.54 (m, 1H), 1.48-1.36 (m, 2H), 0.45-0.38 (m, 2H), 0.33-0.27 (m, 2H) (three protons obscured). Analytical LC/MS (Method 1): Purity: 99.2%; Observed Mass: 474.91; Retention Time: 1.38 min. (Method 2): Purity: 98.9%; Observed Mass: 475.36; Retention Time: 0.99 min.

Example 2

2-(3,4-dimethoxyphenyl)-6-(1'-isopropyl-[1,4'-bipiperidin]-4-yl)-8-methylimidazo[1,2-a]pyridine

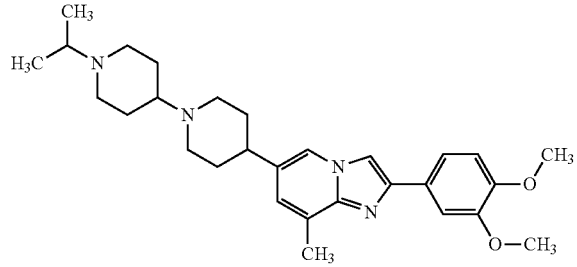
(2)

Example 2 was synthesized according to the general methods described for the preparation of Example 1 (Step E), using Intermediate 1D (70 mg, 0.18 mmol) as starting material and substituting 1-isopropylpiperidin-4-one (130 mg, 0.90 mmol) where appropriate. The crude material was purified via preparative HPLC (Prep Method 1) to afford the title compound (52 mg, 0.11 mmol, 61% yield). $^1$H NMR (500 MHz, DMSO-$d_6$) δ 8.24-8.20 (m, 1H), 8.20-8.13 (m, 1H), 7.57-7.52 (m, 1H), 7.52-7.47 (m, 1H), 7.06-6.99 (m, 2H), 3.86 (s, 3H), 3.80 (s, 3H), 3.51-3.44 (m, 1H), 3.06-2.96 (m, 3H), 2.93-2.85 (m, 1H), 2.41-2.27 (m, 5H), 1.92 (s, 3H), 1.87-1.80 (m, 4H), 1.73-1.61 (m, 2H), 1.60-1.49 (m, 2H), 1.04 (br d, J=6.4 Hz, 6H) (one proton obscured). Analytical LC/MS (Method 1): Purity: 100%; Observed Mass: 477.29; Retention Time: 1.42 min. (Method 2): Purity: 100%; Observed Mass: 477.03; Retention Time: 0.97 min.

Example 3

2-(3,4-dimethoxyphenyl)-6-(1'-isobutyl-[1,4'-bipiperidin]-4-yl)-8-methylimidazo[1,2-a]pyridine

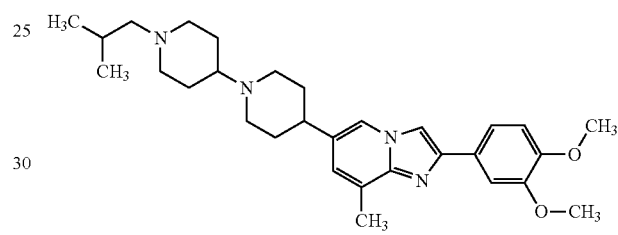
(3)

Example 3 was synthesized according to the general methods described for the preparation of Example 1 (Step E), using Intermediate 1D (70 mg, 0.18 mmol) as starting material and substituting 1-isobutylpiperidin-4-one (140 mg, 0.90 mmol) where appropriate. The crude material was purified via preparative HPLC (Prep Method 1) to afford the title compound (52 mg, 0.11 mmol, 61% yield). $^1$H NMR (500 MHz, DMSO-$d_6$) δ 8.58 (s, 1H), 8.46 (br s, 1H), 7.57 (br s, 2H), 7.52-7.47 (m, 1H), 7.17-7.13 (m, 1H), 3.89 (s, 3H), 3.85 (s, 3H), 3.74-3.60 (m, 1H), 3.25-3.15 (m, 1H), 3.09-2.91 (m, 4H), 2.64 (s, 3H), 2.36-2.27 (m, 2H), 2.23-1.96 (m, 8H), 1.01-0.95 (m, 6H) (5 protons obscured). Analytical LC/MS (Method 1): Purity: 97%; Observed Mass: 491.18; Retention Time: 1.51 min. (Method 2): Purity: 100%; Observed Mass: 491.27; Retention Time: 0.94 min.

Example 4

6-(1'-cyclopropyl-[1,4'-bipiperidin]-4-yl)-2-(3-fluoro-4-methoxyphenyl)-8-methylimidazo[1,2-a]pyridine

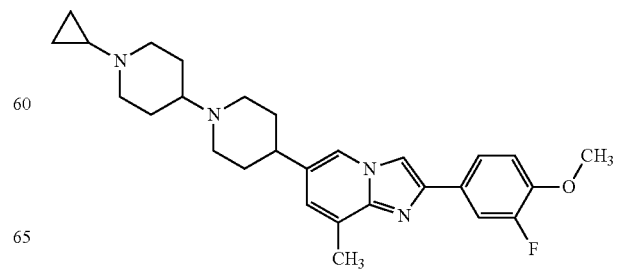
(4)

Step A. Intermediate 4A. Preparation of 6-bromo-2-(3-fluoro-4-methoxyphenyl)-8-methylimidazo[1,2-a]pyridine

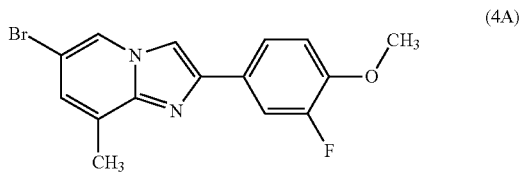 [SMILES: COc1ccc(-c2cn3cc(Br)cc(C)c3n2)cc1F]

(4A)

Intermediate 4A was prepared according to the general methods described for the synthesis of Intermediate 1A, starting with 5-bromo-3-methylpyridin-2-amine (0.76 g, 4.1 mmol) and substituting 2-bromo-1-(3-fluoro-4-methoxyphenyl)ethan-1-one (1.0 g, 4.1 mmol) where appropriate to afford the title compound (1.0 g, 3.0 mmol, 73% yield) as a tan solid. $^1$H NMR (500 MHz, DMSO-d$_6$) δ 9.08-9.02 (m, 1H), 8.59 (s, 1H), 7.96-7.90 (m, 1H), 7.89-7.80 (m, 2H), 7.44-7.37 (m, 1H), 2.64 (s, 3H). Analytical LC/MS (Method 5): Observed Mass: 337.0; Retention Time: 0.75 min.

Step B. Intermediate 4B. Preparation of tert-butyl 4-(2-(3-fluoro-4-methoxyphenyl)-8-methylimidazo[1,2-a]pyridin-6-yl)-3,6-dihydropyridin-1(2H)-carboxylate

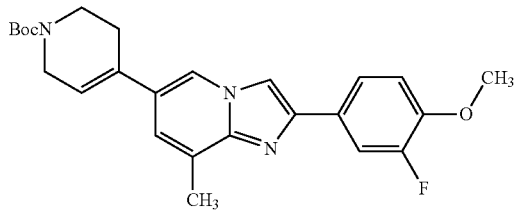

(4B)

Intermediate 4B was prepared according to the general methods described for the synthesis of Intermediate 1B, using Intermediate 4A (500 mg, 1.5 mmol) as starting material to afford the title compound (480 mg, 1.1 mmol, 73% yield) as a pale yellow solid. $^1$H NMR (500 MHz, METHANOL-d$_4$) δ 8.32-8.27 (m, 1H), 8.09-8.05 (m, 1H), 7.72-7.66 (m, 2H), 7.36-7.30 (m, 1H), 7.21-7.14 (m, 1H), 6.27-6.20 (m, 1H), 4.19-4.08 (m, 2H), 3.94 (s, 3H), 3.73-3.65 (m, 2H), 2.64-2.60 (m, 3H), 2.59-2.53 (m, 2H), 1.52 (s, 9H). Analytical LC/MS (Method 5): Observed Mass: 438.4; Retention Time: 0.88 min.

Step C. Intermediate 4C. 2-(3-fluoro-4-methoxyphenyl)-8-methyl-6-(piperidin-4-yl) imidazo[1,2-a]pyridine hydrochloride

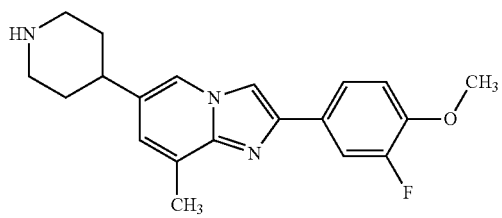

(4C)

Intermediate 4C was prepared according to the general methods described for the synthesis of Intermediate 1D (Steps C-D), using Intermediate 4B (480 mg, 1.1 mmol) as starting material to afford the title compound (410 mg, 1.1 mmol, 100% yield) as a tan solid. $^1$H NMR (500 MHz, METHANOL-d$_4$) δ 8.64-8.60 (m, 1H), 8.49-8.45 (m, 1H), 7.83-7.80 (m, 1H), 7.80-7.74 (m, 2H), 7.39-7.33 (m, 1H), 4.00 (s, 3H), 3.79-3.73 (m, 1H), 3.73-3.65 (m, 2H), 3.63-3.55 (m, 2H), 2.75 (s, 3H), 2.28-2.21 (m, 2H), 2.10-2.01 (m, 2H). Analytical LC/MS (Method 5): Observed Mass: 340.2; Retention Time: 0.58 min.

Step D. Preparation of Example 4

Example 4 was synthesized according to the general methods described for the preparation of Example 1 (Step E), using Intermediate 4C (60 mg, 0.15 mmol) as starting material. The crude material was purified via preparative HPLC (Prep Method 1) to afford the title compound (40 mg, 0.086 mmol, 57% yield). $^1$H NMR (500 MHz, DMSO-d$_6$) δ 7.99 (s, 1H), 7.92 (s, 1H), 7.49 (br d, J=2.7 Hz, 2H), 7.01-6.95 (m, 1H), 6.81-6.75 (m, 1H), 3.63 (s, 3H), 2.80-2.65 (m, 2H), 2.30 (s, 3H), 1.95-1.83 (m, 2H), 1.65-1.54 (m, 2H), 1.54-1.36 (m, 4H), 1.36-1.29 (m, 1H), 1.26-1.09 (m, 2H), 0.20-0.11 (m, 2H), 0.08-0.01 (m, 2H) (6 protons obscured). Analytical LC/MS (Method 1): Purity: 100%; Observed Mass: 463.14; Retention Time: 1.53 min. (Method 2): Purity: 100%; Observed Mass: 463.16; Retention Time: 0.99 min.

Example 5

2-(3-fluoro-4-methoxyphenyl)-6-(1'-isopropyl-[1,4'-bipiperidin]-4-yl)-8-methylimidazo[1,2-a]pyridine

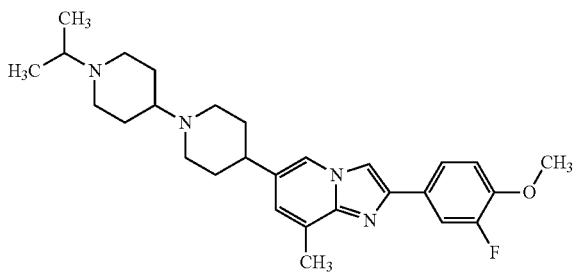

(5)

Example 5 was synthesized according to the general methods described for the preparation of Example 1 (Step E) using Intermediate 4C (60 mg, 0.15 mmol) as starting material and substituting 1-isopropylpiperidin-4-one (110 mg, 0.78 mmol) where appropriate. The crude material was purified via preparative HPLC (Prep Method 1) to afford the title compound (49 mg, 0.11 mmol, 73% yield). $^1$H NMR (500 MHz, DMSO-d$_6$) δ 8.24 (s, 1H), 8.18-8.15 (m, 1H), 7.77-7.70 (m, 2H), 7.26-7.19 (m, 1H), 7.06-7.01 (m, 1H), 3.88 (s, 3H), 3.03-2.97 (m, 2H), 2.97-2.90 (m, 1H), 2.56-2.53 (m, 1H), 2.51 (s, 3H), 2.49-2.44 (m, 1H), 2.38-2.21 (m, 4H), 1.86-1.76 (m, 4H), 1.71-1.60 (m, 2H), 1.56-1.43 (m, 2H), 1.07-0.97 (m, 6H) (two protons obscured). Analytical LC/MS: (Method 1): Purity: 100%; Observed Mass: 465.01; Retention Time: 1.54 min. (Method 2): Purity: 100%; Observed Mass: 465.29; Retention Time: 1.04 min.

Example 6

2-(3-fluoro-4-methoxyphenyl)-6-(1'-isobutyl-[1,4'-bipiperidin]-4-yl)-8-methylimidazo[1,2-a]pyridine

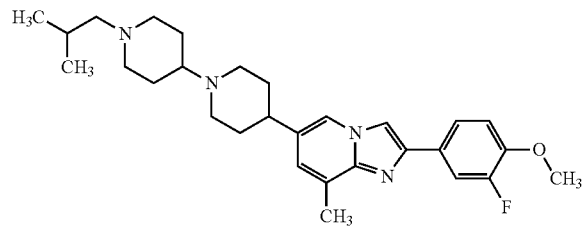
(6)

Example 6 was synthesized according to the general methods described for the preparation of Example 1 (Step E) using Intermediate 4C (60 mg, 0.15 mmol) as starting material and substituting 1-isobutylpiperidin-4-one (120 mg, 0.77 mmol) where appropriate. The crude material was purified via preparative HPLC (Prep Method 1) to afford the title compound (40 mg, 0.084 mmol, 56% yield). $^1$H NMR (500 MHz, DMSO-$d_6$) δ 8.26 (s, 1H), 8.19 (s, 1H), 7.79-7.72 (m, 2H), 7.28-7.22 (m, 1H), 7.07-7.03 (m, 1H), 3.90 (s, 3H), 3.42-3.35 (m, 1H), 3.21-3.17 (m, 1H), 3.14-3.02 (m, 2H), 3.00-2.88 (m, 2H), 2.44-2.35 (m, 2H), 2.12-2.04 (m, 2H), 1.91-1.85 (m, 2H), 1.83-1.75 (m, 3H), 1.74-1.61 (m, 3H), 1.60-1.45 (m, 3H), 0.87 (br d, J=6.4 Hz, 6H) (three protons obscured). Analytical LC/MS (Method 1): Purity: 100%; Observed Mass: 479.13; Retention Time: 1.77 min. (Method 2): Purity: 98.8%; Observed Mass: 479.05; Retention Time: 1.04 min.

Example 7

6-(1'-cyclopropyl-[1,4'-bipiperidin]-4-yl)-8-methyl-2-(4-(methylsulfonyl)phenyl) imidazo[1,2-a]pyridine

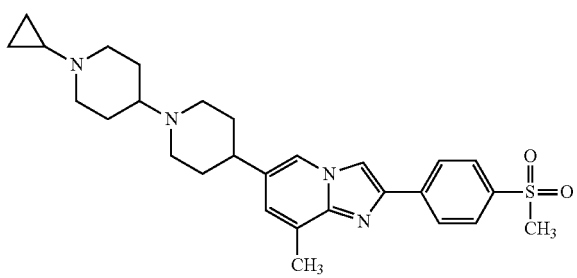
(7)

Step A. Intermediate 7A. Preparation of 6-bromo-8-methyl-2-(4-(methylsulfonyl)phenyl)imidazo[1,2-a]pyridine

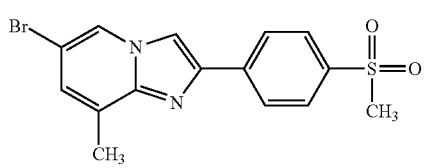
(7A)

Intermediate 7A was prepared according to the general methods described for the synthesis of Intermediate 1A, starting with 5-bromo-3-methylpyridin-2-amine (0.60 g, 3.2 mmol) and substituting 2-bromo-1-(4-(methylsulfonyl)phenyl)ethan-1-one (0.89 g, 3.2 mmol) where appropriate to afford the title compound (1.0 g, 2.7 mmol, 84% yield) as a tan solid. $^1$H NMR (500 MHz, METHANOL-$d_4$) δ 9.01-8.95 (m, 1H), 8.66 (s, 1H), 8.24-8.17 (m, 4H), 7.98-7.92 (m, 1H), 3.25-3.22 (m, 3H), 2.78-2.74 (m, 3H). Analytical LC/MS (Method 5): Observed Mass: 367.1; Retention Time: 0.72 min.

Step B. Intermediate 7B. Preparation of tert-butyl 4-(8-methyl-2-(4-(methylsulfonyl) phenyl)imidazo[1,2-a]pyridin-6-yl)-3,6-dihydropyridine-1(2H)-carboxylate

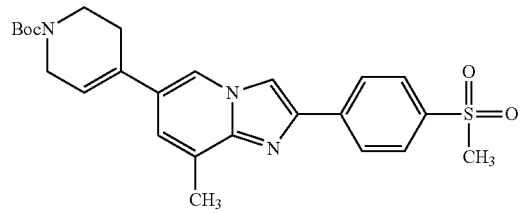
(7B)

Intermediate 7B was prepared according to the general methods described for the synthesis of Intermediate 1B, using Intermediate 7A (1.0 g, 2.7 mmol) as starting material to afford the title compound (1.2 g, 2.6 mmol, 96% yield) as a pale yellow solid. $^1$H NMR (500 MHz, METHANOL-$d_4$) δ 8.37-8.32 (m, 2H), 8.24-8.19 (m, 2H), 8.07-8.01 (m, 2H), 7.42-7.36 (m, 1H), 6.32-6.24 (m, 1H), 4.19-4.09 (m, 2H), 3.72-3.65 (m, 2H), 3.19 (s, 3H), 2.64 (s, 3H), 2.61-2.53 (m, 2H), 1.53 (s, 9H). Analytical LC/MS (Method 5): Observed Mass: 468.4; Retention Time: 0.81 min.

Step C. Intermediate 7C. Preparation of 8-methyl-2-(4-(methylsulfonyl)phenyl)-6-(piperidin-4-yl)imidazo[1,2-a]pyridine hydrochloride

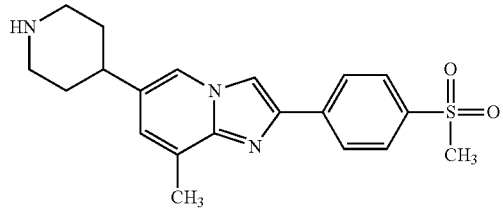
(7C)

Intermediate 7C was prepared according to the general methods described for the synthesis of Intermediate 1D (Steps C-D), using Intermediate 7B (1.2 g, 2.5 mmol) as starting material to afford the title compound (1.0 g, 2.5 mmol, 100% yield) as a tan solid. $^1$H NMR (500 MHz, METHANOL-$d_4$) δ 8.74 (s, 1H), 8.72-8.69 (m, 1H), 8.22 (d, J=10.2 Hz, 4H), 7.91-7.87 (m, 1H), 3.71-3.67 (m, 1H), 3.63-3.61 (m, 1H), 3.61-3.58 (m, 1H), 3.28-3.24 (m, 2H), 3.23 (s, 3H), 2.78 (s, 3H), 2.29-2.22 (m, 2H), 2.12-2.02 (m, 2H). Analytical LC/MS (Method 5): Observed Mass: 370.4; Retention Time: 0.51 min.

Step D. Preparation of Example 7

Example 7 was synthesized according to the general methods described for the preparation of Example 1 (Step E), using Intermediate 7C (70 mg, 0.16 mmol) as starting material. The crude material was purified via preparative HPLC (Prep Method 1) to afford the title compound (61 mg, 0.12 mmol, 75% yield). $^1$H NMR (500 MHz, DMSO-$d_6$) δ 8.48 (s, 1H), 8.21 (br d, J=8.6 Hz, 3H), 8.01-7.94 (m, 2H), 7.11-7.07 (m, 1H), 3.25-3.22 (m, 1H), 3.02-2.94 (m, 2H), 2.53 (s, 3H), 2.40-2.25 (m, 2H), 2.18-2.09 (m, 2H), 1.88-1.81 (m, 2H), 1.77-1.70 (m, 2H), 1.69-1.61 (m, 2H), 1.60-1.54 (m, 1H), 1.46-1.35 (m, 2H), 0.42-0.37 (m, 2H), 0.30-0.25 (m, 2H) (6 protons obscured). Analytical LC/MS (Method 1): Purity: 96.8%; Observed Mass: 493.14; Retention Time: 1.45 min. (Method 2): Purity: 94.9%; Observed Mass: 493.15; Retention Time: 0.90 min.

Example 8

6-(1'-isopropyl-[1,4'-bipiperidin]-4-yl)-8-methyl-2-(4-(methylsulfonyl)phenyl) imidazo[1,2-a]pyridine (8)

Example 8 was synthesized according to the general methods described for the preparation of Example 1 (Step E) using Intermediate 7C (70 mg, 0.16 mmol) as starting material and substituting 1-isopropylpiperidin-4-one (110 mg, 0.78 mmol) where appropriate. The crude material was purified via preparative HPLC (Prep Method 1) to afford the title compound (49 mg, 0.10 mmol, 63% yield). $^1$H NMR (500 MHz, DMSO-$d_6$) δ 8.48 (s, 1H), 8.22 (br d, J=8.9 Hz, 3H), 7.98 (br d, J=8.5 Hz, 2H), 7.13-7.08 (m, 1H), 3.26-3.22 (m, 2H), 3.02-2.95 (m, 2H), 2.87-2.81 (m, 2H), 2.72-2.64 (m, 1H), 2.53 (s, 3H), 2.49-2.44 (m, 1H), 2.29-2.17 (m, 3H), 2.16-2.05 (m, 2H), 1.94-1.89 (m, 1H), 1.86-1.79 (m, 2H), 1.79-1.71 (m, 2H), 1.70-1.57 (m, 2H), 1.49-1.38 (m, 2H), 1.00-0.93 (m, 6H). Analytical LC/MS (Method 1): Purity: 94.4%; Observed Mass: 494.90; Retention Time: 1.19 min. (Method 2): Purity: 95%; Observed Mass: 495.17; Retention Time: 0.90.

Example 9

6-(1'-isobutyl-[1,4'-bipiperidin]-4-yl)-8-methyl-2-(4-(methylsulfonyl)phenyl) imidazo[1,2-a]pyridine

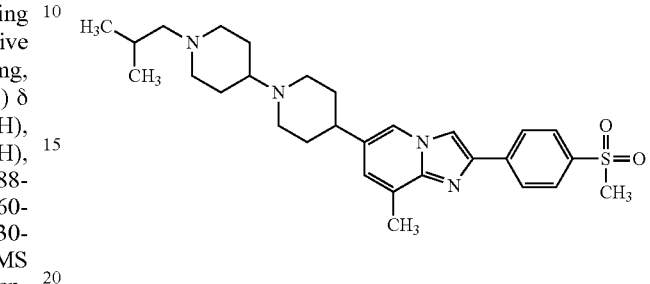

(9)

Example 9 was synthesized according to the general methods described for the preparation of Example 1 (Step E) using Intermediate 7C (70 mg, 0.16 mmol) as starting material and substituting 1-isobutylpiperidin-4-one (120 mg, 0.77 mmol) where appropriate. The crude material was purified via preparative HPLC (Prep Method 1) to afford the title compound (62 mg, 0.12 mmol, 75% yield). $^1$H NMR (500 MHz, DMSO-$d_6$) δ 8.49 (s, 1H), 8.23 (br d, J=8.9 Hz, 3H), 8.00 (s, 2H), 7.15-7.08 (m, 1H), 3.28-3.23 (m, 1H), 3.05-2.97 (m, 2H), 2.92-2.83 (m, 2H), 2.54 (br s, 4H), 2.34-2.23 (m, 3H), 2.06-1.99 (m, 2H), 1.90-1.81 (m, 4H), 1.79-1.71 (m, 3H), 1.71-1.59 (m, 3H), 1.55-1.43 (m, 2H), 0.86 (br d, J=6.4 Hz, 6H) (one proton obscured). Analytical LC/MS (Method 1): Purity: 100%; Observed Mass: 509.17; Retention Time: 1.38 min. (Method 2): Purity: 99.3%; Observed Mass: 509.18; Retention Time: 0.94 min.

Example 10

6-(1'-cyclopropyl-[1,4'-bipiperidin]-4-yl)-2-(3,4-dimethoxyphenyl)imidazo[1,2-a]pyridine

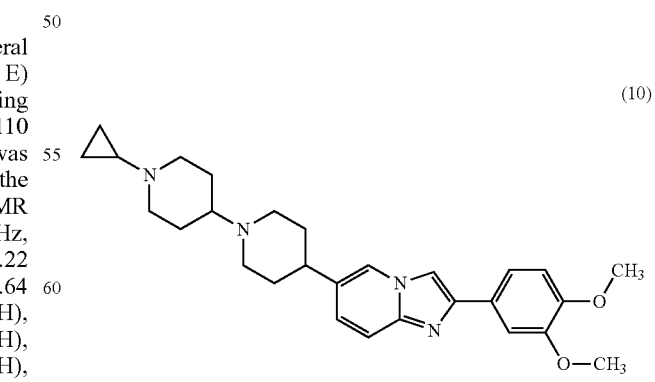

(10)

Step A. Intermediate 10A. Preparation of 6-bromo-2-(3,4-dimethoxyphenyl) imidazo[1,2-a]pyridine

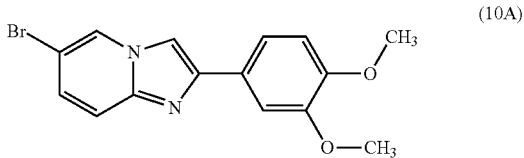 [SMILES: COc1ccc(-c2cn3cc(Br)ccc3n2)cc1OC]

Intermediate 10A was prepared according to the general methods described for the synthesis of Intermediate 1A, substituting 5-bromopyridin-2-amine (5.0 g, 29 mmol) where appropriate to afford the title compound (9.5 g, 29 mmol, 100% yield) as a tan solid. $^1$H NMR (500 MHz, METHANOL-$d_4$) δ 9.10-9.08 (m, 1H), 8.48 (s, 1H), 8.09-8.05 (m, 1H), 7.87-7.83 (m, 1H), 7.52-7.47 (m, 2H), 7.20-7.16 (m, 1H), 3.98 (s, 3H), 3.94 (s, 3H). Analytical LC/MS (Method 5): Observed Mass: 335.2; Retention Time: 0.62 min.

Step B. Intermediate 10B. Preparation of tert-butyl 4-(2-(3,4-dimethoxyphenyl) imidazo[1,2-a]pyridin-6-yl)-3,6-dihydropyridine-1(2H)-carboxylate

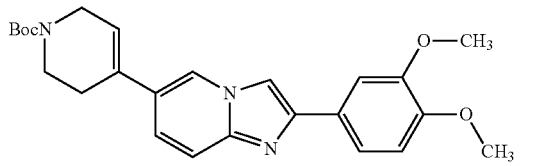

Intermediate 10B was prepared according to the general methods described for the synthesis of Intermediate 1B, using Intermediate 10A (2.5 g, 7.5 mmol) as starting material to afford the title compound (3.2 g, 7.4 mmol, 99% yield) as a yellow solid. $^1$H NMR (500 MHz, METHANOL-$d_4$) δ 8.40-8.36 (m, 1H), 8.05 (s, 1H), 7.55-7.53 (m, 1H), 7.51-7.48 (m, 2H), 7.47-7.43 (m, 1H), 7.05-7.00 (m, 1H), 6.26-6.18 (m, 1H), 4.14-4.09 (m, 2H), 3.94 (s, 3H), 3.89 (s, 3H), 3.70-3.66 (m, 2H), 2.59-2.53 (m, 2H), 1.54-1.51 (m, 9H). Analytical LC/MS (Method 5): Observed Mass: 436.4; Retention Time: 0.78 min.

Step C. Intermediate 10C. Preparation of tert-butyl 4-(2-(3,4-dimethoxyphenyl) imidazo[1,2-a]pyridin-6-yl)piperidine-1-carboxylate

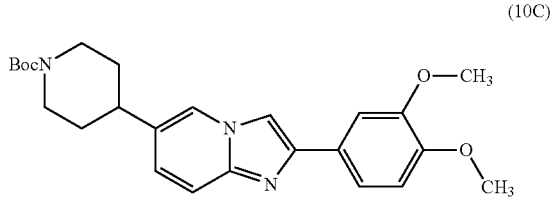 [SMILES: COc1ccc(-c2cn3cc(C4CCN(C(=O)OC(C)(C)C)CC4)ccc3n2)cc1OC]

To a 100 mL pear shaped flask were added Intermediate 10B (3.2 g, 7.4 mmol), and MeOH (40 mL). The vessel was evacuated and purged with $N_2$ (2×), then platinum(IV) oxide (0.68 g, 3.0 mmol) was added and the reaction mixture was stirred under hydrogen at 1 atm. After 1 h, the catalyst was filtered and the filtrate was concentrated. The residue was purified by flash column chromatography (80 g silica gel cartridge; A=Hex, B=EtOAc; 30 min grad.; 0% B to 100% B; flow rate=60 mL/min). The pure fractions were combined, concentrated and dried in vacuo to afford the title compound (1.0 g, 2.3 mmol, 31% yield) as a white solid. $^1$H NMR (500 MHz, METHANOL-$d_4$) δ 8.31-8.28 (m, 1H), 8.10-8.07 (m, 1H), 7.58-7.55 (m, 1H), 7.52-7.46 (m, 2H), 7.31-7.27 (m, 1H), 7.06-7.02 (m, 1H), 4.30-4.24 (m, 2H), 3.95 (s, 3H), 3.90 (s, 3H), 2.99-2.87 (m, 2H), 2.84-2.77 (m, 1H), 1.97-1.90 (m, 2H), 1.71-1.61 (m, 2H), 1.51 (s, 9H). Analytical LC/MS (Method 5): Observed Mass: 438.4; Retention Time: 0.78 min.

Step D. Intermediate 10D. Preparation of 2-(3,4-dimethoxyphenyl)-6-(piperidin-4-yl) imidazo[1,2-a]pyridine 2,2,2-trifluoroacetate

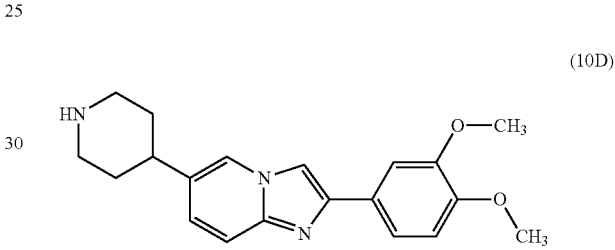

To a 100 mL pear shaped flask were added Intermediate 10C (1.0 g, 2.3 mmol), DCM (5 mL), and TFA (5 mL). After stirring 1 h, the solvent was concentrated, the residue was co-evaporated with toluene and the product was dried in vacuo to afford the title compound (1.0 g, 2.2 mmol, 96% yield) as a tan solid. $^1$H NMR (500 MHz, METHANOL-$d_4$) δ 8.74-8.70 (m, 1H), 8.49-8.46 (m, 1H), 7.99-7.94 (m, 1H), 7.93-7.89 (m, 1H), 7.52-7.46 (m, 2H), 7.20-7.16 (m, 1H), 3.98 (s, 3H), 3.94 (s, 3H), 3.63-3.58 (m, 2H), 3.27-3.23 (m, 2H), 2.30-2.22 (m, 2H), 2.08-1.98 (m, 2H) (one proton obscured). Analytical LC/MS (Method 5): Observed Mass: 338.3; Retention Time: 0.50 min.

Step E. Preparation of Example 10

Example 10 was synthesized according to the general methods described for the preparation of Example 1 (Step E) using Intermediate 10D (70 mg, 0.16 mmol) as starting material. The crude material was purified via preparative HPLC (Prep Method 1) to afford the title compound (25 mg, 0.054 mmol, 34% yield). $^1$H NMR (500 MHz, DMSO-$d_6$) δ 8.33 (s, 1H), 8.25 (s, 1H), 7.55 (s, 1H), 7.53-7.46 (m, 2H), 7.23-7.18 (m, 1H), 7.05-7.01 (m, 1H), 3.86 (s, 3H), 3.81 (s, 3H), 3.14-3.05 (m, 1H), 3.04-2.97 (m, 2H), 2.61-2.55 (m, 1H), 2.49-2.35 (m, 2H), 2.21-2.13 (m, 2H), 1.92-1.84 (m, 2H), 1.82-1.75 (m, 2H), 1.75-1.65 (m, 2H), 1.64-1.56 (m, 1H), 1.50-1.38 (m, 2H), 0.45-0.39 (m, 2H), 0.32-0.26 (m, 2H) (two protons obscured). Analytical LC/MS (Method 1): Purity: 95.9%; Observed Mass: 461.27; Retention Time: 1.35 min. (Method 2): Purity: 96.7%; Observed Mass: 460.99; Retention Time: 1.02 min.

Example 11

2-(3,4-dimethoxyphenyl)-6-(1'-isopropyl-[1,4'-bipiperidin]-4-yl)imidazo[1,2-a]pyridine (11)

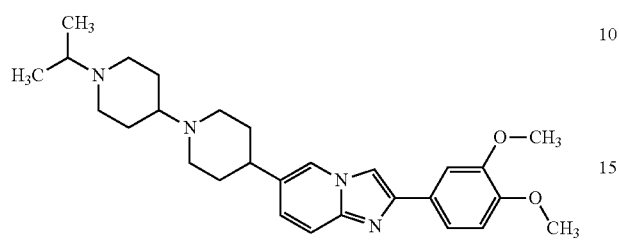

Example 11 was synthesized according to the general methods described for the preparation of Example 1 (Step E) using Intermediate 10D (70 mg, 0.16 mmol) as starting material and substituting 1-isopropylpiperidin-4-one (110 mg, 0.78 mmol) where appropriate. The crude material was purified via preparative HPLC (Prep Method 1) to afford the title compound (43 mg, 0.093 mmol, 58% yield). $^1$H NMR (500 MHz, DMSO-$d_6$) δ 8.33-8.29 (m, 1H), 8.22 (s, 1H), 7.55-7.51 (m, 1H), 7.47 (s, 2H), 7.23-7.18 (m, 1H), 7.03-6.97 (m, 1H), 3.84 (s, 3H), 3.78 (s, 3H), 3.01-2.94 (m, 2H), 2.90-2.81 (m, 2H), 2.76-2.65 (m, 1H), 2.29-2.19 (m, 3H), 2.18-2.07 (m, 2H), 1.85-1.72 (m, 4H), 1.69-1.59 (m, 2H), 1.50-1.37 (m, 2H), 0.97 (d, J=6.6 Hz, 6H) (one proton obscured). Analytical LC/MS (Method 1): Purity: 100%; Observed Mass: 463.29; Retention Time: 1.33 min. (Method 2): Purity: 100%; Observed Mass: 463.16; Retention Time: 0.96 min.

Example 12

2-(3,4-dimethoxyphenyl)-6-(1'-isobutyl-[1,4'-bipiperidin]-4-yl)imidazo[1,2-a]pyridine (12)

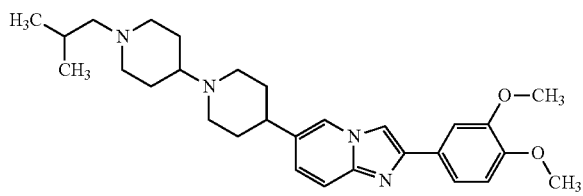

Example 12 was synthesized according to the general methods described for the preparation of Example 1 (Step E) using Intermediate 10D (70 mg, 0.16 mmol) as starting material and substituting 1-isobutylpiperidin-4-one (120 mg, 0.77 mmol) where appropriate. The crude material was purified via preparative HPLC (Prep Method 1) to afford the title compound (23 mg, 0.050 mmol, 31% yield). $^1$H NMR (500 MHz, DMSO-$d_6$) δ 8.33 (s, 1H), 8.25 (s, 1H), 7.56-7.53 (m, 1H), 7.53-7.46 (m, 2H), 7.25-7.19 (m, 1H), 7.05-7.00 (m, 1H), 3.85 (s, 3H), 3.80 (s, 3H), 3.60-3.49 (m, 1H), 3.20-3.17 (m, 1H), 3.13-3.05 (m, 2H), 2.99-2.89 (m, 2H), 2.46-2.36 (m, 3H), 2.14-2.06 (m, 2H), 2.00-1.94 (m, 1H), 1.91-1.85 (m, 2H), 1.84-1.75 (m, 3H), 1.75-1.64 (m, 2H), 1.59-1.49 (m, 2H), 0.86 (s, 6H) (one proton obscured). Analytical LC/MS (Method 1): Purity: 100%; Observed Mass: 477.03; Retention Time: 1.39 min. (Method 2): Purity: 100%; Observed Mass: 477.02; Retention Time: 1.04 min.

Example 13

2-(3,4-dimethoxyphenyl)-6-(1-(2-isopropyl-2-azaspiro[3.3]heptan-6-yl)piperidin-4-yl)-8-methylimidazo[1,2-a]pyridine (13)

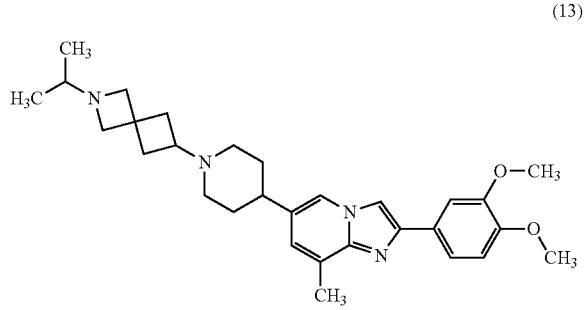 [SMILES: COc1ccc(-c2cn3cc(C4CCN(C5CC6(C5)CN(C(C)C)C6)CC4)cc(C)c3n2)cc1OC]

Step A. Intermediate 13A. Preparation of 6-(1-(2-azaspiro[3.3]heptan-6-yl)piperidin-4-yl)-2-(3,4-dimethoxyphenyl)-8-methylimidazo[1,2-a]pyridine dihydrochloride (13A)

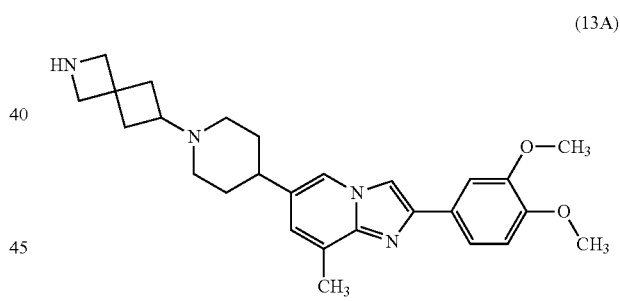

To a 40 mL vial were added Intermediate 1D (0.50 g, 1.3 mmol), tert-butyl 6-oxo-2-azaspiro[3.3]heptane-2-carboxylate (0.82 g, 3.9 mmol), AcOH (0.081 mL, 1.4 mmol), magnesium sulfate (2.3 g, 19 mmol), and DMF (10 mL). The reaction mixture was stirred for 20 min, then sodium triacetoxyborohydride (0.82 g, 3.9 mmol) was added and the reaction mixture was stirred. After 20 h, the reaction mixture was absorbed onto Celite and the product was purified by flash column chromatography (100 g reverse phase C18 GOLD silica gel cartridge; A=water:MeCN:TFA 90:10:0.05%, B=water:MeCN:TFA 10:90:0.05%; 20 min grad.; 0% B to 50% B; flow rate=80 mL/min). The pure fractions were combined, concentrated and the intermediate was dissolved in a minimal amount of MeOH and diluted with 4 M HCl in dioxane (10 mL). After stirring 1.5 h, the solvent was concentrated. The resultant solid was triturated with MeOH and the product was collected by vacuum filtration and dried in vacuo to afford the title compound (0.40 g, 0.77 mmol, 59% yield) as a white solid. $^1$H NMR (500 MHz, METHANOL-d₄) δ 8.58-8.51 (m, 1H), 8.43-8.36 (m, 1H), 7.77-7.66 (m, 1H), 7.58-7.52 (m, 2H), 7.19-7.14 (m, 1H), 4.25-4.21 (m, 2H), 4.19-4.15 (m, 2H), 3.99 (s, 3H), 3.94 (s, 3H), 3.74-3.70 (m, 1H), 3.68-3.62 (m, 2H), 3.18-3.10 (m, 1H), 3.08-2.98 (m, 2H), 2.85-2.80 (m, 3H), 2.73 (s, 3H), 2.28-2.20 (m, 4H) (one proton obscured). Analytical LC/MS (Method 5): Observed Mass: 447.4; Retention Time: 0.50 min.

Step B. Preparation of Example 13

To a 40 mL vial were added Intermediate 13A (70 mg, 0.14 mmol), propan-2-one (80 mg, 1.4 mmol), AcOH (8.4 mg, 0.14 mmol), magnesium sulfate (220 mg, 1.8 mmol), and DMF (2 mL). The reaction mixture was stirred for 20 min, then sodium triacetoxyborohydride (87 mg, 0.41 mmol) was added and the reaction mixture was stirred. After stirring 24 h, the reaction mixture was filtered and the filter cake was washed with 10% IPA/chloroform (20 mL). The filtrate was washed with 10% aqueous NaOH (10 mL), brine, dried over MgSO₄, filtered and concentrated. The crude material was purified via preparative HPLC (Prep Method 1) to afford the title compound (36 mg, 0.074 mmol, 53% yield). ¹H NMR (500 MHz, DMSO-d₆) δ 8.21 (s, 1H), 8.17-8.13 (m, 1H), 7.54-7.51 (m, 1H), 7.50-7.46 (m, 1H), 7.03-6.98 (m, 2H), 3.85-3.82 (m, 3H), 3.79-3.77 (m, 3H), 3.70-3.64 (m, 2H), 3.18-3.15 (m, 1H), 2.92-2.85 (m, 2H), 2.65-2.59 (m, 1H), 2.56-2.53 (m, 2H), 2.49-2.44 (m, 2H), 2.28-2.21 (m, 2H), 1.97-1.91 (m, 2H), 1.86-1.77 (m, 4H), 1.67-1.57 (m, 2H), 0.97-0.92 (m, 6H) (two protons obscured). Analytical LC/MS (Method 1): Purity: 100%; Observed Mass: 489.07; Retention Time: 1.2 min. (Method 2): Purity: 95.2%; Observed Mass: 489.29; Retention Time: 0.98 min.

Example 14

6-(1-(2-cyclobutyl-2-azaspiro[3.3]heptan-6-yl)piperidin-4-yl)-2-(3,4-dimethoxyphenyl)-8-methylimidazo[1,2-a]pyridine

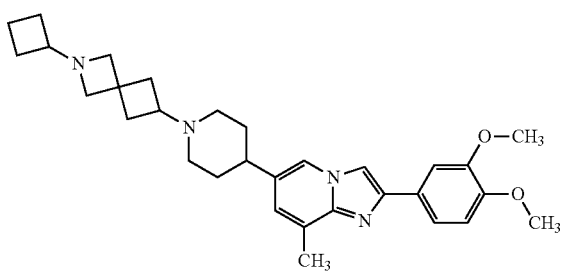

(14)

Example 14 was synthesized according to the general methods described for the preparation of Example 13 (Step B) using Intermediate 13A (70 mg, 0.14 mmol) as starting material and substituting cyclobutanone (98 mg, 1.4 mmol) where appropriate. The crude material was purified via preparative HPLC (Prep Method 1) to afford the title compound (48 mg, 0.096 mmol, 69% yield). ¹H NMR (500 MHz, DMSO-d₆) δ 8.32-8.22 (m, 1H), 8.18-8.14 (m, 1H), 7.57-7.47 (m, 2H), 7.04-6.98 (m, 2H), 4.00-3.95 (m, 1H), 3.90-3.87 (m, 1H), 3.86 (s, 3H), 3.79 (s, 3H), 3.69-3.61 (m, 1H), 3.58-3.48 (m, 1H), 3.09-2.98 (m, 1H), 2.57-2.54 (m, 3H), 2.49-2.39 (m, 2H), 2.24-2.09 (m, 6H), 2.07-1.87 (m, 4H), 1.84-1.66 (m, 4H) (4 protons obscured). Analytical LC/MS (Method 1): Purity: 96.7%; Observed Mass: 501.22; Retention Time: 1.31 min. (Method 2): Purity: 95.2%; Observed Mass: 501.21; Retention Time: 0.95 min.

Example 15

2-(3,4-dimethoxyphenyl)-6-(1-(2-isobutyl-2-azaspiro[3.3]heptan-6-yl)piperidin-4-yl)-8-methylimidazo[1,2-a]pyridine

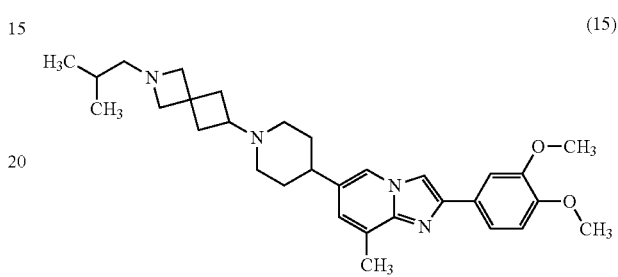

(15)

Example 15 was synthesized according to the general methods described for the preparation of Example 13 (Step B) using Intermediate 13A (90 mg, 0.17 mmol) as starting material and substituting isobutyraldehyde (63 mg, 0.87 mmol) where appropriate. The crude material was purified via preparative HPLC (Prep Method 1) to afford the title compound (32 mg, 0.064 mmol, 38% yield). ¹H NMR (500 MHz, DMSO-d₆) δ 8.21 (s, 1H), 8.17-8.13 (m, 1H), 7.52 (d, J=1.7 Hz, 1H), 7.51-7.45 (m, 1H), 7.00 (br d, J=1.2 Hz, 2H), 3.85 (s, 3H), 3.79 (s, 3H), 2.93-2.85 (m, 2H), 2.62-2.57 (m, 1H), 2.55 (s, 4H), 2.48-2.43 (m, 1H), 2.41-2.33 (m, 2H), 2.27-2.20 (m, 2H), 2.16-2.02 (m, 1H), 1.94 (br s, 2H), 1.80 (br d, J=11.4 Hz, 4H), 1.67-1.54 (m, 3H), 0.90-0.87 (m, 1H), 0.84 (d, J=6.7 Hz, 6H) (one proton obscured). Analytical LC/MS (Method 1): Purity: 99.2%; Observed Mass: 502.96; Retention Time: 1.46 min. (Method 2): Purity: 100%; Observed Mass: 502.96; Retention Time: 1.03 min.

Example 16

6-(1-(2-(cyclopropylmethyl)-2-azaspiro[3.3]heptan-6-yl)piperidin-4-yl)-2-(3,4-dimethoxyphenyl)-8-methylimidazo[1,2-a]pyridine

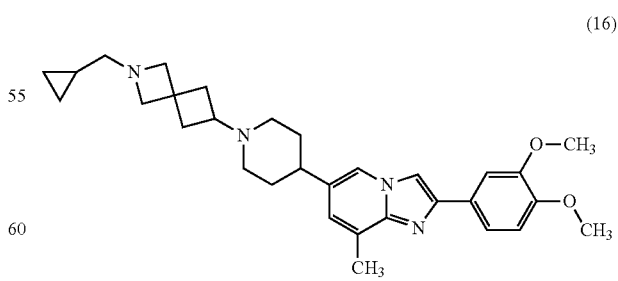

(16)

Example 16 was synthesized according to the general methods described for the preparation of Example 13 (Step B) using Intermediate 13A (90 mg, 0.17 mmol) as starting material and substituting cyclopropanecarbaldehyde (61 mg, 0.87 mmol) where appropriate. The crude material was purified via preparative HPLC (Prep Method 1) to afford the title compound (49 mg, 0.098 mmol, 58% yield). $^1$H NMR (500 MHz, DMSO-$d_6$) δ 8.29 (s, 1H), 8.21 (br s, 1H), 7.30 (br s, 2H), 7.28-7.24 (m, 1H), 6.91-6.86 (m, 1H), 4.04-3.95 (m, 1H), 3.92-3.80 (m, 3H), 3.63 (s, 3H), 3.58 (s, 3H), 3.39-3.20 (m, 1H), 2.80-2.73 (m, 3H), 2.70-2.59 (m, 2H), 2.52-2.44 (m, 1H), 2.37 (s, 3H), 2.35-2.29 (m, 2H), 1.94-1.86 (m, 2H), 1.69-1.56 (m, 2H), 0.72-0.61 (m, 1H), 0.34-0.28 (m, 2H), 0.10-0.03 (m, 2H) (three protons obscured). Analytical LC/MS (Method 1): Purity: 100%; Observed Mass: 501.25; Retention Time: 1.01 min. (Method 2): Purity: 100%; Observed Mass: 501.28; Retention Time: 1.52 min.

Example 17

6-(1-(2-cyclopropyl-2-azaspiro[3.3]heptan-6-yl)piperidin-4-yl)-2-(3,4-dimethoxyphenyl)-8-methylimidazo[1,2-a]pyridine (17)

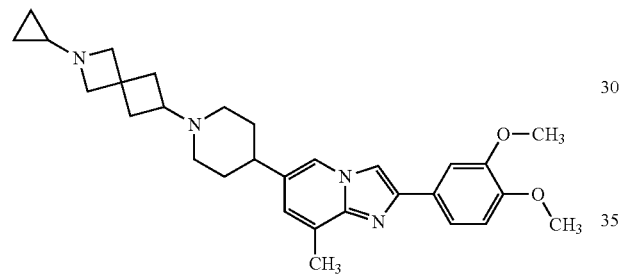

To a 40 mL vial were added Intermediate 13A (100 mg, 0.19 mmol), (1-ethoxycyclopropoxy)trimethylsilane (100 mg, 0.58 mmol), activated 3 Å molecular sieves (500 mg), and MeOH (5 mL). The reaction mixture was flushed with $N_2$ and stirred at 80° C. for 1 h, cooled to room temperature, then sodium cyanoborohydride (36 mg, 0.58 mmol) was added, the vessel flushed with $N_2$ and the reaction mixture was stirred at 40° C. After 18 h, the vessel was cooled, recharged with (1-ethoxycyclopropoxy)trimethylsilane (100 mg, 0.58 mmol), AcOH (0.066 mL, 1.2 mmol), sodium cyanoborohydride (36 mg, 0.58 mmol) and additional 3 Å molecular sieves. The vessel was flushed with $N_2$, heated to 50° C. and stirred. After 18 h, the reaction mixture was cooled, filtered and concentrated. The crude material was purified via preparative HPLC (Prep Method 1) to afford the title compound (10 mg, 0.021, 11% yield). $^1$H NMR (500 MHz, DMSO-$d_6$) δ 8.08-8.04 (m, 1H), 7.96-7.93 (m, 1H), 7.32 (br d, J=1.7 Hz, 2H), 7.30-7.26 (m, 1H), 6.82-6.80 (m, 1H), 3.64 (s, 3H), 3.58 (s, 3H), 3.08-3.04 (m, 1H), 2.97-2.94 (m, 1H), 2.76-2.68 (m, 2H), 2.35-2.34 (m, 3H), 2.09-2.06 (m, 1H), 2.02-1.95 (m, 3H), 1.90-1.85 (m, 2H), 1.72-1.65 (m, 4H), 1.63-1.58 (m, 2H), 1.47-1.40 (m, 2H), 0.27-0.20 (m, 1H), 0.12-0.09 (m, 2H), 0.03-0.02 (m, 2H). Analytical LC/MS (Method 1): Purity: 84.9%; Observed Mass: 487.23; Retention Time: 1.5 min. (Method 2): Purity: 100%; Observed Mass: 487.22; Retention Time: 1.0 min.

Examples 18 and 19

2-(3,4-dimethoxyphenyl)-6-(1-(8-isobutyl-8-azabicyclo[3.2.1]octan-3-yl)piperidin-4-yl)-8-methylimidazo[1,2-a]pyridine (18-19)

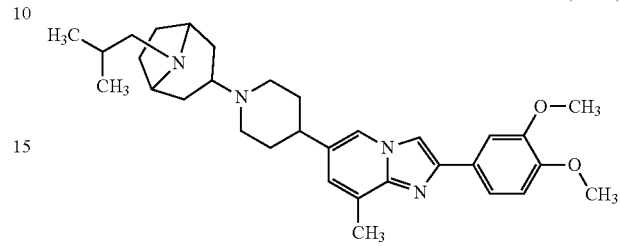

Step A. Intermediate 18A. Preparation of 6-(1-(8-azabicyclo[3.2.1]octan-3-yl)piperidin-4-yl)-2-(3,4-dimethoxyphenyl)-8-methylimidazo[1,2-a]pyridine bis(2,2,2-trifluoroacetate)

(18A)

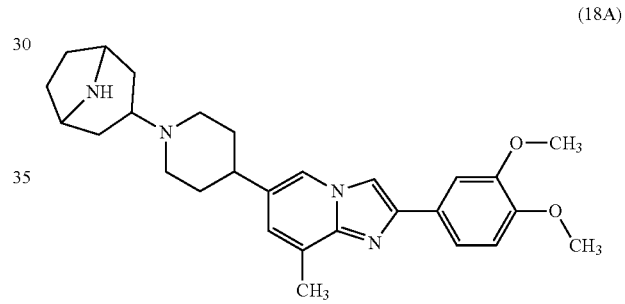

To a 40 mL vial were added Intermediate 1D (400 mg, 1.0 mmol), tert-butyl 3-oxo-8-azabicyclo[3.2.1]octane-8-carboxylate (700 mg, 3.1 mmol), AcOH (0.065 mL, 1.1 mmol), magnesium sulfate (1900 mg, 16 mmol), and DMF (10 mL). The reaction mixture was stirred for 20 min, then sodium triacetoxyborohydride (660 mg, 3.1 mmol) was added and the reaction mixture was stirred. After 18 h, the reaction mixture was diluted with DCM/MeOH and filtered. To the filtrate was added water (0.5 mL) then concentrated. The remaining DMF solution was filtered and the crude product was purified by flash column chromatography (100 g reverse phase C18 GOLD silica gel cartridge; A=water:MeCN:TFA 90:10:0.05%, B=water:MeCN:TFA 10:90:0.05%; 20 min grad.; 0% B to 40% B; flow rate=60 mL/min). Fractions corresponding to the intermediate were combined and concentrated. The resultant residue was dissolved in THF (20 mL) and TFA (20 mL) and stirred. After 3 h, the solvent was concentrated, and the residue was purified by flash column chromatography (100 g reverse phase C18 GOLD silica gel cartridge; A=water:MeCN:TFA 90:10:0.05%, B=water:MeCN:TFA 10:90:0.05%; 20 min grad.; 0% B to 40% B; flow rate=60 mL/min). The desired fractions were combined, concentrated and the product was dried in vacuo to afford the title compound (120 mg, 0.26 mmol, 26% yield) as a colorless residue. $^1$H NMR (500 MHz, METHANOL-$d_4$) δ 8.55-8.50 (m, 1H), 8.41 (s, 1H), 7.75-7.69 (m, 1H), 7.48 (br s, 2H), 7.10-7.04 (m, 1H), 4.31-4.19 (m, 2H), 3.93 (s, 3H), 3.89 (s, 3H), 3.83-3.77 (m, 2H), 3.35-3.32 (m, 1H), 3.31-3.22 (m, 2H), 3.18-3.08 (m, 1H), 2.70 (s, 3H), 2.44-2.36 (m, 2H), 2.31-2.18 (m, 8H), 2.15-2.09 (m, 2H). Analytical LC/MS (Method 5): Observed Mass: 461.3; Retention Time: 0.50 min.

Step B. Preparation of Example 18 and Example 19

To a 40 mL vial were added Intermediate 18A (40 mg, 0.058 mmol), isobutyraldehyde (21 mg, 0.29 mmol), AcOH (3.8 mg, 0.064 mmol), magnesium sulfate (220 mg, 1.8 mmol), and DMF (2 mL). The reaction mixture was stirred for 20 min, then sodium triacetoxyborohydride (36 mg, 0.17 mmol) was added and the reaction mixture was stirred. After 18 h, the reaction mixture was filtered, the filter cake was washed with MeOH, and the filtrate was concentrated. The crude isomeric mixture was purified via preparative HPLC with the following conditions: Column: XBridge C18, 200 mm×19 mm, 5-μm particles; Mobile Phase A: 5:95 acetonitrile:water with ammonium acetate; Mobile Phase B: 95:5 acetonitrile:water with ammonium acetate; Gradient: a 0-minute hold at 15% B, 15-70% B over 20 minutes, then a 0-minute hold at 100% B; Flow Rate: 20 mL/min; Column Temperature: 25° C. Fraction collection was triggered by MS signals. Fractions containing the respective desired products were combined and dried via centrifugal evaporation.

Example 18 (12 mg, 0.023 mmol, 40% yield) was isolated as the $1^{st}$ eluting isomer. $^1$H NMR (500 MHz, DMSO-$d_6$) δ 8.23 (s, 1H), 8.16 (s, 1H), 7.54 (d, J=1.2 Hz, 1H), 7.52-7.48 (m, 1H), 7.05-6.99 (m, 2H), 3.86 (s, 3H), 3.81 (s, 3H), 3.07-3.01 (m, 1H), 2.69-2.60 (m, 1H), 2.50-2.44 (m, 1H), 2.31-2.12 (m, 4H), 1.94-1.91 (m, 1H), 1.91-1.80 (m, 4H), 1.75-1.50 (m, 9H), 0.91 (d, J=6.4 Hz, 6H) (5 protons obscured). Analytical LC/MS (Method 1): Purity: 97.7%; Observed Mass: 516.90; Retention Time: 1.59 min. (Method 2): Purity: 96.1%; Observed Mass: 517.24; Retention Time: 1.09 min.

Example 19 (3.6 mg, 0.0070 mmol, 12% yield) was isolated as the $2^{nd}$ eluting isomer. $^1$H NMR (500 MHz, DMSO-$d_6$) δ 8.22 (s, 1H), 8.20-8.16 (m, 1H), 7.56-7.53 (m, 1H), 7.52-7.47 (m, 1H), 7.02 (s, 2H), 3.87 (s, 3H), 3.81 (s, 3H), 3.27-3.20 (m, 1H), 3.11-3.05 (m, 2H), 2.57 (s, 3H), 2.49-2.43 (m, 1H), 2.42-2.36 (m, 1H), 2.04-1.98 (m, 2H), 1.97-1.92 (m, 2H), 1.88-1.80 (m, 6H), 1.78-1.72 (m, 2H), 1.70-1.57 (m, 5H), 0.89 (d, J=6.4 Hz, 6H) (one proton obscured). Analytical LC/MS (Method 1): Purity: 98.9%; Observed Mass: 517.01; Retention Time: 1.69 min. (Method 2): Purity: 100%; Observed Mass: 517.33; Retention Time: 1.1 min.

Examples 20 and 21

6-(1-(8-(cyclopropylmethyl)-8-azabicyclo[3.2.1]octan-3-yl)piperidin-4-yl)-2-(3,4-dimethoxyphenyl)-8-methylimidazo[1,2-a]pyridine (20-21)

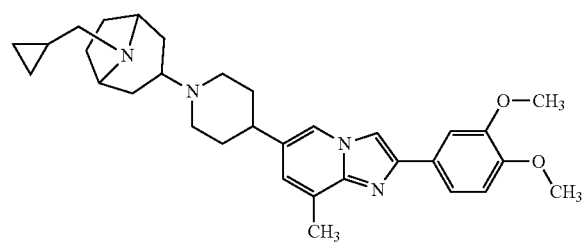

Examples 20 and 21 were synthesized according to the general methods described for the synthesis of Examples 18 and 19, using Intermediate 18A (40 mg, 0.058 mmol) as starting material, and substituting cyclopropanecarbaldehyde (20 mg, 0.29 mmol) where appropriate. The crude isomeric mixture was purified via preparative HPLC with the following conditions: Column: XBridge C18, 200 mm×19 mm, 5-μm particles; Mobile Phase A: 5:95 acetonitrile:water with ammonium acetate; Mobile Phase B: 95:5 acetonitrile:water with ammonium acetate; Gradient: a 0-minute hold at 13% B, 13-53% B over 20 minutes, then a 0-minute hold at 100% B; Flow Rate: 20 mL/min; Column Temperature: 25° C. Fraction collection was triggered by MS signals. Fractions containing the respective desired products were combined and dried via centrifugal evaporation.

Example 20 (7.5 mg, 0.015 mmol, 26% yield) was isolated as the first eluting isomer. $^1$H NMR (500 MHz, DMSO-$d_6$) δ 8.05 (s, 1H), 8.01-7.97 (m, 1H), 7.36 (s, 1H), 7.35-7.30 (m, 1H), 6.85 (s, 2H), 3.69 (s, 3H), 3.63 (s, 3H), 2.88-2.78 (m, 2H), 2.58-2.46 (m, 1H), 2.31-2.19 (m, 3H), 2.09-2.00 (m, 2H), 1.75 (s, 3H), 1.70-1.62 (m, 2H), 1.45 (br d, J=8.9 Hz, 8H), 1.21-1.03 (m, 1H), 0.79-0.68 (m, 1H), 0.33 (br d, J=7.0 Hz, 2H), 0.01 (br d, J=4.3 Hz, 2H) (three protons obscured). Analytical LC/MS (Method 1): Purity: 95.9%; Observed Mass: 514.94; Retention Time: 1.52 min. (Method 2): Purity: 96.2%; Observed Mass: 514.33; Retention Time: 1.08 min.

Examples 21 (4.1 mg, 0.0080 mmol, 14% yield) was isolated as the second eluting isomer. $^1$H NMR (500 MHz, DMSO-$d_6$) δ 8.05 (s, 1H), 8.02-7.97 (m, 1H), 7.36 (s, 1H), 7.35-7.31 (m, 1H), 6.85 (s, 2H), 3.69 (s, 3H), 3.63 (s, 3H), 2.87-2.79 (m, 2H), 2.57-2.46 (m, 1H), 2.33-2.20 (m, 3H), 2.09-2.00 (m, 2H), 1.75 (s, 3H), 1.69-1.61 (m, 2H), 1.45 (br d, J=8.9 Hz, 8H), 0.79-0.69 (m, 1H), 0.37-0.28 (m, 2H), 0.05-0.03 (m, 2H) (four protons obscured). Analytical LC/MS (Method 1): Purity: 100%; Observed Mass: 515.25; Retention Time: 1.74 min. (Method 2): Purity: 96.1%; Observed Mass: 515.41; Retention Time: 1.08 min.

Example 22

2-(3,4-dimethoxyphenyl)-6-(1-(8-isopropyl-8-azabicyclo[3.2.1]octan-3-yl)piperidin-4-yl)-8-methylimidazo[1,2-a]pyridine (22-23)

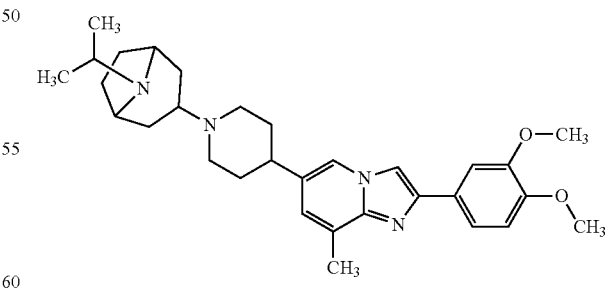

Examples 22 and 23 were synthesized according to the general methods described for the synthesis of Examples 18 and 19, using Intermediate 18A (40 mg, 0.058 mmol) as starting material, and substituting propan-2-one (17 mg, 0.29 mmol) where appropriate. The crude isomeric mixture was purified via preparative LC/MS with the following conditions: Column: XBridge C18, 200 mm×19 mm, 5-μm particles; Mobile Phase A: 5:95 acetonitrile:water with ammonium acetate; Mobile Phase B: 95:5 acetonitrile:water with ammonium acetate; Gradient: a 0-minute hold at 15% B, 15-60% B over 20 minutes, then a 0-minute hold at 100% B; Flow Rate: 20 mL/min; Column Temperature: 25° C. Fraction collection was triggered by MS signals. Fractions containing the respective desired products were combined and dried via centrifugal evaporation.

Example 22 (5.3 mg, 0.011 mmol, 19% yield) was isolated as the first eluting isomer. $^1$H NMR (500 MHz, DMSO-$d_6$) δ 8.23 (s, 1H), 8.18-8.14 (m, 1H), 7.56-7.53 (m, 1H), 7.52-7.48 (m, 1H), 7.02 (br d, J=1.2 Hz, 2H), 3.87 (s, 3H), 3.81 (s, 3H), 3.05-2.97 (m, 2H), 2.86-2.77 (m, 1H), 2.70-2.61 (m, 1H), 2.58-2.56 (m, 1H), 2.50-2.41 (m, 1H), 2.24-2.13 (m, 2H), 1.95-1.90 (m, 1H), 1.87-1.78 (m, 4H), 1.73-1.53 (m, 6H), 1.52-1.45 (m, 2H), 1.05 (br d, J=5.8 Hz, 6H) (three protons obscured). Analytical LC/MS (Method 1): Purity: 100%; Observed Mass: 503.18; Retention Time: 1.39 min. (Method 2): Purity: 100%; Observed Mass: 503.21; Retention Time: 1.00 min.

Example 23 (2.6 mg, 0.0052 mmol, 9.0% yield) was isolated as the second eluting isomer. $^1$H NMR (500 MHz, DMSO-$d_6$) δ 8.22 (s, 1H), 8.20-8.17 (m, 1H), 7.57-7.52 (m, 1H), 7.52-7.47 (m, 1H), 7.05-7.00 (m, 2H), 3.87 (s, 3H), 3.81 (s, 3H), 3.35-3.24 (m, 1H), 2.72-2.62 (m, 1H), 2.49-2.43 (m, 1H), 2.40-2.32 (m, 1H), 1.92 (br s, 13H), 1.70-1.60 (m, 2H), 1.04 (br d, J=5.8 Hz, 6H) (5 protons obscured). Analytical LC/MS (Method 1): Purity: 97%; Observed Mass: 502.90; Retention Time: 1.65 min. (Method 2): Purity: 98.6%; Observed Mass: 503.16; Retention Time: 1.07 min.

Example 24

6-(8-(1-cyclopropylpiperidin-4-yl)-8-azabicyclo[3.2.1]octan-3-yl)-2-(3,4-dimethoxyphenyl)-8-methylimidazo[1,2-a]pyridine (isomeric mixture)

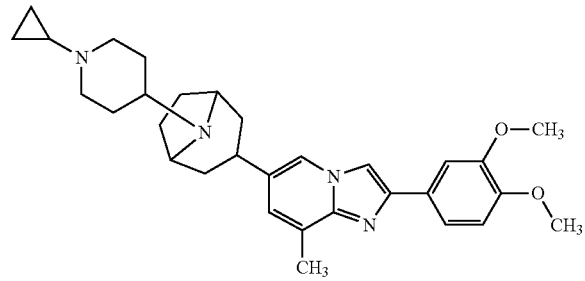

(24)

Step A. Intermediate 24A. Preparation of tert-butyl 3-(2-(3,4-dimethoxyphenyl)-8-methylimidazo[1,2-a]pyridin-6-yl)-8-azabicyclo[3.2.1]oct-2-ene-8-carboxylate

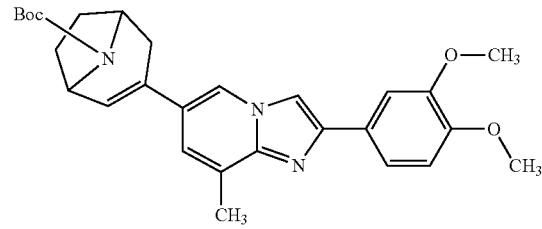

(24A)

To a 40 mL vial were added Intermediate 1A (260 mg, 0.75 mmol), tert-butyl 3-(4,4,5,5-tetramethyl-1,3,2-dioxaborolan-2-yl)-8-azabicyclo[3.2.1]oct-2-ene-8-carboxylate (250 mg, 0.75 mmol), XPhos Pd G3, 95% (63 mg, 0.075 mmol), 1,4-dioxane (15 mL), followed by potassium phosphate tribasic (550 mg, 2.6 mmol) dissolved in water (3 mL). The vessel was flushed with $N_2$, capped and the reaction mixture was stirred at 85° C. After 18 h, the reaction mixture was cooled, diluted with water (100 mL) and extracted with EtOAc (2×50 mL). The organic phase was combined, washed with brine, dried over $MgSO_4$, filtered and concentrated. The residue was purified by flash column chromatography (120 g silica gel cartridge; A=Hex, B=EtOAc; 30 min grad.; 0% B to 100% B; flow rate=80 mL/min). The pure fractions were combined, concentrated and dried in vacuo to afford the title compound (270 mg, 0.56 mmol, 75% yield) as a pale yellow solid. $^1$H NMR (500 MHz, METHANOL-$d_4$) δ 8.27 (s, 1H), 8.06 (s, 1H), 7.60 (s, 1H), 7.52-7.45 (m, 1H), 7.30 (s, 1H), 7.08-7.01 (m, 1H), 6.65-6.57 (m, 1H), 4.57-4.53 (m, 1H), 4.53-4.48 (m, 1H), 3.96 (s, 3H), 3.90 (s, 3H), 3.16-3.03 (m, 1H), 2.62 (s, 3H), 2.38-2.22 (m, 2H), 2.10-2.00 (m, 2H), 1.86-1.75 (m, 1H), 1.49 (s, 9H). Analytical LC/MS (Method 5): Observed Mass: 476.4; Retention Time: 0.88 min.

Step B. Intermediate 24B. Preparation of 6-(8-azabicyclo[3.2.1]octan-3-yl)-2-(3,4-dimethoxyphenyl)-8-methylimidazo[1,2-a]pyridine hydrochloride

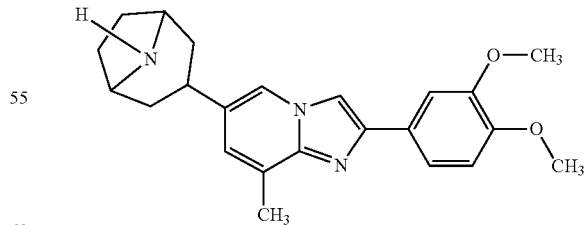

(24B)

To a 100 mL pear shaped flask were added Intermediate 24A (270 mg, 0.57 mmol) and MeOH (30 mL). The vessel was evacuated and purged with $N_2$, then Pd—C (10% on carbon) (60 mg, 0.057 mmol) was added and the reaction mixture was stirred under hydrogen at 1 atm. After 18 h, the catalyst was filtered and to the filtrate was added 4 M HCl in dioxane (30 mL). After stirring 30 min, the solvent was concentrated, the residue was co-evaporated with toluene (2×) and the product was dried in vacuo to afford the title compound (230 mg, 0.56 mmol, 98% yield) as a tan solid. $^1$H NMR (500 MHz, METHANOL-d$_4$) δ 8.83-8.59 (m, 1H), 8.46 (s, 1H), 7.80 (s, 1H), 7.56 (s, 2H), 7.21-7.15 (m, 1H), 4.25-4.14 (m, 2H), 3.98 (s, 3H), 3.94 (s, 3H), 3.78-3.58 (m, 2H), 3.48-3.40 (m, 1H), 2.77-2.72 (m, 3H), 2.25 (br s, 4H), 2.16-2.08 (m, 2H). Analytical LC/MS (Method 5): Observed Mass: 378.3; Retention Time: 0.58 min.

Step C. Preparation of Example 24

To a 40 mL vial were added Intermediate 24B (70 mg, 0.16 mmol), 1-cyclopropylpiperidin-4-one (110 mg, 0.79 mmol), AcOH (10 mg, 0.17 mmol), magnesium sulfate (220 mg, 1.8 mmol), and DMF (2 mL). The reaction mixture was stirred for 20 min, then sodium triacetoxyborohydride (99 mg, 0.47 mmol) was added and the reaction mixture was stirred. After 18 h, the reaction mixture was filtered and partitioned into 10% NaOH (20 mL) and extracted with 10% IPA/chloroform (3×10 mL). The organic phase was combined, dried over Na$_2$SO$_4$, filtered and concentrated. The crude material was purified via preparative HPLC (Prep Method 1) to afford the title compound (57 mg, 0.11 mmol, 69% yield). $^1$H NMR (500 MHz, DMSO-d$_6$) δ 8.01-7.94 (m, 2H), 7.32-7.22 (m, 2H), 6.83-6.75 (m, 2H), 3.62 (s, 3H), 3.56 (s, 3H), 2.82-2.66 (m, 3H), 2.66-2.58 (m, 1H), 2.24-2.15 (m, 1H), 2.11-2.02 (m, 1H), 2.02-1.90 (m, 2H), 1.58 (br s, 9H), 1.50-1.30 (m, 4H), 1.29-1.20 (m, 1H), 1.15-1.01 (m, 2H), 0.23-0.14 (m, 2H), 0.10-0.02 (m, 2H). Analytical LC/MS (Method 1): Purity: 98.9%; Observed Mass: 501.17; Retention Time: 1.52 min. (Method 2): Purity: 100%; Observed Mass: 500.96; Retention Time: 1.16 min.

Examples 25 and 26

6-(8-(1-cyclopropylpiperidin-4-yl)-8-azabicyclo[3.2.1]octan-3-yl)-2-(3,4-dimethoxyphenyl)-8-methylimidazo[1,2-a]pyridine (25-26)

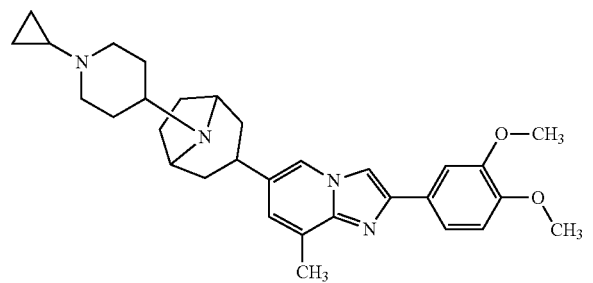

The individual isomers Examples 25 and Example 26 were obtained by the separation of the isomeric mixture Example 24 (21 mg, 0.041 mmol) under the following conditions: Instrument: Waters 100 Prep SFC; Column: Chiral OD, 30×250 mm. 5 micron; Mobile Phase: 55% CO$_2$/45% IPA w/0.1% DEA; Flow Conditions: 100 mL/min; Detector Wavelength: 220 nm; Injection Details: 600 μL 21 mg dissolved in 3 mL MeOH.

Example 25 (5.6 mg, 0.011, 27% yield) was isolated as the first eluting isomer. $^1$H NMR (500 MHz, DMSO-d$_6$) δ 7.95 (s, 1H), 7.94-7.90 (m, 1H), 7.30-7.26 (m, 1H), 7.25-7.19 (m, 1H), 6.76 (br s, 2H), 3.60 (s, 3H), 3.54 (s, 3H), 3.36-3.19 (m, 1H), 2.76-2.62 (m, 3H), 1.98-1.89 (m, 2H), 1.67-1.52 (m, 6H), 1.51-1.42 (m, 2H), 1.35-1.25 (m, 3H), 1.07-0.95 (m, 2H), 0.17-0.11 (m, 2H), 0.07-0.00 (m, 2H) (5 protons obscured). Analytical LC/MS (Method 1): Purity: 99.3%; Observed Mass: 501.21; Retention Time: 1.46 min. (Method 2): Purity: 100%; Observed Mass: 500.98; Retention Time: 1.01 min. Chiral Analytical (SFC Method 4): Chiral purity >95%. Retention Time: 2.2 min.

Example 26 (4.1 mg, 0.0082 mmol, 20% yield) was isolated as the second eluting isomer. $^1$H NMR (500 MHz, DMSO-d$_6$) δ 8.42-8.35 (m, 1H), 8.21 (s, 1H), 7.52 (d, J=1.9 Hz, 1H), 7.48 (dd, J=8.2, 1.8 Hz, 1H), 7.07 (s, 1H), 7.02 (d, J=8.5 Hz, 1H), 3.85 (s, 3H), 3.79 (s, 3H), 3.13-3.01 (m, 1H), 3.00-2.89 (m, 2H), 2.51 (dd, J=3.8, 1.9 Hz, 6H), 2.43-2.30 (m, 2H), 2.24-2.13 (m, 2H), 1.93-1.82 (m, 5H), 1.62-1.49 (m, 4H), 1.46-1.33 (m, 2H), 0.43-0.38 (m, 2H), 0.32-0.28 (m, 2H). Analytical LC/MS (Method 1): Purity: 100%; Observed Mass: 500.93; Retention Time: 1.46 min. (Method 2): Purity: 98.6%; Observed Mass: 500.96; Retention Time: 0.99 min. Chiral Analytical (SFC Method 4): Chiral purity >95%. Retention Time: 4.2 min.

Example 27

2-(3,4-dimethoxyphenyl)-6-(8-(1-isobutylpiperidin-4-yl)-8-azabicyclo[3.2.1]octan-3-yl)-8-methylimidazo[1,2-a]pyridine (isomeric mixture)

(27)

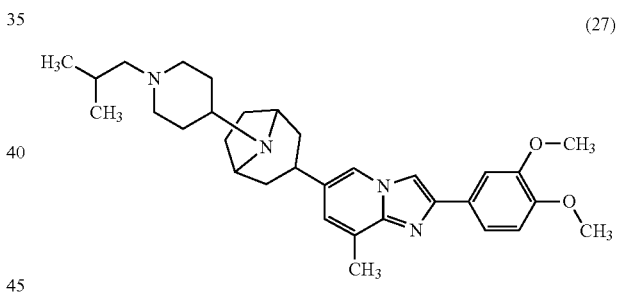

Example 27 was prepared according to the general methods described for the synthesis of Example 24 (Step C), using Intermediate 24C (70 mg, 0.16 mmol) as starting material, and substituting 1-isobutylpiperidin-4-one (120 mg, 0.77 mmol) where appropriate. The crude material was purified via preparative HPLC (Prep Method 1) to afford the title compound (76 mg, 0.15 mmol, 94% yield). $^1$H NMR (500 MHz, DMSO-d$_6$) δ 8.23 (s, 2H), 7.55-7.52 (m, 1H), 7.51-7.46 (m, 1H), 7.07-6.99 (m, 2H), 3.86 (s, 3H), 3.80 (s, 3H), 3.69-3.62 (m, 1H), 3.05-2.94 (m, 1H), 2.88-2.79 (m, 2H), 2.56 (s, 4H), 2.33-2.23 (m, 1H), 2.06-2.01 (m, 2H), 1.89-1.72 (m, 6H), 1.66-1.55 (m, 2H), 1.49-1.30 (m, 3H), 0.88-0.85 (m, 6H) (4 protons obscured). Analytical LC/MS (Method 1): Purity: 97.9%; Observed Mass: 516.97; Retention Time: 1.59 min. (Method 2): Purity: 100%; Observed Mass: 516.96; Retention Time: 1.1 min.

Examples 28 and 29

2-(3,4-dimethoxyphenyl)-6-(8-(1-isobutylpiperidin-4-yl)-8-azabicyclo[3.2.1]octan-3-yl)-8-methylimidazo[1,2-a]pyridine

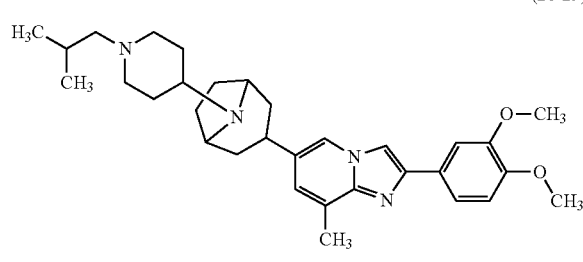

(28-29)

The individual isomers Example 28 and Example 29 were obtained by the separation of isomeric mixture Example 27 (50 mg, 0.097 mmol) under the following conditions: Instrument: Berger SFC; Column: OD 30×250 mm ID, 5 m; Temperature: 40° C.; Flow rate: 85.0 mL/min; Mobile Phase: 75/25 $CO_2$/EtOH-0.1% DEA; Detector Wavelength: 220 nm; Injection Volume: 500 μL; Sample Preparation: 50 mg of the sample dissolved in 3 mL MeOH.

Example 28 (22 mg, 0.043 mmol, 44% yield) was isolated as the first eluting isomer. $^1$H NMR (400 MHz, METHANOL-$d_4$) δ 8.12-8.07 (m, 1H), 8.01 (s, 1H), 7.61-7.58 (m, 1H), 7.49-7.44 (m, 1H), 7.09-7.05 (m, 1H), 7.04-6.98 (m, 1H), 3.95 (s, 3H), 3.88 (s, 3H), 3.69-3.61 (m, 2H), 3.35-3.32 (m, 1H), 3.05-2.89 (m, 3H), 2.59 (s, 3H), 2.56-2.49 (m, 1H), 2.11 (s, 2H), 2.05-1.89 (m, 4H), 1.86-1.76 (m, 3H), 1.68-1.47 (m, 4H), 1.29 (s, 3H), 0.93 (d, J=6.7 Hz, 6H). Analytical LC/MS (Method 3): Purity: 96.9%; Observed Mass: 517.55; Retention Time: 2.27 min. (Method 4): Purity: 98.0%; Observed Mass: 517.20; Retention Time: 1.25 min. Chiral Analytical (SFC Method 5): Chiral Purity >99%. Retention Time: 11.58 min.

Example 29 (12 mg, 0.010 mmol, 23% yield) was isolated as the second eluting isomer. $^1$H NMR (400 MHz, METHANOL-$d_4$) δ 8.42-8.37 (m, 1H), 8.08-8.05 (m, 1H), 7.62-7.59 (m, 1H), 7.52-7.46 (m, 1H), 7.19-7.15 (m, 1H), 7.07-7.02 (m, 1H), 3.96 (s, 3H), 3.90 (s, 3H), 3.68-3.64 (m, 1H), 3.52-3.48 (m, 1H), 3.40-3.36 (m, 1H), 3.17-3.05 (m, 4H), 2.63 (s, 3H), 2.54-2.44 (m, 4H), 2.39-2.35 (m, 1H), 2.12-2.01 (m, 6H), 1.78-1.64 (m, 5H), 0.98-0.97 (m, 3H), 0.97-0.95 (m, 3H). Analytical LC/MS (Method 3): Purity: 98.5%; Observed Mass: 517.50; Retention Time: 2.28 min. (Method 4): Purity: 96.1%; Observed Mass: 517.20; Retention Time: 1.18 min. Chiral Analytical (SFC Method 5): Chiral Purity >99%. Retention Time: 19.81 min.

Example 30

2-(3,4-dimethoxyphenyl)-6-(8-(1-isopropylpiperidin-4-yl)-8-azabicyclo[3.2.1]octan-3-yl)-8-methylimidazo[1,2-a]pyridine (isomeric mixture)

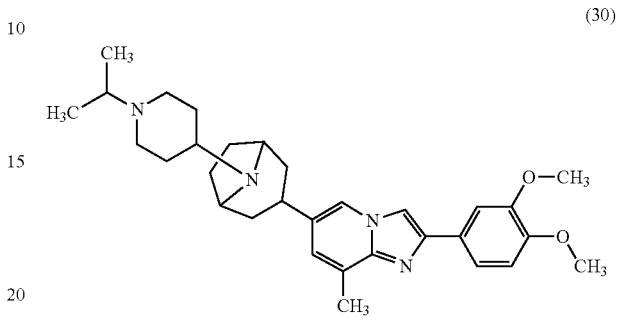

(30)

Example 30 was prepared according to the general methods described for the synthesis of Example 24 (Step C), using Intermediate 24C (70 mg, 0.16 mmol) as starting material, and substituting 1-isopropylpiperidin-4-one (110 mg, 0.78 mmol) where appropriate. The crude material was purified via preparative HPLC (Prep Method 1) to afford the title compound (44 mg, 0.088 mmol, 55% yield). $^1$H NMR (500 MHz, DMSO-$d_6$) δ 8.23-8.18 (m, 2H), 7.56-7.52 (m, 1H), 7.51-7.47 (m, 1H), 7.05-6.99 (m, 2H), 3.86 (s, 3H), 3.80 (s, 3H), 3.62-3.40 (m, 1H), 3.02-2.91 (m, 1H), 2.88-2.80 (m, 2H), 2.76-2.67 (m, 1H), 2.56 (s, 3H), 2.49-2.40 (m, 1H), 2.24-2.16 (m, 2H), 1.91-1.70 (m, 8H), 1.59-1.51 (m, 2H), 1.38-1.29 (m, 2H), 0.99 (s, 6H) (one proton obscured). Analytical LC/MS (Method 1): Purity: 100%; Observed Mass: 502.90; Retention Time: 1.41 min. (Method 2): Purity: 100%; Observed Mass: 502.96; Retention Time: 1.08 min.

Example 31

2-(3,4-dimethoxyphenyl)-6-(1'-isobutyl-[1,4'-bipiperidin]-4-yl)-5,6,7,8-tetrahydroimidazo[1,2-a]pyridine (racemic mixture)

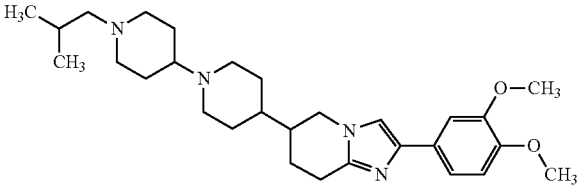

(31)

Step A. Intermediate 31A. Preparation of tert-butyl 4-(2-(3,4-dimethoxyphenyl)-5,6,7,8-tetrahydroimidazo[1,2-a]pyridin-6-yl)piperidine-1-carboxylate

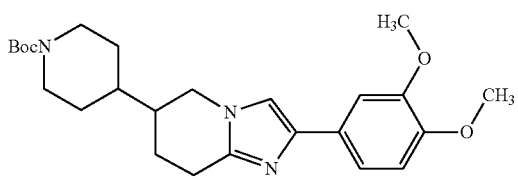

(31A)

To a 100 mL pear shaped flask were added Intermediate 10B (2.5 g, 5.7 mmol), and MeOH (350 mL). The vessel was evacuated and purged with $N_2$, then Pd—C (10% on carbon) (1.2 g, 0.57 mmol) was added and the reaction mixture was stirred under hydrogen at 1 atm. After stirring 96 h, the catalyst was filtered and the filtrate was concentrated. The crude residue was purified by flash column chromatography (120 g silica gel cartridge; A=DCM, B=MeOH; 30 min grad.; 0% B to 10% B; flow rate=80 mL/min). The pure fractions were combined, concentrated and dried in vacuo to afford the title compound (2.1 g, 4.8 mmol, 84% yield) as a pale yellow solid. $^1$H NMR (500 MHz, METHANOL-$d_4$) δ 7.34 (d, J=1.9 Hz, 1H), 7.26-7.23 (m, 1H), 7.22 (s, 1H), 6.97-6.93 (m, 1H), 4.20-4.13 (m, 3H), 3.90 (s, 3H), 3.85 (s, 3H), 3.79-3.71 (m, 1H), 3.05-2.97 (m, 1H), 2.85-2.72 (m, 3H), 2.24-2.15 (m, 1H), 1.93-1.85 (m, 2H), 1.83-1.75 (m, 1H), 1.71-1.54 (m, 2H), 1.49-1.46 (m, 9H), 1.34-1.24 (m, 2H). Analytical LC/MS (Method 5): Observed Mass: 442.5; Retention Time: 0.78 min.

Step B. Intermediate 31B. Preparation of 2-(3,4-dimethoxyphenyl)-6-(piperidin-4-yl)-5,6,7,8-tetrahydroimidazo[1,2-a]pyridine hydrochloride

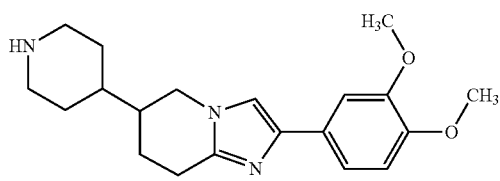

(31B)

To a 200 mL pear shaped flask were added Intermediate 31A (2.1 g, 4.8 mmol), THF (10 mL), and 4 M HCl in dioxane (20 mL). After stirring 18 h, the solvent was concentrated and the residue was co-evaporated with toluene. The product was dried in vacuo to afford the title compound (1.8 g, 4.8 mmol, 100% yield) as a light tan solid. $^1$H NMR (500 MHz, METHANOL-$d_4$) δ 7.70 (s, 1H), 7.27-7.26 (m, 1H), 7.30-7.26 (m, 1H), 7.11-7.08 (m, 1H), 4.43-4.37 (m, 1H), 4.01-3.94 (m, 1H), 3.93 (s, 3H), 3.90 (s, 3H), 3.63-3.58 (m, 4H), 3.53-3.47 (m, 2H), 3.30-3.26 (m, 1H), 3.25-3.22 (m, 1H), 3.11-3.03 (m, 3H), 2.34-2.27 (m, 1H), 2.19-2.04 (m, 2H). Analytical LC/MS (Method 5): Observed Mass: 342.4; Retention Time: 0.50 min.

Step C. Preparation of Example 31

To a 40 mL vial were added Intermediate 31B (120 mg, 0.27 mmol), 1-isobutylpiperidin-4-one (220 mg, 1.4 mmol), AcOH (0.017 mL, 0.3 mmol), magnesium sulfate (490 mg, 4.1 mmol) and DMF (5 mL). The reaction mixture was stirred for 20 min, then sodium triacetoxyborohydride (170 mg, 0.81 mmol) was added and the reaction mixture was stirred. After 24 h, the reaction mixture was filtered and the filter cake was washed with 10% IPA/chloroform (20 mL). The filtrate was washed with 10% aqueous NaOH (10 mL), brine, dried over $MgSO_4$, filtered and concentrated. The crude material was purified via preparative HPLC (Prep Method 1) to afford the title compound (69 mg, 0.14 mmol, 52% yield). Analytical LC/MS (Method 1): Purity: 96.8%; Observed Mass: 481.23; Retention Time: 1.38 min. (Method 2): Purity: 97.6%; Observed Mass: 481.22; Retention Time: 0.91 min.

Examples 32 and 33

2-(3,4-dimethoxyphenyl)-6-(1'-isobutyl-[1,4'-bipiperidin]-4-yl)-5,6,7,8-tetrahydroimidazo[1,2-a]pyridine

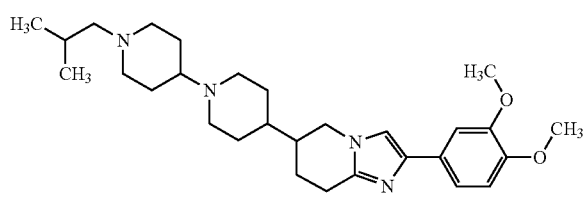

(32-33)

The individual enantiomers Example 32 and Example 33 were obtained by the separation of racemic mixture Example 31 (68 mg, 0.14 mmol) under the following conditions: Instrument: Waters 100 Prep SFC; Column: Chiral OD, 30×250 mm. 5 micron; Mobile Phase: 55% $CO_2$/45% MeOH w/0.1% DEA; Flow Conditions: 100 mL/min; Detector Wavelength: 220 nm; Injection Details: 1000 µL 68 mg dissolved in 3 mL MeOH.

Example 32 (21 mg, 0.044 mmol, 31% yield) was isolated as the 1st eluting enantiomer. $^1$H NMR (500 MHz, DMSO-$d_6$) δ 7.58-7.48 (m, 1H), 7.34-7.29 (m, 1H), 7.28-7.21 (m, 1H), 7.00-6.93 (m, 1H), 4.18-4.09 (m, 1H), 3.81 (s, 3H), 3.78 (s, 3H), 3.00-2.89 (m, 9H), 2.84-2.76 (m, 1H), 2.05 (br s, 4H), 1.89 (br s, 5H), 1.68-1.45 (m, 5H), 0.93-0.89 (m, 6H) (three protons obscured). Analytical LC/MS (Method 1): Purity: 98.2%; Observed Mass: 481.18; Retention Time: 1.38 min. (Method 2): Purity: 97.1%; Observed Mass: 480.98; Retention Time: 1.05 min. Chiral Analytical (SFC Method 1): Chiral purity >95%. Retention Time: 1.89 min.

Example 33 (11 mg, 0.023 mmol, 16% yield) was isolated as the 2$^{nd}$ eluting enantiomer. $^1$H NMR (500 MHz, DMSO-$d_6$) δ 7.35 (s, 1H), 7.30 (d, J=1.2 Hz, 1H), 7.21 (s, 1H), 6.92 (d, J=8.2 Hz, 1H), 4.11-4.01 (m, 1H), 3.79 (s, 3H), 3.76 (s, 3H), 3.69-3.60 (m, 1H), 3.05-2.98 (m, 2H), 2.91-2.83 (m, 3H), 2.72-2.63 (m, 1H), 2.40-2.30 (m, 1H), 2.28-2.18 (m, 2H), 2.09-1.99 (m, 3H), 1.92-1.81 (m, 3H), 1.79-1.68 (m, 5H), 1.59-1.43 (m, 3H), 1.38-1.24 (m, 3H), 0.85 (d, J=6.4 Hz, 6H). Analytical LC/MS (Method 1): Purity: 100%; Observed Mass: 481.17; Retention Time: 1.38 min. (Method 2): Purity: 97.2%; Observed Mass: 481.01; Retention Time: 1.05 min. Chiral Analytical (SFC Method 1): Chiral purity >95%. Retention Time: 5.19 min.

Example 34

2-(3,4-dimethoxyphenyl)-6-(1'-isopropyl-[1,4'-bipiperidin]-4-yl)-5,6,7,8-tetrahydroimidazo[1,2-a]pyridine (racemic mixture)

(34)

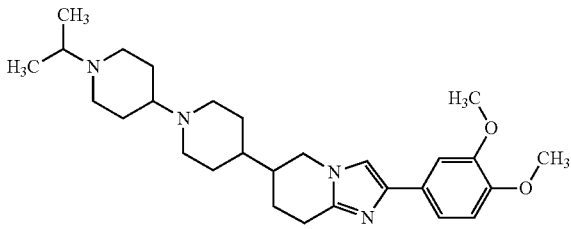

Example 34 was prepared according to the general methods described for the synthesis of Example 31 (Step C), using Intermediate 31B (120 mg, 0.27 mmol) as starting material and substituting 1-isopropylpiperidin-4-one (190 mg, 1.3 mmol) where appropriate. The crude material was purified via preparative HPLC (Prep Method 1) to afford the title compound (70 mg, 0.15 mmol, 56% yield). $^1$H NMR (500 MHz, DMSO-$d_6$) δ 7.34 (s, 1H), 7.30 (d, J=1.8 Hz, 1H), 7.21 (dd, J=8.2, 1.8 Hz, 1H), 6.91 (d, J=8.2 Hz, 1H), 4.09-4.01 (m, 1H), 3.79 (s, 3H), 3.75 (s, 3H), 3.70-3.59 (m, 1H), 2.95-2.86 (m, 2H), 2.86-2.79 (m, 2H), 2.73-2.61 (m, 2H), 2.19-2.13 (m, 1H), 2.08 (br s, 5H), 1.80-1.64 (m, 5H), 1.58-1.47 (m, 1H), 1.45-1.34 (m, 2H), 1.32-1.18 (m, 3H), 0.96 (d, J=6.7 Hz, 6H) (one proton obscured). Analytical LC/MS (Method 1): Purity: 90.7%; Observed Mass: 467.13; Retention Time: 1.2 min. (Method 2): Purity: 95.1%; Observed Mass: 467.65; Retention Time: 0.64 min.

Examples 35 and 36

2-(3,4-dimethoxyphenyl)-6-(1'-isopropyl-[1,4'-bipiperidin]-4-yl)-5,6,7,8-tetrahydroimidazo[1,2-a]pyridine (35-36)

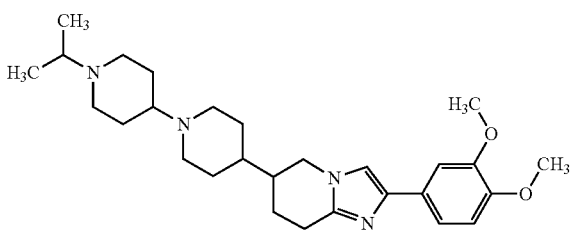

The individual enantiomers Example 35 and Example 36 were obtained by the separation of racemic mixture Example 34 (26 mg, 0.056 mmol) under the following conditions: Instrument: Waters 100 Prep SFC; Column: Chiral OD, 30×250 mm. 5 micron; Mobile Phase: 55% $CO_2$/45% MeOH w/0.1% DEA; Flow Conditions: 100 mL/min; Detector Wavelength: 220 nm; Injection Details: 1000 μL 26 mg dissolved in 3 mL MeOH.

Example 35 (6.4 mg, 0.014 mmol, 25% yield) was isolated as the 1st eluting enantiomer. $^1$H NMR (500 MHz, DMSO-$d_6$) δ 7.32 (s, 1H), 7.29 (d, J=1.7 Hz, 1H), 7.19 (s, 1H), 6.90 (d, J=8.4 Hz, 1H), 4.08-3.98 (m, 1H), 3.77 (s, 3H), 3.73 (s, 3H), 2.94-2.88 (m, 2H), 2.87-2.79 (m, 3H), 2.73-2.60 (m, 2H), 2.21-1.98 (m, 6H), 1.79-1.70 (m, 4H), 1.69-1.61 (m, 1H), 1.57-1.46 (m, 1H), 1.45-1.34 (m, 2H), 1.33-1.19 (m, 3H), 0.95 (d, J=6.5 Hz, 6H) (one proton obscured). Analytical LC/MS (Method 1): Purity: 97.7%; Observed Mass: 467.21; Retention Time: 1.25 min. (Method 2): Purity: 100%; Observed Mass: 467.19; Retention Time: 0.97 min. Chiral Analytical (SFC Method 1): Chiral purity >95%. Retention Time: 1.85 min.

Example 36 (7.4 mg, 0.016 mmol, 29% yield) was isolated as the $2^{nd}$ eluting enantiomer. $^1$H NMR (500 MHz, DMSO-$d_6$) δ 7.34 (s, 1H), 7.30 (s, 1H), 7.23-7.18 (m, 1H), 6.94-6.89 (m, 1H), 4.10-4.02 (m, 1H), 3.78 (s, 3H), 3.74 (s, 3H), 3.71-3.61 (m, 1H), 2.98-2.86 (m, 4H), 2.80-2.71 (m, 1H), 2.70-2.61 (m, 1H), 2.29-2.08 (m, 6H), 2.07-2.00 (m, 1H), 1.83-1.65 (m, 5H), 1.57-1.39 (m, 3H), 1.36-1.21 (m, 3H), 1.01-0.98 (m, 6H). Analytical LC/MS (Method 1): Purity: 100%; Observed Mass: 467.21; Retention Time: 1.25 min. (Method 2): Purity: 98.4%; Observed Mass: 467.19; Retention Time: 0.97 min. Chiral Analytical (SFC Method 1): Chiral purity >95%. Retention Time: 3.68 min.

Examples 37 and 38

6-(1'-cyclopropyl-[1,4'-bipiperidin]-4-yl)-2-(3,4-dimethoxyphenyl)-5,6,7,8-tetrahydroimidazo[1,2-a]pyridine (37-38)

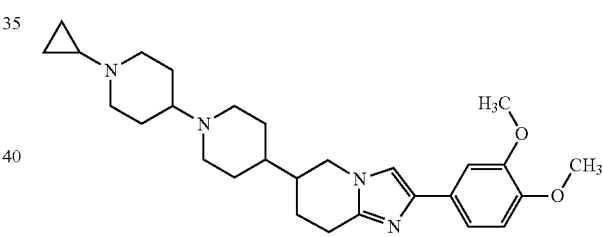

The racemic mixture was prepared according to the general methods described for the synthesis of Example 31 (Step C), using Intermediate 31B (300 mg, 0.62 mmol) as starting material and substituting 1-cyclopropylpiperidin-4-one (430 mg, 3.1 mmol) where appropriate. The crude material was purified via preparative HPLC (Prep Method 1) to afford the racemic mixture (65 mg, 0.14 mmol, 23% yield).

The individual enantiomers Example 37 and Example 38 were obtained by the separation of racemic mixture (65 mg, 0.14 mmol) under the following conditions: Instrument: Waters 100 Prep SFC; Column: Chiral AD, 30×250 mm. 5 micron; Mobile Phase: 60% $CO_2$/40% MeOH w/0.1% DEA; Flow Conditions: 100 mL/min; Detector Wavelength: 220 nm; Injection Details: 1200 μL 65 mg dissolved in 3 mL MeOH.

Example 37 (25 mg, 0.054 mmol, 39% yield) was isolated as the $1^{st}$ eluting enantiomer. $^1$H NMR (500 MHz, DMSO-$d_6$) δ 7.08 (s, 1H), 7.04 (d, J=1.8 Hz, 1H), 6.97-6.94 (m, 1H), 6.66 (s, 1H), 3.82-3.77 (m, 1H), 3.53 (s, 3H), 3.49 (s, 3H), 3.43-3.36 (m, 1H), 2.75-2.69 (m, 3H), 2.63-2.57 (m, 1H), 2.45-2.36 (m, 1H), 2.15-2.04 (m, 1H), 2.02-1.91 (m, 2H), 1.91-1.81 (m, 2H), 1.81-1.74 (m, 1H), 1.57-1.42 (m, 5H), 1.34-1.23 (m, 2H), 1.19-0.96 (m, 6H), 0.17-0.11 (m, 2H), 0.05-0.03 (m, 2H). Analytical LC/MS (Method 1): Purity: 100%; Observed Mass: 465.28; Retention Time: 1.37 min. (Method 2): Purity: 100%; Observed Mass: 465.28; Retention Time: 0.95 min. Chiral Analytical (SFC Method 2): Chiral purity >95%. Retention Time: 3.60 min.

Example 38 (23 mg, 0.043 mmol, 31% yield) was isolated as the $2^{nd}$ eluting enantiomer. $^1$H NMR (500 MHz, DMSO-$d_6$) δ 7.08 (s, 1H), 7.04 (d, J=1.9 Hz, 1H), 6.97-6.94 (m, 1H), 6.65 (d, J=8.5 Hz, 1H), 3.84-3.76 (m, 1H), 3.53 (s, 3H), 3.49 (s, 3H), 3.43-3.34 (m, 1H), 2.77-2.68 (m, 4H), 2.65-2.56 (m, 1H), 2.45-2.36 (m, 1H), 2.15-2.05 (m, 1H), 2.01-1.91 (m, 2H), 1.90-1.82 (m, 2H), 1.81-1.74 (m, 1H), 1.57-1.42 (m, 5H), 1.34-1.24 (m, 2H), 1.18-0.98 (m, 5H), 0.17-0.11 (m, 2H), 0.04-0.02 (m, 2H). Analytical LC/MS (Method 1): Purity: 100%; Observed Mass: 465.29; Retention Time: 1.37 min. (Method 2): Purity: 87.7%; Observed Mass: 465.29; Retention Time: 0.95 min. Chiral Analytical (SFC Method 2): Chiral purity >95%. Retention Time: 5.58 min.

Example 39

1-(4-(2-(3,4-dimethoxyphenyl)-5,6,7,8-tetrahydroimidazo[1,2-a]pyridin-6-yl)-[1,4'-bipiperidin]-1'-yl)-2-methylpropan-1-one (racemic mixture)

(39)

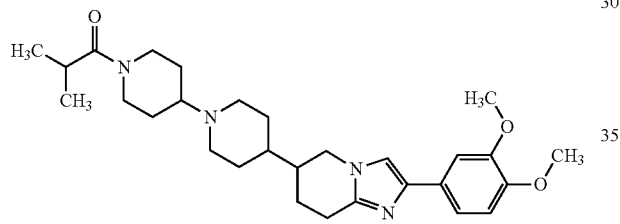

Step A. Intermediate 39A. Preparation of 6-([1,4'-bipiperidin]-4-yl)-2-(3,4-dimethoxyphenyl)-5,6,7,8-tetrahydroimidazo[1,2-a]pyridine dihydrochloride (39A)

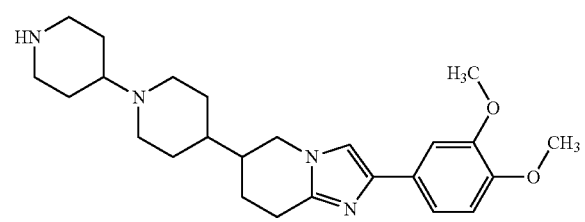

To a 40 mL vial were added Intermediate 31B (600 mg, 1.6 mmol), tert-butyl 4-oxopiperidine-1-carboxylate (950 mg, 4.8 mmol), AcOH (0.10 mL, 1.7 mmol), magnesium sulfate (2900 mg, 24 mmol), and DMF (15 mL). The reaction mixture was stirred for 20 min, then sodium triacetoxyborohydride (1000 mg, 4.8 mmol) was added and the reaction mixture was stirred. After 24 h, the reaction mixture was filtered and the filter cake was washed with 10% MeOH/DCM (20 mL). The filtrate was concentrated and the crude product was purified by flash column chromatography (100 g reverse phase C18 GOLD silica gel cartridge; A=water:MeCN:TFA 90:10:0.05%, B=water:MeCN:TFA 10:90:0.05%; 20 min grad.; 0% B to 400% B; flow rate=60 mL/min). The pure fractions were combined and concentrated. The resultant residue was dissolved in THF (20 mL) and 4 M HCl in dioxane (20 mL) and stirred. After 3 h, the solvent was concentrated, the residue was co-evaporated with toluene and the product was dried in vacuo to provide the title compound (790 mg, 1.6 mmol, 100% yield) as a yellow solid. Analytical LC/MS (Method 5): Observed Mass: 425.4; Retention Time: 0.48 min.

Step B. Preparation of Example 39

To a 40 mL vial were added Intermediate 39A (200 mg, 0.22 mmol), isobutyric acid (39 mg, 0.44 mmol), TEA (0.062 mL, 0.44 mmol), HOBt (85 mg, 0.44 mmol), and DMF (2 mL). To this mixture was added EDC (85 mg, 0.44 mmol), the vial was capped and the reaction mixture was stirred. After 18 h, the crude reaction mixture was purified via preparative HPLC (Prep Method 2) to afford the title compound (30 mg, 0.061 mmol, 28% yield). $^1$H NMR (500 MHz, DMSO-$d_6$) δ 7.93 (s, 1H), 7.36 (s, 2H), 7.11 (br d, J=8.5 Hz, 1H), 4.62-4.52 (m, 1H), 4.29-4.21 (m, 1H), 4.17-4.08 (m, 1H), 3.92-3.87 (m, 1H), 3.86-3.83 (m, 3H), 3.83-3.80 (m, 3H), 3.58-3.50 (m, 1H), 3.20-2.86 (m, 6H), 2.14-2.02 (m, 4H), 1.99-1.91 (m, 2H), 1.74-1.38 (m, 7H), 1.04-0.99 (m, 6H) (two protons obscured). Analytical LC/MS (Method 1): Purity: 98.6%; Observed Mass: 495.19; Retention Time: 1.25 min. (Method 2): Purity: 98.8%; Observed Mass: 495.16; Retention Time: 1.05 min.

Examples 40 and 41

1-(4-(2-(3,4-dimethoxyphenyl)-5,6,7,8-tetrahydroimidazo[1,2-a]pyridin-6-yl)-[1,4'-bipiperidin]-1'-yl)-2-methylpropan-1-one (40-41)

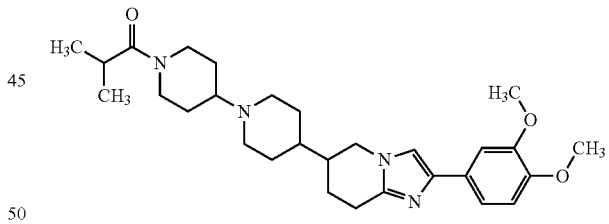

The individual enantiomers Example 40 and Example 41 were obtained by the separation of racemic mixture Example 39 (14 mg, 0.028 mmol) under the following conditions: Instrument: Waters 100 Prep SFC; Column: Chiral OD, 30×250 mm. 5 micron; Mobile Phase: 55% CO$_2$/45% MeOH-ACN-50-50; Flow Conditions: 100 mL/min; Detector Wavelength: 220 nm; Injection Details: 2000 μL 14 mg dissolved in 3 mL MeOH.

Example 40 (3.7 mg, 0.0075 mmol, 27% yield) was isolated as the $1^{st}$ eluting enantiomer. $^1$H NMR (500 MHz, DMSO-$d_6$) δ 7.34 (s, 1H), 7.30 (s, 1H), 7.24-7.19 (m, 1H), 6.94-6.89 (m, 1H), 4.49-4.38 (m, 1H), 4.09-4.03 (m, 1H), 4.01-3.93 (m, 1H), 3.79 (s, 3H), 3.75 (s, 3H), 3.70-3.61 (m, 1H), 3.04-2.90 (m, 3H), 2.90-2.82 (m, 2H), 2.72-2.60 (m, 1H), 2.22-2.13 (m, 2H), 2.07-2.01 (m, 1H), 1.85-1.72 (m, 4H), 1.71-1.65 (m, 1H), 1.59-1.48 (m, 1H), 1.39-1.17 (m, 6H), 0.99 (br s, 6H) (one proton obscured). Analytical LC/MS (Method 1): Purity: 95.3%; Observed Mass: 495.15; Retention Time: 1.28 min. (Method 2): Purity: 97.2%; Observed Mass: 495.13; Retention Time: 1.06 min. Chiral Analytical (SFC Method 1): Chiral purity >95%. Retention time: 1.25 min.

Example 41 (3.8 mg, 0.0077 mmol, 28% yield) was isolated as the $2^{nd}$ eluting enantiomer. $^1$H NMR (500 MHz, DMSO-$d_6$) δ 7.36-7.33 (m, 1H), 7.32-7.29 (m, 1H), 7.24-7.19 (m, 1H), 6.94-6.89 (m, 1H), 4.47-4.39 (m, 1H), 4.10-4.02 (m, 1H), 4.00-3.93 (m, 1H), 3.78 (s, 3H), 3.75 (s, 3H), 3.69-3.61 (m, 1H), 3.54-3.44 (m, 1H), 3.02-2.94 (m, 1H), 2.94-2.83 (m, 4H), 2.72-2.60 (m, 1H), 2.50-2.43 (m, 2H), 2.07-2.00 (m, 1H), 1.84-1.71 (m, 4H), 1.70-1.65 (m, 1H), 1.57-1.48 (m, 1H), 1.36-1.14 (m, 6H), 0.99 (br t, J=7.2 Hz, 6H). Analytical LC/MS (Method 1): Purity: 96%; Observed Mass: 495.16; Retention Time: 1.28 min. (Method 2): Purity: 96.7%; Observed Mass: 495.12; Retention Time: 1.06 min. Chiral Analytical (SFC Method 1): Chiral purity >95%. Retention time: 3.40 min.

Example 42 cyclopropyl(4-(2-(3,4-dimethoxyphenyl)-5,6,7,8-tetrahydroimidazo[1,2-a]pyridin-6-yl)-[1,4'-bipiperidin]-1'-yl)methanone (racemic mixture)

(42)

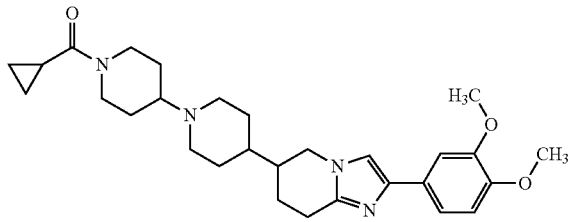

To a 40 mL vial were added Intermediate 39A (200 mg, 0.22 mmol), TEA (0.34 mL, 2.4 mmol), DMAP (98 mg, 0.80 mmol), and DCM (2 mL). To this mixture was added cyclopropanecarbonyl chloride (0.073 mL, 0.80 mmol), the vial was capped and the reaction mixture was stirred. After 2 h, the solvent was concentrated and the crude material was purified via preparative HPLC (Prep Method 1) to afford the title compound (59 mg, 0.12 mmol, 55% yield). $^1$H NMR (500 MHz, DMSO-$d_6$) δ 7.34-7.32 (m, 1H), 7.30-7.28 (m, 1H), 7.22-7.18 (m, 1H), 6.92-6.88 (m, 1H), 4.45-4.35 (m, 1H), 4.33-4.24 (m, 1H), 4.09-4.01 (m, 1H), 3.77 (s, 3H), 3.74 (s, 3H), 3.09-2.94 (m, 3H), 2.91-2.81 (m, 1H), 2.72-2.60 (m, 2H), 2.30-2.18 (m, 2H), 2.07-2.00 (m, 1H), 1.98-1.93 (m, 1H), 1.91-1.66 (m, 6H), 1.58-1.47 (m, 1H), 1.44-1.19 (m, 6H), 0.69 (br d, J=7.3 Hz, 4H). Analytical LC/MS (Method 1): Purity: 100%; Observed Mass: 493.08; Retention Time: 1.14 min. (Method 2): Purity: 100%; Observed Mass: 493.28; Retention Time: 1.02 min.

Examples 43 and 44 cyclopropyl(4-(2-(3,4-dimethoxyphenyl)-5,6,7,8-tetrahydroimidazo[1,2-a]pyridin-6-yl)-[1,4'-bipiperidin]-1'-yl)methanone (43-44)

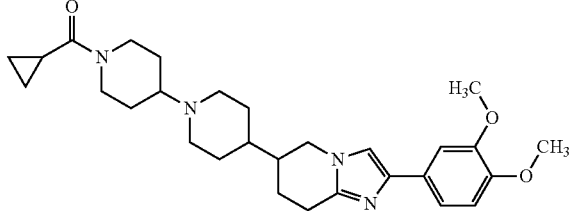

The individual enantiomers Example 43 and Example 44 were obtained by the separation of racemic mixture Example 42 (59 mg, 0.12 mmol) under the following conditions: Instrument: Waters 100 Prep SFC; Column: Chiral OD, 30×250 mm. 5 micron; Mobile Phase: 75% $CO_2$/25% IPA-ACN 50-50 w/0.1% DEA; Flow Conditions: 100 mL/min; Detector Wavelength: 220 nm; Injection Details: 1000 μL 59 mg dissolved in 3 mL MeOH.

Example 43 (21 mg, 0.043 mmol, 36% yield) was isolated as the $1^{st}$ eluting enantiomer. $^1$H NMR (500 MHz, DMSO-$d_6$) δ 7.34 (s, 1H), 7.30 (s, 1H), 7.21 (br d, J=8.2 Hz, 1H), 6.91 (br d, J=8.2 Hz, 1H), 4.42-4.33 (m, 1H), 4.32-4.24 (m, 1H), 4.10-4.02 (m, 1H), 3.78 (s, 3H), 3.74 (s, 3H), 3.68-3.57 (m, 2H), 3.46-3.37 (m, 1H), 3.09-2.98 (m, 1H), 2.94-2.81 (m, 3H), 2.70-2.60 (m, 1H), 2.11 (br d, J=2.7 Hz, 3H), 2.07-2.01 (m, 1H), 1.99-1.92 (m, 2H), 1.84-1.62 (m, 2H), 1.59-1.47 (m, 2H), 1.29-1.23 (m, 2H), 1.19 (br s, 3H), 0.70 (br d, J=6.7 Hz, 4H). Analytical LC/MS (Method 1): Purity: 95.4%; Observed Mass: 493.14; Retention Time: 1.24 min. (Method 2): Purity: 97.3%; Observed Mass: 493.13; Retention Time: 1.03 min. Chiral Analytical (SFC Method 3): Chiral purity >95%. Retention time: 5.99 min.

Example 44 (22 mg, 0.0045 mmol, 38% yield) was isolated as the $2^{nd}$ eluting enantiomer. $^1$H NMR (500 MHz, DMSO-$d_6$) δ 7.34 (s, 1H), 7.30 (s, 1H), 7.21 (br d, J=7.9 Hz, 1H), 6.91 (d, J=8.5 Hz, 1H), 4.43-4.34 (m, 1H), 4.33-4.23 (m, 1H), 4.09-4.01 (m, 1H), 3.78 (s, 3H), 3.74 (s, 3H), 3.59-3.53 (m, 1H), 3.47-3.36 (m, 1H), 3.09-2.99 (m, 1H), 2.96-2.90 (m, 2H), 2.89-2.83 (m, 1H), 2.70-2.61 (m, 1H), 2.16 (s, 2H), 2.08-2.01 (m, 2H), 1.99-1.93 (m, 2H), 1.86-1.66 (m, 4H), 1.56-1.49 (m, 1H), 1.27 (br s, 2H), 1.22-1.10 (m, 3H), 0.73-0.68 (m, 4H). Analytical LC/MS (Method 1): Purity: 100%; Observed Mass: 493.34; Retention Time: 1.24 min. (Method 2): Purity: 95.9%; Observed Mass: 493.13; Retention Time: 1.04 min. Chiral Analytical (SFC Method 3): Chiral purity >95%. Retention time: 7.30 min.

Example 45

2-(3,4-dimethoxyphenyl)-6-(1-(2-isopropyl-2-azaspiro[3.3]heptan-6-yl)piperidin-4-yl)-5,6,7,8-tetrahydroimidazo[1,2-a]pyridine (racemic mixture)

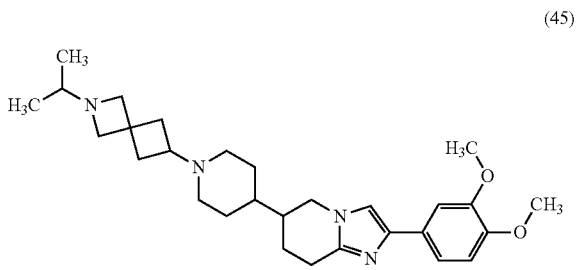 [SMILES: COc1ccc(-c2cn3c(n2)CCC(C2CCN(C4CC5(C4)CN(C(C)C)C5)CC2)C3)cc1OC]

(45)

Step A. Intermediate 45A. Preparation of 6-(1-(2-azaspiro[3.3]heptan-6-yl)piperidin-4-yl)-2-(3,4-dimethoxyphenyl)-5,6,7,8-tetrahydroimidazo[1,2-a]pyridine bis(2,2,2-trifluoroacetate)

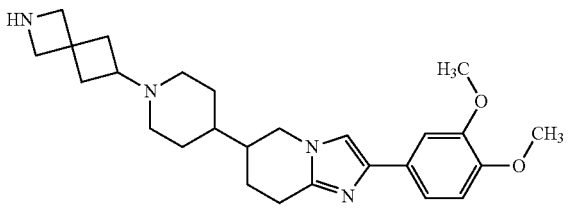

(45A)

To a 250 mL round bottomed flask were added Intermediate 31A (1.0 g, 2.7 mmol), tert-butyl 6-oxo-2-azaspiro[3.3]heptane-2-carboxylate (1.7 g, 7.9 mmol), AcOH (0.17 ml, 2.9 mmol), magnesium sulfate (4.8 g, 40 mmol), and DMF (20 mL). The reaction mixture was stirred for 20 min, then sodium triacetoxyborohydride (1.7 g, 7.9 mmol) was added and the reaction mixture was stirred. After 18 h, the reaction mixture was filtered, the filter cake was washed with DCM/MeOH and the filtrate was concentrated. The remaining crude DMF solution was purified by flash column chromatography (275 g reverse phase C18 GOLD silica gel cartridge; A=water:MeCN:TFA 90:10:0.05%, B=water:MeCN:TFA 10:90:0.05%; 20 min grad.; 10% B to 100% B; flow rate=125 mL/min). The pure fractions were combined and concentrated. The resultant residue was dissolved in DCM (20 mL) and TFA (20 mL). After stirring 2 h, the solvent was concentrated under reduced pressure at 35° C., the residue was co-evaporated with toluene and the product was dried in vacuo to afford the title compound (1.3 g, 2.0 mmol, 74% yield) as a pale yellow solid. $^1$H NMR (500 MHz, METHANOL-$d_4$) δ 7.69-7.66 (m, 1H), 7.27 (s, 2H), 7.11-7.07 (m, 1H), 4.40-4.33 (m, 1H), 3.98-3.94 (m, 1H), 3.92 (s, 3H), 3.90 (s, 3H), 3.67-3.54 (m, 3H), 3.28-3.20 (m, 1H), 3.10-3.01 (m, 1H), 2.82-2.75 (m, 3H), 2.70-2.61 (m, 3H), 2.32-2.25 (m, 1H), 2.16-2.06 (m, 3H), 1.85-1.66 (m, 4H). Analytical LC/MS (Method 5): Observed Mass: 437.5; Retention Time: 0.58 min.

Step B. Preparation of Example 45

To a 40 mL vial were added Intermediate 45A (320 mg, 0.48 mmol), acetone (140 mg, 2.4 mmol), AcOH (0.030 mL, 0.53 mmol), magnesium sulfate (870 mg, 7.2 mmol), and DMF (5 mL). The reaction mixture was stirred for 20 min, then sodium triacetoxyborohydride (310 mg, 1.5 mmol) was added and the reaction mixture was stirred. After 18 h, the reaction mixture was filtered, the filter cake was washed with 10% MeOH/DCM and the filtrate was concentrated. The crude product was purified by preparative HPLC (Prep Method 1) to afford the title compound (180 mg, 0.21 mmol, 44% yield). $^1$H NMR (500 MHz, DMSO-$d_6$) δ 7.33 (s, 1H), 7.29 (d, J=1.7 Hz, 1H), 7.23-7.18 (m, 1H), 6.90 (d, J=8.5 Hz, 1H), 4.09-4.01 (m, 1H), 3.78 (s, 3H), 3.74 (s, 3H), 3.69-3.59 (m, 1H), 3.33-3.15 (m, 1H), 2.88-2.77 (m, 3H), 2.70-2.61 (m, 1H), 2.47-2.37 (m, 1H), 2.21-2.13 (m, 2H), 2.06-1.99 (m, 1H), 1.89-1.83 (m, 2H), 1.79-1.70 (m, 2H), 1.68-1.59 (m, 3H), 1.58-1.47 (m, 1H), 1.30-1.17 (m, 3H), 0.87 (d, J=6.1 Hz, 6H) (4 protons obscured). Analytical LC/MS: (Method 1): Purity: 95.4%; Observed Mass: 479.26; Retention Time: 1.2 min. (Method 2): Purity: 97.5%; Observed Mass: 478.90; Retention Time: 0.98 min.

Examples 46 and 47

2-(3,4-dimethoxyphenyl)-6-(1-(2-isopropyl-2-azaspiro[3.3]heptan-6-yl)piperidin-4-yl)-5,6,7,8-tetrahydroimidazo[1,2-a]pyridine

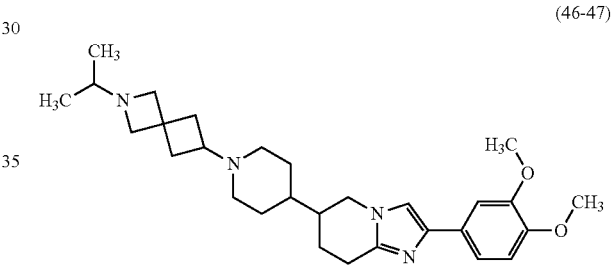

(46-47)

The individual enantiomers Example 46 and Example 47 were obtained by the separation of racemic mixture Example 45 (130 mg, 0.27 mmol) under the following conditions: Instrument: Waters 100 Prep SFC; Column: Chiral OD; 30×250 mm. 5 micron; Mobile Phase: 55% CO$_2$/45% MeOH w/0.1% DEA; Flow Conditions: 100 mL/min; Detector Wavelength: 220 nm; Injection Details: 300 μL 130 mg dissolved in 3 mL MeOH.

Example 46 (59 mg, 0.12 mmol, 44% yield) was isolated as the 1$^{st}$ eluting enantiomer. $^1$H NMR (500 MHz, DMSO-$d_6$) δ 8.38-8.22 (m, 1H), 7.91-7.81 (m, 1H), 7.36-7.24 (m, 1H), 7.08 (br d, J=8.5 Hz, 1H), 4.27-4.19 (m, 1H), 4.15-4.04 (m, 2H), 4.02-3.94 (m, 1H), 3.88-3.84 (m, 1H), 3.82 (s, 3H), 3.80 (s, 3H), 3.74-3.63 (m, 2H), 3.44-3.30 (m, 1H), 3.25-3.07 (m, 1H), 3.02-2.88 (m, 4H), 2.79-2.61 (m, 2H), 2.49-2.46 (m, 1H), 2.46-2.35 (m, 1H), 2.15-1.88 (m, 3H), 1.76-1.55 (m, 2H), 1.55-1.34 (m, 1H), 1.30-1.22 (m, 1H), 1.09 (br d, J=6.3 Hz, 6H) (two protons obscured). Analytical LC/MS (Method 1): Purity: 100%; Observed Mass: 479.26; Retention Time: 1.29 min. (Method 2): Purity: 100%; Observed Mass: 478.94; Retention Time: 0.94 min. Chiral Analytical (SFC Method 1): Chiral purity >95%. Retention time: 1.41 min.

Example 47 (22 mg, 0.046 mmol, 17% yield) was isolated as the 2$^{nd}$ eluting enantiomer. $^1$H NMR (500 MHz, DMSO-$d_6$) δ 7.34-7.32 (m, 1H), 7.31-7.28 (m, 1H), 7.22-7.18 (m, 1H), 6.90 (d, J=8.5 Hz, 1H), 4.08-4.01 (m, 1H), 3.77 (s, 3H), 3.74 (s, 3H), 3.67-3.60 (m, 1H), 3.35-3.17 (m, 2H), 2.89-2.76 (m, 3H), 2.69-2.61 (m, 1H), 2.48-2.41 (m, 1H), 2.19-2.13 (m, 2H), 2.06-1.99 (m, 1H), 1.90-1.84 (m, 2H), 1.79-1.70 (m, 2H), 1.69-1.59 (m, 3H), 1.57-1.47 (m, 1H), 1.31-1.16 (m, 3H), 0.87 (br d, J=6.2 Hz, 6H) (three protons obscured). Analytical LC/MS (Method 1): Purity: 100%; Observed Mass: 479.26; Retention Time: 1.29 (Method 2): Purity: 100%; Observed Mass: 479.26; Retention Time: 0.94 min. Chiral Analytical (SFC Method 1): Chiral purity >95%. Retention time: 4.05 min.

Example 48

6-(1-(2-cyclobutyl-2-azaspiro[3.3]heptan-6-yl)piperidin-4-yl)-2-(3,4-dimethoxyphenyl)-5,6,7,8-tetrahydroimidazo[1,2-a]pyridine (racemic mixture)

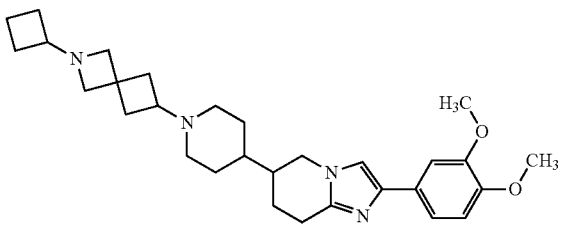

(48)

Example 48 was prepared according to the general methods described for the synthesis of Example 45 (Step B), using Intermediate 45A (320 mg, 0.48 mmol) as starting material and substituting cyclobutanone (170 mg, 2.4 mmol) where appropriate. The crude product was purified by preparative HPLC (Prep Method 1) to afford the title compound (170 mg, 0.35 mmol, 73% yield). $^1$H NMR (500 MHz, DMSO-$d_6$) δ 7.37-7.32 (m, 1H), 7.31-7.27 (m, 1H), 7.23-7.18 (m, 1H), 6.92-6.88 (m, 1H), 4.15-4.02 (m, 1H), 3.77 (s, 3H), 3.74 (s, 3H), 3.48-3.43 (m, 3H), 3.06-2.93 (m, 3H), 2.88-2.76 (m, 3H), 2.72-2.61 (m, 3H), 2.49-2.43 (m, 1H), 2.17-1.92 (m, 6H), 1.87-1.82 (m, 2H), 1.77-1.72 (m, 2H), 1.70-1.47 (m, 5H), 1.30-1.15 (m, 3H). Analytical LC/MS (Method 1): Purity: 93.6%; Observed Mass: 491.22; Retention Time: 1.19 min. (Method 2): Purity: 96.3%; Observed Mass: 491.26; Retention Time: 1.04 min.

Examples 49 and 50

6-(1-(2-cyclobutyl-2-azaspiro[3.3]heptan-6-yl)piperidin-4-yl)-2-(3,4-dimethoxyphenyl)-5,6,7,8-tetrahydroimidazo[1,2-a]pyridine

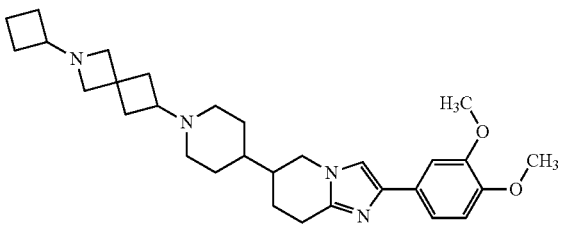

(49-50)

The individual enantiomers Example 49 and Example 50 were obtained by the separation of racemic mixture Example 48 (77 mg, 0.16 mmol) under the following conditions: Instrument: Waters 100 Prep SFC; Column: Chiral OD, 30×250 mm. 5 micron; Mobile Phase: 55% $CO_2$/45% MeOH w/0.1% DEA; Flow Conditions: 100 mL/min; Detector Wavelength: 220 nm; Injection Details: 300 μL 77 mg dissolved in 3 mL MeOH.

Example 49 (13 mg, 0.026 mmol, 16% yield) was isolated as the $1^{st}$ eluting enantiomer. $^1$H NMR (500 MHz, DMSO-$d_6$) δ 7.34-7.31 (m, 1H), 7.30-7.27 (m, 1H), 7.22-7.17 (m, 1H), 6.92-6.88 (m, 1H), 4.07-4.00 (m, 1H), 3.77 (s, 3H), 3.73 (s, 3H), 3.11 (s, 2H), 3.00 (s, 3H), 2.89-2.82 (m, 1H), 2.81-2.75 (m, 2H), 2.70-2.59 (m, 1H), 2.49-2.44 (m, 1H), 2.16-2.10 (m, 2H), 2.05-1.97 (m, 1H), 1.89-1.80 (m, 4H), 1.77-1.47 (m, 11H), 1.30-1.15 (m, 3H). Analytical LC/MS (Method 1): Purity: 98.5%; Observed Mass: 491.19; Retention Time: 1.31 min. (Method 2): Purity: 95.8%; Observed Mass: 491.21; Retention Time: 0.99 min. Chiral Analytical (SFC Method 1): Chiral purity >95%. Retention time: 1.80 min.

Example 50 (11 mg, 0.022 mmol, 14% yield) was isolated as the $2^{nd}$ eluting enantiomer. $^1$H NMR (500 MHz, DMSO-$d_6$) δ 7.33-7.31 (m, 1H), 7.30-7.27 (m, 1H), 7.21-7.17 (m, 1H), 6.91-6.88 (m, 1H), 4.07-4.01 (m, 1H), 3.77 (s, 3H), 3.73 (s, 3H), 3.72-3.68 (m, 1H), 3.61-3.60 (m, 1H), 3.03-2.99 (m, 1H), 2.87-2.82 (m, 1H), 2.80-2.73 (m, 2H), 2.69-2.59 (m, 1H), 2.49-2.43 (m, 1H), 2.16-2.09 (m, 2H), 2.05-1.97 (m, 1H), 1.88-1.79 (m, 4H), 1.78-1.47 (m, 11H), 1.30-1.15 (m, 3H) (one proton obscured). Analytical LC/MS (Method 1): Purity: 100%; Observed Mass: 491.10; Retention Time: 1.32 min. (Method 2): Purity: 100%; Observed Mass: 491.19; Retention Time: 0.98 min. Chiral Analytical (SFC Method 1): Chiral purity >95%. Retention time: 5.30 min.

Example 51

6-(1-(2-(cyclopropylmethyl)-2-azaspiro[3.3]heptan-6-yl)piperidin-4-yl)-2-(3,4-dimethoxyphenyl)-5,6,7,8-tetrahydroimidazo[1,2-a]pyridine (racemic mixture)

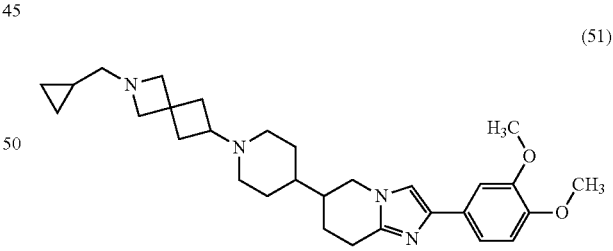

(51)

Example 51 was prepared according to the general methods described for the synthesis of Example 45 (Step B), using Intermediate 45A (320 mg, 0.48 mmol) as starting material and substituting cyclopropanecarbaldehyde (170 mg, 2.4 mmol) where appropriate. The crude product was purified by preparative HPLC (Prep Method 1) to afford the title compound (190 mg, 0.39 mmol, 81% yield). $^1$H NMR (500 MHz, DMSO-$d_6$) δ 7.27-7.25 (m, 1H), 7.24-7.21 (m, 1H), 7.16-7.11 (m, 1H), 6.86-6.81 (m, 1H), 4.00-3.94 (m, 1H), 3.71 (s, 3H), 3.67 (s, 3H), 3.61-3.54 (m, 1H), 3.23-3.18 (m, 1H), 3.12-3.07 (m, 1H), 2.82-2.68 (m, 3H), 2.63-2.54 (m, 1H), 2.43-2.39 (m, 1H), 2.25-2.20 (m, 2H), 2.13-2.07

(m, 2H), 1.98-1.92 (m, 1H), 1.82-1.75 (m, 2H), 1.72-1.63 (m, 2H), 1.61-1.52 (m, 3H), 1.50-1.41 (m, 1H), 1.24-1.10 (m, 3H), 0.68-0.59 (m, 1H), 0.33-0.29 (m, 2H), 0.01 (br d, J=4.6 Hz, 2H) (two protons obscured). Analytical LC/MS (Method 1): Purity: 96.3%; Observed Mass: 491.20; Retention Time: 1.2 min. (Method 2): Purity: 97.3%; Observed Mass: 491.19; Retention Time: 0.98 min.

Example 52

2-(3,4-dimethoxyphenyl)-6-(1-(2-isobutyl-2-azaspiro[3.3]heptan-6-yl)piperidin-4-yl)-5,6,7,8-tetrahydro-imidazo[1,2-a]pyridine (racemic mixture)

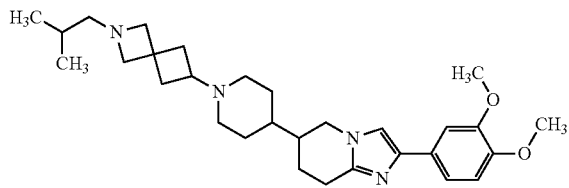

(52)

Example 52 was prepared according to the general methods described for the synthesis of Example 45 (Step B), using Intermediate 45A (320 mg, 0.48 mmol) as starting material and substituting isobutyraldehyde (170 mg, 2.4 mmol) where appropriate. The crude product was purified by preparative HPLC (Prep Method 1) to afford the title compound (190 mg, 0.39 mmol, 81% yield). $^1$H NMR (500 MHz, DMSO-$d_6$) δ 7.33 (s, 1H), 7.29 (d, J=1.8 Hz, 1H), 7.23-7.18 (m, 1H), 6.93-6.87 (m, 1H), 4.08-4.02 (m, 1H), 3.78 (s, 3H), 3.74 (s, 3H), 3.68-3.61 (m, 1H), 3.31-3.15 (m, 1H), 2.88-2.77 (m, 3H), 2.71-2.60 (m, 1H), 2.32-2.22 (m, 2H), 2.21-2.14 (m, 2H), 2.11-2.05 (m, 1H), 2.04-1.98 (m, 1H), 1.89-1.84 (m, 2H), 1.79-1.71 (m, 2H), 1.69-1.60 (m, 3H), 1.57-1.47 (m, 2H), 1.32-1.16 (m, 3H), 0.82 (d, J=6.6 Hz, 6H) (three protons obscured). Analytical LC/MS (Method 1): Purity: 97.6%; Observed Mass: 493.20; Retention Time: 1.24 min. (Method 2): Purity: 97.5%; Observed Mass: 493.22; Retention Time: 0.99 min.

Examples 53 and 54

2-(3,4-dimethoxyphenyl)-6-(1-(2-isobutyl-2-azaspiro[3.3]heptan-6-yl)piperidin-4-yl)-5,6,7,8-tetrahydro-imidazo[1,2-a]pyridine

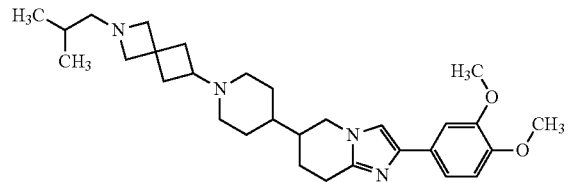

(53-54)

The individual enantiomers Example 53 and Example 54 were obtained by the separation of racemic mixture Example 52 (94 mg, 0.19 mmol) under the following conditions: Instrument: Waters 100 Prep SFC; Column: Chiral OD, 30×250 mm. 5 micron; Mobile Phase: 55% CO$_2$/45% MeOH w/0.1% DEA; Flow Conditions: 100 mL/min; Detector Wavelength: 220 nm; Injection Details: 600 μL 94 mg dissolved in 3 mL MeOH.

Example 53 (17 mg, 0.035 mmol, 18% yield) was isolated as the 1$^{st}$ eluting enantiomer. $^1$H NMR (500 MHz, DMSO-$d_6$) δ 7.32 (s, 1H), 7.29 (s, 1H), 7.22-7.17 (m, 1H), 6.91 (s, 1H), 4.09-3.99 (m, 1H), 3.77 (s, 3H), 3.73 (s, 3H), 3.13 (s, 2H), 3.02 (s, 2H), 2.88-2.80 (m, 1H), 2.80-2.73 (m, 2H), 2.70-2.58 (m, 1H), 2.49-2.41 (m, 1H), 2.18-2.09 (m, 4H), 2.06-1.98 (m, 1H), 1.90-1.80 (m, 2H), 1.78-1.69 (m, 2H), 1.67-1.56 (m, 3H), 1.55-1.43 (m, 2H), 1.30-1.15 (m, 3H), 0.80 (d, J=6.6 Hz, 6H) (one proton obscured). Analytical LC/MS (Method 1): Purity: 97.8%; Observed Mass: 493.21; Retention Time: 1.29 min. (Method 2): Purity: 97.6%; Observed Mass: 493.23; Retention Time: 0.98 min. Chiral Analytical (SFC Method 1): Chiral purity >95%. Retention time: 1.45 min.

Example 54 (16 mg, 0.032 mmol, 17% yield) was isolated as the 2$^{nd}$ eluting enantiomer. $^1$H NMR (500 MHz, DMSO-$d_6$) δ 7.33-7.31 (m, 1H), 7.30-7.27 (m, 1H), 7.21-7.17 (m, 1H), 6.92-6.87 (m, 1H), 4.07-3.99 (m, 1H), 3.76 (s, 3H), 3.74 (s, 3H), 3.18-3.13 (m, 2H), 3.06-3.00 (m, 2H), 2.88-2.81 (m, 1H), 2.80-2.74 (m, 2H), 2.67-2.58 (m, 1H), 2.49-2.42 (m, 1H), 2.18-2.10 (m, 4H), 2.06-1.97 (m, 1H), 1.87-1.79 (m, 2H), 1.76-1.69 (m, 2H), 1.65-1.57 (m, 3H), 1.54-1.43 (m, 2H), 1.30-1.17 (m, 3H), 0.79 (d, J=6.6 Hz, 6H) (one proton obscured). Analytical LC/MS (Method 1): Purity: 100%; Observed Mass: 492.90; Retention Time: 1.35 min. (Method 2): Purity: 100%; Observed Mass: 493.22; Retention Time: 1.00 min. Chiral Analytical (SFC Method 1): Chiral purity >95%. Retention time: 4.10 min.

Example 55

6-(1'-(cyclopropylmethyl)-[1,4'-bipiperidin]-4-yl)-2-(3,4-dimethoxyphenyl)-5,6,7,8-tetrahydroimidazo[1,2-a]pyridine (racemic mixture)

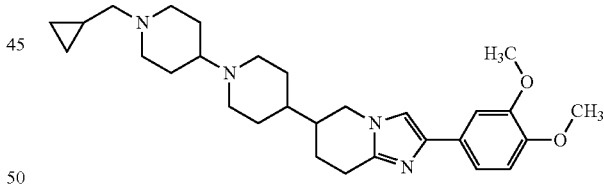

(55)

To a 40 mL vial were added Intermediate 39A (380 mg, 0.42 mmol), cyclopropanecarbaldehyde (150 mg, 2.1 mmol), AcOH (0.026 mL, 0.46 mmol), magnesium sulfate (760 mg, 6.3 mmol) and DMF (5 mL). The reaction mixture was stirred for 20 min, then sodium triacetoxyborohydride (270 mg, 1.3 mmol) was added and the reaction mixture was stirred. After 18 h, the reaction mixture was filtered, the filter cake was washed with 10% MeOH/DCM (20 mL) and the filtrate was concentrated. The crude product was purified by preparative HPLC (Prep Method 1) to afford the title compound (100 mg, 0.21 mmol, 50% yield). $^1$H NMR (500 MHz, DMSO-$d_6$) δ 7.32-7.28 (m, 1H), 7.27-7.23 (m, 1H), 7.18-7.13 (m, 1H), 6.89-6.83 (m, 1H), 4.05-3.95 (m, 1H), 3.73 (s, 3H), 3.70 (s, 3H), 3.01-2.93 (m, 2H), 2.91-2.84 (m, 2H), 2.84-2.77 (m, 1H), 2.66-2.56 (m, 1H), 2.10 (br d, J=6.3 Hz, 3H), 2.07-1.95 (m, 3H), 1.89-1.80 (m, 3H), 1.65 (br d, J=13.6 Hz, 5H), 1.53-1.44 (m, 1H), 1.40 (br s, 2H), 1.21 (br s, 3H), 0.83-0.70 (m, 1H), 0.44-0.37 (m, 2H), 0.01 (br d, J=4.3 Hz, 2H). Analytical LC/MS (Method 1): Purity: 98%; Observed Mass: 479.12; Retention Time: 1.22 min. (Method 2): Purity: 97.1%; Observed Mass: 478.97; Retention Time: 1.03 min.

Examples 56 and 57

6-(1'-(cyclopropylmethyl)-[1,4'-bipiperidin]-4-yl)-2-(3,4-dimethoxyphenyl)-5,6,7,8-tetrahydroimidazo[1,2-a]pyridine

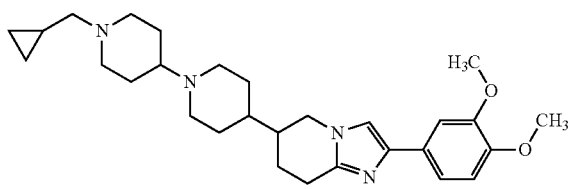

(56-57)

The individual enantiomers Example 56 and Example 57 were obtained by the separation of racemic mixture Example 55 (68 mg, 0.14 mmol) under the following conditions: Instrument: Waters 100 Prep SFC; Column: Chiral OD, 30×250 mm. 5 micron; Mobile Phase: 55% CO$_2$/45% MeOH w/0.1% DEA; Flow Conditions: 100 mL/min; Detector Wavelength: 220 nm; Injection Details: 1500 µL 68 mg dissolved in 2 mL MeOH.

Example 56 (2.7 mg, 0.0056 mmol, 4.0% yield) was isolated as the 1$^{st}$ eluting enantiomer. $^1$H NMR (500 MHz, DMSO-d$_6$) δ 7.25-7.22 (m, 1H), 7.21-7.17 (m, 1H), 7.13-7.09 (m, 1H), 6.82-6.78 (m, 1H), 3.99-3.91 (m, 1H), 3.68 (s, 3H), 3.64 (s, 3H), 3.60-3.49 (m, 1H), 3.04-2.97 (m, 1H), 2.94-2.86 (m, 1H), 2.80-2.72 (m, 1H), 2.60-2.51 (m, 1H), 2.30-2.24 (m, 1H), 2.23-2.16 (m, 2H), 2.15-2.07 (m, 2H), 2.04-1.89 (m, 3H), 1.75-1.64 (m, 4H), 1.64-1.57 (m, 1H), 1.51-1.37 (m, 3H), 1.28-1.13 (m, 3H), 0.79-0.70 (m, 1H), 0.41-0.35 (m, 2H), 0.05-0.03 (m, 2H) (two protons obscured). Analytical LC/MS (Method 1): Purity: 91.1%; Observed Mass: 479.21; Retention Time: 1.26 min. (Method 2): Purity: 93.1%; Observed Mass: 479.20; Retention Time: 0.89 min. Chiral Analytical (SFC Method 1): Chiral purity >95%. Retention time: 2.20 min.

Example 57 (2.4 mg, 0.0050 mmol, 3.6% yield) was isolated as the 2$^{nd}$ eluting enantiomer. $^1$H NMR (500 MHz, DMSO-d$_6$) δ 7.24-7.21 (m, 1H), 7.20-7.16 (m, 1H), 7.12-7.07 (m, 1H), 6.81-6.77 (m, 1H), 3.99-3.89 (m, 1H), 3.66 (s, 3H), 3.62 (s, 3H), 3.58-3.50 (m, 1H), 3.05-3.00 (m, 1H), 2.88 (s, 2H), 2.78-2.71 (m, 1H), 2.59-2.49 (m, 1H), 2.34-2.27 (m, 1H), 2.25-2.19 (m, 2H), 2.17-2.08 (m, 2H), 2.07-1.98 (m, 2H), 1.96-1.87 (m, 1H), 1.75-1.56 (m, 5H), 1.43 (br s, 3H), 1.19 (br s, 3H), 0.80-0.70 (m, 1H), 0.37 (br d, J=8.0 Hz, 2H), 0.01 (br d, J=4.6 Hz, 2H) (one proton obscured). Analytical LC/MS (Method 1): Purity: 96.6%; Observed Mass: 479.22; Retention Time: 1.26 min. (Method 2): Purity: 95.7%; Observed Mass: 479.20; Retention Time: 0.90 min. Chiral Analytical (SFC Method 1): Chiral purity >95%. Retention time: 4.70 min.

Example 58

2-(3,4-dimethoxyphenyl)-7-(1'-isopropyl-[1,4'-bipiperidin]-4-yl)-5,6,7,8-tetrahydroimidazo[1,2-a]pyridine (racemic mixture)

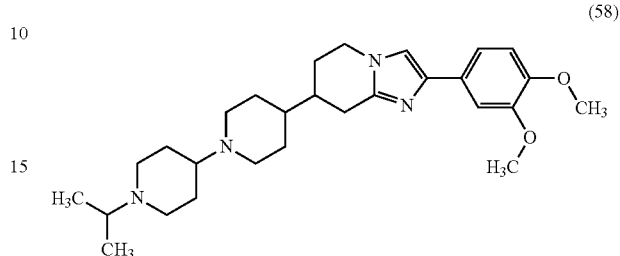

(58)

Step A. Intermediate 58A. Preparation of 7-bromo-2-(3,4-dimethoxyphenyl)imidazo[1,2-a]pyridine

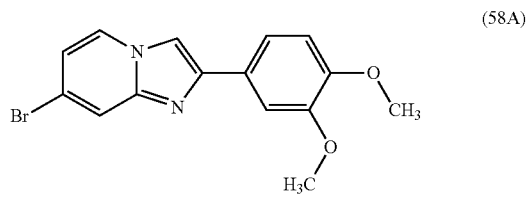 [SMILES: COc1ccc(-c2cn3ccc(Br)cc3n2)cc1OC]

(58A)

Intermediate 58A was prepared according to the general methods described for the synthesis of Intermediate 1A, substituting 4-bromopyridin-2-amine (500 mg, 2.9 mmol) where appropriate to afford the title compound (0.98 g, 2.9 mmol, 100% yield) as a white solid. $^1$H NMR (500 MHz, DMSO-d$_6$) δ 8.75 (d, J=7.2 Hz, 1H), 8.70 (s, 1H), 8.16 (d, J=1.7 Hz, 1H), 7.62-7.57 (m, 1H), 7.56-7.53 (m, 1H), 7.56-7.50 (m, 1H), 7.18 (s, 1H), 3.89 (s, 3H), 3.85 (s, 3H). Analytical LC/MS (Method 5): Observed Mass: 333.0; Retention Time: 0.62 min.

Step B. Intermediate 58B. Preparation of tert-butyl 4-(2-(3,4-dimethoxyphenyl)imidazo[1,2-a]pyridin-7-yl)-3,6-dihydropyridine-1(2H)-carboxylate

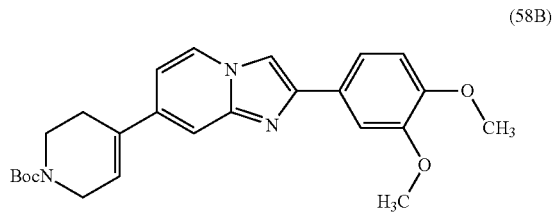 [SMILES: COc1ccc(-c2cn3ccc(C4=CCN(C(=O)OC(C)(C)C)CC4)cc3n2)cc1OC]

(58B)

Intermediate 58B was prepared according to the general methods described for the synthesis of Intermediate 1B, using Intermediate 58A (0.98 g, 2.9 mmol) as starting material to afford the title compound (1.2 g, 2.8 mmol, 97% yield) as a white solid. $^1$H NMR (500 MHz, METHANOL-d$_4$) δ 8.35-8.31 (m, 1H), 8.09 (s, 1H), 7.56 (d, J=1.9 Hz, 1H), 7.48 (s, 2H), 7.16-7.11 (m, 1H), 7.06-7.02 (m, 1H), 6.45-6.33 (m, 1H), 4.19-4.12 (m, 2H), 3.95 (s, 3H), 3.90 (s, 3H), 3.74-3.67 (m, 2H), 2.65-2.57 (m, 2H), 1.53 (s, 9H). Analytical LC/MS (Method 5): Observed Mass: 436.2; Retention Time: 0.79 min.

Step C. Intermediate 58C. Preparation of tert-butyl 4-(2-(3,4-dimethoxyphenyl)-5,6,7,8-tetrahydroimidazo[1,2-a]pyridin-7-yl)piperidine-1-carboxylate

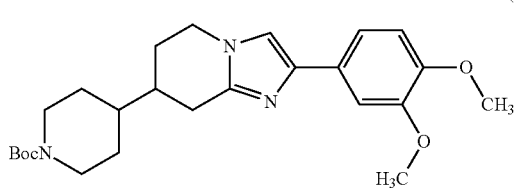

(58C)

Intermediate 58C was prepared according to the general methods described for the synthesis of Intermediate 31A, using Intermediate 58B (1.2 g, 2.8 mmol) as starting material to afford the title compound (0.56 g, 1.3 mmol, 46% yield) as a white solid. $^1$H NMR (400 MHz, METHANOL-d$_4$) δ 7.35-7.32 (m, 1H), 7.22 (s, 2H), 6.97-6.92 (m, 1H), 4.20-4.12 (m, 3H), 3.97-3.91 (m, 1H), 3.90 (s, 3H), 3.85 (s, 3H), 3.06-2.98 (m, 1H), 2.85-2.68 (m, 2H), 2.61-2.49 (m, 1H), 2.26-2.14 (m, 1H), 1.92-1.69 (m, 4H), 1.57-1.50 (m, 1H), 1.48 (s, 9H), 1.26 (s, 2H). Analytical LC/MS (Method 5): Observed Mass: 442.4; Retention Time: 0.77 min.

Step D. Intermediate 58D. Preparation of 2-(3,4-dimethoxyphenyl)-7-(piperidin-4-yl)-5,6,7,8-tetrahydroimidazo[1,2-a]pyridine hydrochloride

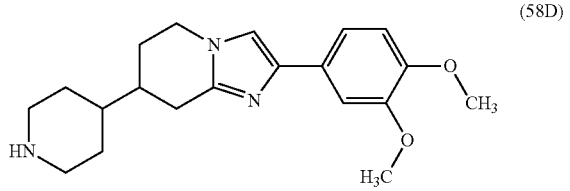 [SMILES: COc1ccc(-c2cn3c(n2)CC(C2CCNCC2)CC3)cc1OC]

(58D)

Intermediate 58D was prepared according to the general methods described for the synthesis of Intermediate 31B, using Intermediate 58C (0.56 g, 1.3 mmol) as starting material to afford the title compound (420 mg, 1.1 mmol, 85% yield) as a pale yellow solid. $^1$H NMR (500 MHz, METHANOL-d$_4$) δ 7.72 (s, 1H), 7.30 (s, 2H), 7.12-7.06 (m, 1H), 4.42-4.33 (m, 1H), 4.20-4.11 (m, 1H), 3.93 (s, 3H), 3.90 (s, 3H), 3.54-3.48 (m, 2H), 3.31-3.25 (m, 1H), 3.10-3.02 (m, 2H), 2.89-2.81 (m, 1H), 2.36-2.30 (m, 1H), 2.19-2.13 (m, 1H), 2.12-2.01 (m, 1H), 1.94-1.84 (m, 1H), 1.84-1.75 (m, 1H), 1.71-1.56 (m, 2H). Analytical LC/MS (Method 5): Observed Mass: 342.4; Retention Time: 0.49 min.

Step E. Preparation of Example 58

To a 2 dram vial were added Intermediate 58D (110 mg, 0.29 mmol), 1-isopropylpiperidin-4-one (120 mg, 0.85 mmol), AcOH (0.017 mL, 0.31 mmol), magnesium sulfate (220 mg, 1.8 mmol), and DMF (1 mL). The reaction mixture was stirred for 20 min, then sodium triacetoxyborohydride (180 mg, 0.83 mmol) was added and the reaction mixture was stirred. After 18 h, the reaction mixture was filtered, the filter cake was washed with 10% MeOH/DCM (10 mL), and the filtrate was concentrated. The crude product was purified by preparative HPLC (Prep Method 1) to afford the title compound (15 mg, 0.032 mmol, 11% yield). $^1$H NMR (500 MHz, DMSO-d$_6$) δ 7.37 (s, 1H), 7.29 (s, 1H), 7.23-7.18 (m, 1H), 6.92-6.88 (m, 1H), 4.10-4.04 (m, 1H), 3.87-3.80 (m, 1H), 3.78 (s, 3H), 3.74 (s, 3H), 3.05-2.96 (m, 3H), 2.94-2.84 (m, 2H), 2.47-2.30 (m, 4H), 2.29-2.19 (m, 2H), 2.08-2.02 (m, 1H), 1.87-1.73 (m, 4H), 1.72-1.47 (m, 5H), 1.31-1.23 (m, 3H), 1.04 (br d, J=6.5 Hz, 6H). Analytical LC/MS (Method 1): Purity: 95%; Observed Mass: 467.20; Retention Time: 1.21 min. (Method 2): Purity: 100%; Observed Mass: 467.20; Retention Time: 0.98 min.

Example 59

2-(3,4-dimethoxyphenyl)-7-(1'-isobutyl-[1,4'-bipiperidin]-4-yl)-5,6,7,8-tetrahydroimidazo[1,2-a]pyridine (racemic mixture)

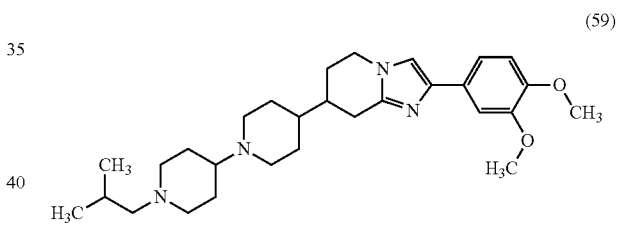

(59)

Example 59 was synthesized according to the general methods described for the preparation of Example 58 (Step E), using Intermediate 58D (110 mg, 0.29 mmol) as starting material, and substituting 1-isobutylpiperidin-4-one (130 mg, 0.84 mmol) where appropriate. The crude product was purified by preparative HPLC (Prep Method 1) to afford the title compound (15 mg, 0.031 mmol, 11% yield). $^1$H NMR (500 MHz, DMSO-d$_6$) δ 7.37 (s, 1H), 7.31 (d, J=1.5 Hz, 1H), 7.25-7.20 (m, 1H), 6.92 (d, J=8.5 Hz, 1H), 4.12-4.03 (m, 1H), 3.88-3.81 (m, 1H), 3.79 (s, 3H), 3.75 (s, 3H), 3.50-3.40 (m, 1H), 3.01-2.90 (m, 2H), 2.90-2.83 (m, 2H), 2.46-2.38 (m, 1H), 2.27-2.21 (m, 1H), 2.20-2.12 (m, 2H), 2.11-2.04 (m, 1H), 2.00 (s, 2H), 1.91-1.56 (m, 9H), 1.49-1.40 (m, 2H), 1.24 (br s, 3H), 0.85 (d, J=6.4 Hz, 6H). Analytical LC/MS (Method 1): Purity: 97.4%; Observed Mass: 480.99; Retention Time: 1.31 min. (Method 2): Purity: 92.7%; Observed Mass: 481.03; Retention Time: 1.03 min.

Example 60

2-(3,4-dimethoxyphenyl)-7-(1'-isopropyl-[1,4'-bipiperidin]-4-yl)-[1,2,4]triazolo[1,5-a]pyridine

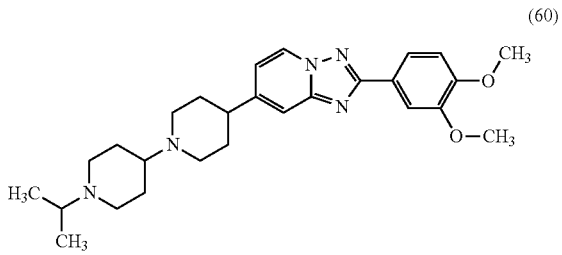 [SMILES: COc1ccc(-c2nc3cc(C4CCN(C5CCN(C(C)C)CC5)CC4)ccn3n2)cc1OC]

(60)

Step A. Intermediate 60A. Preparation of 7-bromo-2-(3,4-dimethoxyphenyl)-[1,2,4]triazolo[1,5-a]pyridine

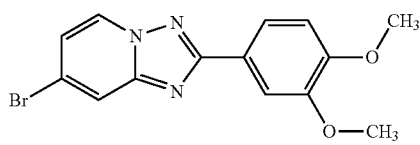

(60A)

To a 50 mL three necked flask were added 4-bromopyridin-2-amine (1.0 g, 5.8 mmol), 3,4-dimethoxybenzonitrile (1.1 g, 6.7 mmol), copper(I) bromide (0.041 g, 0.29 mmol), zinc iodide (0.18 g, 0.56 mmol), 1,10-phenanthroline (0.052 g, 0.29 mmol), and 1,2-dichlorobenzene (12 mL). Air was gently bubbled through the mixture, the system was closed, and the reaction mixture was heated to 130° C. and stirred. After 18 h, the reaction mixture was cooled, diluted with DCM, filtered and the filter cake was washed with copious DCM. The filtrate was concentrated and the residue was purified by flash column chromatography (80 g silica gel cartridge; A=Hex, B=EtOAc; 30 min grad.; 0% B to 100% B; flow rate=60 mL/min). The pure fractions were combined, concentrated and dried in vacuo to afford the title compound (1.4 g, 4.2 mmol, 72% yield) as a pale yellow solid. $^1$H NMR (500 MHz, METHANOL-d$_4$) δ 8.73-8.69 (m, 1H), 8.00-7.98 (m, 1H), 7.86-7.83 (m, 1H), 7.82-7.81 (m, 1H), 7.37-7.31 (m, 1H), 7.13-7.10 (m, 1H), 3.96 (s, 3H), 3.93 (s, 3H). Analytical LC/MS (Method 5): Observed Mass: 335.9; Retention Time: 0.86 min.

Step B. Intermediate 60B. Preparation of tert-butyl 4-(2-(3,4-dimethoxyphenyl)-[1,2,4]triazolo[1,5-a]pyridin-7-yl)-3,6-dihydropyridine-1(2H)-carboxylate

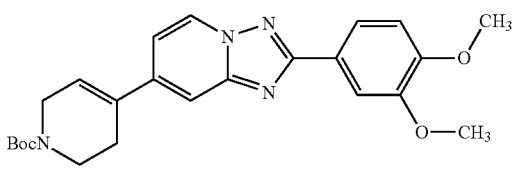 [SMILES: COc1ccc(-c2nc3cc(C4=CCN(C(=O)OC(C)(C)C)CC4)ccn3n2)cc1OC]

To a 40 mL vial were added Intermediate 60A (0.66 g, 2.0 mmol), tert-butyl 4-(4,4,5,5-tetramethyl-1,3,2-dioxaborolan-2-yl)-3,6-dihydropyridine-1(2H)-carboxylate (0.73 g, 2.4 mmol), followed by 1,4-dioxane (10 mL) and potassium phosphate (1.3 g, 6.1 mmol) dissolved in water (2 mL). The vial was purged with N$_2$, then 1,1'-bis(diphenylphosphino)ferrocene-palladium(II)dichloride dichloromethane complex (0.081 g, 0.099 mmol) was added. The vial was purged again with N$_2$ and the reaction stirred at 70° C. After 18 h, the reaction mixture was cooled, diluted with water (100 mL) and extracted with EtOAc (2×50 mL). The organic phase was combined, washed with brine, dried over MgSO$_4$, filtered and concentrated. The residue was purified by flash column chromatography (80 g silica gel cartridge; A=Hex, B=EtOAc; 30 min grad.; 0% B to 100% B; flow rate=60 mL/min). The pure fractions were combined, concentrated and dried in vacuo to afford the title compound (0.61 g, 1.4 mmol, 70% yield) as a pale yellow solid. Analytical LC/MS (Method 5): Observed Mass: 437.1; Retention Time: 0.96 min.

Step C. Intermediate 60C. Preparation of tert-butyl 4-(2-(3,4-dimethoxyphenyl)-[1,2,4]triazolo[1,5-a]pyridin-7-yl)piperidine-1-carboxylate

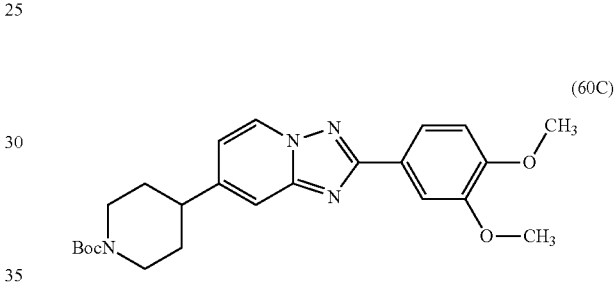

(60C)

To a 100 mL pear shaped flask were added Intermediate 60B (0.61 g, 1.4 mmol) and MeOH (20 mL). The vessel was evacuated and purged with N$_2$, then Pd—C (10% on carbon) (0.15 g, 0.14 mmol) was added and the reaction mixture was stirred under hydrogen at 1 atm. After 2 h, the catalyst was filtered and the filtrate was concentrated. The product was dried in vacuo to afford the title compound (0.61 g, 1.4 mmol, 99% yield) as a white solid. Analytical LC/MS (Method 5): Observed Mass: 439.1; Retention Time: 0.94 min.

Step D. Intermediate 60D. Preparation of 2-(3,4-dimethoxyphenyl)-7-(piperidin-4-yl)-[1,2,4]triazolo[1,5-a]pyridine hydrochloride

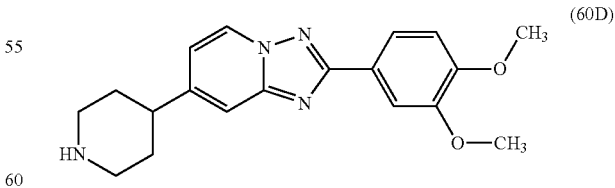

(60D)

To a 100 mL pear shaped flask were added Intermediate 60C (610 mg, 1.4 mmol), THF (2 mL), and 4 M HCl in dioxane (5 mL). A white precipitate immediately forms. The suspension was stirred. After 18 h, the solvent was concentrated and the solid was purified by trituration from MeOH. The product was collected by vacuum filtration and dried in vacuo to afford the title compound (520 mg, 1.4 mmol, 100% yield) as an off white solid. $^1$H NMR (500 MHz, DMSO-$d_6$) δ 8.93 (s, 1H), 7.81-7.76 (m, 1H), 7.73 (s, 1H), 7.65-7.63 (m, 1H), 7.12 (s, 2H), 3.87 (s, 3H), 3.84 (s, 3H), 3.44-3.38 (m, 2H), 3.11-2.98 (m, 3H), 2.11-2.04 (m, 2H), 2.01-1.89 (m, 2H). Analytical LC/MS (Method 5): Observed Mass: 339.0; Retention Time: 0.60 min.

Step E. Preparation of Example 60

To a 40 mL vial were added Intermediate 60D (60 mg, 0.16 mmol), 1-isopropylpiperidin-4-one (68 mg, 0.48 mmol), AcOH (0.010 mL, 0.18 mmol), magnesium sulfate (220 mg, 1.8 mmol), and DMF (2 mL). The reaction mixture was stirred for 20 min, then sodium triacetoxyborohydride (100 mg, 0.48 mmol) was added and the reaction mixture was stirred. After 18 h, the reaction mixture was filtered, the filter cake was washed with 10% MeOH/DCM (20 mL) and the filtrate was concentrated. The crude product was purified by preparative HPLC (Prep Method 1) to afford the title compound (71 mg, 0.15 mmol, 94% yield). $^1$H NMR (500 MHz, DMSO-$d_6$) δ 8.83 (d, J=7.0 Hz, 1H), 7.76 (dd, J=8.2, 1.8 Hz, 1H), 7.71 (s, 1H), 7.62 (s, 1H), 7.15-7.08 (m, 2H), 3.86 (s, 3H), 3.83 (s, 3H), 3.55-3.48 (m, 3H), 3.20-3.16 (m, 1H), 3.15-3.02 (m, 3H), 2.75-2.67 (m, 1H), 2.40-2.29 (m, 3H), 1.94-1.86 (m, 3H), 1.76-1.65 (m, 3H), 1.64-1.52 (m, 2H), 1.10 (br d, J=5.8 Hz, 6H). Analytical LC/MS (Method 1): Purity: 100%; Observed Mass: 464.31; Retention Time: 1.26 min. (Method 2): Purity: 100%; Observed Mass: 464.15; Retention Time: 1.07 min.

Example 61

2-(3,4-dimethoxyphenyl)-7-(1'-isobutyl-[1,4'-bipiperidin]-4-yl)-[1,2,4]triazolo[1,5-a]pyridine (61)

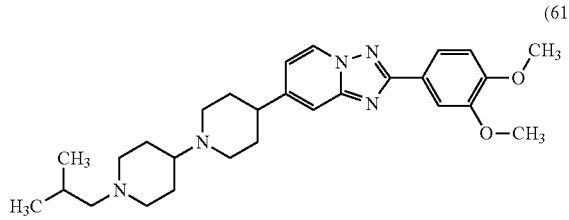

Example 61 was synthesized according to the general methods described for the preparation of Example 60 (Step E), using Intermediate 60D (60 mg, 0.16 mmol) as starting material and substituting 1-isobutylpiperidin-4-one (75 mg, 0.48 mmol) where appropriate. The crude product was purified by preparative HPLC (Prep Method 1) to afford the title compound (54 mg, 0.11 mmol, 69% yield). $^1$H NMR (500 MHz, DMSO-$d_6$) δ 8.86-8.78 (m, 1H), 7.79-7.75 (m, 1H), 7.71 (d, J=1.8 Hz, 1H), 7.61 (s, 1H), 7.12 (s, 2H), 3.86 (s, 3H), 3.83 (s, 3H), 3.57-3.50 (m, 2H), 3.13-3.05 (m, 1H), 2.97-2.90 (m, 1H), 2.78-2.68 (m, 1H), 2.44-2.34 (m, 2H), 2.15-2.02 (m, 2H), 1.98-1.87 (m, 3H), 1.83-1.64 (m, 5H), 1.58-1.47 (m, 2H), 0.86 (d, J=6.4 Hz, 6H) (two protons obscured). Analytical LC/MS (Method 1): Purity: 99.3%; Observed Mass: 478.17; Retention Time: 1.39 min. (Method 2): Purity: 97%; Observed Mass: 478.17; Retention Time: 1.1 min.

Examples 62 and 63

6-(1-(8-isopropyl-8-azabicyclo[3.2.1]octan-3-yl)piperidin-4-yl)-8-methyl-2-(4-(methylsulfonyl)phenyl)imidazo[1,2-a]pyridine (62-63)

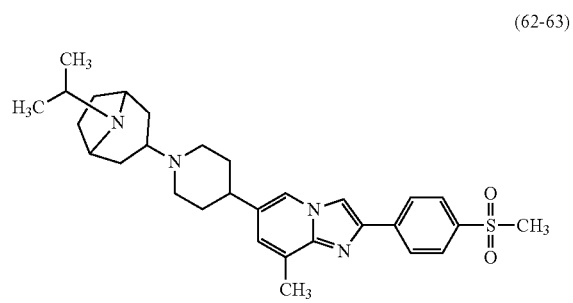 [SMILES: Cc1cc(C2CCN(C3CC4CCC(C3)N4C(C)C)CC2)cn2cc(-c3ccc(S(C)(=O)=O)cc3)nc12]

Step A. Intermediate 62A. Preparation of 6-(1-(8-azabicyclo[3.2.1]octan-3-yl)piperidin-4-yl)-8-methyl-2-(4-(methylsulfonyl)phenyl)imidazo[1,2-a]pyridine dihydrochloride (62A)

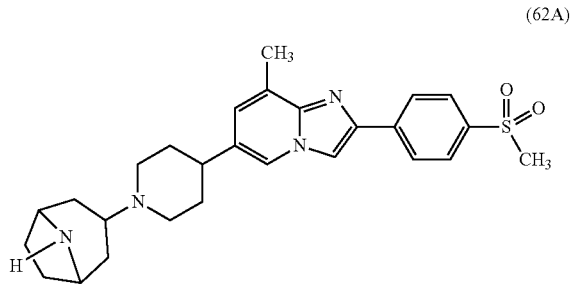 [SMILES: Cc1cc(C2CCN(C3CC4CCC(C3)N4)CC2)cn2cc(-c3ccc(S(C)(=O)=O)cc3)nc12]

To a 250 mL round bottomed flask were added Intermediate 7C (0.58 g, 1.4 mmol), MeOH (50 mL) and DOWEX 550A anion exchange resin (10 g). The mixture was stirred for 15 min, the resin was filtered and the filtrate was concentrated. The resultant free amine was dissolved in DCE (15 ml) and DME (15 ml), then tert-butyl 3-oxo-8-azabicyclo[3.2.1]octane-8-carboxylate (1.3 g, 5.7 mmol) was added, followed by titanium(IV) isopropoxide (2.1 mL, 7.1 mmol). The reaction mixture was stirred at 40° C. under $N_2$. After 18 h, the mixture was cooled to rt, then sodium triacetoxyborohydride (1.2 g, 5.7 mmol) was added and the reaction was continued. After 3 h, the reaction mixture was partitioned into 1 M KOH (sat. with solid NaCl) (150 mL) and 10% IPA/chloroform (150 mL). The layers were separated, the aqueous phase was extracted with 10% IPA/chloroform (75 mL), the organic phase was combined, washed with brine, dried over $MgSO_4$, filtered and concentrated. The residue was purified by flash column chromatography (120 g silica gel cartridge; A=DCM, B=MeOH; 30 min grad.; 0% B to 15% B; flow rate=80 mL/min). Fractions corresponding to product were combined, concentrated and dried in vacuo. The resultant residue was dissolved in MeOH (20 mL) and 4 M HCl in dioxane (10 mL) and stirred. After 0.5 h, the solvent was concentrated and the residue was co-evaporated with toluene (2×). The product was dried in vacuo to afford the title compound (0.47 g, 0.85 mmol, 61% yield) as an off white solid. $^1$H NMR (500 MHz, METHANOL-$d_4$) δ 8.70-8.66 (m, 1H), 8.22 (br d, J=6.8 Hz, 4H), 7.92-7.84 (m, 1H), 7.19-7.15 (m, 1H), 4.31-4.18 (m, 3H), 4.11-3.98 (m, 3H), 3.89-3.79 (m, 3H), 3.23 (s, 3H), 2.78 (s, 3H), 2.50-2.42 (m, 2H), 2.17-2.13 (m, 3H), 2.01 (br d, J=8.5

Hz, 6H). Analytical LC/MS (Method 4): Observed Mass: 479.1; Retention Time: 0.832 min.

Step B. Examples 62 and 63

To a 40 mL vial were added Intermediate 62A (90 mg, 0.16 mmol), propan-2-one (47 mg, 0.82 mmol), AcOH (10 µL, 0.18 mmol), magnesium sulfate (300 mg, 2.5 mmol) and DMF (2 mL). The reaction mixture was stirred for 10 min, then sodium triacetoxyborohydride (170 mg, 0.82 mmol) was added and the reaction mixture was stirred. After 18 h, the reaction mixture was diluted with 10% IPA/CHCl$_3$ (40 mL) and filtered. The filtrate was partitioned into 10% KOH (aq., sat. with solid NaCl) (20 mL) and the layers were separated. The aqueous phase was extracted with 10% IPA/CHCl$_3$ (10 mL), the organic phase was combined, washed with brine, dried over MgSO$_4$, filtered and concentrated. The crude material was purified via preparative LC/MS with the following conditions: Column: XBridge C18, 200 mm×19 mm, 5-µm particles; Mobile Phase A: 5:95 acetonitrile:water with ammonium acetate; Mobile Phase B: 95:5 acetonitrile:water with ammonium acetate; Gradient: a 0-minute hold at 5% B, 5-55% B over 20 minutes, then a 0-minute hold at 100% B; Flow Rate: 20 mL/min; Column Temperature: 25° C. Fraction collection was triggered by MS and UV signals. Fractions corresponding to the respective desired products were combined and dried via centrifugal evaporation.

Example 62 (11 mg, 0.021 mmol, 13% yield) was isolated as the 1$^{st}$ eluting isomer. $^1$H NMR (500 MHz, DMSO-d$_6$) δ 8.51-8.44 (m, 1H), 8.25-8.14 (m, 3H), 8.02-7.93 (m, 2H), 7.14-7.04 (m, 1H), 3.23 (s, 2H), 3.00 (s, 2H), 2.83-2.75 (m, 1H), 2.69-2.59 (m, 1H), 2.52 (br d, J=1.8 Hz, 5H), 2.17 (br s, 2H), 1.81 (br d, J=11.0 Hz, 4H), 1.70-1.52 (m, 6H), 1.51-1.42 (m, 2H), 1.03 (d, J=6.1 Hz, 6H) (two protons obscured). Analytical LC/MS (Method 1): Purity: 98.2%; Observed Mass: 521.01; Retention Time: 0.84 min. (Method 2): Purity: 98%; Observed Mass: 520.95; Retention Time: 1.28 min.

Example 63 (11 mg, 0.021 mmol, 13% yield) was isolated as the 2$^{nd}$ eluting isomer. $^1$H NMR (500 MHz, DMSO-d$_6$) δ 8.52-8.43 (m, 1H), 8.29-8.17 (m, 3H), 8.03-7.91 (m, 2H), 7.13-7.05 (m, 1H), 3.49-3.37 (m, 1H), 3.24 (s, 3H), 2.62-2.45 (m, 7H), 2.39-2.29 (m, 1H), 1.94-1.58 (m, 15H), 1.00 (br d, J=6.1 Hz, 6H). Analytical LC/MS (Method 1): Purity: 97.9%; Observed Mass: 521.32; Retention Time: 0.84 min. (Method 2): Purity: 96.7%; Observed Mass: 521.31; Retention Time: 1.35 min.

Example 64

2-(3,4-dimethoxyphenyl)-8-methyl-6-(4-(4-(oxetan-3-yl)piperazin-1-yl)phenyl) imidazo[1,2-a]pyridine

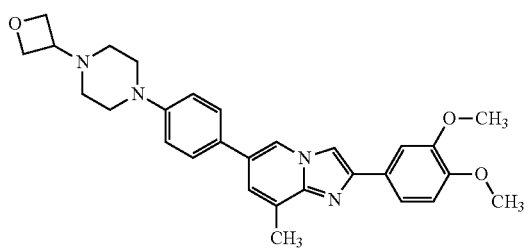

(64)

Step A. Intermediate 64A. Preparation of tert-butyl 4-(4-(2-(3,4-dimethoxyphenyl)-8-methylimidazo[1,2-a]pyridin-6-yl)phenyl)piperazine-1-carboxylate

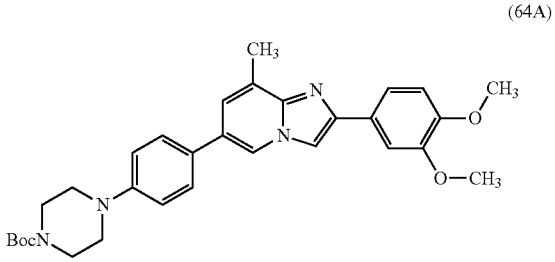 [SMILES: COc1ccc(-c2cn3cc(-c4ccc(N5CCN(C(=O)OC(C)(C)C)CC5)cc4)cc(C)c3n2)cc1OC]

(64A)

To a 40 mL vial were added Intermediate 1A (500 mg, 1.4 mmol), tert-butyl 4-(4-(4,4,5,5-tetramethyl-1,3,2-dioxaborolan-2-yl)phenyl)piperazine-1-carboxylate (620 mg, 1.6 mmol), XPhos Pd G3 (120 mg, 0.14 mmol), 1,4-dioxane (20 mL), followed by potassium phosphate tribasic (1100 mg, 5.0 mmol) dissolved in water (3 mL). The vessel was flushed with N$_2$, capped and the reaction mixture was stirred at 85° C. After 18 h, the reaction mixture was cooled, diluted with water (100 mL) and extracted with EtOAc (2×50 mL). The organic phase was combined, washed with brine, dried over MgSO$_4$, filtered and concentrated. The residue was purified by flash column chromatography (120 g silica gel cartridge; A=Hex, B=EtOAc; 30 min grad.; 0% B to 100% B; flow rate=80 mL/min). Fractions corresponding to desired product were combined, concentrated and dried in vacuo to afford the title compound (610 mg, 1.2 mmol, 86% yield) as a pale yellow solid. $^1$H NMR (500 MHz, CHLOROFORM-d) δ 8.18-8.05 (m, 1H), 7.86-7.79 (m, 1H), 7.67-7.59 (m, 1H), 7.54-7.47 (m, 3H), 7.26-7.19 (m, 1H), 7.07-7.01 (m, 2H), 7.00-6.94 (m, 1H), 4.05 (s, 3H), 3.96 (s, 3H), 3.70-3.60 (m, 4H), 3.30-3.17 (m, 4H), 2.74 (s, 3H), 1.52 (s, 9H). Analytical LC/MS (Method 5): Observed Mass: 529.3; Retention Time: 0.86 min.

Step B. Intermediate 64B. Preparation of 2-(3,4-dimethoxyphenyl)-8-methyl-6-(4-(piperazin-1-yl)phenyl)imidazo[1,2-a]pyridine dihydrochloride

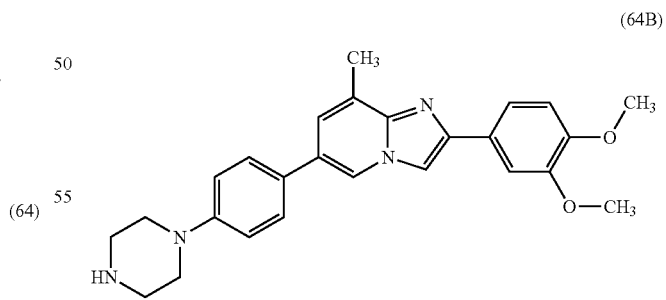

(64B)

To a 200 mL pear shaped flask were added Intermediate 64A (610 mg, 1.2 mmol), MeOH (10 mL), followed by 4 M HCl in dioxane (10 mL). After stirring 30 min, the solvent was concentrated, the residue was co-evaporated with toluene and the product was dried in vacuo to afford the title compound (600 mg, 1.2 mmol, 100% yield) as a tan solid. $^1$H NMR (500 MHz, DMSO-d$_6$) δ 9.49-9.44 (m, 1H), 9.03-8.97 (m, 1H), 8.70-8.64 (m, 1H), 8.16-8.12 (m, 1H), 7.88-7.81 (m, 1H), 7.77-7.71 (m, 2H), 7.70-7.66 (m, 1H), 7.21-7.15 (m, 3H), 3.94 (s, 3H), 3.86 (s, 3H), 3.75-3.65 (m, 1H), 3.56-3.48 (m, 3H), 3.29-3.20 (m, 4H), 2.81 (s, 3H). Analytical LC/MS (Method 5): Observed Mass: 429.3; Retention Time: 0.57 min.

Step C. Example 64

To a 40 mL vial were added Intermediate 64B (60 mg, 0.12 mmol), oxetan-3-one (43 mg, 0.60 mmol), AcOH (7.5 µL, 0.13 mmol), magnesium sulfate (220 mg, 1.8 mmol), and DMF (2 mL). The reaction mixture was stirred for 10 min, then sodium triacetoxyborohydride (130 mg, 0.60 mmol) was added and the reaction mixture was stirred. After 18 h, the reaction mixture was diluted with 10% IPA/CHCl$_3$ (40 mL) and filtered. The filtrate was partitioned into 10% KOH (aq., sat. with solid NaCl) (20 mL) and the layers were separated. The aqueous phase was extracted with 10% IPA/CHCl$_3$ (10 mL), the organic phase was combined, washed with brine, dried over MgSO$_4$, filtered and concentrated. The crude material was purified by preparative HPLC (Prep Method 1) to afford the title compound (33 mg, 0.068 mmol, 57% yield). $^1$H NMR (500 MHz, DMSO-d$_6$) δ 8.67-8.58 (m, 1H), 8.34-8.30 (m, 1H), 7.63-7.55 (m, 3H), 7.54-7.50 (m, 1H), 7.48-7.42 (m, 1H), 7.11-7.01 (m, 3H), 4.66-4.59 (m, 2H), 4.58-4.49 (m, 2H), 3.87 (s, 3H), 3.81-3.76 (m, 3H), 3.61-3.46 (m, 1H), 3.36-3.23 (m, 2H), 2.60 (s, 5H), 2.51 (br s, 4H). Analytical LC/MS (Method 1): Purity: 100%; Observed Mass: 485.17; Retention Time: 1.12 min. (Method 2): Purity: 100%; Observed Mass: 485.16; Retention Time: 1.80 min.

Example 65

6-(4-(4-isopropylpiperazin-1-yl)phenyl)-8-methyl-2-(4-(methylsulfonyl)phenyl) imidazo[1,2-a]pyridine

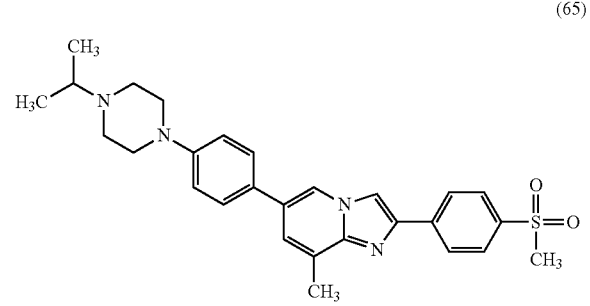 [SMILES: Cc1cc(-c2ccc(N3CCN(C(C)C)CC3)cc2)cn2cc(-c3ccc(S(C)(=O)=O)cc3)nc12]

(65)

Step A. Intermediate 65A. Preparation of 8-methyl-2-(4-(methylsulfonyl)phenyl)-6-(4-(piperazin-1-yl)phenyl)imidazo[1,2-a]pyridine dihydrochloride

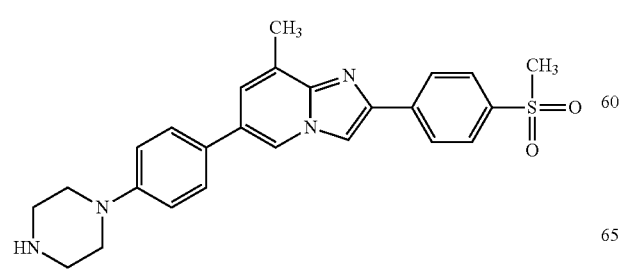

(65A)

Intermediate 65A was synthesized according to procedures described for the preparation of Intermediate 64B (Step A-B), substituting Intermediate 7A (0.75 g, 2.1 mmol) where appropriate to afford the title compound (0.81 g, 1.6 mmol, 76% yield over 2 steps) as a tan solid. $^1$H NMR (500 MHz, DMSO-d$_6$) δ 9.25 (br s, 1H), 9.02-8.93 (m, 1H), 8.82-8.74 (m, 1H), 8.41-8.29 (m, 2H), 8.17-8.08 (m, 2H), 8.05-7.93 (m, 1H), 7.79-7.63 (m, 2H), 7.21-7.09 (m, 2H), 3.52-3.48 (m, 4H), 3.31 (s, 3H), 3.27-3.23 (m, 4H), 2.73 (s, 3H) Analytical LC/MS (Method 4): Observed Mass: 447.1; Retention Time: 0.927 min.

Step B. Example 65

Example 65 was synthesized according to procedures described for the preparation of Example 64 (Step C), using Intermediate 65A (70 mg, 0.14 mmol) as starting material. The crude mixture was purified by preparative HPLC (Prep Method 1) to afford the title compound (15 mg, 0.031 mmol, 22% yield). $^1$H NMR (500 MHz, DMSO-d$_6$) δ 8.68-8.62 (m, 1H), 8.54 (s, 1H), 8.25 (d, J=8.5 Hz, 2H), 8.00 (d, J=8.5 Hz, 2H), 7.58 (br d, J=8.9 Hz, 2H), 7.46 (s, 1H), 7.04 (br d, J=8.9 Hz, 2H), 3.45-3.33 (m, 1H), 3.25 (s, 4H), 2.78-2.67 (m, 1H), 2.61 (s, 7H), 2.55 (s, 2H), 1.03 (d, J=6.7 Hz, 6H). Analytical LC/MS (Method 1): Purity: 100%; Observed Mass: 489.35; Retention Time: 1.06 min. (Method 2): Purity: 100%; Observed Mass: 489.35; Retention Time: 1.45 min.

Example 66

7-(1'-isopropyl-[1,4'-bipiperidin]-4-yl)-5-methyl-2-(4-(methylsulfonyl)phenyl) imidazo[1,2-a]pyridine

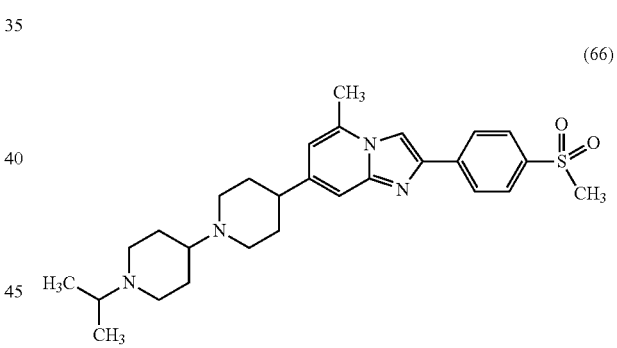

(66)

Step A. Intermediate 66A. Preparation of tert-butyl 2'-amino-6'-methyl-3,6-dihydro-[4,4'-bipyridine]-1(2H)-carboxylate

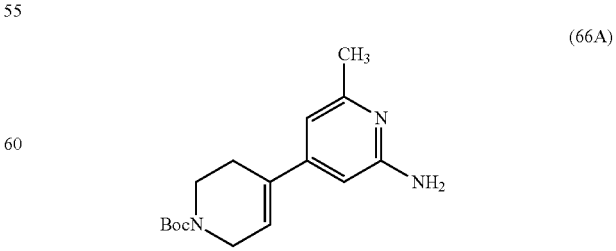

(66A)

To a 200 mL pear shaped flask were added 4-bromo-6-methylpyridin-2-amine (1.0 g, 5.4 mmol), tert-butyl 4-(4,4, 5,5-tetramethyl-1,3,2-dioxaborolan-2-yl)-3,6-dihydropyridine-1(2H)-carboxylate (2.0 g, 6.4 mmol), XPhos Pd G3 (0.23 g, 0.27 mmol), 1,4-dioxane (50 mL), followed by potassium phosphate tribasic (4.0 g, 19 mmol) dissolved in water (10 mL). The vessel was flushed with N₂, and the reaction mixture was stirred at 85° C. After 24 h, the reaction mixture was cooled, diluted with water (200 mL) and extracted with EtOAc (2×100 mL). The organic phase was combined, washed with brine, dried over MgSO₄, filtered and concentrated. The residue was purified by flash column chromatography (80 g silica gel cartridge; A=DCM, B=MeOH; 30 min grad.; 0% B to 15% B; flow rate=60 mL/min). Fractions containing product were combined, concentrated and dried in vacuo to afford the title compound (1.3 g, 4.5 mmol, 83% yield) as a pale yellow solid. ¹H NMR (500 MHz, METHANOL-d₄) δ 6.62-6.55 (m, 1H), 6.46-6.37 (m, 1H), 6.31-6.23 (m, 1H), 4.08 (br s, 2H), 3.72-3.57 (m, 2H), 2.53-2.43 (m, 2H), 2.33 (s, 3H), 1.51 (s, 9H). Analytical LC/MS (Method 4): Observed Mass: 289.9; Retention Time: 1.318 min.

Step B. Intermediate 66B. Preparation of tert-butyl 4-(5-methyl-2-(4-(methylsulfonyl)phenyl)imidazo[1,2-a]pyridin-7-yl)-3,6-dihydropyridine-1(2H)-carboxylate

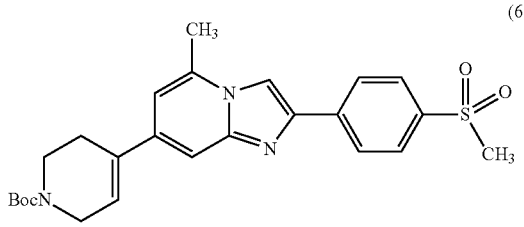

(66B)

To a 20 mL microwave reaction vial were added Intermediate 66A (0.6 g, 2.1 mmol), 2,2-dimethoxy-2-(4-(methylsulfonyl)phenyl)ethyl 4-methylbenzenesulfonate (1.0 g, 2.5 mmol), MeCN (15 mL), followed by scandium(III) triflate (0.051 g, 0.10 mmol). The vial was capped and irradiated at 120° C. After 15 h, the solvent was concentrated and the residue was purified by flash column chromatography (120 g silica gel cartridge; A=DCM, B=MeOH; 30 min grad.; 0% B to 10% B; flow rate=80 mL/min). The fractions corresponding to product were combined, concentrated and dried in vacuo to afford the title compound (100 mg, 0.21 mmol, 10% yield) as a tan solid. ¹H NMR (500 MHz, METHANOL-d₄) δ 8.38-8.32 (m, 1H), 8.30-8.19 (m, 2H), 8.08-8.00 (m, 2H), 7.51-7.44 (m, 1H), 7.14-7.07 (m, 1H), 6.48-6.38 (m, 1H), 4.22-4.08 (m, 2H), 3.77-3.66 (m, 2H), 3.19 (s, 3H), 2.74 (s, 3H), 2.68-2.59 (m, 2H), 1.53 (s, 9H). Analytical LC/MS (Method 4): Observed Mass: 468.1; Retention Time: 1.508 min.

Step C. Intermediate 66C. Preparation of 5-methyl-2-(4-(methylsulfonyl)phenyl)-7-(piperidin-4-yl)imidazo[1,2-a]pyridine hydrochloride

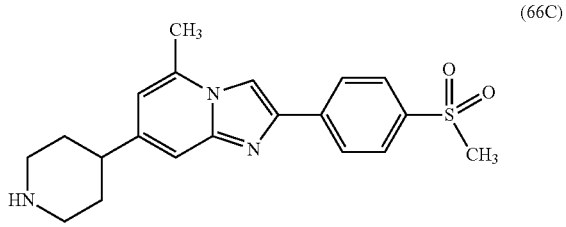 [SMILES: Cc1cc(C2CCNCC2)cc2nc(-c3ccc(S(C)(=O)=O)cc3)cn12]

(66C)

To a 250 mL round bottomed flask were added Intermediate 66B (90 mg, 0.19 mmol), MeOH (30 mL), and Pd—C (% wt. on carbon, wet) (41 mg, 0.019 mmol). The vessel was evacuated and purged with N₂ (3×) and stirred under H₂ at 1 atm. After 6 h, the catalyst was filtered, and to the filtrate was added 4 M HCl in dioxane (20 mL) and the mixture was stirred. After 20 min, the solvent was concentrated, the residue was co-evaporated with toluene (2×) and the product was dried in vacuo to afford the title compound (78 mg, 0.19 mmol, 100% yield) as a tan solid. ¹H NMR (500 MHz, METHANOL-d₄) δ 8.88-8.79 (m, 1H), 8.28-8.19 (m, 4H), 7.78-7.69 (m, 1H), 7.47-7.41 (m, 1H), 3.78-3.75 (m, 2H), 3.69 (br s, 4H), 3.62-3.59 (m, 3H), 3.23 (s, 3H), 2.96-2.89 (m, 3H). Analytical LC/MS (Method 4): Observed Mass: 369.9; Retention Time: 0.821 min.

Step D. Example 66

To a 40 mL vial were added Intermediate 66C (50 mg, 0.12 mmol), 1-isopropylpiperidin-4-one (87 mg, 0.62 mmol), AcOH (7.8 µL, 0.14 mmol), magnesium sulfate (220 mg, 1.8 mmol), and DMF (2 mL). The reaction mixture was stirred for 10 min, then sodium triacetoxyborohydride (130 mg, 0.62 mmol) was added and the reaction mixture was stirred. After 18 h, the reaction mixture was diluted with 10% IPA/CHCl3 (40 mL) and filtered. The filtrate was partitioned into 10% KOH (aq., sat. with solid NaCl) (20 mL) and the layers were separated. The aqueous phase was extracted with 10% IPA/CHCl₃ (10 mL), the organic phase was combined, washed with brine, dried over MgSO₄, filtered and concentrated. The crude material was purified by preparative HPLC (Prep Method 1) to afford the title compound (16 mg, 0.032 mmol, 27% yield). ¹H NMR (500 MHz, DMSO-d₆) δ 8.51-8.42 (m, 1H), 8.31-8.24 (m, 2H), 8.06-7.91 (m, 2H), 7.35-7.26 (m, 1H), 6.86-6.73 (m, 1H), 3.66-3.62 (m, 6H), 3.25-3.21 (m, 2H), 3.07-2.97 (m, 3H), 2.95-2.86 (m, 1H), 2.64-2.61 (m, 2H), 2.46-2.22 (m, 4H), 1.89-1.80 (m, 3H), 1.74-1.48 (m, 4H), 1.19-0.99 (m, 6H). Analytical LC/MS (Method 1): Purity: 95.4%; Observed Mass: 495.17; Retention Time: 0.92 min. (Method 2): Purity: 95.6%; Observed Mass: 495.17; Retention Time: 1.28 min.

Example 67

8-fluoro-6-(1'-isopropyl-[1,4'-bipiperidin]-4-yl)-2-(4-(methylsulfonyl)phenyl) imidazo[1,2-a]pyridine (67)

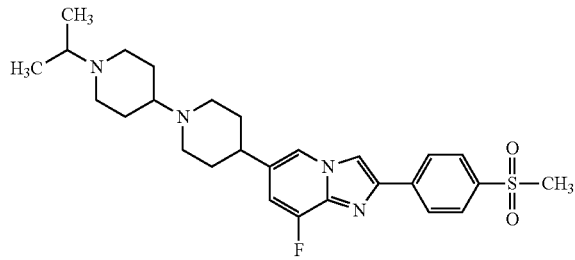

Step A. Intermediate 67A. Preparation of 6-bromo-8-fluoro-2-(4-(methylsulfonyl) phenyl)imidazo[1,2-a]pyridine (67A)

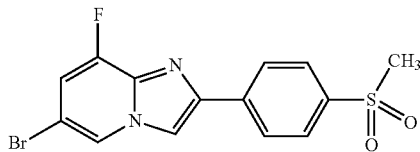

To a 40 mL vial were added 5-bromo-3-fluoropyridin-2-amine (1.0 g, 5.2 mmol), 2-bromo-1-(4-(methylsulfonyl) phenyl)ethan-1-one (1.6 g, 5.8 mmol), and EtOH (15 mL). The vessel was capped and the reaction mixture was stirred at 75° C. After 18 h, a precipitate formed. The reaction vessel was stored at –20° C. for 1 h, and the precipitate was collected by vacuum filtration. The filter cake was washed with a minimal amount of ether and the product was dried in vacuo to afford the title compound (1.0 g, 2.8 mmol, 54% yield) as a light tan solid. $^1$H NMR (500 MHz, DMSO-d$_6$) δ 8.88-8.81 (m, 1H), 8.73-8.64 (m, 1H), 8.30-8.23 (m, 2H), 8.06-7.97 (m, 2H), 7.62-7.53 (m, 1H), 3.26 (s, 3H). Analytical LC/MS (Method 4): Observed Mass: 370.7; Retention Time: 1.562 min.

Step B. Intermediate 67B. Preparation of benzyl 4-(8-fluoro-2-(4-(methylsulfonyl) phenyl)imidazo[1,2-a]pyridin-6-yl)-3,6-dihydropyridine-1(2H)-carboxylate (67B)

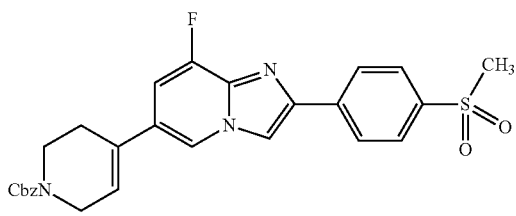

To a 40 mL vial were added Intermediate 67A (1.0 g, 2.8 mmol), benzyl 4-(4,4,5,5-tetramethyl-1,3,2-dioxaborolan-2-yl)-3,6-dihydropyridine-1(2H)-carboxylate (1.2 g, 3.4 mmol), XPhos Pd G3 (0.12 g, 0.14 mmol), 1,4-dioxane (15 mL), followed by potassium phosphate tribasic (2.1 g, 9.9 mmol) dissolved in water (3 mL). The vessel was flushed with N$_2$ and the reaction mixture was stirred at 85° C. After 18 h, the reaction mixture was cooled, diluted with water (200 mL), and extracted with EtOAc (2×100 mL). The organic phase was combined, washed with brine, dried over MgSO$_4$, filtered and concentrated. The residue was purified by flash column chromatography (120 g silica gel cartridge; A=DCM, B=MeOH; 30 min grad.; 0% B to 15% B; flow rate=80 mL/min). The fractions corresponding to product were combined, concentrated and dried in vacuo to afford the title compound (0.41 g, 0.81 mmol, 29% yield) as a pale yellow solid. $^1$H NMR (500 MHz, METHANOL-d$_4$) δ 8.50-8.45 (m, 1H), 8.40-8.37 (m, 1H), 8.22 (s, 2H), 8.09-8.01 (m, 2H), 7.47-7.31 (m, 6H), 6.39-6.25 (m, 1H), 5.20 (s, 2H), 4.29-4.17 (m, 2H), 3.86-3.73 (m, 2H), 3.18 (s, 3H), 2.65-2.57 (m, 2H). Analytical LC/MS (Method 4): Observed Mass: 506.1; Retention Time: 1.947 min.

Step C. Intermediate 67C. Preparation of 8-fluoro-2-(4-(methylsulfonyl)phenyl)-6-(piperidin-4-yl)imidazo[1,2-a]pyridine (67C)

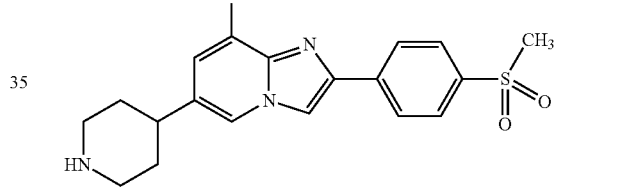

To a 250 mL round bottomed flask were added Intermediate 67B (0.41 g, 0.81 mmol), MeOH (30 mL), and DCM (10 mL). The vessel was evacuated and purged with N$_2$, then Pd—C (5% wt. on carbon, wet) (0.086 g, 0.081 mmol) was added, the vessel was evacuated and purged with N$_2$, and the reaction mixture was stirred under H$_2$ at 1 atm. After 18 h, the catalyst was filtered and the filtrate was concentrated. The product was dried in vacuo to afford the title compound (0.30 g, 0.81 mmol, 100% yield) as a light tan solid. $^1$H NMR (500 MHz, METHANOL-d$_4$) δ 8.50-8.45 (m, 1H), 8.30-8.27 (m, 1H), 8.26-8.20 (m, 2H), 8.07-8.03 (m, 2H), 7.22-7.13 (m, 1H), 3.58-3.52 (m, 2H), 3.19 (s, 5H), 3.06-2.99 (m, 1H), 2.25-2.18 (m, 2H), 2.00-1.89 (m, 2H). Analytical LC/MS (Method 4): Observed Mass: 373.9; Retention Time: 0.890 min.

Step D. Example 67

To a 40 mL vial were added Intermediate 67C (75 mg, 0.17 mmol), 1-isopropylpiperidin-4-one (120 mg, 0.84 mmol), AcOH (11 µL, 0.19 mmol), magnesium sulfate (300 mg, 2.5 mmol), and DMF (2 mL). The reaction mixture was stirred for 20 min, then sodium triacetoxyborohydride (180 mg, 0.84 mmol) was added and the reaction mixture was stirred. After 18 h, the reaction mixture was diluted with 10% IPA/CHCl$_3$ (40 mL) and filtered. The filtrate was partitioned into 10% KOH (aq., sat. with solid NaCl) (20 mL) and the layers were separated. The aqueous phase was extracted with 10% IPA/CHCl$_3$ (10 mL), the organic phase was combined, washed with brine, dried over MgSO$_4$, filtered and concentrated. The crude material was purified by preparative HPLC (Prep Method 2) to afford the title compound (47 mg, 0.065 mmol, 38% yield). $^1$H NMR (500 MHz, DMSO-d$_6$) δ 8.72-8.63 (m, 1H), 8.34-8.28 (m, 1H), 8.25-8.19 (m, 2H), 8.05-7.97 (m, 2H), 7.23-7.17 (m, 1H), 3.70-3.43 (m, 3H), 3.24 (s, 3H), 3.21-3.12 (m, 1H), 3.10-2.92 (m, 3H), 2.55-2.52 (m, 2H), 2.40-2.29 (m, 2H), 2.18 (br d, J=11.0 Hz, 2H), 2.08-1.84 (m, 4H), 1.26 (br d, J=6.7 Hz, 6H) (two protons obscured). Analytical LC/MS (Method 1): Purity: 100%; Observed Mass: 499.21; Retention Time: 0.91 min. (Method 2): Purity: 100%; Observed Mass: 498.94; Retention Time: 1.12 min.

Examples 68 and 69

8-fluoro-6-(1-(8-isopropyl-8-azabicyclo[3.2.1]octan-3-yl)piperidin-4-yl)-2-(4-(methylsulfonyl)phenyl)imidazo[1,2-a]pyridine (68-69)

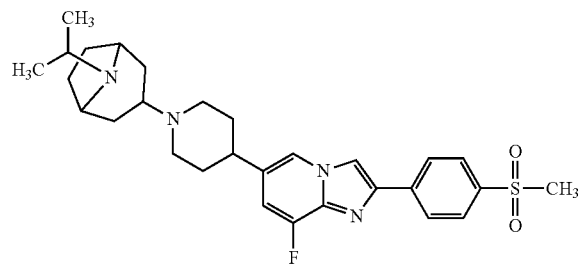

Step A. Intermediate 68A. Preparation of 6-(1-(8-azabicyclo[3.2.1]octan-3-yl)piperidin-4-yl)-8-fluoro-2-(4-(methylsulfonyl)phenyl)imidazo[1,2-a]pyridine dihydrochloride (68A)

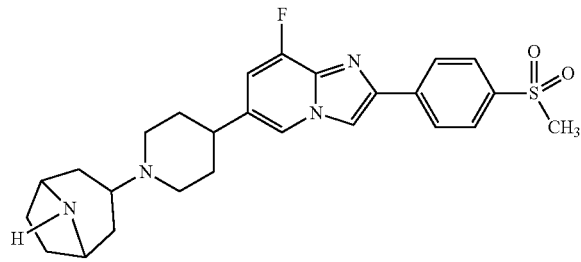

To a 250 mL round bottomed flask were added Intermediate 67C (0.41 g, 1.1 mmol), DCE (10 mL), 1,4-dioxane (10 mL), tert-butyl 3-oxo-8-azabicyclo[3.2.1]octane-8-carboxylate (0.99 g, 4.4 mmol), followed by titanium(IV) isopropoxide (1.6 ml, 5.5 mmol). The reaction mixture was stirred at 40° C. under N$_2$. After 18 h, the mixture was cooled to rt, then sodium triacetoxyborohydride (0.93 g, 4.4 mmol) was added and the reaction was continued. After 1 h, the reaction mixture was filtered, partitioned into 1 M KOH (150 mL) (saturated with solid NaCl) and 10% IPA/chloroform (150 mL). The layers were separated, the aqueous phase was extracted with 10% IPA/chloroform (75 mL), the organic phase was combined, washed with brine, dried over MgSO$_4$, filtered and concentrated. The residue was purified by flash column chromatography (120 g silica gel cartridge; A=DCM, B=MeOH; 30 min grad.; 0% B to 30% B; flow rate=80 mL/min). Fractions corresponding to desired intermediate were combined, concentrated and dried in vacuo. The resultant residue was dissolved in MeOH (20 mL) and 4 M HCl in dioxane (10 mL), and stirred. After 0.5 h, the solvent was concentrated, the residue was co-evaporated with toluene (2×), and the product was dried in vacuo to afford the title compound (0.50 g, 0.90 mmol, 82% yield) as a tan solid. Analytical LC/MS (Method 4): Observed Mass: 483.1; Retention Time: 0.896 min.

Step B. Examples 68 and 69

Examples 68 and 69 were synthesized according to procedures described for the preparation of Examples 62 and 63 (Step B), using Intermediate 68A (100 mg, 0.18 mmol) as starting material. The crude isomeric mixture was purified via preparative HPLC with the following conditions: Column: XBridge C18, 200 mm×19 mm, 5-µm particles; Mobile Phase A: 5:95 acetonitrile:water with ammonium acetate; Mobile Phase B: 95:5 acetonitrile:water with ammonium acetate; Gradient: a 0-minute hold at 2% B, 2-42% B over 20 minutes, then a 0-minute hold at 100% B; Flow Rate: 20 mL/min; Column Temperature: 25° C. Fraction collection was triggered by MS signals. Fractions corresponding to the respective desired products were combined and dried via centrifugal evaporation.

Example 68 (8.4 mg, 0.016 mmol, 9% yield) was isolated as the 1$^{st}$ eluting isomer. $^1$H NMR (500 MHz, DMSO-d$_6$) δ 8.63-8.57 (m, 1H), 8.31-8.27 (m, 1H), 8.25-8.20 (m, 2H), 8.02-7.96 (m, 2H), 7.26-7.20 (m, 1H), 3.55-3.37 (m, 2H), 3.24 (s, 2H), 3.05-2.96 (m, 2H), 2.95-2.85 (m, 1H), 2.76-2.65 (m, 1H), 2.59-2.56 (m, 1H), 2.25-2.17 (m, 2H), 1.93-1.81 (m, 5H), 1.63 (br s, 8H), 1.09 (br d, J=6.1 Hz, 6H). Analytical LC/MS (Method 1): Purity: 97.5%; Observed Mass: 525.20; Retention Time: 0.95 min. (Method 2): Purity: 100%; Observed Mass: 525.30; Retention Time: 1.23 min.

Example 69 (11 mg, 0.021 mmol, 12% yield) was isolated as the 2$^{nd}$ eluting isomer. $^1$H NMR (500 MHz, DMSO-d$_6$) δ 8.67-8.58 (m, 1H), 8.34-8.30 (m, 1H), 8.27-8.21 (m, 2H), 8.06-7.96 (m, 2H), 7.31-7.22 (m, 1H), 3.69-3.60 (m, 1H), 3.36-3.30 (m, 1H), 3.25 (s, 2H), 2.90-2.81 (m, 1H), 2.55-2.52 (m, 3H), 2.41-2.32 (m, 1H), 2.05-1.76 (m, 10H), 1.74-1.56 (m, 3H), 1.12 (br d, J=6.1 Hz, 6H) (two protons obscured). Analytical LC/MS (Method 1): Purity: 96.5%; Observed Mass: 525.20; Retention Time: 0.98 min. (Method 2): Purity: 95.3%; Observed Mass: 525.20; Retention Time: 1.36 min.

Example 70

7-fluoro-6-(1'-isopropyl-[1,4'-bipiperidin]-4-yl)-2-(4-(methylsulfonyl)phenyl) imidazo[1,2-a]pyridine

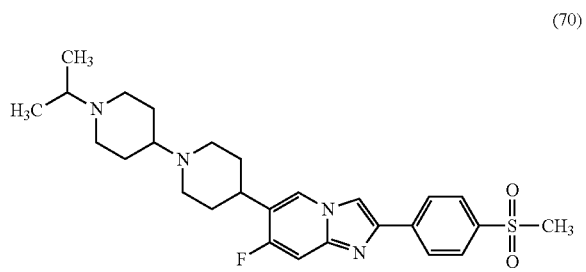 [SMILES: CC(C)N1CCC(N2CCC(c3cn4cc(-c5ccc(S(C)(=O)=O)cc5)nc4cc3F)CC2)CC1]
(70)

Step A. Intermediate 70A. Preparation of 7-fluoro-2-(4-(methylsulfonyl)phenyl)-6-(piperidin-4-yl)imidazo[1,2-a]pyridine

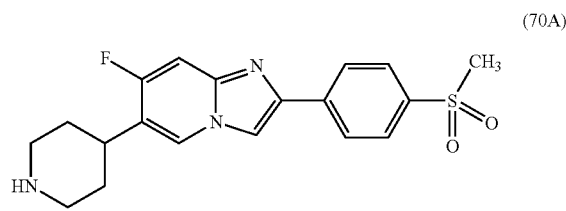 [SMILES: CS(=O)(=O)c1ccc(-c2cn3cc(C4CCNCC4)c(F)cc3n2)cc1]
(70A)

Intermediate 70A was synthesized according to procedures described for the preparation of Intermediate 67C (Steps A-C), using 5-bromo-4-fluoropyridin-2-amine (1.0 g, 5.2 mmol) as starting material to afford the title compound (0.38 g, 1.0 mmol, 19% yield over 3 steps) as a light tan solid. $^1$H NMR (500 MHz, DMSO-$d_6$) δ 8.96-8.75 (m, 1H), 8.59-8.49 (m, 2H), 8.25-8.16 (m, 2H), 7.99 (d, J=8.6 Hz, 2H), 7.59-7.49 (m, 1H), 3.44-3.38 (m, 2H), 3.25 (s, 3H), 3.13-3.04 (m, 3H), 2.11-2.02 (m, 2H), 1.96-1.86 (m, 2H). Analytical LC/MS (Method 4): Observed Mass: 373.9; Retention Time: 0.992 min.

Step B. Example 70

Example 70 was synthesized according to procedures described for the preparation of Example 67 (Step D), using Intermediate 70A (65 mg, 0.17 mmol) as starting material. The crude mixture was purified by preparative HPLC (Prep Method 1) to afford the title compound (14 mg, 0.028 mmol, 17% yield). $^1$H NMR (500 MHz, DMSO-$d_6$) δ 8.53-8.46 (m, 2H), 8.21-8.16 (m, 2H), 8.02-7.95 (m, 2H), 7.46-7.42 (m, 1H), 3.24-3.22 (m, 2H), 3.17 (s, 3H), 3.02-2.97 (m, 2H), 2.87-2.82 (m, 2H), 2.73-2.62 (m, 3H), 1.79-1.64 (m, 6H), 1.49-1.39 (m, 4H), 0.96 (br d, J=6.7 Hz, 6H). Analytical LC/MS (Method 1): Purity: 97.4%; Observed Mass: 499.12; Retention Time: 0.89 min. (Method 2): Purity: 98.7%; Observed Mass: 499.0; Retention Time: 1.20 min.

Examples 71 and 72

8-fluoro-6-(1-(1-isopropylazepan-4-yl)piperidin-4-yl)-2-(4-(methylsulfonyl)phenyl)imidazo[1,2-a]pyridine

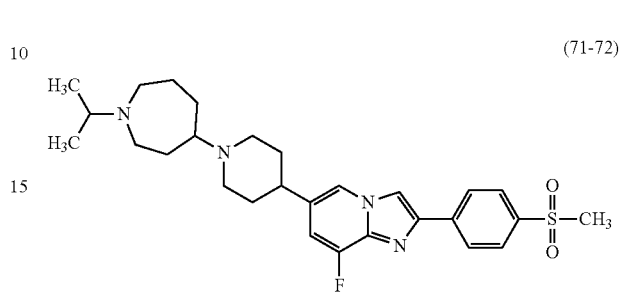
(71-72)

Step A. Intermediate 108A. Preparation of 6-(1-(azepan-4-yl)piperidin-4-yl)-8-fluoro-2-(4-(methylsulfonyl)phenyl)imidazo[1,2-a]pyridine dihydrochloride

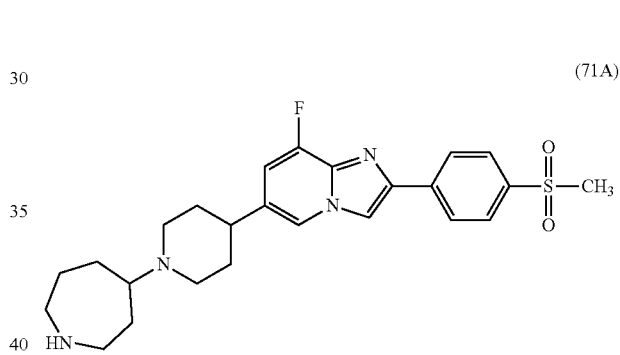
(71A)

To a 200 mL pear shaped flask were added Intermediate 67C (1.2 g, 3.3 mmol), tert-butyl 4-oxoazepane-1-carboxylate (3.5 g, 17 mmol), AcOH (0.21 mL, 3.6 mmol), magnesium sulfate (7.9 g, 66 mmol), and DMF (40 mL). The reaction mixture was stirred for 20 min, then sodium triacetoxyborohydride (3.5 g, 17 mmol) was added and the reaction mixture was stirred under $N_2$. After 18 h, the reaction mixture was diluted with 2 M KOH (sat. with solid NaCl) (200 mL), and extracted with 10% IPA/CHCl$_3$ (2×100 mL). The organic phase was combined, wash with brine, dried over MgSO$_4$, filtered and concentrated. The residue was purified by flash column chromatography (80 g silica gel cartridge; A=DCM, B=MeOH; 30 min grad.; 0% B to 10% B; flow rate=60 mL/min). The fractions corresponding to product were combined, concentrated and dried in vacuo. The resultant intermediate was dissolved in MeOH (20 mL) and 4 M HCl in dioxane (20 mL) and stirred. After 30 min, the solvent was concentrated and the residue was co-evaporated with toluene (2×) and the product was dried in vacuo to afford the title compound (1.1 g, 2.1 mmol, 64% yield) as a light tan solid. $^1$H NMR (500 MHz, METHANOL-$d_4$) δ 8.83-8.76 (m, 1H), 8.69-8.64 (m, 1H), 8.24-8.17 (m, 4H), 7.92-7.84 (m, 1H), 3.74-3.62 (m, 3H), 3.60-3.53 (m, 1H), 3.48-3.38 (m, 3H), 3.31-3.24 (m, 2H), 3.22 (s, 3H), 2.65-2.55 (m, 1H), 2.50-2.43 (m, 1H), 2.33 (br d, J=2.9 Hz, 5H), 2.26-2.16 (m, 1H), 2.10-1.90 (m, 2H) (one proton obscured). Analytical LC/MS (Method 4): Observed Mass:471.3; Retention Time: 0.889 min.

Step B. Examples 71 and 72

To a 40 mL vial were added Intermediate 71A (220 mg, 0.41 mmol), propan-2-one (120 mg, 2.0 mmol), AcOH (0.025 mL, 0.45 mmol), magnesium sulfate (730 mg, 6.1 mmol), and DMF (2 mL). The reaction mixture was stirred for 20 min, then sodium triacetoxyborohydride (430 mg, 6.1 mmol) was added and the reaction mixture was stirred. After 18 h, the reaction mixture was diluted with 10% IPA/CHCl$_3$ (40 mL) and filtered. The filtrate was partitioned into 10% KOH (aq., sat. with solid NaCl) (20 mL) and the layers were separated. The aqueous phase was extracted with 10% IPA/CHCl$_3$ (10 mL), the organic phase was combined, washed with brine, dried over MgSO$_4$, filtered and concentrated. The crude material was purified by preparative HPLC (Prep Method 1). The resultant racemic mixture was further purified by SFC-chiral chromatography with the following conditions: Instrument: Waters 100 Prep SFC; Column: Chiral AD, 30×250 mm. 5 micron; Mobile Phase: 65% CO$_2$/35% IPA w/0.5% DEA; Flow Conditions: 100 mL/min.; Detector Wavelength: 220 nm; Injection Details: 500 µL, 100 mg dissolved in 4 mL MeOH. Fractions corresponding to the respective desired products were combined and dried via centrifugal evaporation.

Example 71 (26 mg, 0.051 mmol, 12% yield) was isolated as the 1$^{st}$ eluting enantiomer. $^1$H NMR (500 MHz, DMSO-d$_6$) δ 8.65-8.56 (m, 1H), 8.32-8.27 (m, 1H), 8.25-8.20 (m, 2H), 8.05-7.96 (m, 2H), 7.27-7.21 (m, 1H), 3.25 (s, 2H), 2.95-2.82 (m, 2H), 2.73-2.64 (m, 2H), 2.63-2.53 (m, 2H), 2.41-2.28 (m, 2H), 1.91 (s, 2H), 1.87-1.69 (m, 5H), 1.69-1.41 (m, 5H), 0.98 (dd, J=6.3, 3.8 Hz, 6H) (two protons obscured). Analytical LC/MS (Method 1): Purity: 100%; Observed Mass: 513.20; Retention Time: 0.95 min. (Method 2): Purity: 100%; Observed Mass: 513.30; Retention Time: 1.23 min. Chiral analytical (SFC Method 6): Purity: >95%; Retention Time: 13.52 min.

Example 72 (18 mg, 0.035 mmol, 9% yield) was isolated as the 2$^{nd}$ eluting enantiomer. $^1$H NMR (500 MHz, DMSO-d$_6$) δ 8.62 (d, J=3.1 Hz, 1H), 8.28 (s, 1H), 8.23 (d, J=8.2 Hz, 2H), 8.00 (d, J=8.2 Hz, 2H), 7.24 (br d, J=12.2 Hz, 1H), 3.25 (s, 2H), 2.89-2.79 (m, 3H), 2.72-2.58 (m, 3H), 2.39-2.26 (m, 3H), 1.90 (s, 3H), 1.86-1.68 (m, 5H), 1.67-1.37 (m, 5H), 0.95 (dd, J=6.4, 3.7 Hz, 6H). Chiral analytical (SFC Method 6): Purity: >92%; Retention Time: 16.16 min.

Example 73

5-fluoro-6-(1'-isopropyl-[1,4'-bipiperidin]-4-yl)-2-(4-(methylsulfonyl)phenyl) imidazo[1,2-a]pyridine (73)

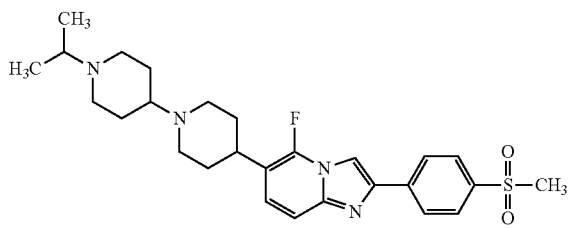

Step A. Intermediate 73A. Preparation of tert-butyl 6-amino-2-fluoro-3',6'-dihydro-[3,4'-bipyridine]-1'(2'H)-carboxylate

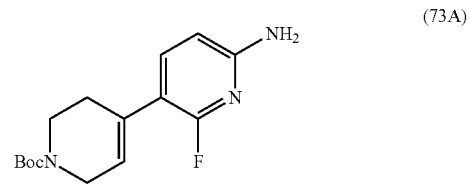 [SMILES: CC(C)(C)OC(=O)N1CC=C(c2ccc(N)nc2F)CC1]

(73A)

Intermediate 73A was synthesized according to procedures described for the preparation of Intermediate 66A, using 5-bromo-6-fluoropyridin-2-amine (1.5 g. 7.9 mmol) as starting material to afford the title compound (2.3 g, 7.8 mmol, 99% yield) as a pale yellow solid. $^1$H NMR (500 MHz, METHANOL-d$_4$) δ 7.60-7.39 (m, 1H), 6.39 (dd, J=8.2, 1.8 Hz, 1H), 5.88 (br s, 1H), 4.09-4.01 (m, 2H), 3.69-3.57 (m, 2H), 2.52-2.39 (m, 2H), 1.51 (s, 9H). Analytical LC/MS (Method 4): Observed Mass: 294.1; Retention Time: 1.684 min.

Step B. Intermediate 73B. Preparation of tert-butyl 4-(6-amino-2-fluoropyridin-3-yl) piperidine-1-carboxylate

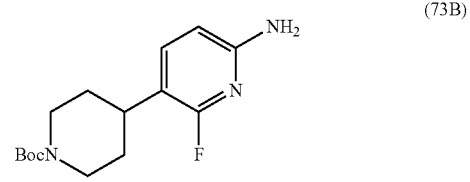 [SMILES: CC(C)(C)OC(=O)N1CCC(c2ccc(N)nc2F)CC1]

(73B)

To a 500 mL pear shaped flask were Intermediate 73A (2.3 g, 7.8 mmol), DCM (30 mL), MeOH (30 mL), followed by Pd—C (5% wt. on carbon, wet) (1.7 g, 0.78 mmol). The vessel was evacuated and purged with N$_2$, then stirred under H$_2$ at 1 atm. After 18 h, the catalyst was filtered and the filtrate was concentrated. The product was dried in vacuo to afford the title compound (2.3 g, 7.8 mmol, 100% yield) as a pale yellow solid. $^1$H NMR (500 MHz, METHANOL-d$_4$) δ 7.51-7.38 (m, 1H), 6.45-6.31 (m, 1H), 4.28-4.15 (m, 2H), 2.96-2.76 (m, 3H), 1.81-1.72 (m, 2H), 1.65-1.51 (m, 2H), 1.49 (s, 9H). Analytical LC/MS (Method 4): Observed Mass: 240.1 (-t-Bu); Retention Time: 1.676 min.

Step C. Intermediate 73C. Preparation of 5-fluoro-2-(4-(methylsulfonyl)phenyl)-6-(piperidin-4-yl)imidazo[1,2-a]pyridine

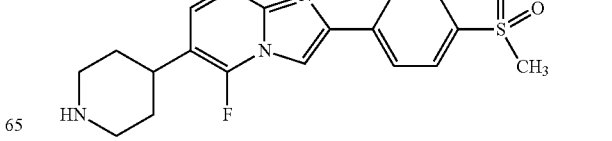

(73C)

To a 20 mL microwave reaction vial were added Intermediate 73B (1.0 g, 3.4 mmol), 2,2-dimethoxy-2-(4-(methylsulfonyl)phenyl)ethyl 4-methylbenzenesulfonate (1.4 g, 3.4 mmol), MeCN (20 mL), followed by scandium(III) triflate (0.083 g, 0.17 mmol). The vial was capped and the reaction mixture was irradiated at 120° C. After 12 h, the desired cyclization reaction was observed, in addition to Boc-cleavage. The solvent was concentrated and the residue was purified by flash column chromatography (120 g silica gel cartridge; A=DCM, B=MeOH; 30 min grad.; 0% B to 10% B; flow rate=80 mL/min). The fractions corresponding to product were combined, concentrated and dried in vacuo to afford the title compound (0.14 g, 0.37 mmol, 11% yield) as a light tan solid. Analytical LC/MS (Method 4): Observed Mass: 374.1; Retention Time: 1.008 min.

Step D. Example 73

To a 40 mL vial were added Intermediate 73C (72 mg, 0.19 mmol), 1-isopropylpiperidin-4-one (140 mg, 0.96 mmol), AcOH (0.012 mL, 0.21 mmol), magnesium sulfate (350 mg, 2.9 mmol), and DMF (2 mL). The reaction mixture was stirred for 20 min, then sodium triacetoxyborohydride (200 mg, 0.96 mmol) was added and the reaction mixture was stirred. After 18 h, the reaction mixture was diluted with 10% IPA/CHCl$_3$ (40 mL) and filtered. The filtrate was partitioned into 10% KOH (aq., sat. with solid NaCl) (20 mL) and the layers were separated. The aqueous phase was extracted with 10% IPA/CHCl$_3$ (10 mL), the organic phase was combined, washed with brine, dried over MgSO$_4$, filtered and concentrated. The crude material was purified by preparative HPLC (Prep Method 2) to afford the title compound (29 mg, 0.040 mmol, 21% yield). $^1$H NMR (500 MHz, DMSO-d$_6$) δ 8.76 (br s, 1H), 8.32 (br d, J=7.6 Hz, 2H), 8.01 (br d, J=8.2 Hz, 2H), 7.59 (br d, J=9.2 Hz, 1H), 7.38-7.30 (m, 1H), 3.63-3.45 (m, 4H), 3.26 (br s, 2H), 3.14-3.04 (m, 2H), 2.99-2.90 (m, 3H), 2.40-2.31 (m, 2H), 2.07 (br d, J=12.8 Hz, 8H), 1.57-1.52 (m, 1H), 1.21-1.12 (m, 6H). Analytical LC/MS (Method 1): Purity: 98.1%; Observed Mass: 499.30; Retention Time: 0.91 min. (Method 2): Purity: 97.8%; Observed Mass: 499.30; Retention Time: 1.21 min.

Example 74

8-fluoro-7-(1'-isobutyl-[1,4'-bipiperidin]-4-yl)-2-(4-(methylsulfonyl)phenyl)imidazo[1,2-a]pyridine Step A. Intermediate 74A. Preparation of 8-fluoro-2-(4-(methylsulfonyl)phenyl)-7-(piperidin-4-yl)imidazo[1,2-a]pyridine hydrochloride

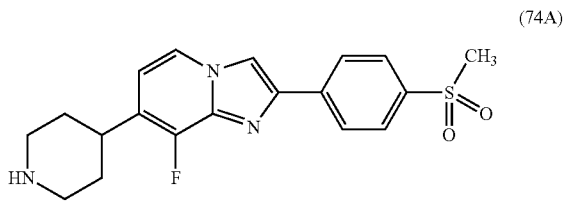 [SMILES: CS(=O)(=O)c1ccc(-c2cn3ccc(C4CCNCC4)c(F)c3n2)cc1]

(74A)

Intermediate 74A was synthesized according to methods described for the preparation of Intermediate 66C (Step A-C), using 4-bromo-3-fluoropyridin-2-amine (0.50 g, 2.6 mmol) as starting material to afford the title compound (0.34 g, 0.83 mmol, 32% yield over 3 steps) as a light tan solid. $^1$H NMR (500 MHz, METHANOL-d$_4$) δ 8.81-8.78 (m, 1H), 8.70-8.65 (m, 1H), 8.23-8.16 (m, 4H), 7.50-7.44 (m, 1H), 3.64-3.58 (m, 3H), 3.32-3.24 (m, 2H), 3.22 (s, 3H), 2.22-2.16 (m, 4H). Analytical LC/MS (Method 4): Observed Mass: 374.1; Retention Time: 0.894 min.

Step B. Example 74

Example 74 was synthesized according to methods described for the preparation of Example 66 (Step D), using Intermediate 74A (70 mg, 0.17 mmol) as starting material. The crude mixture was purified by preparative HPLC (Prep Method 2) to afford the title compound (33 mg, 0.064 mmol, 38% yield). $^1$H NMR (500 MHz, DMSO-d$_6$) δ 8.66-8.61 (m, 1H), 8.41-8.34 (m, 1H), 8.27-8.21 (m, 2H), 8.05-7.95 (m, 2H), 6.99-6.91 (m, 1H), 3.39-3.28 (m, 2H), 3.05-2.84 (m, 5H), 2.39-2.13 (m, 3H), 2.11-1.95 (m, 2H), 1.91-1.69 (m, 10H), 1.57-1.43 (m, 2H), 0.85 (d, J=6.5 Hz, 6H).

Examples 75 and 76

(6R)-2-(3,4-dimethoxyphenyl)-6-(1-(8-isobutyl-8-azabicyclo[3.2.1]octan-3-yl)piperidin-4-yl)-5,6,7,8-tetrahydroimidazo[1,2-a]pyridine (absolute stereochemistry arbitrarily drawn)

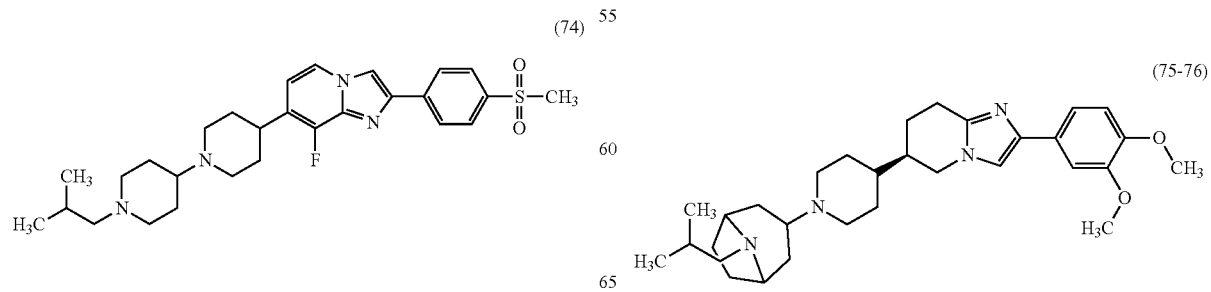

Step A. Intermediate 75A. Preparation of (R)-2-(3,4-dimethoxyphenyl)-6-(piperidin-4-yl)-5,6,7,8-tetrahydroimidazo[1,2-a]pyridine (absolute stereochemistry arbitrarily drawn)

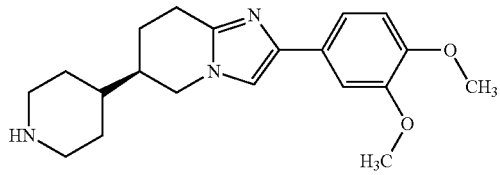

(75A)

Intermediate 75A was obtained as the 1$^{st}$ eluting enantiomer of the chiral separation of Intermediate 31B (1.0 g, 2.9 mmol) by SFC-chiral chromatography with the following conditions: Instrument: Waters 100 Prep SFC; Column: ChiralCel OD-H, 21×250 mm. 5 micron; Mobile Phase: 55% CO$_2$/45% MeOH w/0.1% DEA; Flow Conditions: 45 mL/min., 120 bar, 30° C.; Detector Wavelength: 220 nm; Injection Details: 1000 µL, 1000 mg dissolved in 8 mL MeOH-MeCN. Fractions containing the desired product were combined and dried via centrifugal evaporation to afford the title compound (0.36 g, 1.1 mmol, 38% yield) as a pale yellow solid. $^1$H NMR (500 MHz, METHANOL-d$_4$) δ 7.36-7.31 (m, 1H), 7.27-7.19 (m, 2H), 6.98-6.92 (m, 1H), 4.19-4.13 (m, 1H), 3.90 (s, 3H), 3.85 (s, 3H), 3.77-3.69 (m, 1H), 3.19-3.09 (m, 2H), 3.04-2.96 (m, 1H), 2.83-2.71 (m, 1H), 2.70-2.58 (m, 2H), 2.24-2.14 (m, 1H), 1.94-1.76 (m, 3H), 1.70-1.49 (m, 2H), 1.45-1.27 (m, 2H). Analytical LC/MS (Method 4): Observed Mass: 342.1; Retention Time: 0.857 min. Chiral analytical (SFC Method 8): Purity: >95%; Retention Time: 6.729 min.

Step B. Intermediate 75B. Preparation of (6R)-6-(1-(8-azabicyclo[3.2.1]octan-3-yl) piperidin-4-yl)-2-(3,4-dimethoxyphenyl)-5,6,7,8-tetrahydroimidazo[1,2-a]pyridine dihydrochloride (absolute stereochemistry arbitrarily drawn)

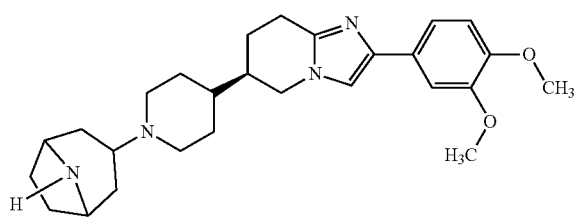

(75B)

To a 40 mL vial were added Intermediate 75A (0.36 g, 1.1 mmol), tert-butyl 3-oxo-8-azabicyclo[3.2.1]octane-8-carboxylate (0.95 g, 4.2 mmol), DCE (8 mL) and 1,4-dioxane (8 mL). To this mixture was added titanium(IV) isopropoxide (1.6 mL, 5.3 mmol), the vessel was flushed with N$_2$, capped and stirred at 40° C. After 18 h, the mixture was cooled to rt, then sodium triacetoxyborohydride (0.89 g, 4.2 mmol) was added and the reaction was continued. After 3 h, the reaction mixture was partitioned into 10% KOH (aq., sat. with solid NaCl) (150 mL) and 10% IPA/chloroform (150 mL). The layers were separated, the aqueous phase was extracted with 10% IPA/chloroform (75 mL), the organic phase was combined, washed with brine, dried over MgSO$_4$, filtered and concentrated. The residue was purified by flash column chromatography (40 g silica gel cartridge; A=DCM, B=MeOH; 30 min grad.; 0% B to 20% B; flow rate=80 mL/min). Fractions corresponding to desired product were combined, concentrated and dried in vacuo. The resultant residue was dissolved in MeOH (10 mL) and 4 M HCl in dioxane (5 mL) and stirred. After 15 min, the solvent was concentrated, the residue was co-evaporated with toluene, and the product was dried in vacuo to afford the title compound (0.11 g, 0.21 mmol, 19% yield) as an off-white solid. $^1$H NMR (500 MHz, METHANOL-d$_4$) δ 7.72-7.69 (m, 1H), 7.30-7.25 (m, 2H), 7.12-7.08 (m, 1H), 4.41-4.35 (m, 1H), 4.28-4.23 (m, 1H), 4.22-4.15 (m, 1H), 4.01-3.95 (m, 1H), 3.91 (d, J=12.9 Hz, 6H), 3.79-3.67 (m, 5H), 3.62-3.59 (m, 1H), 3.29-3.06 (m, 6H), 2.31-2.01 (m, 8H), 1.92-1.77 (m, 4H). Analytical LC/MS (Method 4): Observed Mass: 451.1; Retention Time: 0.858 min.

Step C. Examples 75 and 76

To a 40 mL vial were added Intermediate 75B (60 mg, 0.12 mmol), isobutyraldehyde (41 mg, 0.57 mmol), AcOH (7.2 µL, 0.13 mmol), magnesium sulfate (210 mg, 1.7 mmol), and DMF (2 mL). The reaction mixture was stirred for 10 min, then sodium triacetoxyborohydride (120 mg, 0.57 mmol) was added and the reaction mixture was stirred. After 18 h, the reaction mixture was diluted with 10% IPA/CHCl$_3$ (40 mL) and filtered. The filtrate was partitioned into 10% KOH (aq., sat. with solid NaCl) (20 mL) and the layers were separated. The aqueous phase was extracted with 10% IPA/CHCl$_3$ (10 mL), the organic phase was combined, washed with brine, dried over MgSO$_4$, filtered and concentrated. The crude isomeric mixture was purified via preparative HPLC with the following conditions: Column: XBridge C18, 200 mm×19 mm, 5-µm particles; Mobile Phase A: 5:95 acetonitrile:water with ammonium acetate; Mobile Phase B: 95:5 acetonitrile:water with ammonium acetate; Gradient: a 0-minute hold at 10% B, 10-60% B over 20 minutes, then a 0-minute hold at 100% B; Flow Rate: 20 mL/min; Column Temperature: 25° C. Fraction collection was triggered by MS signals. Fractions corresponding to the respective desired products were combined and dried via centrifugal evaporation.

Example 75 (28 mg, 0.055 mmol, 46% yield) was isolated as the 1$^{st}$ eluting isomer. $^1$H NMR (500 MHz, DMSO-d$_6$) δ 7.37-7.32 (m, 1H), 7.31-7.27 (m, 1H), 7.21 (br d, J=7.9 Hz, 1H), 6.94-6.88 (m, 1H), 4.05 (br s, 1H), 3.78 (s, 3H), 3.74 (s, 3H), 3.62-3.47 (m, 1H), 3.26-3.13 (m, 2H), 3.10-2.93 (m, 1H), 2.92-2.83 (m, 1H), 2.72-2.59 (m, 1H), 2.49-2.31 (m, 3H), 1.91 (s, 5H), 1.78 (br d, J=5.8 Hz, 7H), 1.65 (br d, J=7.6 Hz, 2H), 1.58-1.46 (m, 2H), 1.38 (br d, J=8.2 Hz, 3H), 0.91 (d, J=6.4 Hz, 6H) (one proton obscured). Analytical LC/MS (Method 1): Purity: 100%; Observed Mass: 507.29; Retention Time: 0.98 min. (Method 2): Purity: 94.2%; Observed Mass: 506.99; Retention Time: 1.24 min.

Example 76 (25 mg, 0.049 mmol, 41% yield) was isolated as the 2$^{nd}$ eluting isomer. $^1$H NMR (500 MHz, DMSO-d$_6$) δ 7.92-7.85 (m, 1H), 7.35-7.24 (m, 2H), 7.15-7.05 (m, 1H), 4.30-4.20 (m, 1H), 4.00-3.85 (m, 2H), 3.82 (d, J=11.6 Hz, 6H), 3.55-3.41 (m, 2H), 3.18 (s, 2H), 3.04-2.91 (m, 2H), 2.80-2.65 (m, 2H), 2.28-1.72 (m, 12H), 1.71-1.34 (m, 5H), 0.97 (br d, J=6.4 Hz, 6H) (two protons obscured). Analytical LC/MS (Method 1): Purity: 100%; Observed Mass: 507.01;

Retention Time: 0.98 min. (Method 2): Purity: 100%; Observed Mass: 507.0; Retention Time: 1.47 min.

Examples 77 and 78

(6S)-2-(3,4-dimethoxyphenyl)-6-(1-(8-isobutyl-8-azabicyclo[3.2.1]octan-3-yl)piperidin-4-yl)-5,6,7,8-tetrahydroimidazo[1,2-a]pyridine (absolute stereochemistry arbitrarily drawn)

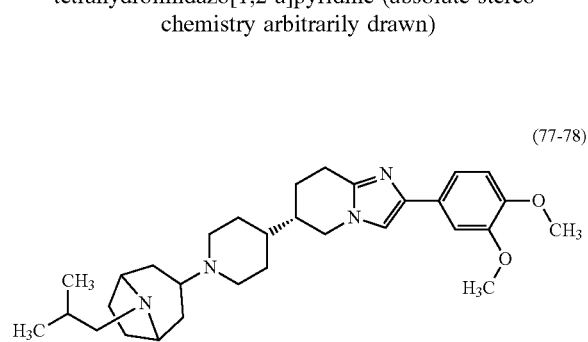

(77-78)

Step A. Intermediate 77A. Preparation of (S)-2-(3,4-dimethoxyphenyl)-6-(piperidin-4-yl)-5,6,7,8-tetrahydroimidazo[1,2-a]pyridine (absolute stereochemistry arbitrarily drawn)

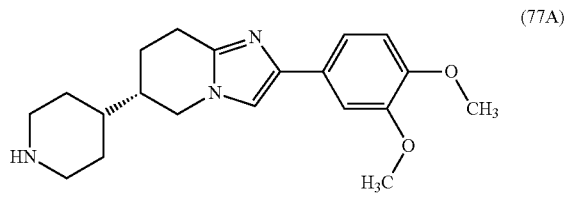 [SMILES: COc1ccc(-c2cn3c(n2)CC[C@@H](C2CCNCC2)C3)cc1OC]

(77A)

Intermediate 77A was obtained as the $2^{nd}$ eluting enantiomer of the chiral separation of Intermediate 31B (1.0 g, 2.9 mmol) by SFC-chiral chromatography with the following conditions: Instrument: Waters 100 Prep SFC; Column: ChiralCel OD-H, 21×250 mm. 5 micron; Mobile Phase: 55% $CO_2$/45% MeOH w/0.1% DEA; Flow Conditions: 45 mL/min., 120 bar, 30° C.; Detector Wavelength: 220 nm; Injection Details: 1000 µL, 1000 mg dissolved in 8 mL MeOH-MeCN. Fractions containing the desired product were combined and dried via centrifugal evaporation to afford the title compound (0.33 g, 0.97 mmol, 33% yield) as a pale yellow solid. $^1$H NMR (500 MHz, METHANOL-$d_4$) δ 7.36-7.32 (m, 1H), 7.28-7.19 (m, 2H), 6.98-6.91 (m, 1H), 4.25-4.10 (m, 1H), 3.90 (s, 3H), 3.85 (s, 3H), 3.78-3.72 (m, 1H), 3.22-3.16 (m, 2H), 3.05-2.98 (m, 1H), 2.81-2.67 (m, 3H), 2.24-2.16 (m, 1H), 1.98-1.81 (m, 3H), 1.71-1.53 (m, 2H), 1.47-1.32 (m, 2H). Analytical LC/MS (Method 4): Observed Mass: 342.1; Retention Time: 0.859 min. Chiral analytical (SFC Method 8): Purity: >95%; Retention Time: 16.297 min.

Step B. Intermediate 77B. Preparation of (6S)-6-(1-(8-azabicyclo[3.2.1]octan-3-yl) piperidin-4-yl)-2-(3,4-dimethoxyphenyl)-5,6,7,8-tetrahydroimidazo[1,2-a]pyridine dihydrochloride (absolute stereochemistry arbitrarily drawn)

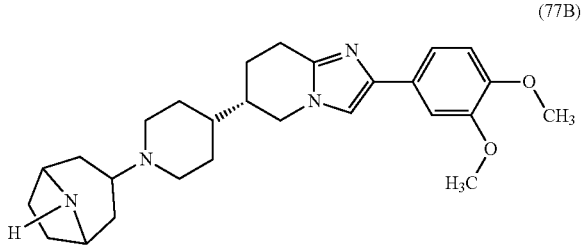 [SMILES: COc1ccc(-c2cn3c(n2)CC[C@@H](C2CCN(C4CC5CCC(C4)N5)CC2)C3)cc1OC]

(77B)

Intermediate 77B was synthesized according to methods described for the preparation of Intermediate 75B, using Intermediate 77A (0.33 g, 0.97 mmol) as starting material to afford the title compound (0.10 g, 0.19 mmol, 20% yield) as an off-white solid. $^1$H NMR (500 MHz, METHANOL-$d_4$) δ 7.71-7.67 (m, 1H), 7.28-7.25 (m, 2H), 7.24-7.21 (m, 1H), 4.43-4.36 (m, 1H), 4.30-4.24 (m, 1H), 4.22-4.13 (m, 1H), 3.99-3.95 (m, 1H), 3.93 (s, 3H), 3.90 (s, 3H), 3.76 (br s, 2H), 3.69 (br d, J=5.5 Hz, 5H), 3.61 (br d, J=5.0 Hz, 2H), 3.28-3.20 (m, 2H), 3.14-3.01 (m, 3H), 2.45-1.98 (m, 6H), 1.92-1.74 (m, 3H). Analytical LC/MS (Method 4): Observed Mass: 451.1; Retention Time: 0.857 min.

Step C. Examples 77 and 78

Examples 77 and 78 were synthesized according to methods described for the preparation of Examples 75 and 76, using Intermediate 77B (50 mg, 0.096 mmol) as starting material. The crude isomeric mixture was purified via preparative HPLC with the following conditions: Column: XBridge C18, 200 mm×19 mm, 5-µm particles; Mobile Phase A: 5:95 acetonitrile:water with ammonium acetate; Mobile Phase B: 95:5 acetonitrile:water with ammonium acetate; Gradient: a 0-minute hold at 11% B, 11-58% B over 20 minutes, then a 0-minute hold at 100% B; Flow Rate: 20 mL/min; Column Temperature: 25° C. Fraction collection was triggered by MS signals. Fractions corresponding to the respective desired products were combined and dried via centrifugal evaporation.

Example 77 (22 mg, 0.043 mmol, 45% yield) was isolated as the $1^{st}$ eluting isomer. $^1$H NMR (500 MHz, DMSO-$d_6$) δ 7.36-7.31 (m, 1H), 7.31-7.27 (m, 1H), 7.24-7.18 (m, 1H), 6.95-6.87 (m, 1H), 4.10-4.00 (m, 1H), 3.76 (d, J=18.3 Hz, 6H), 3.63-3.46 (m, 3H), 3.21-3.15 (m, 2H), 2.99-2.78 (m, 3H), 2.72-2.60 (m, 1H), 2.18-2.08 (m, 2H), 2.07-1.96 (m, 3H), 1.93-1.69 (m, 5H), 1.68-1.43 (m, 7H), 1.32-1.16 (m, 3H), 0.92-0.77 (m, 6H). Analytical LC/MS (Method 1): Purity: 95.8%; Observed Mass: 507.05; Retention Time: 1.01 min. (Method 2): Purity: 96.6%; Observed Mass: 507.02; Retention Time: 1.38 min.

Example 78 (21 mg, 0.041 mmol, 43% yield) was isolated as the $2^{nd}$ eluting isomer. $^1$H NMR (500 MHz, DMSO-$d_6$) δ 7.35-7.32 (m, 1H), 7.31-7.28 (m, 1H), 7.22-7.19 (m, 1H), 6.92-6.89 (m, 1H), 3.77 (s, 3H), 3.75-3.71 (m, 2H), 3.19-3.05 (m, 5H), 2.91-2.78 (m, 3H), 2.71-2.61 (m, 3H), 2.41-2.28 (m, 3H), 2.03-1.88 (m, 6H), 1.77-1.58 (m, 8H), 1.23 (br s, 3H), 0.86 (br d, J=6.7 Hz, 6H). Analytical LC/MS (Method 1): Purity: 99.1%; Observed Mass: 506.9; Retention Time: 0.94 min. (Method 2): Purity: 100%; Observed Mass: 506.9; Retention Time: 1.55 min.

Examples 79 and 80

(6R)-6-(1-(8-isobutyl-8-azabicyclo[3.2.1]octan-3-yl) piperidin-4-yl)-2-(4-(methylsulfonyl)phenyl)-5,6,7,8-tetrahydroimidazo[1,2-a]pyridine (absolute stereochemistry arbitrarily drawn)

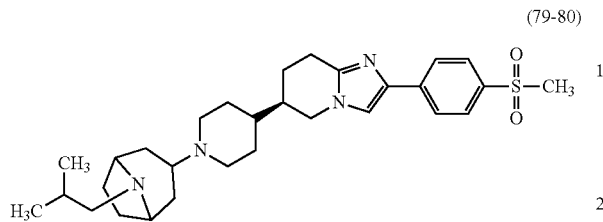
(79-80)

Step A. Intermediate 79A. Preparation of tert-butyl 4-(2-(4-(methylsulfonyl)phenyl) imidazo[1,2-a]pyridin-6-yl)-3,6-dihydropyridine-1(2H)-carboxylate

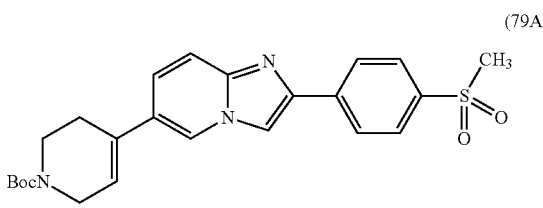
(79A)

Intermediate 79A was synthesized according to methods described for the preparation of Intermediate 1B (Steps A-B), using 5-bromopyridin-2-amine (1.3 g, 7.5 mmol) as starting material, and substituting 2-bromo-1-(4-(methylsulfonyl)phenyl)ethan-1-one where appropriate to afford the title compound (2.8 g, 6.1 mmol, 81% yield over 2 steps) as a pale yellow solid. $^1$H NMR (500 MHz, DMSO-$d_6$) δ 8.60-8.56 (m, 1H), 8.53-8.47 (m, 1H), 8.25-8.18 (m, 2H), 8.00-7.96 (m, 2H), 7.62-7.52 (m, 2H), 6.36-6.26 (m, 1H), 4.05 (br s, 2H), 3.58 (br s, 2H), 3.32 (s, 3H), 3.20-3.17 (m, 1H), 2.76-2.72 (m, 1H), 1.45 (s, 9H). Analytical LC/MS (Method 4): Observed Mass: 454.1; Retention Time: 1.451 min.

Step B. Intermediate 79B. Preparation of 2-(4-(methylsulfonyl)phenyl)-6-(piperidin-4-yl)-5,6,7,8-tetrahydroimidazo[1,2-a]pyridine hydrochloride

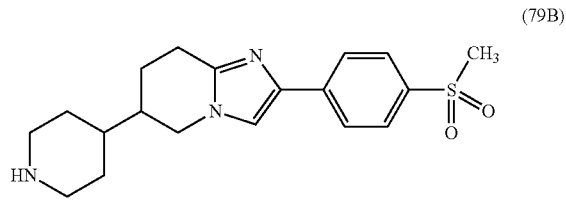 [SMILES: CS(=O)(=O)c1ccc(-c2cn3c(n2)CCC(C2CCNCC2)C3)cc1]
(79B)

Intermediate 79B was synthesized according to methods described for the preparation of Intermediate 31B (Steps A-B), using Intermediate 79A (2.8 g, 6.1 mmol) as starting material to afford the title compound (0.85 g, 2.1 mmol, 34% yield over 2 steps) as an off-white solid. $^1$H NMR (500 MHz, METHANOL-$d_4$) δ 7.93 (s, 4H), 7.56-7.52 (m, 1H), 4.26-4.18 (m, 1H), 3.84-3.76 (m, 1H), 3.37 (s, 2H), 3.14 (s, 3H), 3.06-3.00 (m, 1H), 2.86-2.75 (m, 1H), 2.63 (br t, J=12.3 Hz, 2H), 2.25-2.17 (m, 1H), 1.89 (br d, J=12.2 Hz, 2H), 1.83-1.75 (m, 1H), 1.72-1.62 (m, 1H), 1.59-1.49 (m, 1H), 1.44-1.26 (m, 2H). Analytical LC/MS (Method 4): Observed Mass: 360.0; Retention Time: 0.752 min.

Step C. Intermediate 79C. Preparation of (R)-2-(4-(methylsulfonyl)phenyl)-6-(piperidin-4-yl)-5,6,7,8-tetrahydroimidazo[1,2-a]pyridine (absolute stereochemistry arbitrarily drawn)

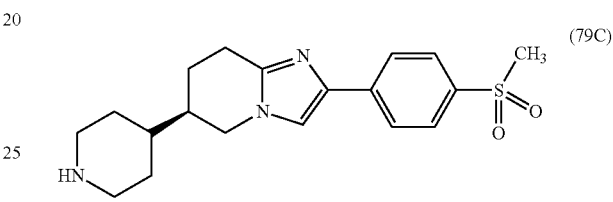
(79C)

Intermediate 79C was obtained as the 1$^{st}$ eluting enantiomer of the chiral separation of Intermediate 79B (0.85 g, 2.4 mmol) by SFC-chiral chromatography with the following conditions: Instrument: Berger SFC; Column: Chiral OD, 30×250 mm. 5 micron; Mobile Phase: 70% $CO_2$/30% EtOH w/0.1% DEA; Flow Conditions: 85 mL/min.; Detector Wavelength: 220 nm; Injection Details: 650 μL, 850 mg dissolved in 30 mL EtOH-DEA. Fractions containing the desired product were combined and dried via centrifugal evaporation to afford the title compound (0.35 g, 0.97 mmol, 41% yield) as a pale yellow solid. $^1$H NMR (500 MHz, METHANOL-$d_4$) δ 7.96-7.89 (m, 4H), 7.57-7.53 (m, 1H), 4.27-4.19 (m, 1H), 3.85-3.74 (m, 1H), 3.14 (s, 4H), 3.08-3.00 (m, 1H), 2.85-2.76 (m, 1H), 2.70-2.61 (m, 2H), 2.25-2.17 (m, 1H), 1.95-1.85 (m, 2H), 1.84-1.77 (m, 1H), 1.73-1.63 (m, 1H), 1.60-1.51 (m, 1H), 1.42-1.30 (m, 3H). Analytical LC/MS (Method 4): Observed Mass: 360.0; Retention Time: 0.816 min. Chiral analytical (SFC Method 9): Purity: >99%; Retention Time: 12.01 min.

Step D. Intermediate 79D. Preparation of (6R)-6-(1-(8-azabicyclo[3.2.1]octan-3-yl) piperidin-4-yl)-2-(4-(methylsulfonyl)phenyl)-5,6,7,8-tetrahydroimidazo[1,2-a]pyridine dihydrochloride (absolute stereochemistry arbitrarily drawn)

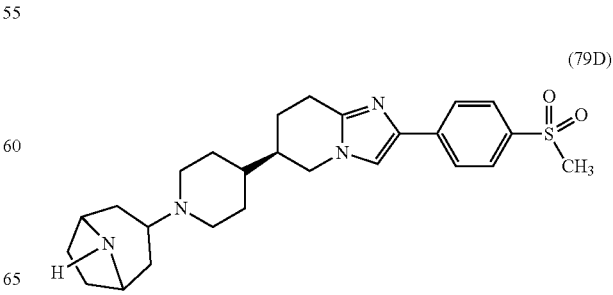
(79D)

Intermediate 79D was synthesized according to methods described for the preparation of Intermediate 75B, using Intermediate 79C (0.35 g, 0.97 mmol) as starting material to afford the title compound (0.50 g, 0.92 mmol, 95% yield) as a pale yellow solid. $^1$H NMR (500 MHz, METHANOL-$d_4$) δ 8.14-8.10 (m, 2H), 8.00 (s, 1H), 7.96 (d, J=8.6 Hz, 2H), 4.48-4.41 (m, 2H), 4.30-4.15 (m, 4H), 4.12-3.97 (m, 5H), 3.79-3.69 (m, 4H), 3.18-3.06 (m, 4H), 2.16-2.05 (m, 6H), 1.91-1.79 (m, 5H). Analytical LC/MS (Method): Observed Mass: 469.1; Retention Time: 0.825 min.

Step E. Examples 79 and 80

Examples 79 and 80 were synthesized according to methods described for the preparation of Examples 75 and 76, using Intermediate 79D (110 mg, 0.20 mmol) as starting material. The crude isomeric mixture was purified via preparative HPLC with the following conditions: Column: XBridge C18, 200 mm×19 mm, 5-μm particles; Mobile Phase A: 5:95 acetonitrile:water with ammonium acetate; Mobile Phase B: 95:5 acetonitrile:water with ammonium acetate; Gradient: a 0-minute hold at 12% B, 12-52% B over 20 minutes, then a 0-minute hold at 100% B; Flow Rate: 20 mL/min; Column Temperature: 25° C. Fraction collection was triggered by MS signals. Fractions corresponding to the respective desired products were combined and dried via centrifugal evaporation.

Example 79 (7.4 mg, 0.014 mmol, 7% yield) was isolated as the $1^{st}$ eluting isomer. $^1$H NMR (500 MHz, DMSO-$d_6$) δ 7.97-7.92 (m, 2H), 7.88-7.82 (m, 2H), 7.72-7.65 (m, 1H), 4.20-4.04 (m, 1H), 3.79-3.60 (m, 1H), 3.49-3.32 (m, 1H), 3.19 (s, 3H), 2.98-2.84 (m, 3H), 2.78-2.64 (m, 1H), 2.16-1.96 (m, 5H), 1.89-1.73 (m, 4H), 1.72-1.42 (m, 10H), 1.25 (br s, 4H), 0.87 (d, J=6.7 Hz, 6H). Analytical LC/MS (Method 1): Purity: 93.1%; Observed Mass: 524.93; Retention Time: 0.89 min. (Method 2): Purity: 95.4%; Observed Mass: 525.21; Retention Time: 1.17 min.

Example 80 (15 mg, 0.029 mmol, 15% yield) was isolated as the $2^{nd}$ eluting isomer. $^1$H NMR (500 MHz, DMSO-$d_6$) δ 7.94 (br d, J=8.5 Hz, 2H), 7.85 (d, J=8.5 Hz, 2H), 7.68 (s, 1H), 4.18-4.07 (m, 1H), 3.78-3.66 (m, 1H), 3.49-3.35 (m, 1H), 3.19 (s, 5H), 2.93-2.85 (m, 1H), 2.76-2.62 (m, 2H), 2.38-2.28 (m, 1H), 2.03 (br s, 4H), 1.91 (br s, 3H), 1.86-1.49 (m, 11H), 1.25 (br s, 3H), 0.87 (br d, J=6.4 Hz, 6H). Analytical LC/MS (Method 1): Purity: 91.7%; Observed Mass: 525.21; Retention Time: 0.89 min. (Method 2): Purity: 90.7%; Observed Mass: 525.21; Retention Time: 1.41 min.

Examples 81 and 82

(6S)-6-(1-(8-isobutyl-8-azabicyclo[3.2.1]octan-3-yl) piperidin-4-yl)-2-(4-(methylsulfonyl)phenyl)-5,6,7, 8-tetrahydroimidazo[1,2-a]pyridine (absolute stereochemistry arbitrarily drawn)

(81-82)

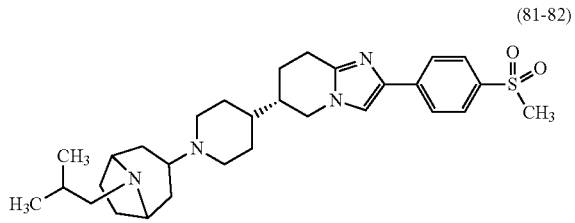 [SMILES: CC(C)CN1C2CCC1CC(N1CCC([C@@H]3CCc4nc(-c5ccc(S(C)(=O)=O)cc5)cn4C3)CC1)C2]

Step A. Intermediate 81A. Preparation of (S)-2-(4-(methylsulfonyl)phenyl)-6-(piperidin-4-yl)-5,6,7,8-tetrahydroimidazo[1,2-a]pyridine (absolute stereochemistry arbitrarily drawn)

(81A)

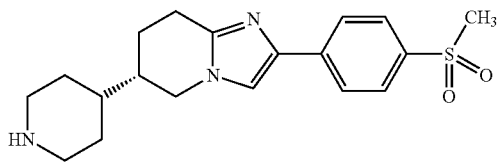

Intermediate 81A was obtained as the $2^{nd}$ eluting enantiomer of the chiral separation of Intermediate 79B (0.85 g, 2.4 mmol) by SFC-chiral chromatography with the following conditions: Instrument: Berger SFC; Column: Chiral OD, 30×250 mm. 5 micron; Mobile Phase: 70% $CO_2$/30% EtOH w/0.1% DEA; Flow Conditions: 85 mL/min.; Detector Wavelength: 220 nm; Injection Details: 650 μL, 850 mg dissolved in 30 mL EtOH-DEA. Fractions containing the desired product were combined and dried via centrifugal evaporation to afford the title compound (0.35 g, 0.97 mmol, 41% yield) as a pale yellow solid. $^1$H NMR (500 MHz, METHANOL-$d_4$) δ 7.98-7.89 (m, 4H), 7.58-7.52 (m, 1H), 4.29-4.16 (m, 1H), 3.87-3.70 (m, 1H), 3.14 (s, 5H), 3.07-3.00 (m, 1H), 2.86-2.75 (m, 1H), 2.67-2.58 (m, 2H), 2.24-2.18 (m, 1H), 1.94-1.86 (m, 2H), 1.81-1.75 (m, 1H), 1.74-1.62 (m, 1H), 1.59-1.50 (m, 1H), 1.43-1.33 (m, 2H). Analytical LC/MS (Method 4): Observed Mass: 360.0; Retention Time: 0.824 min. Chiral analytical (SFC Method 9): Purity: >99%; Retention Time: 16.21 min.

Step B. Intermediate 81B. Preparation of (6S)-6-(1-(8-azabicyclo[3.2.1]octan-3-yl) piperidin-4-yl)-2-(4-(methylsulfonyl)phenyl)-5,6,7,8-tetrahydroimidazo [1,2-a]pyridine dihydrochloride (absolute stereochemistry arbitrarily drawn)

(81B)

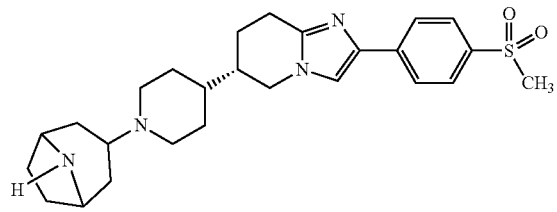

Intermediate 81B was synthesized according to methods described for the preparation of Intermediate 75B, using Intermediate 81A (0.35 g, 0.97 mmol) as starting material to afford the title compound (0.52 g, 0.96 mmol, 99% yield) as a pale yellow solid. $^1$H NMR (500 MHz, METHANOL-$d_4$) δ 8.15-8.08 (m, 2H), 8.02-7.94 (m, 3H), 4.47-4.41 (m, 1H), 4.29-4.17 (m, 3H), 4.12-4.05 (m, 5H), 4.02-3.94 (m, 2H), 3.76-3.70 (m, 2H), 3.37 (s, 4H), 3.16-3.08 (m, 3H), 2.14-2.08 (m, 7H), 1.89-1.83 (m, 3H). Analytical LC/MS (Method 4): Observed Mass: 469.1; Retention Time: 0.826 min.

Step C. Examples 81 and 82

Examples 81 and 81 were synthesized according to methods described for the preparation of Examples 75 and 76, using Intermediate 81B (100 mg, 0.19 mmol) as starting material. The crude isomeric mixture was purified via preparative HPLC with the following conditions: Column: XBridge C18, 200 mm×19 mm, 5-μm particles; Mobile Phase A: 5:95 acetonitrile:water with ammonium acetate; Mobile Phase B: 95:5 acetonitrile:water with ammonium acetate; Gradient: a 0-minute hold at 0% B, 0-30% B over 20 minutes, then a 0-minute hold at 100% B; Flow Rate: 20 mL/min; Column Temperature: 25° C. Fraction collection was triggered by MS signals. Fractions corresponding to the respective desired products were combined and dried via centrifugal evaporation.

Example 81 (1.1 mg, 0.0021 mmol, 1% yield) was isolated as the $1^{st}$ eluting isomer. $^1$H NMR (500 MHz, DMSO-$d_6$) δ 8.00-7.95 (m, 4H), 7.94-7.91 (m, 1H), 4.26-4.19 (m, 1H), 4.17-4.06 (m, 2H), 3.90-3.77 (m, 1H), 3.50-3.36 (m, 1H), 3.23 (s, 2H), 3.10-2.78 (m, 4H), 2.39-1.82 (m, 15H), 1.74-1.51 (m, 5H), 0.99 (br d, J=6.0 Hz, 6H) (two protons obscured). Analytical LC/MS (Method 1): Purity: 100%; Observed Mass: 525.29; Retention Time: 0.86 min. (Method 2): Purity: 87.3%; Observed Mass: 525.31; Retention Time: 1.19 min.

Example 82 (2.9 mg, 0.0055 mmol, 3% yield) was isolated as the $2^{nd}$ eluting isomer. $^1$H NMR (500 MHz, DMSO-$d_6$) δ 8.07 (s, 1H), 8.01 (br d, J=13.4 Hz, 4H), 4.31-4.20 (m, 1H), 4.02-3.93 (m, 1H), 3.90-3.81 (m, 1H), 3.64-3.43 (m, 1H), 3.25 (s, 3H), 3.16-3.06 (m, 1H), 2.99 (s, 2H), 2.77 (br s, 4H), 2.31-2.18 (m, 2H), 2.16-1.86 (m, 9H), 1.77-1.48 (m, 4H), 0.97 (br d, J=6.4 Hz, 6H) (four protons obscured). Analytical LC/MS (Method 1): Purity: 100%; Observed Mass: 524.97; Retention Time: 0.8 min. (Method 2): Purity: 95.6%; Observed Mass: 525.30; Retention Time: 1.42 min.

The following Examples were prepared according to the general methods described herein using appropriate starting materials, reagents and conditions.

| Ex. No. | Structure | Method |
|---|---|---|
| 83 | (1st eluting isomer) | Ex. 62 |
| 84 | (2nd eluting isomer) | Ex. 62 |
| 85 | (1st eluting isomer) | Ex. 62 |

| | | |
|---|---|---|
| 86 | 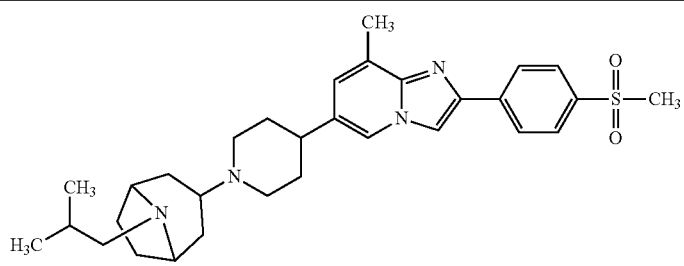<br>2<sup>nd</sup> eluting isomer | Ex. 62 |
| 87 | 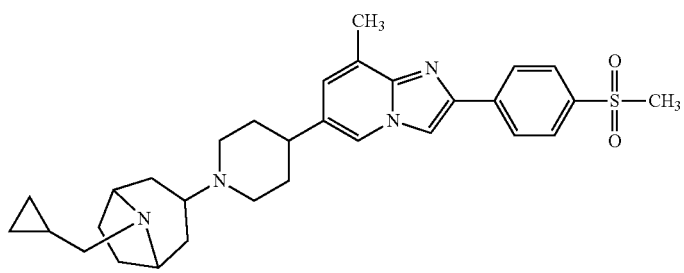 [SMILES: Cc1cc(C2CCN(C3CC4CCC(C3)N4CC3CC3)CC2)cn2cc(-c3ccc(S(C)(=O)=O)cc3)nc12]<br>1<sup>st</sup> eluting isomer | Ex. 62 |
| 88 | 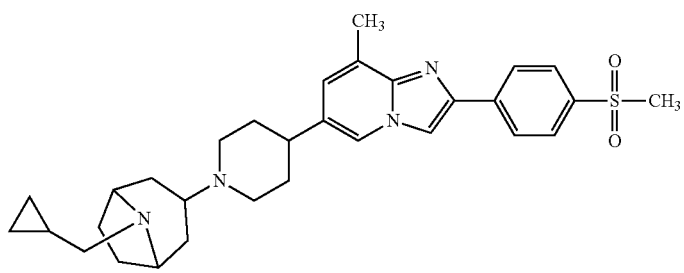 [SMILES: Cc1cc(C2CCN(C3CC4CCC(C3)N4CC3CC3)CC2)cn2cc(-c3ccc(S(C)(=O)=O)cc3)nc12]<br>2<sup>nd</sup> eluting isomer | Ex. 62 |
| 89 | 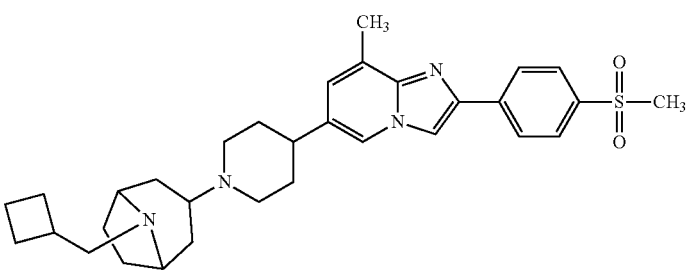 [SMILES: Cc1cc(C2CCN(C3CC4CCC(C3)N4CC3CCC3)CC2)cn2cc(-c3ccc(S(C)(=O)=O)cc3)nc12]<br>1<sup>st</sup> eluting isomer | Ex. 62 |
| 90 | 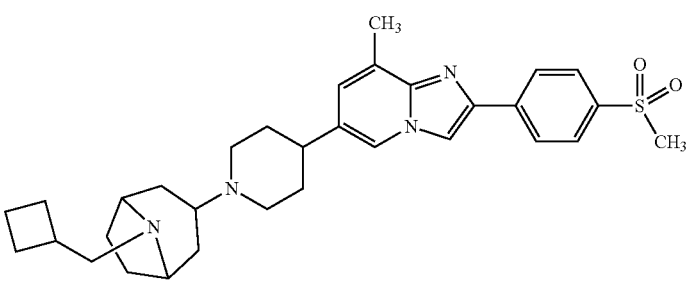 [SMILES: Cc1cc(C2CCN(C3CC4CCC(C3)N4CC3CCC3)CC2)cn2cc(-c3ccc(S(C)(=O)=O)cc3)nc12]<br>2<sup>nd</sup> eluting isomer | Ex. 62 |

-continued
| | | |
|---|---|---|
| 91 | 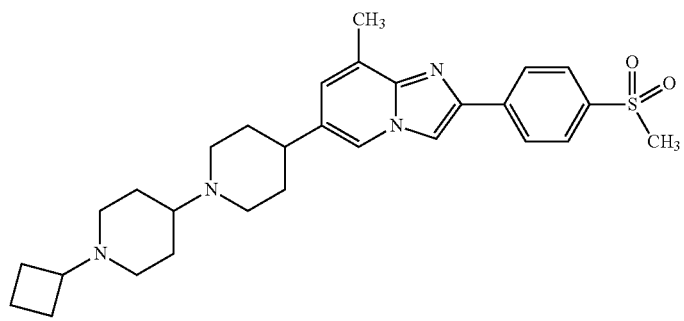 [SMILES: Cc1cc(C2CCN(C3CCN(C4CCC4)CC3)CC2)cn2cc(-c3ccc(S(C)(=O)=O)cc3)nc12] | Ex. 7 |
| 92 | 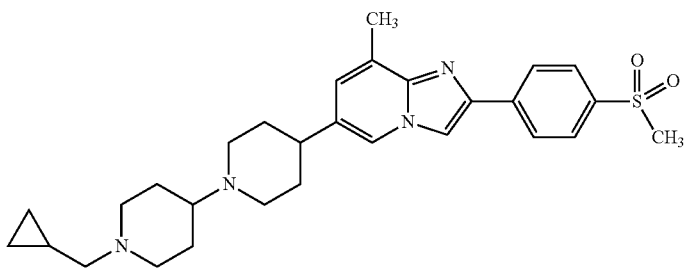 [SMILES: Cc1cc(C2CCN(C3CCN(CC4CC4)CC3)CC2)cn2cc(-c3ccc(S(C)(=O)=O)cc3)nc12] | Ex. 7 |
| 93 | 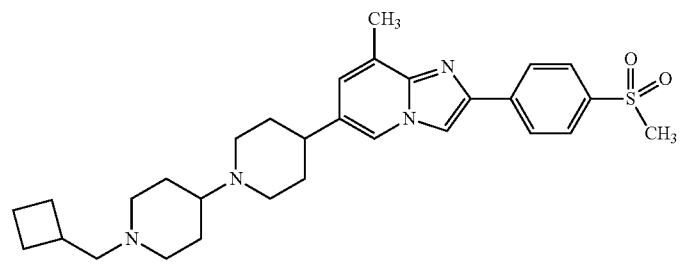 [SMILES: Cc1cc(C2CCN(C3CCN(CC4CCC4)CC3)CC2)cn2cc(-c3ccc(S(C)(=O)=O)cc3)nc12] | Ex. 7 |
| 94 | 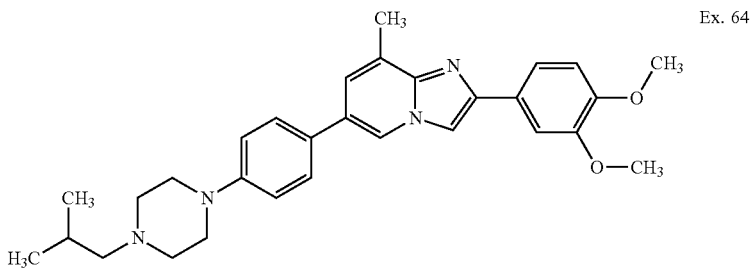 | Ex. 64 |
| 95 | 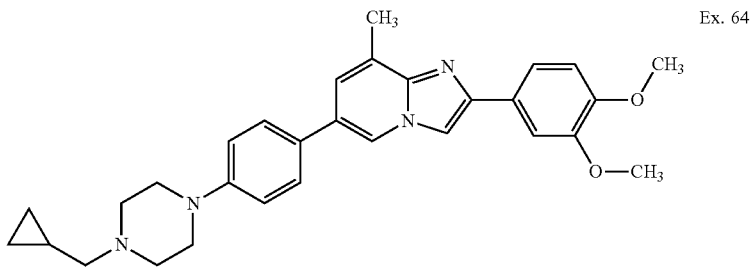 | Ex. 64 |

-continued
| | | |
|---|---|---|
| 96 | 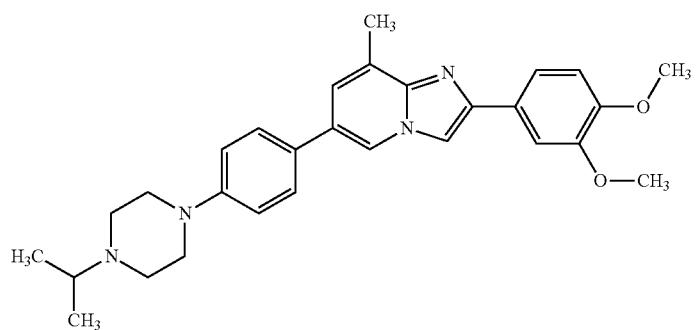 [SMILES: COc1ccc(-c2cn3cc(-c4ccc(N5CCN(C(C)C)CC5)cc4)cc(C)c3n2)cc1OC] | Ex. 64 |
| 97 | 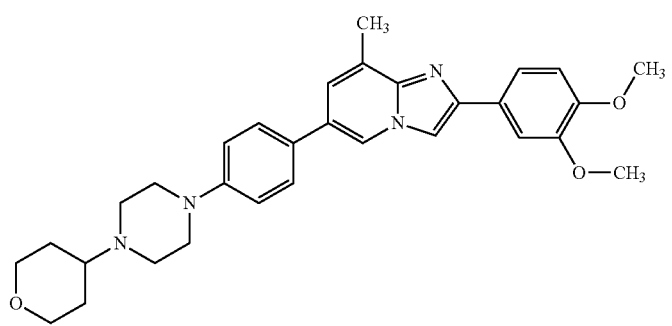 [SMILES: COc1ccc(-c2cn3cc(-c4ccc(N5CCN(C6CCOCC6)CC5)cc4)cc(C)c3n2)cc1OC] | Ex. 64 |
| 98 | 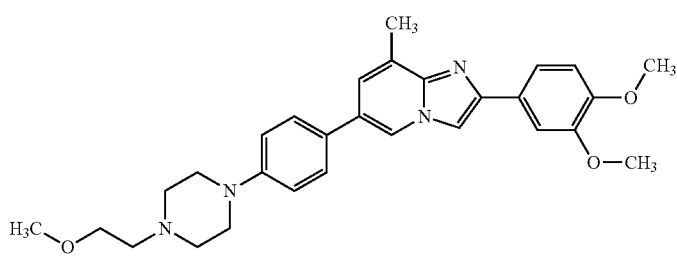 | Ex. 64 |
| 99 | 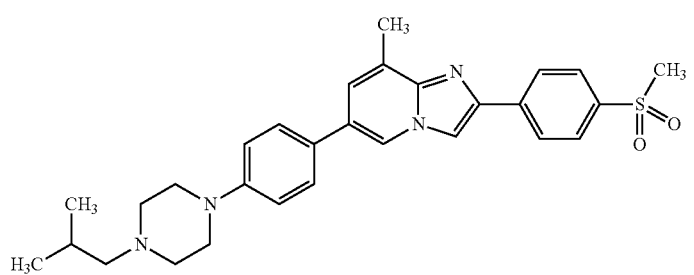 [SMILES: Cc1cc(-c2ccc(N3CCN(CC(C)C)CC3)cc2)cn2cc(-c3ccc(S(C)(=O)=O)cc3)nc12] | Ex. 65 |
| 100 | 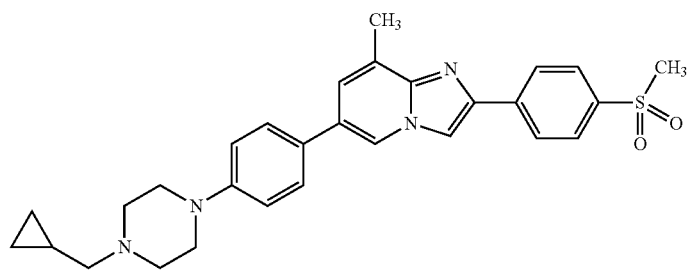 [SMILES: Cc1cc(-c2ccc(N3CCN(CC4CC4)CC3)cc2)cn2cc(-c3ccc(S(C)(=O)=O)cc3)nc12] | Ex. 65 |

-continued
| | | |
|---|---|---|
| 101 | 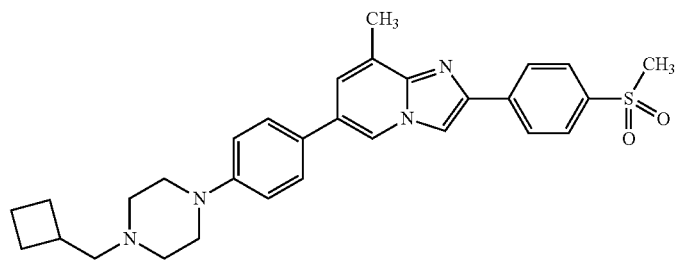 [SMILES: Cc1cc(-c2ccc(N3CCN(CC4CCC4)CC3)cc2)cn2cc(-c3ccc(S(C)(=O)=O)cc3)nc12] | Ex. 65 |
| 102 | 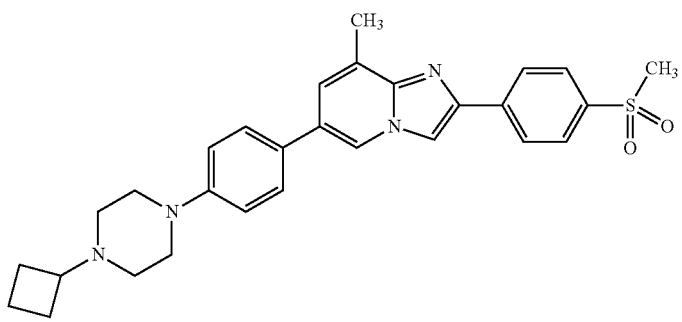 [SMILES: Cc1cc(-c2ccc(N3CCN(C4CCC4)CC3)cc2)cn2cc(-c3ccc(S(C)(=O)=O)cc3)nc12] | Ex. 65 |
| 103 | 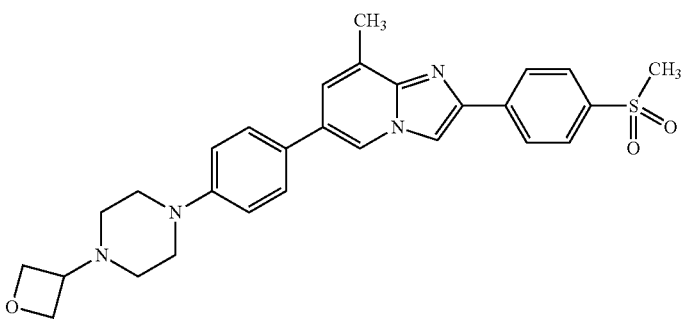 [SMILES: Cc1cc(-c2ccc(N3CCN(C4COC4)CC3)cc2)cn2cc(-c3ccc(S(C)(=O)=O)cc3)nc12] | Ex. 65 |
| 104 | 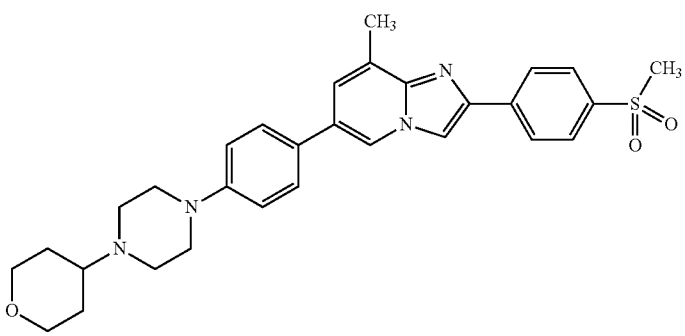 [SMILES: Cc1cc(-c2ccc(N3CCN(C4CCOCC4)CC3)cc2)cn2cc(-c3ccc(S(C)(=O)=O)cc3)nc12] | Ex. 65 |
| 105 | 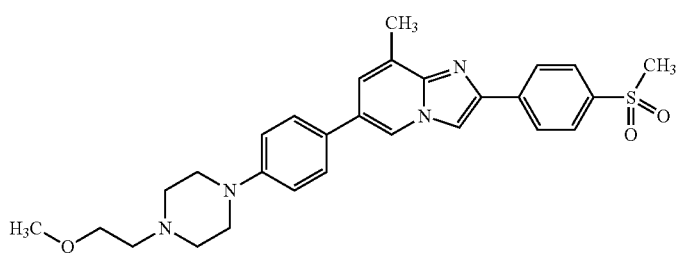 [SMILES: COCCN1CCN(c2ccc(-c3cc(C)c4nc(-c5ccc(S(C)(=O)=O)cc5)cn4c3)cc2)CC1] | Ex. 65 |

-continued
| 106 | 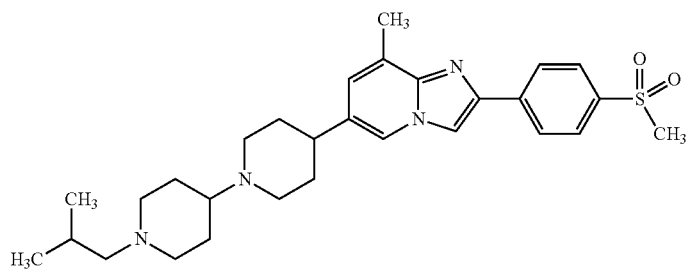 [SMILES: Cc1cc(C2CCN(C3CCN(CC(C)C)CC3)CC2)cn2cc(-c3ccc(S(C)(=O)=O)cc3)nc12] | Ex. 66 |
| 107 | 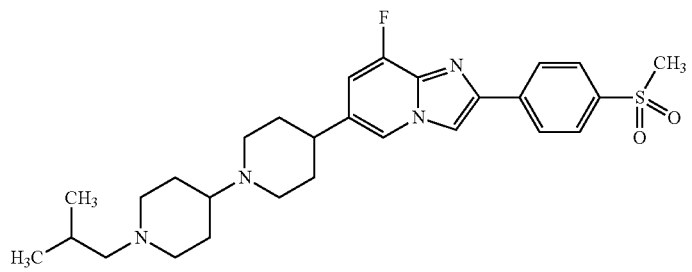 [SMILES: CC(C)CN1CCC(N2CCC(c3cc(F)c4nc(-c5ccc(S(C)(=O)=O)cc5)cn4c3)CC2)CC1] | Ex. 67 |
| 108 | 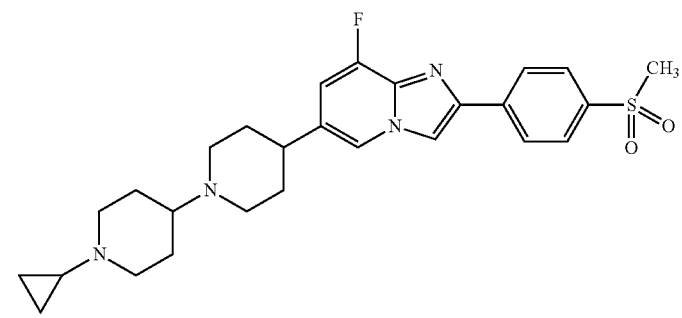 [SMILES: CS(=O)(=O)c1ccc(-c2cn3cc(C4CCN(C5CCN(C6CC6)CC5)CC4)cc(F)c3n2)cc1] | Ex. 67 |
| 109 | 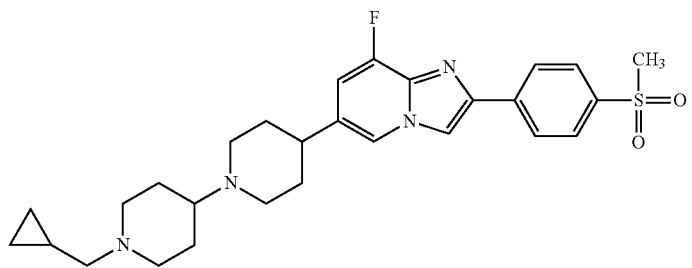 [SMILES: CS(=O)(=O)c1ccc(-c2cn3cc(C4CCN(C5CCN(CC6CC6)CC5)CC4)cc(F)c3n2)cc1] | Ex. 67 |
| 110 | 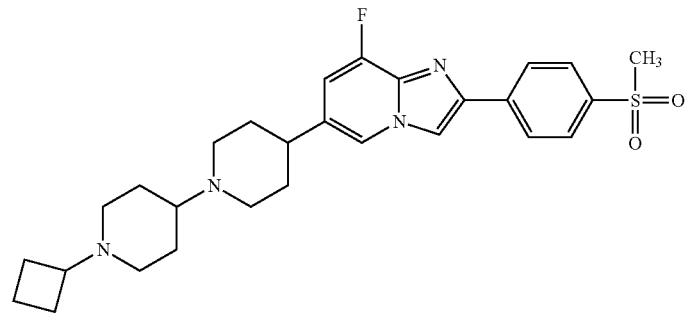 [SMILES: CS(=O)(=O)c1ccc(-c2cn3cc(C4CCN(C5CCN(C6CCC6)CC5)CC4)cc(F)c3n2)cc1] | Ex. 67 |

| | | |
|---|---|---|
| 111 | 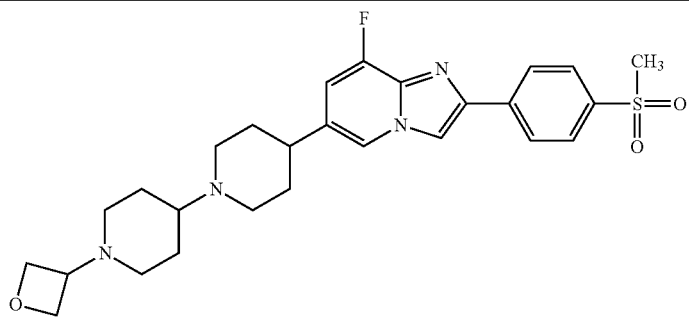 | Ex. 67 |
| 112 | 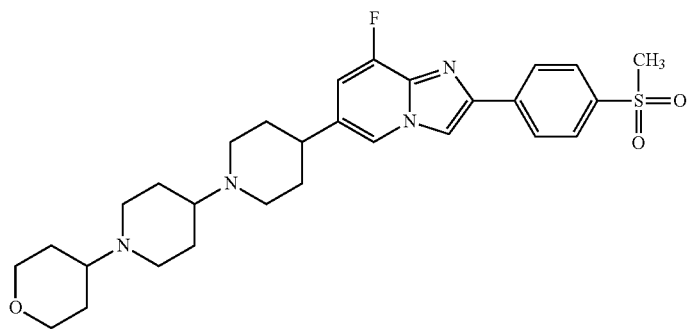 [SMILES: CS(=O)(=O)c1ccc(-c2cn3cc(C4CCN(C5CCN(C6CCOCC6)CC5)CC4)cc(F)c3n2)cc1] | Ex. 67 |
| 113 | 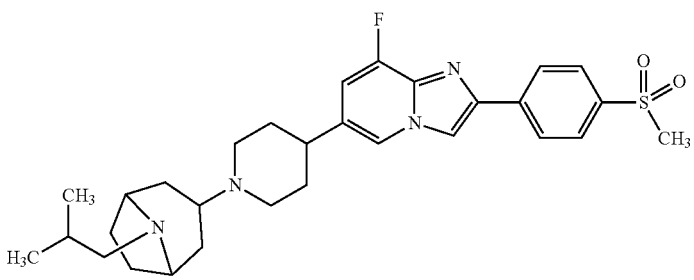 [SMILES: CC(C)CN1C2CCC1CC(N1CCC(c3cc(F)c4nc(-c5ccc(S(C)(=O)=O)cc5)cn4c3)CC1)C2]
1st eluting isomer | Ex. 68 |
| 114 | 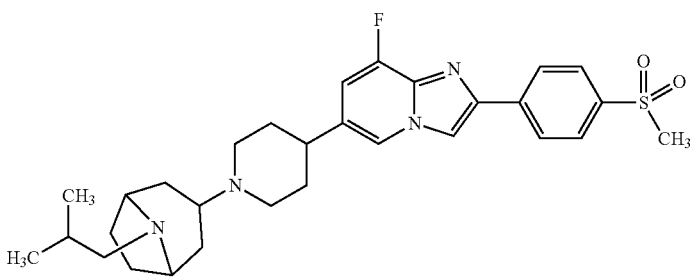 [SMILES: CC(C)CN1C2CCC1CC(N1CCC(c3cc(F)c4nc(-c5ccc(S(C)(=O)=O)cc5)cn4c3)CC1)C2]
2nd eluting isomer | Ex. 68 |
| 115 | 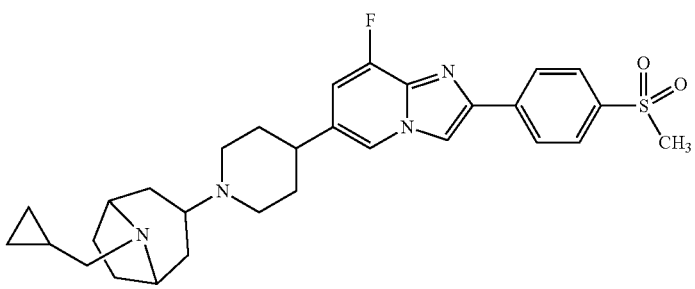 [SMILES: CS(=O)(=O)c1ccc(-c2cn3cc(C4CCN(C5CC6CCC(C5)N6CC5CC5)CC4)cc(F)c3n2)cc1]
1st eluting isomer | Ex. 68 |

| | | |
|---|---|---|
| 116 | 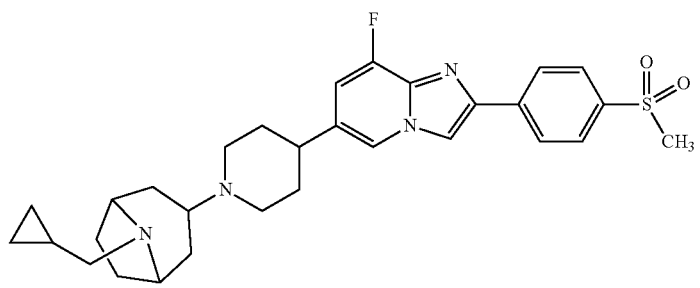 [SMILES: CS(=O)(=O)c1ccc(-c2cn3cc(C4CCN(C5CC6CCC(C5)N6CC5CC5)CC4)cc(F)c3n2)cc1]<br>2nd eluting isomer | Ex. 68 |
| 117 | 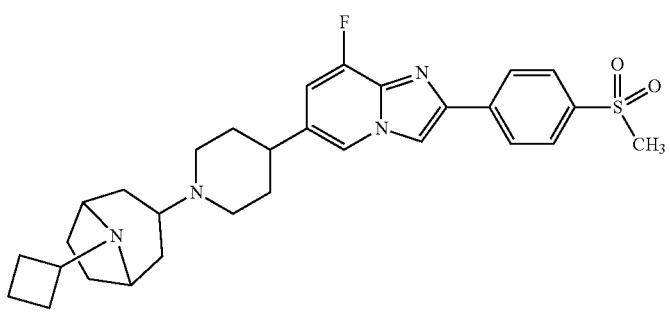 [SMILES: CS(=O)(=O)c1ccc(-c2cn3cc(C4CCN(C5CC6CCC(C5)N6C5CCC5)CC4)cc(F)c3n2)cc1]<br>1st eluting isomer | Ex. 68 |
| 118 | 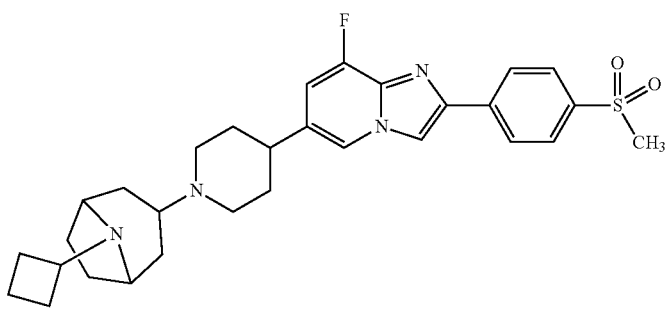 [SMILES: CS(=O)(=O)c1ccc(-c2cn3cc(C4CCN(C5CC6CCC(C5)N6C5CCC5)CC4)cc(F)c3n2)cc1]<br>2nd eluting isomer | Ex. 68 |
| 119 | 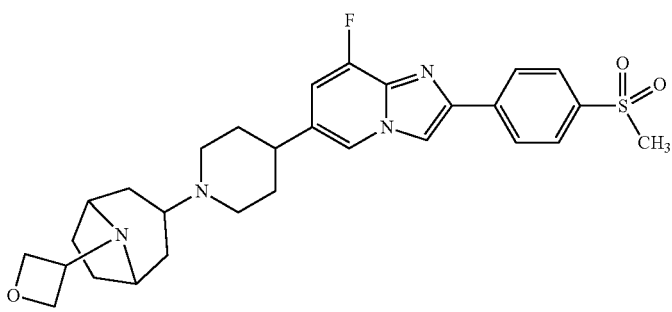 [SMILES: CS(=O)(=O)c1ccc(-c2cn3cc(C4CCN(C5CC6CCC(C5)N6C5COC5)CC4)cc(F)c3n2)cc1]<br>1st eluting isomer | Ex. 68 |

| 120 | 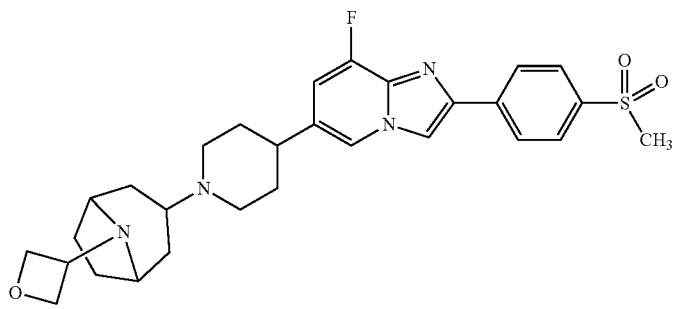 [SMILES: CS(=O)(=O)c1ccc(-c2cn3cc(C4CCN(C5CC6CCC(C5)N6C5COC5)CC4)cc(F)c3n2)cc1] | Ex. 68 |
2<sup>nd</sup> eluting isomer
| 121 | 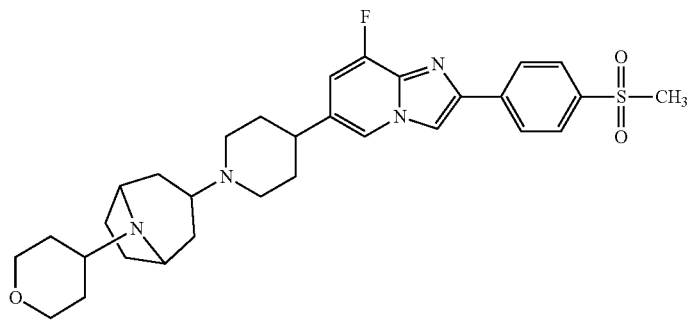 [SMILES: CS(=O)(=O)c1ccc(-c2cn3cc(C4CCN(C5CC6CCC(C5)N6C5CCOCC5)CC4)cc(F)c3n2)cc1] | Ex. 68 |
1<sup>st</sup> eluting isomer
| 122 | 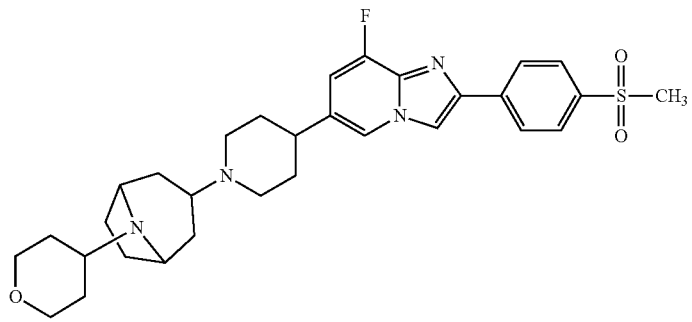 [SMILES: CS(=O)(=O)c1ccc(-c2cn3cc(C4CCN(C5CC6CCC(C5)N6C5CCOCC5)CC4)cc(F)c3n2)cc1] | Ex. 68 |
2<sup>nd</sup> eluting isomer
| 123 | 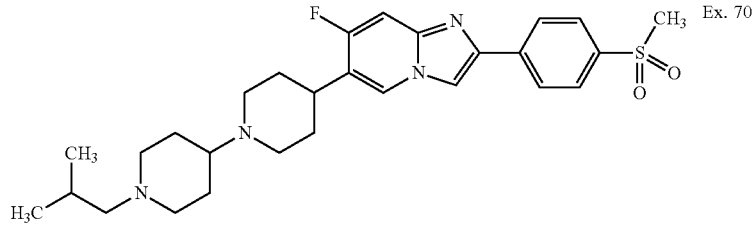 | Ex. 70 |
| 124 | 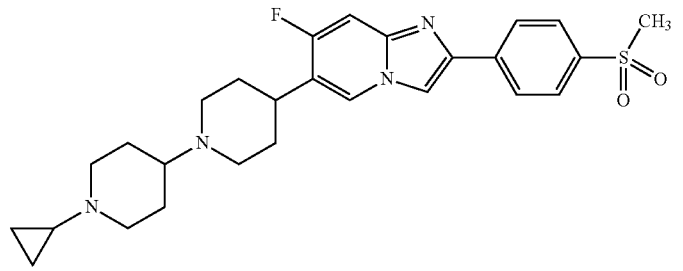 [SMILES: CS(=O)(=O)c1ccc(-c2cn3cc(C4CCN(C5CCN(C6CC6)CC5)CC4)c(F)cc3n2)cc1] | Ex. 70 |

| 125 | 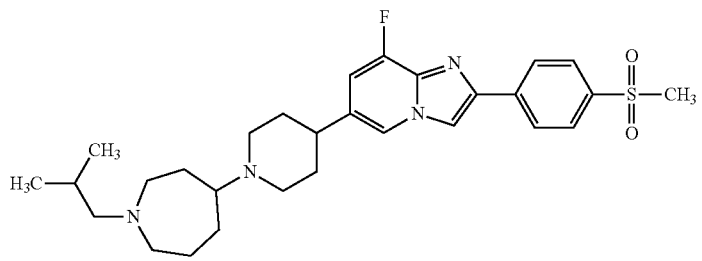 [SMILES: CC(C)CN1CCCC(N2CCC(c3cc(F)c4nc(-c5ccc(S(C)(=O)=O)cc5)cn4c3)CC2)CC1] 1st eluting enantiomer | Ex. 71 |
| 126 | 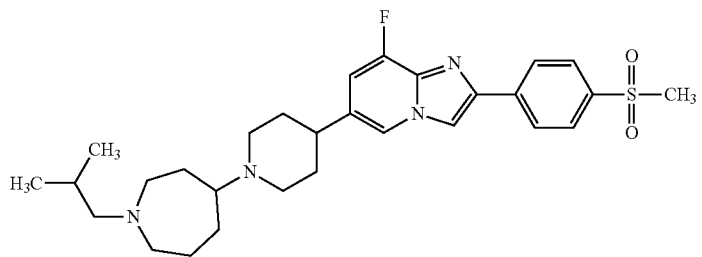 [SMILES: CC(C)CN1CCCC(N2CCC(c3cc(F)c4nc(-c5ccc(S(C)(=O)=O)cc5)cn4c3)CC2)CC1] 2nd eluting enantiomer | Ex. 71 |
| 127 | 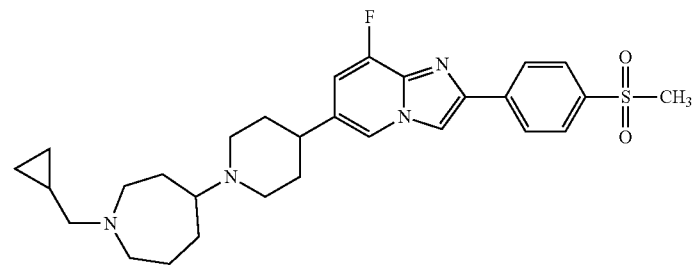 [SMILES: CS(=O)(=O)c1ccc(-c2cn3cc(C4CCN(C5CCCN(CC6CC6)CC5)CC4)cc(F)c3n2)cc1] 1st eluting enantiomer | Ex. 71 |
| 128 | 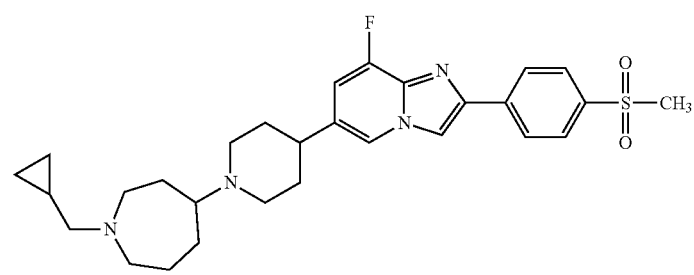 [SMILES: CS(=O)(=O)c1ccc(-c2cn3cc(C4CCN(C5CCCN(CC6CC6)CC5)CC4)cc(F)c3n2)cc1] 2nd eluting enantiomer | Ex. 71 |
| 129 | 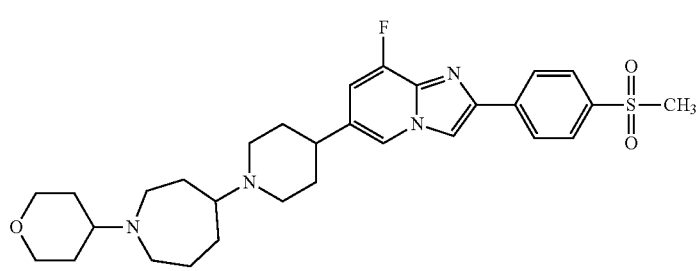 [SMILES: CS(=O)(=O)c1ccc(-c2cn3cc(C4CCN(C5CCCN(C6CCOCC6)CC5)CC4)cc(F)c3n2)cc1] 1st eluting enantiomer | Ex. 71 |

-continued
| | | |
|---|---|---|
| 130 | 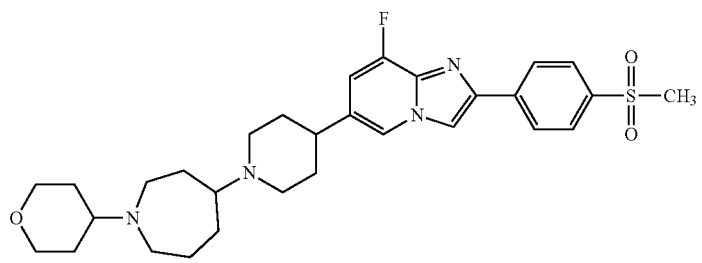 [SMILES: CS(=O)(=O)c1ccc(-c2cn3cc(C4CCN(C5CCCN(C6CCOCC6)CC5)CC4)cc(F)c3n2)cc1] 2<sup>nd</sup> eluting enantiomer | Ex. 71 |
| 131 | 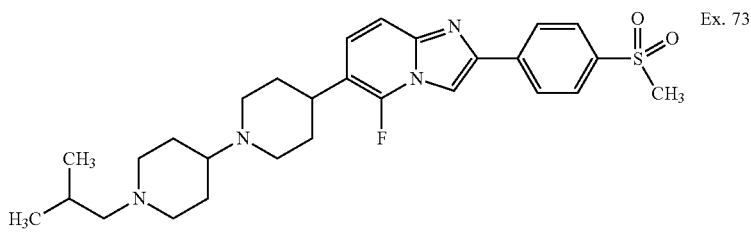 | Ex. 73 |
| 132 | 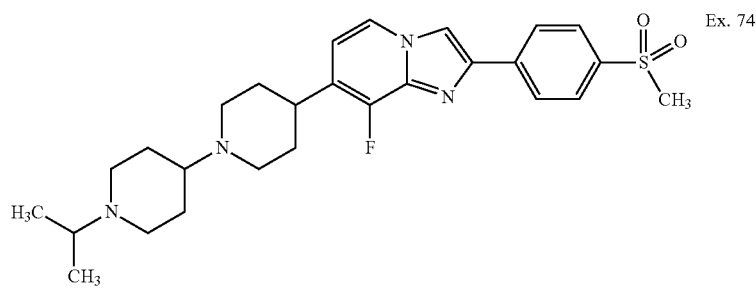 | Ex. 74 |
| 133 | 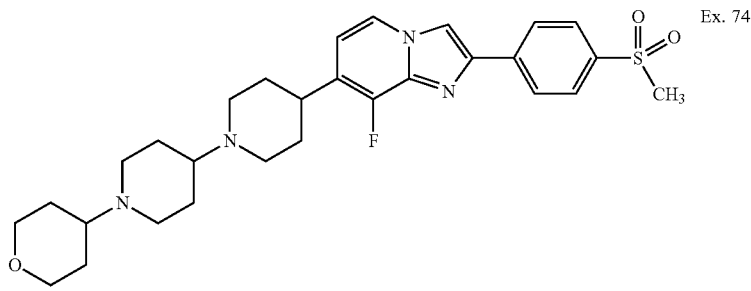 | Ex. 74 |
| 134 | 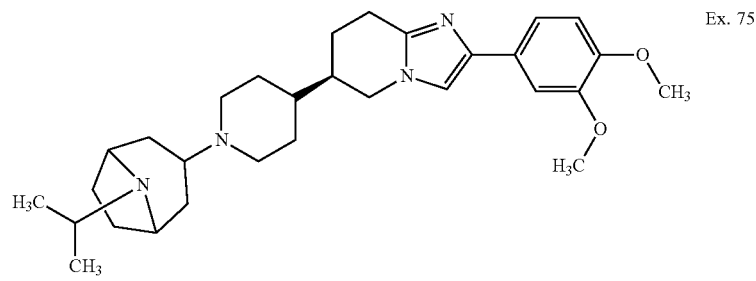 1<sup>st</sup> eluting isomer (absolute stereochemistry arbitrarily drawn) | Ex. 75 |

| | | |
|---|---|---|
| 135 | 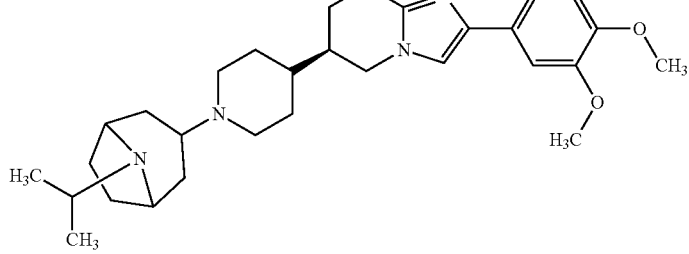<br>2ⁿᵈ eluting isomer (absolute stereochemistry arbitrarily drawn) | Ex. 75 |
| 136 | 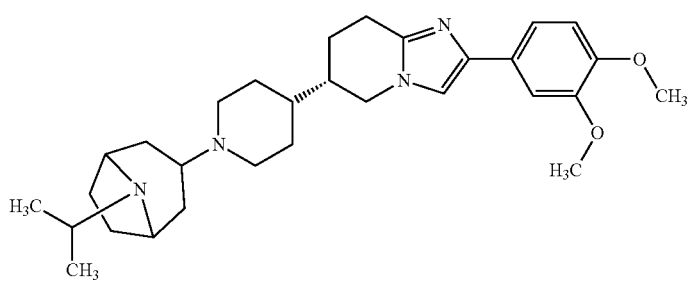 [SMILES: COc1ccc(-c2cn3c(n2)CC[C@@H](C2CCN(C4CC5CCC(C4)N5C(C)C)CC2)C3)cc1OC]<br>1ˢᵗ eluting isomer(absolute chemistry arbitrarily drawn) | Ex. 77 |
| 137 | 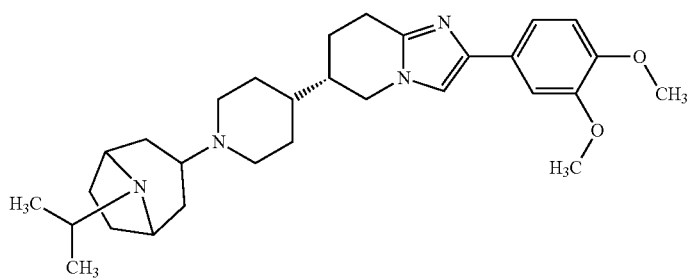 [SMILES: COc1ccc(-c2cn3c(n2)CC[C@@H](C2CCN(C4CC5CCC(C4)N5C(C)C)CC2)C3)cc1OC]<br>2ⁿᵈ eluting isomer(absolute chemistry arbitrarily drawn) | Ex. 77 |
| 138 | 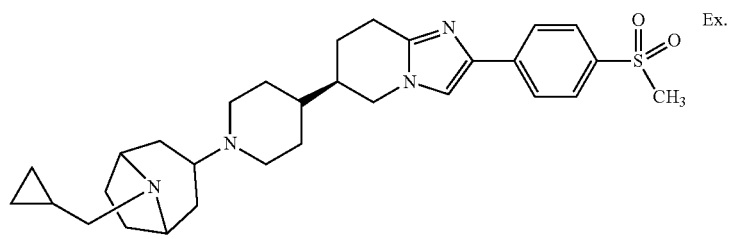<br>1ˢᵗ eluting isomer (absolute stereochemistry arbitrarily drawn) | Ex. 79 |
| 139 | 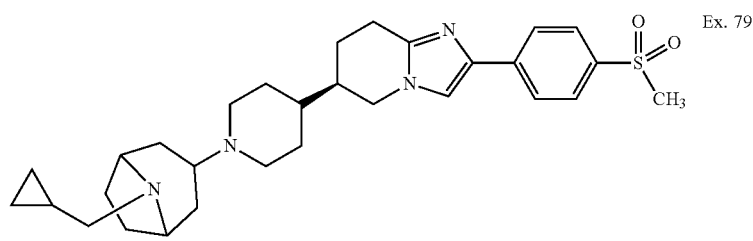<br>2ⁿᵈ eluting isomer (absolute stereochemistry arbitrarily drawn) | Ex. 79 |

| 140 | 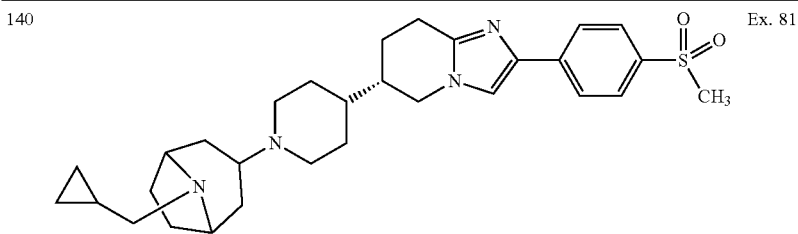 | Ex. 81 |

1st eluting isomer (absolute stereochemistry arbitrarily drawn)

| 141 | 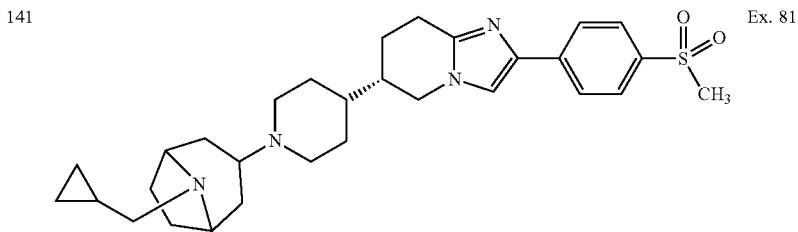 | Ex. 81 |

2nd eluting isomer (absolute stereochemistry arbitrarily drawn)

| Ex. No. | Analytical LC/MS, Preparative HPLC method, yield, and $^1$H NMR |
|---|---|
| 83 | Analytical LC/MS (Method 1): Purity: 100%; Observed Mass: 532.94; Retention Time: 0.93 min. (Method 2): Purity: 97.2%; Observed Mass: 533.00; Retention Time: 1.35 min. Prep Method 1: 13 mg, 14% yield; $^1$H NMR (500 MHz, DMSO-$d_6$) δ 8.48-8.43 (m, 1H), 8.26-8.16 (m, 3H), 8.02-7.91 (m, 2H), 7.17-7.04 (m, 1H), 3.72-3.42 (m, 4H), 3.37-3.28 (m, 2H), 3.22 (s, 3H), 3.19-3.11 (m, 1H), 3.04-2.93 (m, 2H), 2.74-2.59 (m, 2H), 2.49-2.43 (m, 1H), 2.29-2.16 (m, 2H), 2.08-1.96 (m, 3H), 1.85-1.77 (m, 4H), 1.62 (br s, 9H). |
| 84 | Analytical LC/MS (Method 1): Purity: 90.8%; Observed Mass: 532.99; Retention Time: 0.93 min. (Method 2): Purity: 95%; Observed Mass: 533.29; Retention Time: 1.54 min. Prep Method 1: 8.8 mg, 9% yield; $^1$H NMR (500 MHz, DMSO-$d_6$) δ 8.50-8.42 (m, 1H), 8.29-8.15 (m, 3H), 8.02-7.91 (m, 2H), 7.17-7.03 (m, 1H), 3.64-3.41 (m, 3H), 3.28-3.14 (m, 6H), 3.08-2.96 (m, 1H), 2.50-2.44 (m, 1H), 2.41-2.32 (m, 1H), 2.03-1.73 (m, 16H), 1.71-1.54 (m, 5H). |
| 85 | Analytical LC/MS (Method 1): Purity: 100%; Observed Mass: 534.99; Retention Time: 0.94 min. (Method 2): Purity: 98.3%; Observed Mass: 535.29; Retention Time: 1.39 min. Prep Method 1: 23 mg, 26% yield; $^1$H NMR (500 MHz, DMSO-$d_6$) δ 8.54-8.43 (m, 1H), 8.26-8.16 (m, 3H), 8.04-7.93 (m, 2H), 7.20-7.01 (m, 1H), 3.48-3.36 (m, 1H), 3.23 (s, 2H), 3.21-3.14 (m, 2H), 3.02-2.90 (m, 2H), 2.49-2.42 (m, 1H), 2.11 (br d, J = 7.0 Hz, 5H), 1.95-1.90 (m, 1H), 1.82 (br s, 4H), 1.69-1.46 (m, 10H), 0.91-0.86 (m, 6H) (one proton obscured). |
| 86 | Analytical LC/MS (Method 1): Purity: 97.6%; Observed Mass: 535.30; Retention Time: 0.89 min. (Method 2): Purity: 96.9%; Observed Mass: 534.98; Retention Time: 1.49 min. Prep Method 1: 14 mg, 16% yield; $^1$H NMR (500 MHz, DMSO-$d_6$) δ 8.55-8.42 (m, 1H), 8.31-8.14 (m, 3H), 8.06-7.92 (m, 2H), 7.18-7.01 (m, 1H), 3.24 (s, 3H), 3.11-3.01 (m, 2H), 2.50-2.44 (m, 2H), 2.42-2.34 (m, 1H), 2.02-1.52 (m, 20H), 0.88 (br d, J = 6.4 Hz, 6H) (one proton obscured). |
| 87 | Analytical LC/MS (Method 1): Purity: 100%; Observed Mass: 533.26; Retention Time: 0.93 min. (Method 2): Purity: 100%; Observed Mass: 533.28; Retention Time: 1.33 min. Prep Method 1: 16 mg, 16% yield; $^1$H NMR (500 MHz, DMSO-$d_6$) δ 8.40-8.32 (m, 1H), 8.16-8.05 (m, 3H), 7.91-7.83 (m, 2H), 7.04-6.94 (m, 1H), 3.40-3.26 (m, 1H), 3.13 (s, 2H), 2.93-2.80 (m, 2H), 2.59-2.47 (m, 1H), 2.39-2.28 (m, 1H), 2.23-2.15 (m, 2H), 2.12-2.01 (m, 2H), 1.86-1.66 (m, 6H), 1.59-1.38 (m, 8H), 0.78-0.68 (m, 1H), 0.42-0.29 (m, 2H), 0.08--0.09 (m, 2H) (three protons obscured). |
| 88 | Analytical LC/MS (Method 1): Purity: 98.1%; Observed Mass: 532.95; Retention Time: 0.88 min. (Method 2): Purity: 97.6%; Observed Mass: 533.02; Retention Time: 1.53 min. Prep Method 1: 13 mg, 15% yield; $^1$H NMR (500 MHz, DMSO-$d_6$) δ 8.39-8.29 (m, 1H), 8.15-8.04 (m, 3H), 7.91-7.75 (m, 2H), 7.04-6.91 (m, 1H), 3.48-3.36 (m, 1H), 3.32-3.21 (m, 1H), 3.11 (s, 4H), 2.38-2.29 (m, 1H), 2.27-2.20 (m, 1H), 2.19-2.12 (m, 2H), 1.91-1.63 (m, 14H), 1.56-1.42 (m, 2H), 0.84-0.70 (m, 1H), 0.44-0.29 (m, 2H), 0.01 (br d, J = 4.3 Hz, 2H) (two protons obscured). |
| 89 | Analytical LC/MS (Method 1): Purity: 100%; Observed Mass: 547.01; Retention Time: 0.95 min. (Method 2): Purity: 100%; Observed Mass: 547.01; Retention Time: 1.41 min. Prep Method 1: 24 mg, 27% yield; $^1$H NMR (500 MHz, DMSO-$d_6$) δ 8.46 (s, 1H), 8.26-8.12 (m, 3H), 7.97 (br d, J = 8.5 Hz, 2H), 7.08 (s, 1H), 3.65-3.46 (m, 2H), 3.45-3.34 (m, 1H), 3.22 (s, 3H), 3.11-3.03 (m, 1H), 3.01-2.92 (m, 2H), 2.61-2.54 (m, 4H), 2.49-2.35 (m, 5H), 2.23-2.11 (m, 2H), 2.08-1.73 (m, 8H), 1.73-1.48 (m, 5H), 1.40 (br d, J = 7.6 Hz, 2H). |
| 90 | Analytical LC/MS (Method 1): Purity: 100%; Observed Mass: 547.03; Retention Time: 0.97 min. (Method 2): Purity: 100%; Observed Mass: 547.00; Retention Time: 1.66 min. Prep Method 1: 8.7 mg, 10% yield; $^1$H NMR (500 MHz, DMSO-$d_6$) δ 8.46 (s, 1H), 8.28-8.14 (m, 3H), 7.97 (br d, J = 8.5 Hz, 2H), 7.09 (s, 1H), 3.70-3.53 (m, 9H), 3.22 (s, 6H), 2.48-2.32 (m, 4H), 2.07-1.90 (m, 5H), 1.83 (br s, 7H), 1.70-1.57 (m, 4H). |

-continued

| | |
|---|---|
| 91 | Analytical LC/MS (Method 1): Purity: 100%; Observed Mass: 507.30; Retention Time: 0.84 min. (Method 2): Purity: 100%; Observed Mass: 507.00; Retention Time: 1.32 min. Prep Method 2: 67 mg, 74% yield; $^1$H NMR (500 MHz, DMSO-$d_6$) δ 8.67-8.56 (m, 1H), 8.38-8.29 (m, 1H), 8.28-8.16 (m, 2H), 8.07-7.88 (m, 2H), 7.26-7.13 (m, 1H), 3.66-3.57 (m, 1H), 3.26 (s, 2H), 3.22-3.12 (m, 1H), 3.01-2.91 (m, 1H), 2.89-2.79 (m, 1H), 2.59-2.50 (m, 11H), 2.43-2.30 (m, 2H), 2.22 (br d, J = 6.7 Hz, 6H), 2.06-1.86 (m, 3H), 1.84-1.62 (m, 2H) (one proton obscured). |
| 92 | Analytical LC/MS (Method 1): Purity: 100%; Observed Mass: 506.97; Retention Time: 0.85 min. (Method 2): Purity: 100%; Observed Mass: 507.29; Retention Time: 1.13 min. Prep Method 2: 72 mg, 79% yield; $^1$H NMR (500 MHz, DMSO-$d_6$) δ 8.70-8.53 (m, 1H), 8.39-8.28 (m, 1H), 8.26-8.18 (m, 2H), 8.05-7.95 (m, 2H), 7.29-7.09 (m, 1H), 3.80-3.46 (m, 2H), 3.26 (s, 2H), 3.22-3.14 (m, 1H), 3.08-2.92 (m, 4H), 2.64-2.48 (m, 10H), 2.45-2.27 (m, 2H), 2.26-2.12 (m, 2H), 2.09-1.85 (m, 3H), 1.22-0.94 (m, 1H), 0.67 (br d, J = 7.3 Hz, 2H), 0.39 (br d, J = 4.3 Hz, 2H). |
| 93 | Analytical LC/MS (Method 1): Purity: 100%; Observed Mass: 521.34; Retention Time: 0.89 min. (Method 2): Purity: 97.9%; Observed Mass: 521.00; Retention Time: 1.23 min. Prep Method 1: 63 mg, 96% yield; $^1$H NMR (500 MHz, DMSO-$d_6$) δ 8.47 (s, 1H), 8.21 (br d, J = 9.2 Hz, 3H), 7.97 (br d, J = 8.2 Hz, 2H), 7.09 (s, 1H), 3.57-3.35 (m, 3H), 3.23 (s, 3H), 3.05-2.92 (m, 2H), 2.89-2.77 (m, 2H), 2.47 (br s, 2H), 2.35-2.17 (m, 5H), 2.07-1.94 (m, 2H), 1.62 (br s, 12H), 1.51-1.36 (m, 2H). |
| 94 | Analytical LC/MS (Method 1): Purity: 99%; Observed Mass: 485.23; Retention Time: 1.27 min. (Method 2): Purity: 98.6%; Observed Mass: 485.46; Retention Time: 2.33 min. Prep Method 2: 60 mg, 65% yield; $^1$H NMR (500 MHz, DMSO-$d_6$) δ 8.89-8.82 (m, 1H), 8.58-8.48 (m, 1H), 7.87-7.80 (m, 1H), 7.72-7.67 (m, 2H), 7.60-7.58 (m, 1H), 7.21-7.10 (m, 4H), 3.97-3.87 (m, 1H), 3.67-3.28 (m, 3H), 3.23-3.13 (m, 1H), 3.09-2.99 (m, 2H), 2.67 (s, 3H), 2.55 (s, 3H), 2.51 (br d, J = 1.6 Hz, 6H), 2.22-2.06 (m, 1H), 1.00 (d, J = 6.6 Hz, 6H). |
| 95 | Analytical LC/MS (Method 1): Purity: 98.9%; Observed Mass: 482.90; Retention Time: 1.28 min. (Method 2): Purity: 100%; Observed Mass: 482.94; Retention Time: 1.95 min. Prep Method 1: 32 mg, 51% yield; $^1$H NMR (500 MHz, DMSO-$d_6$) δ 8.56-8.39 (m, 1H), 8.22-8.09 (m, 1H), 7.46-7.38 (m, 4H), 7.32-7.21 (m, 1H), 6.93 (dd, J = 8.5, 4.3 Hz, 3H), 3.76 (s, 3H), 3.69 (s, 3H), 3.36-3.24 (m, 1H), 3.11 (br s, 2H), 2.51-2.49 (m, 3H), 2.48 (s , 3H), 2.42-2.38 (m, 2H), 2.20-2.09 (m, 2H), 0.83-0.73 (m, 1H), 0.45-0.35 (m, 2H), 0.04--0.02 (m, 2H). |
| 96 | Analytical LC/MS (Method 1): Purity: 95.5%; Observed Mass: 471.17; Retention Time: 1.24 min. (Method 2): Purity: 96.7%; Observed Mass: 471.17; Retention Time: 1.78 min. Prep Method 1: 47 mg, 72% yield; $^1$H NMR (500 MHz, DMSO-$d_6$) δ 8.62-8.53 (m, 1H), 8.30 (s, 1H), 7.59-7.53 (m, 4H), 7.44-7.33 (m, 1H), 7.04 (dd, J = 8.4, 4.4 Hz, 3H), 3.88 (s, 3H), 3.82 (s, 3H), 3.54-3.35 (m, 1H), 3.19 (br d, J = 4.0 Hz, 3H), 2.77-2.64 (m, 1H), 2.61 (s, 7H), 1.03 (d, J = 6.7 Hz, 6H). |
| 97 | Analytical LC/MS (Method 1): Purity: 98.2%; Observed Mass: 513.23; Retention Time: 1.18 min. (Method 2): Purity: 100%; Observed Mass: 512.96; Retention Time: 1.88 min. Prep Method 1: 11 mg, 17% yield; $^1$H NMR (500 MHz, DMSO-$d_6$) δ 8.60-8.55 (m, 1H), 8.33-8.25 (m, 2H), 7.59-7.55 (m, 2H), 7.54-7.49 (m, 1H), 7.42-7.32 (m, 2H), 7.07-7.00 (m, 2H), 3.93-3.87 (m, 2H), 3.86-3.77 (m, 4H), 3.19 (br s, 6H), 2.69-2.54 (m, 9H), 1.81-1.73 (m, 3H), 1.46-1.40 (m, 2H). |
| 98 | Analytical LC/MS (Method 1): Purity: 98.9%; Observed Mass: 487.26; Retention Time: 1.18 min. (Method 2): Purity: 97.6%; Observed Mass: 487.32; Retention Time: 1.89 min. Prep Method 1: 41 mg, 68% yield; $^1$H NMR (500 MHz, DMSO-$d_6$) δ 8.62-8.51 (m, 1H), 8.29 (s, 1H), 7.60-7.49 (m, 4H), 7.43-7.33 (m, 1H), 7.09-6.98 (m, 3H), 3.86 (s, 3H), 3.80 (s, 3H), 3.64-3.45 (m, 3H), 3.25 (s, 3H), 2.64-2.47 (m, 12H). |
| 99 | Analytical LC/MS (Method 1): Purity: 99.3%; Observed Mass: 502.96; Retention Time: 1.09 min. (Method 2): Purity: 98.6%; Observed Mass: 503.16; Retention Time: 2.33 min. Prep Method 1: 28 mg, 41% yield; $^1$H NMR (500 MHz, DMSO-$d_6$) δ 8.69-8.60 (m, 1H), 8.58-8.47 (m, 1H), 8.28-8.19 (m, 2H), 8.05-7.92 (m, 2H), 7.57 (br d, J = 8.5 Hz, 2H), 7.45 (s, 1H), 7.03 (br d, J = 8.5 Hz, 2H), 3.68-3.49 (m, 3H), 3.23 (s, 3H), 3.20-3.15 (m, 3H), 2.60 (s, 3H), 2.53-2.51 (m, 2H), 2.13-2.05 (m, 2H), 1.87-1.75 (m, 1H), 0.88 (d, J = 6.7 Hz, 6H). |
| 100 | Analytical LC/MS (Method 1): Purity: 99%; Observed Mass: 501.21; Retention Time: 1.13 min. (Method 2): Purity: 97.7%; Observed Mass: 501.18; Retention Time: 1.89 min. Prep Method 1: 25 mg, 36% yield; $^1$H NMR (500 MHz, DMSO-$d_6$) δ 8.54-8.48 (m, 1H), 8.43-8.35 (m, 1H), 8.14-8.03 (m, 2H), 7.88-7.78 (m, 2H), 7.47-7.41 (m, 2H), 7.34-7.25 (m, 1H), 6.97-6.87 (m, 2H), 3.32-3.17 (m, 2H), 3.09 (s, 3H), 2.68-2.53 (m, 2H), 2.45 (s, 3H), 2.39 (s, 2H), 2.29-2.16 (m, 2H), 1.16-1.03 (m, 1H), 0.87-0.70 (m, 2H), 0.40-0.32 (m, 2H), 0.07--0.02 (m, 2H). |
| 101 | Analytical LC/MS (Method 1): Purity: 96.8%; Observed Mass: 515.23; Retention Time: 1.19 min. (Method 2): Purity: 96.6%; Observed Mass: 515.22; Retention Time: 1.95 min. Prep Method 1: 41 mg, 57% yield; $^1$H NMR (500 MHz, DMSO-$d_6$) δ 8.67-8.61 (m, 1H), 8.57-8.50 (m, 1H), 8.28-8.20 (m, 2H), 8.02-7.95 (m, 2H), 7.60-7.55 (m, 2H), 7.50-7.43 (m, 1H), 7.10-7.02 (m, 2H), 3.64-3.45 (m, 6H), 3.28-3.15 (m, 6H), 2.48-2.44 (m, 1H), 2.08-1.95 (m, 3H), 1.94-1.63 (m, 7H). |
| 102 | Analytical LC/MS (Method 1): Purity: 100%; Observed Mass: 501.27; Retention Time: 1.13 min. (Method 2): Purity: 97%; Observed Mass: 500.98; Retention Time: 2.07 min. Prep Method 1: 35 mg, 51% yield; $^1$H NMR (500 MHz, DMSO-$d_6$) δ 8.63 (s, 1H), 8.53 (s, 1H), 8.23 (br d, J = 8.5 Hz, 2H), 7.98 (d, J = 8.2 Hz, 2H), 7.57 (br d, J = 8.5 Hz, 2H), 7.44 (s, 1H), 7.02 (br d, J = 8.9 Hz, 2H), 3.69-3.56 (m, 3H), 3.23 (s, 3H), 3.21-3.15 (m, 3H), 2.78-2.68 (m, 1H), 2.52-2.50 (m, 1H), 2.39 (br s, 4H), 2.02-1.94 (m, 2H), 1.88-1.78 (m, 2H), 1.70-1.59 (m, 2H). |
| 103 | Analytical LC/MS (Method 1): Purity: 100%; Observed Mass: 502.92; Retention Time: 1.04 min. (Method 2): Purity: 96.7%; Observed Mass: 502.94; Retention Time: 1.76 min. Prep Method 1: 40 mg, 58% yield; $^1$H NMR (500 MHz, DMSO-$d_6$) δ 8.68-8.62 (m, 1H), 8.55-8.50 (m, 1H), 8.26-8.17 (m, 2H), 8.04-7.94 (m, 2H), 7.65-7.55 (m, 2H), 7.49-7.37 (m, 1H), 7.12-6.98 (m, 2H), 4.58 (s, 2H), 4.49 (s, 2H), 3.56-3.42 (m, 1H), 3.24 (s, 5H), 2.61 (s, 3H), 2.52 (br s, 2H), 2.43 (br s, 4H). |
| 104 | Analytical LC/MS (Method 1): Purity: 99.2%; Observed Mass: 530.99; Retention Time: 1.02 min. (Method 2): Purity: 99%; Observed Mass: 531.20; Retention Time: 1.72 min. Prep Method 1: 36 mg, 50% yield; $^1$H NMR (500 MHz, DMSO-$d_6$) δ 8.66-8.60 (m, 1H), 8.58-8.50 (m, 1H), 8.29-8.19 (m, 2H), 8.04-7.95 (m, 2H), 7.61-7.54 (m, 2H), 7.48-7.39 (m, 1H), 7.09-6.96 (m, 2H), 3.95-3.83 (m, 2H), 3.55-3.37 (m, 2H), 3.24 (s, 4H), 3.19 (br s, 3H), 2.66-2.58 (m, 7H), 2.48-2.35 (m, 1H), 1.79-1.70 (m, 2H), 1.49-1.35 (m, 2H). |

| | |
|---|---|
| 105 | Analytical LC/MS (Method 1): Purity: 100%; Observed Mass: 505.17; Retention Time: 1.05 min. (Method 2): Purity: 98.9%; Observed Mass: 505.12; Retention Time: 1.74 min. Prep Method 1: 38 mg, 55% yield; $^1$H NMR (500 MHz, DMSO-$d_6$) δ 8.66-8.61 (m, 1H), 8.55-8.47 (m, 1H), 8.26-8.20 (m, 2H), 7.99 (d, J = 8.5 Hz, 2H), 7.58 (br d, J = 8.5 Hz, 2H), 7.47-7.37 (m, 1H), 7.04 (br d, J = 8.9 Hz, 2H), 3.54-3.38 (m, 1H), 3.25 (d, J = 8.2 Hz, 4H), 3.22-3.14 (m, 2H), 2.60 (s, 11H) (three protons obscured). |
| 106 | Analytical LC/MS (Method 1): Purity: 94.8%; Observed Mass: 509.27; Retention Time: 0.9 min. (Method 2): Purity: 97.6%; Observed Mass: 509.27; Retention Time: 1.26 min. Prep Method 1: 15 mg, 22% yield; $^1$H NMR (500 MHz, DMSO-$d_6$) δ 8.48 (s, 1H), 8.26 (br d, J = 8.5 Hz, 2H), 7.98 (d, J = 8.5 Hz, 2H), 7.30 (s, 1H), 6.80 (s, 1H), 3.58-3.35 (m, 3H), 3.24 (s, 3H), 3.12-3.02 (m, 2H), 2.97-2.87 (m, 2H), 2.63 (s, 3H), 2.44-2.31 (m, 3H), 2.13-2.02 (m, 2H), 1.98-1.82 (m, 3H), 1.77 (br s, 4H), 1.57-1.45 (m, 2H), 0.85 (d, J = 6.4 Hz, 6H). |
| 107 | Analytical LC/MS (Method 1): Purity: 100%; Observed Mass: 513.12; Retention Time: 0.93 min. (Method 2): Purity: 94.9%; Observed Mass: 513.23; Retention Time: 1.43 min. Prep Method 2: 33 mg, 30% yield; $^1$H NMR (500 MHz, DMSO-$d_6$) δ 8.72-8.65 (m, 1H), 8.34-8.29 (m, 1H), 8.26-8.19 (m, 2H), 8.05-7.95 (m, 2H), 7.24-7.14 (m, 1H), 3.77-3.41 (m, 1H), 3.25 (s, 2H), 3.20-2.83 (m, 4H), 2.59-2.48 (m, 7H), 2.36-1.89 (m, 9H), 0.97 (br d, J = 6.7 Hz, 6H) (one proton obscured). |
| 108 | Analytical LC/MS (Method 1): Purity: 98.7%; Observed Mass: 496.91; Retention Time: 0.91 min. (Method 2): Purity: 98.2%; Observed Mass: 497.22; Retention Time: 1.38 min. Prep Method 2: 15 mg, 14% yield; $^1$H NMR (500 MHz, DMSO-$d_6$) δ 8.75-8.66 (m, 1H), 8.34-8.29 (m, 1H), 8.27-8.20 (m, 2H), 8.05-7.96 (m, 2H), 7.24-7.17 (m, 1H), 3.66-3.57 (m, 1H), 3.26 (s, 2H), 3.21-3.08 (m, 1H), 3.02-2.94 (m, 1H), 2.57-2.50 (m, 9H), 2.37-2.25 (m, 2H), 2.24-2.12 (m, 2H), 2.03-1.82 (m, 4H), 0.97-0.89 (m, 2H), 0.87-0.77 (m, 2H). |
| 109 | Analytical LC/MS (Method 1): Purity: 99.3%; Observed Mass: 511.20; Retention Time: 0.81 min. (Method 2): Purity: 98.2%; Observed Mass: 511.30; Retention Time: 1.30 min. Prep Method 1: 48 mg, 49% yield; $^1$H NMR (500 MHz, DMSO-$d_6$) δ 8.59-8.53 (m, 1H), 8.28-8.22 (m, 1H), 8.20-8.14 (m, 2H), 8.00-7.92 (m, 2H), 7.24-7.14 (m, 1H), 3.20 (s, 2H), 3.01-2.86 (m, 4H), 2.19 (br s, 3H), 2.10 (d, J = 6.7 Hz, 2H), 1.88-1.73 (m, 6H), 1.67 (br s, 4H), 1.48-1.37 (m, 2H), 0.85-0.71 (m, 1H), 0.40 (br dd, J = 7.9, 1.2 Hz, 2H), 0.01 (br d, J = 4.6 Hz, 2H). |
| 110 | Analytical LC/MS (Method 1): Purity: 100%; Observed Mass: 511.20; Retention Time: 0.97 min. (Method 2): Purity: 97.4%; Observed Mass: 511.20; Retention Time: 1.31 min. Prep Method 1: 48 mg, 49% yield; $^1$H NMR (500 MHz, DMSO-$d_6$) δ 8.65-8.59 (m, 1H), 8.32-8.26 (m, 1H), 8.23 (d, J = 8.2 Hz, 2H), 8.00 (d, J = 8.5 Hz, 2H), 7.21 (br d, J = 3.4 Hz, 1H), 3.25 (s, 2H), 3.18 (s, 1H), 3.03-2.96 (m, 2H), 2.89-2.81 (m, 2H), 2.73-2.64 (m, 1H), 2.31-2.22 (m, 3H), 1.92 (s, 6H), 1.88-1.56 (m, 9H), 1.51-1.35 (m, 2H). |
| 111 | Analytical LC/MS (Method 1): Purity: 100%; Observed Mass: 513.10; Retention Time: 0.96 min. (Method 2): Purity: 97.8%; Observed Mass: 513.30; Retention Time: 1.19 min. Prep Method 1: 33 mg, 33% yield; $^1$H NMR (500 MHz, DMSO-$d_6$) δ 8.63-8.60 (m, 1H), 8.30-8.28 (m, 1H), 8.26-8.20 (m, 2H), 8.02-7.97 (m, 2H), 7.27-7.22 (m, 1H), 4.53-4.49 (m, 2H), 4.43-4.38 (m, 2H), 3.23 (s, 3H), 3.20-3.16 (m, 1H), 3.02-2.95 (m, 3H), 2.83-2.71 (m, 4H), 2.67-2.63 (m, 1H), 2.41-2.36 (m, 1H), 2.31-2.20 (m, 4H), 1.87-1.81 (m, 5H). |
| 112 | Analytical LC/MS (Method 1): Purity: 96.9%; Observed Mass: 541.10; Retention Time: 0.96 min. (Method 2): Purity: 100%; Observed Mass: 541.30; Retention Time: 1.19 min. Prep Method 1: 52 mg, 50% yield; $^1$H NMR (500 MHz, DMSO-$d_6$) δ 8.65-8.60 (m, 1H), 8.33-8.28 (m, 1H), 8.26-8.21 (m, 2H), 8.05-7.98 (m, 2H), 7.27-7.19 (m, 1H), 3.90 (s, 3H), 3.24 (s, 4H), 2.79-2.68 (m, 2H), 2.45-2.34 (m, 2H), 1.91 (s, 10H), 1.80-1.44 (m, 9H). |
| 113 | Analytical LC/MS (Method 1): Purity: 99%; Observed Mass: 539.20; Retention Time: 1.03 min. (Method 2): Purity: 97.3%; Observed Mass: 539.30; Retention Time: 1.26 min. Prep Method 1: 14 mg, 14% yield; $^1$H NMR (500 MHz, DMSO-$d_6$) δ 8.65-8.58 (m, 1H), 8.29-8.27 (m, 1H), 8.25-8.20 (m, 2H), 8.04-7.96 (m, 2H), 7.29-7.18 (m, 1H), 3.25 (s, 4H), 3.05-2.96 (m, 2H), 2.63-2.57 (m, 1H), 2.36-2.31 (m, 1H), 2.15 (br d, J = 7.3 Hz, 4H), 1.94-1.79 (m, 7H), 1.68-1.48 (m, 7H), 0.95-0.83 (m, 6H). |
| 114 | Analytical LC/MS (Method 1): Purity: 98.9%; Observed Mass: 539.20; Retention Time: 1.02 min. (Method 2): Purity: 96%; Observed Mass: 539.30; Retention Time: 1.5 min. Prep Method 1: 9.2 mg, 9% yield; $^1$H NMR (500 MHz, DMSO-$d_6$) δ 8.68-8.57 (m, 1H), 8.33-8.26 (m, 1H), 8.25-8.20 (m, 2H), 8.04-7.93 (m, 2H), 7.32-7.18 (m, 1H), 3.25 (s, 4H), 2.44-2.32 (m, 1H), 2.12 (br d, J = 7.0 Hz, 2H), 1.97 (br s, 2H), 1.94-1.57 (m, 17H), 0.89 (d, J = 6.4 Hz, 6H). |
| 115 | Analytical LC/MS (Method 1): Purity: 100%; Observed Mass: 537.30; Retention Time: 1.06 min. (Method 2): Purity: 100%; Observed Mass: 537.40; Retention Time: 1.28 min. Prep Method 1: 11 mg, 11% yield; $^1$H NMR (500 MHz, DMSO-$d_6$) δ 8.49-8.43 (m, 1H), 8.15-8.10 (m, 1H), 8.08-8.05 (m, 2H), 7.87-7.81 (m, 2H), 7.14-7.03 (m, 1H), 3.08 (s, 2H), 2.86-2.79 (m, 2H), 2.58-2.48 (m, 1H), 2.26 (br d, J = 6.4 Hz, 2H), 2.08-2.00 (m, 2H), 1.74 (s, 6H), 1.71-1.64 (m, 2H), 1.56 (br s, 2H), 1.46 (br d, J = 8.5 Hz, 5H), 0.79-0.68 (m, 1H), 0.32 (br d, J = 7.9 Hz, 2H), 0.01 (br d, J = 4.6 Hz, 2H) (one proton obscured). |
| 116 | Analytical LC/MS (Method 1): Purity: 95.8%; Observed Mass: 537.20; Retention Time: 0.96 min. (Method 2): Purity: 95.3%; Observed Mass: 537.20; Retention Time: 1.56 min. Prep Method 1: 9.2 mg, 9% yield; $^1$H NMR (500 MHz, DMSO-$d_6$) δ 8.50-8.44 (m, 1H), 8.19-8.13 (m, 1H), 8.11-8.06 (m, 2H), 7.90-7.82 (m, 2H), 7.15-7.07 (m, 1H), 3.10 (s, 3H), 2.43-2.40 (m, 1H), 2.21 (br d, J = 6.4 Hz, 3H), 1.83 (br s, 2H), 1.78-1.61 (m, 12H), 1.49 (br d, J = 9.5 Hz, 3H), 0.78-0.70 (m, 1H), 0.33 (br d, J = 7.6 Hz, 2H), 0.01 (br d, J = 4.0 Hz, 2H) (one proton obscured). |
| 117 | Analytical LC/MS (Method 1): Purity: 100%; Observed Mass: 537.30; Retention Time: 1.05 min. (Method 2): Purity: 100%; Observed Mass: 537.40; Retention Time: 1.27 min. Prep Method 1: 13 mg, 13% yield; $^1$H NMR (500 MHz, DMSO-$d_6$) δ 8.64-8.57 (m, 1H), 8.31-8.26 (m, 1H), 8.25-8.19 (m, 2H), 8.04-7.95 (m, 2H), 7.28-7.19 (m, 1H), 3.36-3.29 (m, 1H), 3.24 (s, 2H), 3.20-3.12 (m, 1H), 3.02-2.94 (m, 2H), 2.71-2.62 (m, 1H), 2.26-2.16 (m, 2H), 2.09-1.98 (m, 2H), 1.93-1.78 (m, 10H), 1.73-1.52 (m, 9H). |
| 118 | Analytical LC/MS (Method 1): Purity: 97.7%; Observed Mass: 537.30; Retention Time: 1.05 min. (Method 2): Purity: 99.4%; Observed Mass: 537.30; Retention Time: 1.45 min. Prep Method 1: 9.2 mg, 9% yield; $^1$H NMR (500 MHz, DMSO-$d_6$) δ 8.67-8.56 (m, 1H), 8.35-8.28 (m, 1H), 8.25- |

| | |
|---|---|
| | 8.20 (m, 2H), 8.05-7.95 (m, 2H), 7.28-7.18 (m, 1H), 3.25 (s, 4H), 3.15-3.03 (m, 1H), 2.39-2.32 (m, 1H), 2.04-1.75 (m, 19H), 1.73-1.56 (m, 4H) (one proton obscured). |
| 119 | Analytical LC/MS (Method 1): Purity: 94%; Observed Mass: 539.40; Retention Time: 0.96 min. (Method 2): Purity: 92.9%; Observed Mass: 539.30; Retention Time: 1.24 min. Prep Method 1: 5.3 mg, 5% yield; $^1$H NMR (500 MHz, DMSO-$d_6$) δ 8.65-8.59 (m, 1H), 8.33-8.27 (m, 1H), 8.25-8.21 (m, 2H), 8.03-7.96 (m, 2H), 7.32-7.18 (m, 1H), 4.56 (s, 2H), 4.32 (s, 2H), 3.70-3.61 (m, 1H), 3.25 (s, 2H), 3.17-3.07 (m, 2H), 3.07-2.93 (m, 2H), 2.73-2.59 (m, 1H), 2.30-2.17 (m, 2H), 1.97-1.73 (m, 7H), 1.70-1.47 (m, 7H). |
| 120 | Analytical LC/MS (Method 1): Purity: 89.8%; Observed Mass: 539.40; Retention Time: 0.97 min. (Method 2): Purity: 100%; Observed Mass: 539.30; Retention Time: 1.25 min. Prep Method 1: 6.1 mg, 6% yield; $^1$H NMR (500 MHz, DMSO-$d_6$) δ 8.66-8.58 (m, 1H), 8.32-8.27 (m, 1H), 8.26-8.19 (m, 2H), 8.06-7.94 (m, 2H), 7.30-7.14 (m, 1H), 4.57-4.50 (m, 2H), 4.34-4.21 (m, 2H), 3.60-3.51 (m, 1H), 3.25 (s, 3H), 3.05-2.93 (m, 2H), 2.46-2.37 (m, 1H), 1.97-1.81 (m, 5H), 1.78-1.47 (m, 8H) (four protons obscured). |
| 121 | Analytical LC/MS (Method 1): Purity: 97.2%; Observed Mass: 567.30; Retention Time: 1.04 min. (Method 2): Purity: 100%; Observed Mass: 567.30; Retention Time: 1.21 min. Prep Method 1: 19 mg, 18% yield; $^1$H NMR (500 MHz, DMSO-$d_6$) δ 8.65-8.60 (m, 1H), 8.32-8.26 (m, 1H), 8.25-8.21 (m, 2H), 8.03-7.94 (m, 2H), 7.28-7.21 (m, 1H), 3.91-3.84 (m, 2H), 3.39-3.28 (m, 1H), 3.25 (s, 2H), 3.10-2.99 (m, 2H), 2.79-2.62 (m, 2H), 2.59-2.56 (m, 1H), 2.23-2.12 (m, 2H), 1.91 (s, 4H), 1.88-1.74 (m, 6H), 1.72-1.47 (m, 8H), 1.38-1.24 (m, 2H). |
| 122 | Analytical LC/MS (Method 1): Purity: 100%; Observed Mass: 567.30; Retention Time: 1.03 min. (Method 2): Purity: 100%; Observed Mass: 567.40; Retention Time: 1.35 min. Prep Method 1: 11 mg, 11% yield; $^1$H NMR (500 MHz, DMSO-$d_6$) δ 8.67-8.57 (m, 1H), 8.36-8.29 (m, 1H), 8.25-8.20 (m, 2H), 8.03-7.97 (m, 2H), 7.31-7.21 (m, 1H), 3.91-3.83 (m, 2H), 3.25 (s, 4H), 2.65-2.55 (m, 2H), 2.39-2.33 (m, 1H), 1.98-1.76 (m, 15H), 1.70-1.58 (m, 2H), 1.40-1.27 (m, 2H) (four protons obscured). |
| 123 | Analytical LC/MS (Method 1): Purity: 100%; Observed Mass: 512.97; Retention Time: 0.89 min. (Method 2): Purity: 100%; Observed Mass: 512.96; Retention Time: 1.39 min. Prep Method 1: 31 mg, 35% yield; $^1$H NMR (500 MHz, DMSO-$d_6$) δ 8.54-8.51 (m, 1H), 8.50-8.46 (m, 1H), 8.21-8.14 (m, 2H), 7.98 (br d, J = 8.5 Hz, 2H), 7.50-7.42 (m, 1H), 3.47-3.32 (m, 2H), 3.24 (s, 2H), 3.13-3.01 (m, 1H), 2.99-2.85 (m, 2H), 2.84-2.61 (m, 1H), 2.45-2.29 (m, 3H), 2.15-1.83 (m, 5H), 1.77 (br s, 5H), 1.59-1.43 (m, 3H), 0.86 (br d, J = 6.4 Hz, 6H). |
| 124 | Analytical LC/MS (Method 1): Purity: 100%; Observed Mass: 497.19; Retention Time: 0.78 min. (Method 2): Purity: 100%; Observed Mass: 497.12; Retention Time: 1.29 min. Prep Method 2: 1.5 mg, 1% yield; $^1$H NMR (500 MHz, DMSO-$d_6$) δ 8.58-8.55 (m, 1H), 8.54-8.49 (m, 1H), 8.23-8.17 (m, 2H), 8.04-7.94 (m, 2H), 7.60-7.50 (m, 1H), 3.65-3.51 (m, 1H), 3.48-3.33 (m, 1H), 3.25 (s, 3H), 3.17-3.09 (m, 1H), 3.00 (s, 4H), 2.96-2.81 (m, 1H), 2.44-1.87 (m, 7H), 1.32-1.20 (m, 1H), 0.96-0.69 (m, 4H) (three protons obscured). |
| 125 | Analytical LC/MS (Method 1): Purity: 100%; Observed Mass: 527.20; Retention Time: 1.03 min. (Method 2): Purity: 100%; Observed Mass: 527.20; Retention Time: 1.2 min. Prep Method 1: 23 mg, 11% yield; $^1$H NMR (500 MHz, DMSO-$d_6$) δ 8.67-8.52 (m, 1H), 8.33-8.14 (m, 3H), 8.02-7.95 (m, 2H), 7.30-7.14 (m, 1H), 3.74-3.51 (m, 8H), 3.22 (s, 3H), 2.84 (br d, J = 8.2 Hz, 2H), 2.74-2.59 (m, 2H), 2.33 (br s, 2H), 2.17 (br d, J = 4.6 Hz, 2H), 1.85-1.42 (m, 7H), 0.83 (br d, J = 5.2 Hz, 6H). Chiral analytical (SFC Method 7): Purity: >95%; Retention Time: 10.91 min. |
| 126 | Analytical LC/MS (Method 1): Purity: 97.6%; Observed Mass: 527.20; Retention Time: 1.03 min. (Method 2): Purity: 97.9%; Observed Mass: 527.20; Retention Time: 1.2 min. Prep Method 1: 22 mg, 10% yield; $^1$H NMR (500 MHz, DMSO-$d_6$) δ 8.64-8.54 (m, 1H), 8.29-8.14 (m, 3H), 8.07-7.94 (m, 2H), 7.29-7.12 (m, 1H), 3.66 (br s, 5H), 3.22 (br s, 3H), 2.92-2.79 (m, 2H), 2.55 (br s, 3H), 2.36-2.27 (m, 2H), 2.16 (br d, J = 4.3 Hz, 2H), 1.85-1.72 (m, 4H), 1.71-1.41 (m, 5H), 0.88-0.78 (m, 6H). Chiral analytical (SFC Method 7): Purity: >95%; Retention Time: 15.44 min. |
| 127 | Analytical LC/MS (Method 1): Purity: 98%; Observed Mass: 525.20; Retention Time: 0.93 min. (Method 2): Purity: 95.6%; Observed Mass: 525.30; Retention Time: 1.22 min. Prep Method 1: 5.8 mg, 3% yield; $^1$H NMR (500 MHz, DMSO-$d_6$) δ 8.60-8.49 (m, 1H), 8.23-8.18 (m, 1H), 8.17-8.12 (m, 2H), 7.95-7.86 (m, 2H), 7.21-7.08 (m, 1H), 3.64-3.40 (m, 1H), 3.16 (s, 3H), 2.82-2.68 (m, 3H), 2.58 (br s, 3H), 2.29-2.18 (m, 4H), 1.87-1.36 (m, 11H), 0.75 (br d, J = 6.1 Hz, 1H), 0.41-0.33 (m, 2H), 0.01 (br d, J = 4.9 Hz, 2H). Chiral analytical (SFC Method 4): Purity: >99%; Retention Time: 12.83 min. |
| 128 | Analytical LC/MS (Method 1): Purity: 100%; Observed Mass: 525.10; Retention Time: 1.02 min. (Method 2): Purity: 99.3%; Observed Mass: 525.30; Retention Time: 1.22 min. Prep Method 1: 14 mg, 6% yield; $^1$H NMR (500 MHz, DMSO-$d_6$) δ 8.56 (d, J = 2.4 Hz, 1H), 8.25-8.21 (m, 1H), 8.19-8.13 (m, 2H), 7.97-7.90 (m, 2H), 7.24-7.14 (m, 1H), 3.19 (s, 2H), 2.85-2.75 (m, 2H), 2.56 (br s, 4H), 2.25 (br d, J = 6.1 Hz, 4H), 1.84 (s, 4H), 1.79-1.41 (m, 9H), 0.82-0.73 (m, 1H), 0.38 (br d, J = 7.3 Hz, 2H), 0.01 (br d, J = 4.6 Hz, 2H). Chiral analytical (SFC Method 4): Purity: >95%; Retention Time: 16.01 min. |
| 129 | Analytical LC/MS (Method 1): Purity: 100%; Observed Mass: 555.10; Retention Time: 0.97 min. (Method 2): Purity: 99.2%; Observed Mass: 555.10; Retention Time: 1.18 min. Prep Method 1: 21 mg, 9% yield; $^1$H NMR (500 MHz, DMSO-$d_6$) δ 8.66-8.58 (m, 1H), 8.36-8.20 (m, 3H), 8.08-7.94 (m, 2H), 7.24 (br d, J = 11.9 Hz, 1H), 3.87 (br d, J = 9.5 Hz, 2H), 3.25 (br s, 7H), 2.94-2.81 (m, 2H), 2.78-2.57 (m, 7H), 2.44-2.28 (m, 2H), 1.93-1.34 (m, 12H). Chiral analytical (SFC Method 2): Purity: >95%; Retention Time: 16.52 min. |
| 130 | Analytical LC/MS (Method 1): Purity: 100%; Observed Mass: 555.10; Retention Time: 0.97 min. (Method 2): Purity: 99.2%; Observed Mass: 555.10; Retention Time: 1.18 min. Prep Method 1: 17 mg, 7% yield; $^1$H NMR (500 MHz, DMSO-$d_6$) δ 8.70-8.58 (m, 1H), 8.36-8.20 (m, 3H), 8.07-7.93 (m, 2H), 7.29-7.18 (m, 1H), 3.94-3.81 (m, 2H), 3.56-3.15 (m, 7H), 2.87 (br d, J = 1.8 Hz, 2H), 2.78-2.57 (m, 6H), 2.45-2.29 (m, 2H), 1.93-1.35 (m, 13H). Chiral analytical (SFC Method 2): Purity: >95%; Retention Time: 26.47 min. |

| | |
|---|---|
| 131 | Analytical LC/MS (Method 1): Purity: 100%; Observed Mass: 513.50; Retention Time: 1.06 min. (Method 2): Purity: 100%; Observed Mass: 513.50; Retention Time: 1.7 min. Prep Method 1: 29 mg, 29% yield; $^1$H NMR (500 MHz, DMSO-$d_6$) δ 8.57-8.51 (m, 1H), 8.32-8.27 (m, 1H), 7.87 (br d, J = 7.0 Hz, 2H), 7.48-7.42 (m, 2H), 7.16-7.08 (m, 1H), 3.19 (br d, J = 5.2 Hz, 5H), 3.01-2.95 (m, 3H), 2.74-2.67 (m, 2H), 2.44-2.39 (m, 1H), 1.91 (br s, 3H), 1.86-1.80 (m, 5H), 1.60-1.53 (m, 3H), 1.19-1.13 (m, 2H), 0.84 (br d, J = 5.8 Hz, 6H). |
| 132 | Analytical LC/MS (Method 1): Purity: 100%; Observed Mass: 499.20;Retention Time: 0.79 min. (Method 2): Purity: 93.8%; Observed Mass: 499.30; Retention Time: 1.1 min. Prep Method 2: 53 mg, 46% yield; $^1$H NMR (500 MHz, DMSO-$d_6$) δ 8.68 (br d, J = 2.1 Hz, 1H), 8.49-8.44 (m, 1H), 8.24 (d, J = 8.2 Hz, 2H), 8.01 (d, J = 8.5 Hz, 2H), 6.89-6.80 (m, 1H), 3.65-3.47 (m, 1H), 3.47-3.35 (m, 1H), 3.25 (s, 2H), 3.11-2.98 (m, 1H), 2.53 (br d, J = 19.5 Hz, 5H), 2.43-2.30 (m, 2H), 2.25-1.97 (m, 5H), 1.96-1.78 (m, 1H), 1.27 (br d, J = 6.4 Hz, 6H) (four protons obscured). |
| 133 | Analytical LC/MS (Method 1): Purity: 94%; Observed Mass: 541.30; Retention Time: 0.9 min. (Method 2): Purity: 98.1%; Observed Mass: 541.20; Retention Time: 1.23 min. Prep Method 1: 1.9 mg, 2% yield; $^1$H NMR (500 MHz, DMSO-$d_6$) δ 8.66-8.62 (m, 1H), 8.43-8.39 (m, 1H), 8.27-8.21 (m, 2H), 8.03-7.98 (m, 2H), 6.98-6.86 (m, 1H), 3.98-3.90 (m, 2H), 3.64-3.47 (m, 4H), 3.24 (s, 5H), 3.19-3.07 (m, 2H), 2.35 (s, 2H), 2.08-1.62 (m, 11H), 1.60-1.39 (m, 4H). |
| 134 | Analytical LC/MS (Method 1): Purity: 87.6%; Observed Mass: 493.11; Retention Time: 0.97 min. (Method 2): Purity: 97.5%; Observed Mass: 493.33; Retention Time: 1.1 min. Prep Method 1: 1.2 mg, 2% yield; $^1$H NMR (500 MHz, DMSO-$d_6$) δ 7.35-7.32 (m, 1H), 7.31-7.27 (m, 1H), 7.22-7.16 (m, 1H), 6.93-6.86 (m, 1H), 4.09-3.98 (m, 1H), 3.75 (d, J = 18.3 Hz, 6H), 3.50-3.42 (m, 1H), 2.94-2.81 (m, 3H), 2.78-2.59 (m, 2H), 1.99 (br d, J = 9.5 Hz, 3H), 1.87-1.38 (m, 14H), 1.23 (br s, 4H), 1.00 (br d, J = 6.1 Hz, 6H). |
| 135 | Analytical LC/MS (Method 1): Purity: 90.9%; Observed Mass: 493.00; Retention Time: 0.9 min. (Method 2): Purity: 98.3%; Observed Mass: 493.03; Retention Time: 1.32 min. Prep Method 1: 4.6 mg, 7% yield; $^1$H NMR (500 MHz, DMSO-$d_6$) δ 7.33 (s, 1H), 7.29 (d, J = 1.6 Hz, 1H), 7.23-7.15 (m, 1H), 6.90 (d, J = 8.4 Hz, 1H), 4.10-4.02 (m, 1H), 3.78 (s, 3H), 3.74 (s, 3H), 3.68-3.59 (m, 1H), 3.51-3.39 (m, 1H), 3.23-3.14 (m, 1H), 2.90-2.80 (m, 1H), 2.73-2.60 (m, 2H), 2.30-2.21 (m, 1H), 2.12-1.99 (m, 1H), 1.94-1.58 (m, 13H), 1.56-1.48 (m, 1H), 1.34-1.18 (m, 3H), 1.04 (br d, J = 6.1 Hz, 6H) (two protons obscured). |
| 136 | Analytical LC/MS (Method 1): Purity: 95.3%; Observed Mass: 493.35; Retention Time: 0.90 min. (Method 2): Purity: 98.5%; Observed Mass: 493.04; Retention Time: 1.12 min. Prep Method 1: 15 mg, 31% yield; $^1$H NMR (500 MHz, DMSO-$d_6$) δ 7.33 (s, 1H), 7.29 (d, J = 1.8 Hz, 1H), 7.20 (dd, J = 8.4, 1.7 Hz, 1H), 6.91 (d, J = 8.5 Hz, 1H), 4.14-4.00 (m, 1H), 3.76 (d, J = 18.0 Hz, 6H), 3.66-3.44 (m, 1H), 2.92 (br d, J = 9.5 Hz, 4H), 2.71-2.61 (m, 1H), 2.59-2.56 (m, 1H), 2.02 (br dd, J = 10.1, 1.8 Hz, 3H), 1.88 (s, 2H), 1.84-1.70 (m, 4H), 1.69-1.57 (m, 3H), 1.57-1.39 (m, 5H), 1.31-1.18 (m, 3H), 1.08-0.92 (m, 6H). |
| 137 | Analytical LC/MS (Method 1): Purity: 98.5%; Observed Mass: 493.05; Retention Time: 0.9 min. (Method 2): Purity: 97.8%; Observed Mass: 492.99; Retention Time: 1.31 min. Prep Method 1: 25 mg, 52% yield; $^1$H NMR (500 MHz, DMSO-$d_6$) δ 7.35-7.33 (m, 1H), 7.31-7.28 (m, 1H), 7.23-7.18 (m, 1H), 6.96-6.87 (m, 1H), 4.12-3.99 (m, 1H), 3.76 (d, J = 18.3 Hz, 6H), 3.69-3.59 (m, 1H), 3.25-3.14 (m, 2H), 2.93-2.79 (m, 1H), 2.71-2.60 (m, 2H), 2.31-2.22 (m, 1H), 2.09-1.99 (m, 1H), 1.93-1.60 (m, 15H), 1.57-1.47 (m, 1H), 1.24 (br s, 3H), 1.02 (br d, J = 6.1 Hz, 6H). |
| 138 | Analytical LC/MS (Method 1): Purity: 95.1%; Observed Mass: 522.92; Retention Time: 0.85 min. (Method 2): Purity: 91.1%; Observed Mass: 523.20; Retention Time: 1.11 min. Prep Method 1: 8.8. mg, 8% yield; $^1$H NMR (500 MHz, DMSO-$d_6$) δ 7.86 (br d, J = 8.5 Hz, 2H), 7.77 (d, J = 8.2 Hz, 2H), 7.59 (s, 1H), 4.06-3.98 (m, 1H), 3.63-3.56 (m, 1H), 3.37-3.26 (m, 1H), 3.11 (s, 3H), 2.86-2.75 (m, 3H), 2.67-2.56 (m, 1H), 2.48-2.41 (m, 1H), 2.22-2.13 (m, 2H), 2.01-1.88 (m, 3H), 1.77-1.63 (m, 4H), 1.60-1.38 (m, 8H), 1.27-1.03 (m, 4H), 0.81-0.70 (m, 1H), 0.35 (br d, J = 7.6 Hz, 2H), 0.01 (br d, J = 4.3 Hz, 2H). |
| 139 | Analytical LC/MS (Method 1): Purity: 95.9%; Observed Mass: 523.19; Retention Time: 0.88 min. (Method 2): Purity: 94.5%; Observed Mass: 523.20; Retention Time: 1.32 min. Prep Method 1: 12 mg, 11% yield; $^1$H NMR (500 MHz, DMSO-$d_6$) δ 7.89-7.83 (m, 2H), 7.81-7.72 (m, 2H), 7.65-7.54 (m, 1H), 4.11-3.96 (m, 1H), 3.67-3.52(m, 1H), 3.26-3.17 (m, 1H), 3.11 (s, 4H), 2.86-2.74 (m, 1H), 2.70-2.53 (m, 1H), 2.12 (br d, J = 6.1 Hz, 3H), 2.04-1.91 (m, 2H), 1.80 (s, 4H), 1.75-1.54 (m, 9H), 1.52-1.39 (m, 2H), 1.24-1.11 (m, 3H), 0.82-0.67 (m, 1H), 0.38-0.32 (m, 2H), 0.01(br d, J = 4.3 Hz, 2H). |
| 140 | Analytical LC/MS (Method 1): Purity: 100%; Observed Mass: 523.01; Retention Time: 0.92 min. (Method 2): Purity: 98.8%; Observed Mass: 523.03; Retention Time: 1.18 min. Prep Method 1: 8.6 mg, 9% yield; $^1$H NMR (500 MHz, DMSO-$d_6$) δ 7.84-7.79 (m, 2H), 7.77-7.70 (m, 2H), 7.60-7.52 (m, 1H), 4.03-3.94 (m, 1H), 3.50-3.31 (m, 2H), 3.07 (s, 3H), 2.83-2.72 (m, 3H), 2.62-2.50 (m, 1H), 2.26-2.16 (m, 2H), 1.92 (br d, J = 7.9 Hz, 3H), 1.80-1.69 (m, 5H), 1.64 (br s, 2H), 1.57-1.36 (m, 7H), 1.19-1.07 (m, 3H), 0.74 (br s, 1H), 0.34 (br d, J = 8.2 Hz, 2H), 0.01 (br d, J = 4.3 Hz, 2H). |
| 141 | Analytical LC/MS (Method 1): Purity: 94.9%; Observed Mass: 523.08; Retention Time: 0.91 min. (Method 2): Purity: 98.7%; Observed Mass: 523.03; Retention Time: 1.36 min. Prep Method 1: 6.2 mg, 6% yield; $^1$H NMR (500 MHz, DMSO-$d_6$) δ 7.87 (d, J = 8.5 Hz, 2H), 7.78 (d, J = 8.5 Hz, 2H), 7.61 (s, 1H), 4.12-3.98 (m, 1H), 3.72-3.58 (m, 1H), 3.25-3.17 (m, 1H), 3.12 (s, 4H), 2.86-2.76 (m, 1H), 2.70-2.57 (m, 1H), 2.24-2.16 (m, 1H), 2.10 (br d, J = 6.4 Hz, 2H), 2.05-1.94 (m, 2H), 1.87-1.54 (m, 13H), 1.51-1.38 (m, 2H), 1.17 (br s, 3H), 0.74 (br s, 1H), 0.42-0.32 (m, 2H), 0.06--0.03 (m, 2H). |

Example 142

2-(3,4-dimethoxyphenyl)-6-(4-(4-isopropylpiperazin-1-yl)phenyl)-8-methyl-[1,2,4]triazolo[1,5-a]pyridine

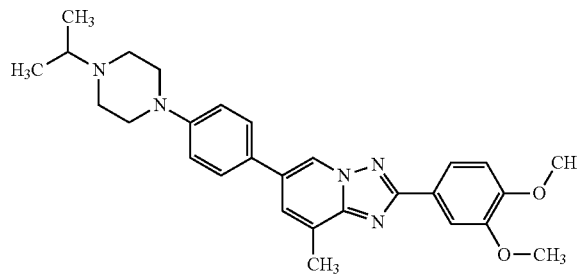

(142)

Step A. Intermediate 142A. Preparation of 6-bromo-2-(3,4-dimethoxyphenyl)-8-methyl-[1,2,4]triazolo[1,5-a]pyridine

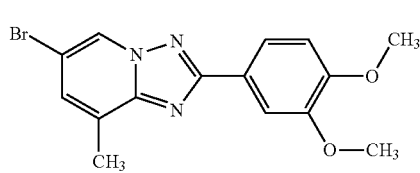

(142A)

Intermediate 142A was synthesized according to the general methods described for the preparation of Intermediate 60A, using 5-bromo-3-methylpyridin-2-amine (1.0 g, 5.6 mmol) as starting material. The crude product was purified flash column chromatography (80 g silica gel cartridge; A=Hex, B=EtOAc; 30 min grad.; 0% B to 100% B; flow rate=60 mL/min) to afford the title compound (1.3 g, 3.8 mmol, 67% yield) as an off-white solid. $^1$H NMR (CHLOROFORM-d) δ: 8.53-8.59 (m, 1H), 7.88 (dd, J=8.3, 1.9 Hz, 1H), 7.79 (d, J=1.8 Hz, 1H), 7.36 (s, 1H), 6.97 (d, J=8.2 Hz, 1H), 4.02 (s, 3H), 3.95 (s, 3H), 2.68 (s, 3H). Analytical LC/MS (Method 5): Observed Mass: 347.8; Retention Time: 0.99 min.

Step B. Example 142

To a 20 mL vial were added Intermediate 142A (17 mg, 0.050 mmol), 1-isopropyl-4-(4-(4,4,5,5-tetramethyl-1,3,2-dioxaborolan-2-yl)phenyl)piperazine (17 mg, 0.050 mmol), followed by 1,4-dioxane (3 mL) and 2 M potassium phosphate (88 μL, 0.18 mmol). The vial was purged with N$_2$, then XPhos Pd G3 (4.2 mg, 5.0 μmol) was added. The vial was purged again with N$_2$ and the reaction stirred at 85° C. After 15 h, the reaction mixture was cooled, diluted with water (5 mL) and extracted with EtOAc (2×5 mL). The organic phase was combined, washed with brine, dried over MgSO$_4$, filtered and concentrated. The residue was purified by flash column chromatography (24 g silica gel cartridge; A=Hex, B=EtOAc; 30 min grad.; 0% B to 100% B; flow rate=30 mL/min). The pure fractions were combined, concentrated and dried in vacuo to afford the title compound (16 mg, 0.033 mmol, 67% yield) as an off-white solid. $^1$H NMR (500 MHz, CHLOROFORM-d) δ 8.73-8.61 (m, 1H), 7.92 (dd, J=8.4, 2.0 Hz, 1H), 7.83 (d, J=2.0 Hz, 1H), 7.77-7.70 (m, 1H), 7.57 (d, J=8.7 Hz, 2H), 7.08 (d, J=8.7 Hz, 2H), 7.04 (d, J=8.4 Hz, 1H), 4.03 (s, 3H), 4.00 (s, 3H), 3.83 (m, 2H), 3.70 (m, 3H), 3.46 (m, 2H), 3.12 (m, 2H), 2.81 (s, 3H), 1.46 (d, J=6.7 Hz, 6H). Analytical LC/MS (Method 5): Observed Mass: 472.1; Retention Time: 0.80 min.

Example 143

2-(3,4-dimethoxyphenyl)-6-(4-(4-isopropylpiperazin-1-yl)cyclohexyl)-8-methyl-5,6,7,8-tetrahydro-[1,2,4]triazolo[1,5-a]pyridine

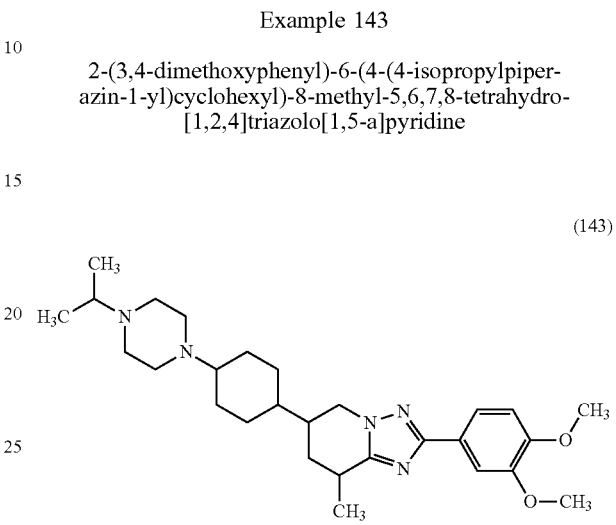

(143)

To a hydrogenation flask were added Example 142 (30 mg, 0.064 mmol), 3 M HCl in dioxane (0.21 mL, 0.64 mmol), platinum(IV) oxide (7 mg), methanol (5 mL), and THF (5 mL). The suspension was stirred at 30 PSI under hydrogen. After 3 h, the reaction mixture was filtered, the filter cake was washed with MeOH (10 mL), and the filtrate was concentrated. The crude product was purified by preparative HPLC (Prep Method 1) to afford the title compound (4.7 mg, 9.6 μmol, 15% yield). $^1$H NMR (DMSO-d$_6$) δ: 7.53 (dd, J=8.4, 1.7 Hz, 1H), 7.49 (d, J=1.7 Hz, 1H), 7.02 (d, J=8.5 Hz, 1H), 4.19-4.43 (m, 2H), 3.78 (s, 3H), 3.75 (s, 3H), 2.89-3.05 (m, 4H), 2.50-2.53 (m, 6H), 2.14-2.30 (m, 2H), 1.82-1.96 (m, 4H), 1.68-1.82 (m, 6H), 1.55 (br s, 4H), 1.24 (d, J=6.6 Hz, 6H). Analytical LC/MS (Method 1): Purity: 98.5%; Observed Mass: 482.0; Retention Time: 1.46 min. (Method 2): Purity: 99.0%; Observed Mass: 482.0; Retention Time: 1.12 min.

Example 144

2-(3,4-dimethoxyphenyl)-6-(4-(4-isopropylpiperazin-1-yl)phenyl)-8-methyl-5,6,7,8-tetrahydro-[1,2,4]triazolo[1,5-a]pyridine

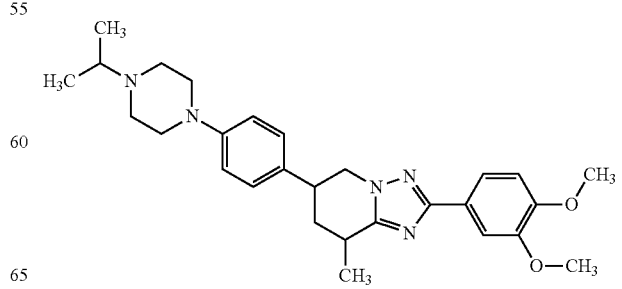

(144)

To a hydrogenation flask were added Example 142 (30 mg, 0.064 mmol), Pd/C (7 mg), methanol (5 mL), and THF (5 mL). The suspension stirred at 15 PSI under hydrogen. After 12 h, the reaction mixture was filtered, the filter cake was washed with MeOH (10 mL) and the filtrate was concentrated. The crude product was purified by preparative HPLC (Prep Method 1) to afford the title compound (6.5 mg, 0.013 mmol, 21% yield). $^1$H NMR (DMSO-$d_6$) δ: 7.56 (dd, J=8.2, 1.8 Hz, 1H), 7.51 (d, J=1.5 Hz, 1H), 7.24 (br d, J=8.5 Hz, 2H), 7.03 (d, J=8.5 Hz, 1H), 6.91 (br d, J=8.5 Hz, 2H), 4.26-4.40 (m, 1H), 4.05 (s, 1H), 3.81 (s, 3H), 3.79 (s, 3H), 3.44-3.61 (m, 2H), 3.30 (br s, 1H), 3.04-3.18 (m, 4H), 2.65 (dt, J=13.0, 6.3 Hz, 2H), 2.13 (br d, J=8.2 Hz, 2H), 1.79-1.94 (m, 2H), 1.40 (d, J=7.0 Hz, 3H), 1.01 (d, J=6.4 Hz, 6H). Analytical LC/MS (Method 1): Purity: 98.1%; Observed Mass: 476.3.

Example 145

6-(8-(1-cyclopropylpiperidin-4-yl)-8-azabicyclo [3.2.1]oct-3-yl)-2-(3,4-dimethoxyphenyl)-5,6,7,8-tetrahydro-[1,2,4]triazolo[1,5-a]pyridine

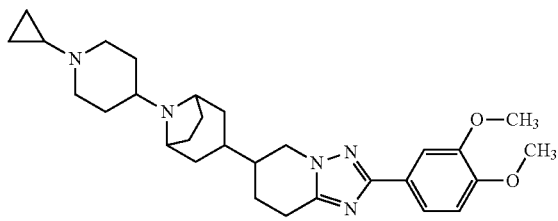

(145)

Step A. Intermediate 145A Preparation of 6-bromo-2-(3,4-dimethoxyphenyl)-[1,2,4]triazolo[1,5-a]pyridine

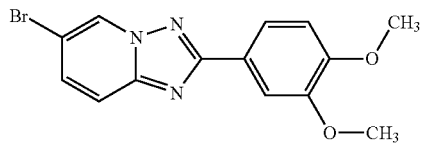

(145A)

Intermediate 145A was synthesized according to the general methods described for the preparation of Intermediate 60A, using 5-bromo-pyridin-2-amine (1.0 g, 5.8 mmol) as starting material. The crude product was purified by flash column chromatography (80 g silica gel cartridge; A=Hex, B=EtOAc; 30 min grad.; 0% B to 100% B; flow rate=60 mL/min to afford the title compound (1.2 g, 3.7 mmol, 64% yield) as a pale yellow solid. $^1$H NMR (CHLOROFORM-d) δ: 8.68-8.79 (m, 1H), 7.89 (dd, J=8.4, 1.7 Hz, 1H), 7.80 (d, J=1.6 Hz, 1H), 7.63-7.68 (m, 1H), 7.60 (d, J=1.6 Hz, 1H), 7.01 (d, J=8.2 Hz, 1H), 4.04 (s, 3H), 3.98 (s, 3H). Analytical LC/MS (Method 5): Observed Mass: 334.0; Retention Time: 0.91 min.

Step B. Intermediate 145B. Preparation of tert-butyl 3-(2-(3,4-dimethoxyphenyl)-[1,2,4]triazolo[1,5-a] pyridin-6-yl)-8-azabicyclo[3.2.1]oct-2-ene-8-carboxylate

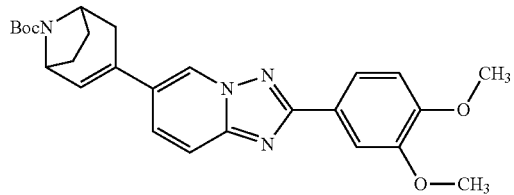

(145B)

Intermediate 145B was synthesized according to the general methods described for the preparation of Example 142 (Step B), using Intermediate 145A (100 mg, 0.30 mmol) as starting material and substituting tert-butyl-(1R,5S)-3-(4,4,5,5-tetramethyl-1,3,2-dioxaborolan-2-yl)-8-azabicyclo [3.2.1]oct-2-ene-8-carboxylate (100 mg, 0.30 mmol), where appropriate. The crude product was purified flash column chromatography (40 g silica gel cartridge; A=Hex, B=EtOAc; 20 min grad.; 0% B to 100% B; flow rate=40 mL/min) to afford the title compound (130 mg, 0.27 mmol, 91% yield) as a gum. $^1$H NMR (CHLOROFORM-d) δ: 8.48 (s, 1H), 7.88 (dd, J=8.3, 1.9 Hz, 1H), 7.79 (d, J=2.0 Hz, 1H), 7.58-7.69 (m, 2H), 6.99 (d, J=8.4 Hz, 1H), 6.57 (br s, 1H), 4.57 (br s, 2H), 4.02 (s, 3H), 3.96 (s, 3H), 2.14-2.34 (m, 2H), 1.91-2.12 (m, 2H), 1.60-1.78 (m, 2H), 1.46 (s, 9H). Analytical LC/MS (Method 5): Observed Mass: 463.0; Retention Time: 1.03 min.

Step C. Intermediate 145C. Preparation of tert-butyl 3-(2-(3,4-dimethoxyphenyl)-5,6,7,8-tetrahydro-[1,2, 4]triazolo[1,5-a]pyridin-6-yl)-8-azabicyclo[3.2.1] octane-8-carboxylate

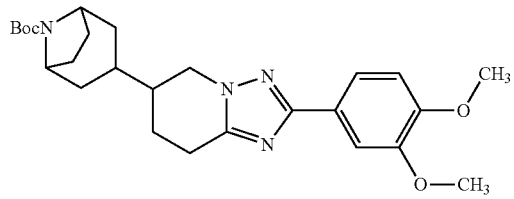

(145C)

Intermediate 145C was synthesized according to the general methods described for the preparation of Example 144, using Intermediate 145B (120 mg, 0.260 mmol) as starting material. The crude product was purified by preparative HPLC (Prep Method 1) to afford the title compound (63 mg, 0.130 mmol, 52% yield) as a gum. $^1$H NMR (CHLOROFORM-d) δ: 7.64-7.64 (m, 1H), 7.57 (d, J=1.7 Hz, 1H), 6.97 (d, J=8.5 Hz, 1H), 4.19-4.48 (m, 3H), 3.96 (s, 3H), 3.95 (s, 3H), 3.73-3.94 (m, 2H), 3.37-3.73 (m, 1H), 3.35-3.35 (m, 1H), 2.94-3.15 (m, 1H), 2.25 (br d, J=8.5 Hz, 2H), 1.98-2.16 (m, 2H), 1.88-1.92 (m, 1H), 1.55-1.70 (m, 5H), 1.50 (s, 9H). Analytical LC/MS (Method 5): Observed Mass: 469.1; Retention Time: 0.938 min.

167

Step D. Intermediate 145D. Preparation of 6-(8-azabicyclo[3.2.1]octan-3-yl)-2-(3,4-dimethoxyphenyl)-5,6,7,8-tetrahydro-[1,2,4]triazolo[1,5-a]pyridine hydrochloride

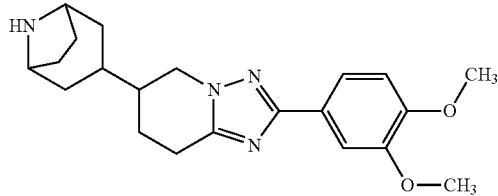

(145D)

Intermediate 145D was synthesized according to the general methods described for the preparation of Example 60 (Step D), using Intermediate 145C (100 mg, 0.21 mmol) as starting material. The crude product was used directly without further purification. $^1$H NMR (METHANOL-$d_4$) δ: 8.16-8.25 (m, 1H), 7.81-7.84 (m, 1H), 7.73-7.77 (m, 1H), 4.29-4.48 (m, 3H), 4.16 (s, 3H), 4.05 (s, 3H), 3.73-3.99 (m, 2H), 3.37-3.73 (m, 1H), 3.05-3.35 (m, 1H), 2.98-3.15 (m, 1H), 2.45 (br d, J=8.5 Hz, 2H), 1.98-2.10 (m, 2H), 1.82-1.92 (m, 1H), 1.66-1.70 (m, 5H). Analytical LC/MS (Method 5): Observed Mass: 369.2; Retention Time: 0.663 min.

Step E. Example 145

Example 145 was synthesized according to the general methods described for the preparation of Example 60 (Step E), using Intermediate 145D (30 mg, 0.062 mmol) and 1-cyclopropylpiperidin-4-one (26 mg, 0.190) as starting materials. The crude product was purified by preparative HPLC (Prep Method 1) to afford the title compound (17 mg, 0.035 mmol, 57% yield) as a gum. $^1$H NMR (DMSO-$d_6$) δ: 7.50-7.55 (m, 1H), 7.41-7.49 (m, 1H), 7.02 (d, J=8.5 Hz, 1H), 4.20 (br dd, J=12.2, 4.6 Hz, 1H), 3.81 (s, 3H), 3.78 (s, 3H), 3.53-3.66 (m, 2H), 2.92 (br d, J=8.2 Hz, 3H), 2.27-2.46 (m, 1H), 2.16 (br t, J=11.1 Hz, 3H), 1.98-2.09 (m, 2H), 1.81-1.95 (m, 7H), 1.44-1.66 (m, 6H), 1.27 (br d, J=12.5 Hz, 3H), 0.33-0.46 (m, 2H), 0.29 (br s, 2H). Analytical LC/MS (Method 1): Purity: 100%; Observed Mass: 492.3; Retention Time: 1.284 min. (Method 2): Purity: 100%; Observed Mass: 492.3; Retention Time: 1.048 min.

Example 146

6-(8-(1-cyclopropylpiperidin-4-yl)-8-azabicyclo[3.2.1]octan-3-yl)-2-(3,4-dimethoxyphenyl)-[1,2,4]triazolo[1,5-a]pyridine

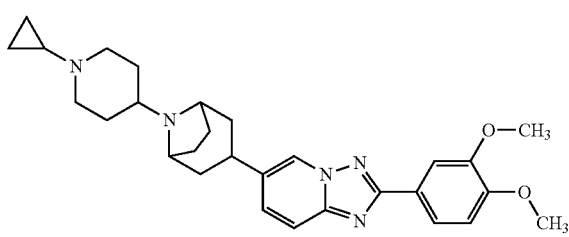

(146)

168

Step A. Intermediate 146A. Preparation of tert-butyl 3-(2-(3,4-dimethoxyphenyl)-[1,2,4]triazolo[1,5-a]pyridin-6-yl)-8-azabicyclo[3.2.1]octane-8-carboxylate

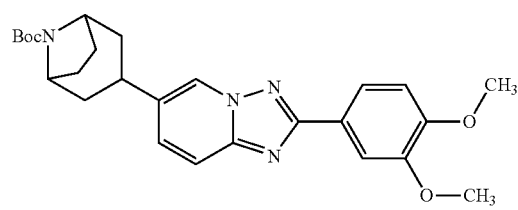

(146A)

Intermediate 146A was synthesized according to the general methods described for the preparation of Example 144, using Intermediate 145B (120 mg, 0.26 mmol) as starting material. The crude product was purified by preparative HPLC (Prep Method 1) to afford the title compound (55 mg, 0.12 mmol, 47% yield) as a gum. $^1$H NMR (CHLOROFORM-d) δ: 8.51 (s, 1H), 8.27 (br d, J=9.3 Hz, 1H), 7.86 (br d, J=8.5 Hz, 1H), 7.78 (d, J=1.5 Hz, 2H), 7.04 (d, J=8.6 Hz, 1H), 4.02 (s, 3H), 3.99 (s, 3H), 3.22-3.39 (m, 1H), 2.72-2.99 (m, 1H), 2.52-2.67 (m, 1H), 2.39 (br s, 1H), 2.05-2.24 (m, 3H), 1.86-1.95 (m, 3H), 1.63-1.69 (m, 1H), 1.53 (s, 9H). Analytical LC/MS (Method 5): Observed Mass: 465.1; Retention Time: 1.018 min.

Step B. Intermediate 146B. Preparation of 6-(8-azabicyclo[3.2.1]octan-3-yl)-2-(3,4-dimethoxyphenyl)-5,6,7,8-tetrahydro-[1,2,4]triazolo[1,5-a]pyridine hydrochloride

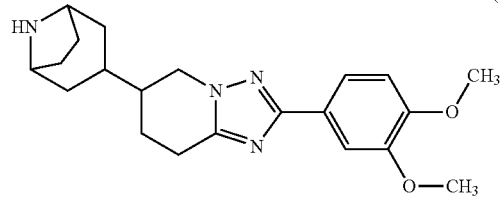

(146B)

Intermediate 146B was synthesized according to the general methods described for the preparation of Example 60 (Step D), using Intermediate 146A (100 mg, 0.21 mmol) as starting material. The crude product was used directly without further purification. $^1$H NMR (METHANOL-$d_4$) δ: 8.57 (s, 1H), 8.25 (br d, J=9.3 Hz, 1H), 7.84 (br d, J=8.5 Hz, 1H), 7.75 (d, J=1.5 Hz, 2H), 7.02 (d, J=8.6 Hz, 1H), 4.00 (s, 3H), 3.96 (s, 3H), 3.20-3.37 (m, 1H), 2.71-2.95 (m, 1H), 2.49-2.63 (m, 1H), 2.36 (br s, 1H), 2.00-2.16 (m, 3H), 1.80-1.91 (m, 3H), 1.60-1.66 (m, 1H). Analytical LC/MS (Method 5): Observed Mass: 365.1; Retention Time: 0.690 min.

Step C. Example 146

Example 146 was synthesized according to the general methods described for the preparation of Example 60 (Step E), using Intermediate 146B (30 mg, 0.063 mmol) and 1-cyclopropylpiperidin-4-one (26 mg, 0.19) as starting materials. The crude product was purified by preparative HPLC (Prep Method 1) to afford the title compound (29 mg, 0.060 mmol, 96% yield) as a gum. $^1$H NMR (DMSO-$d_6$) δ: 8.88 (s, 1H), 8.78 (s, 1H), 7.75 (br dd, J=9.5, 4.6 Hz, 2H), 7.64-7.72 (m, 2H), 7.11 (d, J=8.5 Hz, 1H), 3.86 (s, 2H), 3.83 (s, 3H), 3.05-3.23 (m, 2H), 2.88-2.97 (m, 2H), 2.08-2.24 (m, 3H), 1.74-1.98 (m, 8H), 1.53-1.63 (m, 2H), 1.42 (br d, J=7.3 Hz, 1H), 1.18-1.33 (m, 3H), 0.35-0.46 (m, 2H), 0.30 (br s, 2H). Analytical LC/MS (Method 1): Purity: 100%; Observed Mass: 488.3; Retention Time: 1.375 min. (Method 2): Purity: 100%; Observed Mass: 488.3; Retention Time: 1.110 min.

Example 147

6-(4-(4-isopropylpiperazin-1-yl)phenyl)-8-methyl-2-(4-(methylsulfonyl)phenyl)-[1,2,4]triazolo[1,5-a]pyridine

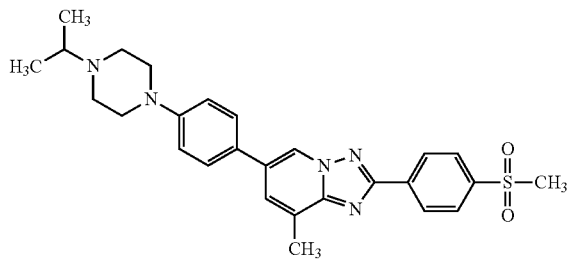

(147)

Step A. Intermediate 147A. Preparation of 6-bromo-8-methyl-2-(4-(methylsulfonyl) phenyl)-[1,2,4]triazolo[1,5-a]pyridine

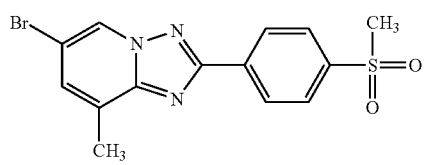

(147A)

Intermediate 147A was synthesized according to the general methods described for the preparation of Intermediate 60A, using 5-bromo-3-methylpyridin-2-amine (2.0 g, 11 mmol) and 4-(methylsulfonyl)benzonitrile (2.3 g, 13 mmol) as starting materials. The crude product was purified flash column chromatography (80 g silica gel cartridge; A=Hex, B=EtOAc; 30 min grad.; 0% B to 100% B; flow rate=60 mL/min) to afford the title compound (2.3 g, 6.3 mmol, 59% yield) as a tan solid. $^1$H NMR (CHLOROFORM-d) δ: 8.63 (s, 1H), 8.46-8.56 (m, J=8.5 Hz, 2H), 8.08 (d, J=8.5 Hz, 2H), 7.45 (s, 1H), 3.13 (s, 3H), 2.72 (s, 3H). Analytical LC/MS (Method 5): Observed Mass: 365.7; Retention Time: 0.936 min.

Step B. Example 147

Example 147 was synthesized according to the general methods described for the preparation of Example 142 (Step B), using Intermediate 147A (110 mg, 0.30 mmol) as starting material. The crude product was purified by preparative HPLC (Prep Method 1) to afford the title compound (120 mg, 0.24 mmol, 81% yield) as a white solid. $^1$H NMR (CHLOROFORM-d) δ: 8.63 (s, 1H), 8.54 (d, J=8.2 Hz, 2H), 8.09 (d, J=8.3 Hz, 2H), 7.53-7.59 (m, 3H), 7.06 (d, J=8.6 Hz, 2H), 3.79 (br d, J=12.9 Hz, 2H), 3.63 (br d, J=10.7 Hz, 2H), 3.42-3.58 (m, 3H), 3.14 (s, 3H), 3.09 (s, 2H), 2.78 (s, 3H), 1.45 (d, J=6.7 Hz, 6H). Analytical LC/MS (Method 1): Purity: 100%; Observed Mass: 492.3; Retention Time: 1.284 min. (Method 2): Purity: 100%; Observed Mass: 490.2; Retention Time: 0.722 min.

The following Examples were prepared according to the general methods described elsewhere herein using appropriate starting materials, reagents and conditions.

| Ex. No | Structure | Method | Analytical Data |
|---|---|---|---|
| 148 | ![structure] | Ex. 145 | Analytical LC/MS (Method 1): Purity: 96.2%; Observed Mass: 494.3; Retention Time: 1.111 min. (Method 2): Purity: 95.4%; Observed Mass: 494.3; Retention Time: 1.068 min. Prep Method 1: 11 mg, 0.021 mmol, 34% yield; $^1$H NMR (DMSO-$d_6$) δ: 7.51 (br d, J = 8.2 Hz, 1H), 7.43-7.49 (m, 1H), 7.01 (d, J = 8.2 Hz, 1H), 4.10-4.24 (m, 1H), 3.79 (s, 3H), 3.78 (s, 3H), 3.65 (br s, 3H), 2.83 (br d, J = 11.3 Hz, 4H), 2.68-2.79 (m, 3H), 2.18 (br s, 3H), 1.80-1.91 (m, 6H), 1.46-1.63 (m, 4H), 1.29-1.46 (m, 4H), 0.98 (br d, J = 6.4 Hz, 6H). |

| Ex. No | Structure | Method | Analytical Data |
|---|---|---|---|
| 149 | (structure) | Ex. 146 | Analytical LC/MS (Method 1): Purity: 97.6%; Observed Mass: 490.3; Retention Time: 1.111 min. (Method 2): Purity: 100%; Observed Mass: 490.3; Retention Time: 1.074 min. Prep Method 1: 13 mg, 41% yield); $^1$H NMR (DMSO-$d_6$) δ: 8.86 (s, 1H), 8.76 (s, 1H), 7.65-7.78 (m, 3H), 7.11 (d, J = 8.5 Hz, 1H), 3.85 (s, 3H), 3.83 (s, 1H), 3.58 (br d, J = 16.5 Hz, 2H), 3.05-3.17 (m, 1H), 2.80 (br d, J = 10.4 Hz, 3H), 2.61-2.74 (m, 2H), 2.24-2.33 (m, 1H), 2.03-2.21 (m, 4H), 1.87 (br d, J = 10.1 Hz, 3H), 1.69-1.80 (m, 2H), 1.65 (br s, 1H), 1.51-1.59 (m, 1H), 1.40 (br d, J = 7.3 Hz, 1H), 1.25-1.36 (m, 2H), 0.97 (dd, J = 6.4, 2.4 Hz, 6H). |
| 150 | (structure) | Ex. 144 | Analytical LC/MS (Method 1): Purity: 95.2%; Observed Mass: 494.3; Retention Time: 1.591 min. (Method 2): Purity: 94.4%; Observed Mass: 494.3; Retention Time: 1.345 min. Prep Method 1: 0.5 mg, 2% yield; $^1$H NMR (DMSO-$d_6$) δ: 8.25 (br s, 2H), 8.02 (br d, J = 8.2 Hz, 2H), 7.28 (br d, J = 8.5 Hz, 2H), 6.96 (br d, J = 8.2 Hz, 2H), 4.40 (br dd, J = 11.6, 4.6 Hz, 2H), 4.15 (br t, J = 11.6 Hz, 2H), 3.44 (s, 3H), 3.26 (s, 3H), 3.10-3.22 (m, 4H), 2.09-2.21 (m, 2H), 1.86-2.02 (m, 2H), 1.44 (br d, J = 6.7 Hz, 6H), 1.08 (br s, 3H). |
| 151 | (structure) | Ex. 142 | Analytical LC/MS (Method 1): Purity: 98.0%; Observed Mass: 498.3; Retention Time: 1.713 min. (Method 2): Purity: 97.0%; Observed Mass: 498.3; Retention Time: 1.556 min. Prep Method 1: 18 mg, 35% yield; $^1$H NMR (DMSO-$d_6$) δ: 7.79-7.83 (m, 2H), 7.72-7.75 (m, 1H), 7.64 (br d, J = 8.9 Hz, 2H), 7.10-7.18 (m, 2H), 6.91 (br d, J = 8.5 Hz, 2H), 3.88 (s, 3H), 3.84 (s, 3H), 3.43-3.54 (m, 6H), 2.92 (br d, J = 11.0 Hz, 4H), 1.58-1.75 (m, 4H), 1.05 (br d, J = 6.1 Hz, 6H). |
| 152 | (structure) | Ex. 144 | Analytical LC/MS (Method 2): Purity: 88.7%; Observed Mass: 502.3; Retention Time: 1.449 min. Prep Method 1: 4.4 mg, 26% yield; $^1$H NMR (DMSO-$d_6$) δ: 8.11 (br d, J = 8.2 Hz, 1H), 7.55 (br d, J = 8.1 Hz, 1H), 7.51 (s, 1H), 7.21 (br d, J = 8.7 Hz, 2H), 7.02 (d, J = 8.5 Hz, 2H), 4.27-4.38 (m, 1H), 4.00-4.10 (m, 1H), 3.81 (s, 3H), 3.80 (s, 3H), 3.52-3.60 (m, 2H), 3.29 (br s, 2H), 2.84 (br d, J = 10.2 Hz, 4H), 2.55 (s, 3H), 2.00 (br d, J = 7.1 Hz, 2H), 1.57-1.68 (m, 2H), 1.04 (br d, J = 6.0 Hz, 6H), 0.85 (br d, J = 6.6 Hz, 3H). |

-continued

| Ex. No | Structure | Method | Analytical Data |
|---|---|---|---|
| 153 | | Ex. 142 | Analytical LC/MS (Method 1): Purity: 100%; Observed Mass: 516.2; Retention Time: 659.1 min. (Method 2): Purity: 100%; Observed Mass: 516.2; Retention Time: 1.473 min. Prep Method 1: 25 mg, 49% yield; $^1$H NMR (DMSO-d$_6$) δ: 9.04 (s, 1H), 8.45 (br d, J = 8.2 Hz, 2H), 8.10 (br d, J = 8.2 Hz, 2H), 7.86 (s, 1H), 7.65 (br d, J = 8.5 Hz, 2H), 6.91 (br d, J = 8.9 Hz, 2H), 3.32-3.65 (m, 3H), 3.28 (s, 2H), 2.91 (br d, J = 9.8 Hz, 3H), 2.66 (s, 3H), 2.55 (s, 1H), 1.84 (br d, J = 4.3 Hz, 2H), 1.63 (br d, J = 7.6 Hz, 3H), 1.04 (br d, J = 5.8 Hz, 6H). |
| 154 | | Ex. 144 | Analytical LC/MS (Method 1): Purity: 100%; Observed Mass: 520.3; Retention Time: 1.476 min. (Method 2): Purity: 100%; Observed Mass: 520.3; Retention Time: 1.346 min. Prep Method 1: 3 mg, 20% yield; $^1$H NMR (DMSO-d$_6$) δ: 8.28 (br d, J = 8.5 Hz, 2H), 8.06 (br d, J = 8.5 Hz, 2H), 7.27 (br d, J = 8.5 Hz, 2H), 6.84 (br d, J = 8.9 Hz, 2H), 4.41 (br dd, J = 12.1, 5.3 Hz, 2H), 4.15 (br t, J = 11.9 Hz, 2H), 3.45-3.53 (m, 1H), 3.32-3.38 (m, 1H), 3.16-3.27 (m, 1H), 2.90 (br d, J = 10.7 Hz, 3H), 2.61-2.68 (m, 2H), 2.59 (s, 3H), 2.14-2.21 (m, 1H), 1.80-1.92 (m, 2H), 1.68 (br d, J = 7.3 Hz, 2H), 1.47 (br d, J = 7.0 Hz, 3H), 1.09 (br d, J = 6.1 Hz, 6H). |
| 155 | | Ex. 146 | Analytical LC/MS (Method 1): Purity: 98.7%; Observed Mass: 502.3; Retention Time: 1.583 min. (Method 2): Purity: 99.3%; Observed Mass: 502.3; Retention Time: 1.125 min. Prep Method 1: 22 mg, 42% yield; $^1$H NMR (DMSO-d$_6$) δ: 8.58-8.73 (m, 1H), 7.60-7.82 (m, 2H), 7.49 (br s, 1H), 7.11 (s, 1H), 3.79-3.91 (m, 2H), 3.61 (br s, 12H), 3.06-3.24 (m, 2H), 2.88-2.99 (m, 2H), 2.55 (s, 4H), 2.24-2.42 (m, 2H), 2.13-2.22 (m, 1H), 1.81-1.96 (m, 3H), 1.55-1.70 (m, 2H), 1.37-1.49 (m, 2H), 1.20-1.34 (m, 2H). |
| 156 | | Ex. 146 | Analytical LC/MS (Method 1): Purity: 98.0%; Observed Mass: 504.3; Retention Time: 1.381 min. (Method 2): Purity: 97.1%; Observed Mass: 504.3; Retention Time: 1.151 min. Prep Method 1: 8.7 mg, 16% yield; $^1$H NMR (DMSO-d$_6$) δ: 8.56-8.72 (m, 1H), 7.73-7.82 (m, 1H), 7.70 (s, 1H), 7.47 (s, 1H), 7.10 (d, J = 8.5 Hz, 1H), 3.86 (s, 3H), 3.82 (s, 3H), 3.00-3.12 (m, 1H), 2.80 (br d, J = 10.4 Hz, 2H), 2.62-2.71 (m, 1H), 2.56 (d, J = 4.0 Hz, 4H), 2.36-2.47 (m, 1H), 2.23-2.34 (m, 1H), 2.04-2.20 (m, 2H), 1.60-1.97 (m, 8H), 1.51-1.59 (m, 1H), 1.38-1.46 (m, 1H), 1.26-1.37 (m, 2H), 0.63-1.03 (m, 6H). |

| Ex. No | Structure | Method | Analytical Data |
|---|---|---|---|
| 157 | (structure) | Ex. 60 | Analytical LC/MS (Method 5): Purity: 100%; Observed Mass: 476.2; Retention Time: 0.642 min. Prep Method 1: 31 mg, 60% yield; ¹H NMR (CHLOROFORM-d) δ: 8.33 (s, 1H), 7.89 (d, J = 8.3 Hz, 1H), 7.81 (d, J = 1.7 Hz, 1H), 7.23 (s, 1H), 7.00 (d, J = 8.5 Hz, 1H), 4.04 (s, 3H), 3.98 (s, 3H), 3.76-3.88 (m, 3H), 3.61-3.70 (m, 2H), 3.06 (br d, J = 15.1 Hz, 3H), 2.79-2.89 (m, 2H), 2.70 (s, 3H), 2.56-2.66 (m, 3H), 2.37 (br s, 2H), 2.27-2.32 (m, 2H), 2.13-2.19 (m, 2H), 1.26-1.36 (m, 2H), 0.88-1.00 (m, 2H). |
| 158 | (structure) | Ex. 60 | Analytical LC/MS (Method 5): Purity: 98.0%; Observed Mass: 478.2; Retention Time: 0.642 min. Prep Method 1: 23 mg, 44% yield; ¹H NMR (CHLOROFORM-d) &: 8.32 (s, 1H), 7.90 (br d, J = 8.2 Hz, 1H), 7.82 (s, 1H), 7.20 (s, 1H), 7.00 (d, J = 8.5 Hz, 1H), 4.05 (s, 3H), 3.98 (s, 3H), 3.76-3.88 (m, 1H), 3.59-3.71 (m, 4H), 3.49-3.57 (m, 1H), 2.99-3.13 (m, 2H), 2.88-2.97 (m, 2H), 2.78-2.86 (m, 1H), 2.70 (s, 6H), 2.33 (br d, J = 13.5 Hz, 3H), 2.11-2.22 (m, 2H), 1.40 (br d, J = 6.7 Hz, 6H). |
| 159 | (structure) | Ex. 146 | Analytical LC/MS (Method 1): Purity: 93.3%; Observed Mass: 520.3; Retention Time: 1.489 min. (Method 2): Purity: 100%; Observed Mass: 520.3; Retention Time: 1.072 min. Prep Method 1: 14 mg, 26% yield; ¹H NMR (DMSO-d₆) δ: 8.65-8.72 (m, 1H), 8.43 (d, J = 8.5 Hz, 2H), 8.09 (d, J = 8.2 Hz, 2H), 7.50-7.55 (m, 1H), 3.27 (s, 3H), 3.16-3.21 (m, 2H), 3.05-3.12 (m, 2H), 2.88-2.96 (m, 3H), 2.60 (s, 3H), 2.20 (br s, 4H), 1.83-1.90 (m, 6H), 1.52-1.59 (m, 4H), 0.38-0.42 (m, 2H), 0.29-0.33 (m, 2H). |
| 160 | (structure) | Ex. 146 | Analytical LC/MS (Method 1): Purity: 100%; Observed Mass: 522.3; Retention Time: 1.527 min. (Method 2): Purity: 100%; Observed Mass: 522.3; Retention Time: 1.056 min. Prep Method 1: 20 mg, 40% yield; ¹H NMR (DMSO-d₆) δ: 8.77 (s, 1H), 8.43 (br d, J = 8.5 Hz, 2H), 7.97-8.13 (m, 2H), 7.50-7.60 (m, 1H), 3.50 (br d, J = 1.2 Hz, 2H), 3.27 (s, 3H), 3.03-3.18 (m, 1H), 2.76-2.90 (m, 2H), 2.65-2.74 (m, 1H), 2.60 (s, 3H), 2.23-2.42 (m, 2H), 2.10-2.27 (m, 2H), 1.83-1.95 (m, 4H), 1.69-1.81 (m, 2H), 1.64-1.71 (m, 1H), 1.53-1.61 (m, 1H), 1.44 (br d, J = 7.3 Hz, 1H), 1.21-1.39 (m, 2H), 0.91-1.05 (m, 6H). |

-continued

| Ex. No | Structure | Method | Analytical Data |
|---|---|---|---|
| 161 | (cyclopropyl-piperidine-piperidine-[1,2,4]triazolo[1,5-a]pyridine(8-CH₃)-phenyl-SO₂CH₃) | Ex. 60 | Analytical LC/MS (Method 1): Purity: 96.9%; Observed Mass: 494.3; Retention Time: 1.474 min. (Method 2): Purity: 97.7%; Observed Mass: 494.3; Retention Time: 1.033 min. Prep Method 1: 14 mg, 26% yield; $^1$H NMR (DMSO-d$_6$) δ: 8.69-8.79 (m, 1H), 8.45 (d, J = 8.5 Hz, 2H), 8.11 (d, J = 8.2 Hz, 2H), 7.49 (br s, 1H), 3.55-3.78 (m, 1H), 3.29 (s, 3H), 2.83-3.08 (m, 3H), 2.62 (s, 3H), 2.51 (br s, 4H), 2.25-2.41 (m, 2H), 2.11-2.25 (m, 2H), 1.84-2.10 (m, 4H), 1.17 (s, 3H), 0.86-0.97 (m, 2H), 0.80 (br s, 2H). |
| 162 | (isopropyl-piperidine-piperidine-[1,2,4]triazolo[1,5-a]pyridine(8-CH₃)-phenyl-SO₂CH₃) | Ex. 60 | Analytical LC/MS (Method 1): Purity: 97.3%; Observed Mass: 496.3; Retention Time: 1.437 min. (Method 2): Purity: 100%; Observed Mass: 496.3; Retention Time: 1.039 min. Prep Method 1: 6.5 mg, 12% yield; $^1$H NMR (DMSO-d$_6$) δ: 8.68 (s, 1H), 8.44 (d, J = 8.2 Hz, 2H), 8.10 (d, J = 8.2 Hz, 2H), 7.54 (s, 1H), 3.29 (s, 3H), 2.89-3.06 (m, 3H), 2.60 (s, 4H), 2.50-2.51 (m, 2H), 2.14-2.45 (m, 5H), 1.78-1.90 (m, 4H), 1.65-1.77 (m, 2H), 1.41-1.62 (m, 2H), 1.03 (br d, J = 6.4 Hz, 6H). |
| 163 | (isobutyl-piperidine-piperidine-[1,2,4]triazolo[1,5-a]pyridine(8-CH₃)-phenyl-SO₂CH₃) | Ex. 60 | Analytical LC/MS (Method 5): Purity: 98.0%; Observed Mass: 510.3; Retention Time: 0.710 min. Prep Method 1: 7.8 mg, 35% yield; $^1$H NMR (CHLOROFORM-d) δ: 8.51 (d, J = 8.6 Hz, 2H), 8.35 (s, 1H), 8.09 (d, J = 8.6 Hz, 2H), 7.23-7.27 (m, 1H), 3.85-3.99 (m, 1H), 3.75-3.84 (m, 2H), 3.57-3.71 (m, 2H), 3.13 (s, 3H), 2.97-3.10 (m, 2H), 2.88 (br d, J = 6.7 Hz, 4H), 2.72 (s, 5H), 2.13-2.46 (m, 8H), 1.11 (d, J = 6.5 Hz, 6H). |
| 164 | (cyclopropyl-piperidine-piperidine-[1,2,4]triazolo[1,5-a]pyridine-3,4-dimethoxyphenyl) | Ex. 60 | Analytical LC/MS (Method 1): Purity: 98.7%; Observed Mass: 462.3; Retention Time: 1.304 min. (Method 2): Purity: 99.1%; Observed Mass: 462.3; Retention Time: 1.084 min. Prep Method 1: 27 mg, 52% yield; $^1$H NMR (DMSO-d$_6$) δ: 8.81 (br s, 1H), 7.81 (s, 1H), 7.76 (s, 1H), 7.71 (d, J = 1.2 Hz, 1H), 7.57-7.67 (m, 1H), 7.12 (d, J = 8.5 Hz, 1H), 3.86 (s, 3H), 3.81-3.84 (m, 3H), 3.52-3.76 (m, 1H), 3.10-3.34 (m, 4H), 2.95-3.11 (m, 1H), 2.68-2.93 (m, 1H), 2.52 (br s, 4H), 2.27-2.38 (m, 2H), 2.19 (br s, 2H), 1.78-2.05 (m, 4H), 0.94 (br s, 2H), 0.85 (br d, J = 7.0 Hz, 2H). |

-continued

| Ex. No | Structure | Method | Analytical Data |
|---|---|---|---|
| 165 | (structure) | Ex. 60 | Analytical LC/MS (Method 1): Purity: 95.3%; Observed Mass: 464.3; Retention Time: 1.251 min. (Method 2): Purity: 91.3%; Observed Mass: 464.3; Retention Time: 1.023 min. Prep Method 1: 30 mg, 54% yield; $^1$H NMR (DMSO-$d_6$) δ: 8.72 (s, 1H), 7.68-7.79 (m, 3H), 7.65 (s, 1H), 7.11 (d, J = 8.5 Hz, 1H), 3.85 (s, 3H), 3.82 (s, 3H), 3.63-3.73 (m, 2H), 2.96-3.05 (m, 2H), 2.84-2.92 (m, 2H), 2.69-2.77 (m, 1H), 2.59-2.68 (m, 1H), 2.12-2.32 (m, 6H), 1.76-1.82 (m, 1H), 1.68 (br dd, J = 11.6, 2.7 Hz, 2H), 1.42-1.55 (m, 2H), 0.98 (d, J = 6.4 Hz, 6H). |
| 166 | (structure) | Ex. 142 | Analytical LC/MS (Method 1): Purity: 99.1%; Observed Mass: 484.3; Retention Time: 1.573 min. (Method 2): Purity: 90.8%; Observed Mass: 484.3; Retention Time: 1.447 min. Prep Method 1: 15 mg, 29% yield; $^1$H NMR (DMSO-$d_6$) δ: 9.24 (s, 1H), 7.97-8.04 (m, 1H), 7.84-7.91 (m, 1H), 7.78-7.84 (m, 1H), 7.75 (s, 3H), 7.14 (br d, J = 8.5 Hz, 1H), 7.08 (br d, J = 8.9 Hz, 2H), 4.26-4.45 (m, 2H), 3.88 (s, 3H), 3.85 (s, 3H), 3.80-3.85 (m, 2H), 3.13-3.30 (m, 2H), 2.51 (br s, 2H), 2.11-2.25 (m, 2H), 1.91-2.08 (m, 2H), 1.37 (br s, 6H). |
| 167 | (structure) | Ex. 142 | Analytical LC/MS (Method 1): Purity: 96.5%; Observed Mass: 476.2; Retention Time: 1.535 min. (Method 2): Purity: 97.1%; Observed Mass: 476.2; Retention Time: 1.306 min. Prep Method 1: 4.1 mg, 6% yield; $^1$H NMR (DMSO-$d_6$) δ: 9.26 (s, 1H), 8.45 (d, J = 8.5 Hz, 2H), 8.08-8.14 (m, 2H), 8.03-8.08 (m, 1H), 7.91-7.98 (m, 1H), 7.75 (br d, J = 8.5 Hz, 2H), 7.15 (br d, J = 8.5 Hz, 2H), 3.57-3.75 (m, 1H), 3.27 (m, 8H), 2.51 (br s, 3H), 1.30 (d, J = 6.4 Hz, 6H). |

Biological Assays

The pharmacological properties of the compounds of this invention may be confirmed by a number of biological assays. The exemplified biological assays, which follow, have been carried out with compounds of the invention.

TLR7/8/9 Inhibition Reporter Assays

HEK-Blue™-cells (Invivogen) overexpressing human TLR7, TLR8 or TLR9 receptors were used for screening inhibitors of these receptors using an inducible SEAP (secreted embryonic alkaline phosphatase) reporter gene under the control of the IFN-0 minimal promoter fused to five NF-κB and AP-1-binding sites. Briefly, cells are seeded into Greiner 384 well plates (15000 cells per well for TLR7, 20,000 for TLR8 and 25,000 for TLR9) and then treated with test compounds in DMSO to yield a final dose response concentration range of 0.05 nM-50 μM. After a 30 minute compound pre-treatment at room temperature, the cells are then stimulated with a TLR7 ligand (gardiquimod at a final concentration of 7.5 μM), TLR8 ligand (R848 at a final concentration of 15.9 μM) or TLR9 ligand (ODN2006 at a final concentration of 5 nM) to activate NF-κB and AP-1 which induce the production of SEAP. After a 22 hour incubation at 37° C., 5% $CO_2$, SEAP levels are determined with the addition of HEK-Blue™ Detection reagent (Invivogen), a cell culture medium that allows for detection of SEAP, according to manufacturer's specifications. The percent inhibition is determined as the % reduction in the HEK-Blue signal present in wells treated with agonist plus DMSO alone compared to wells treated with a known inhibitor.

TABLE 1

| Ex. No. | TLR9 $IC_{50}$ (μM) | TLR7 $IC_{50}$ (μM) | TLR8 $IC_{50}$ (μM) |
|---|---|---|---|
| 1 | 0.056 | 14 | >50 |
| 2 | 0.052 | 3.8 | >50 |
| 3 | 0.032 | 1.8 | >50 |
| 4 | 0.146 | 5.5 | >50 |
| 5 | 0.166 | 3.0 | >50 |
| 6 | 0.252 | 16 | >50 |
| 7 | 0.132 | 7.8 | >50 |
| 8 | 0.021 | 2.3 | >50 |
| 9 | 0.042 | 3.3 | >50 |
| 10 | 0.129 | 5.2 | >50 |
| 11 | 0.077 | 5.6 | >50 |
| 12 | 0.122 | 2.7 | >50 |
| 13 | 0.163 | 47 | >50 |
| 14 | 0.068 | >50 | >50 |
| 15 | 0.047 | 46 | >50 |

TABLE 1-continued

| Ex. No. | TLR9 IC$_{50}$ (μM) | TLR7 IC$_{50}$ (μM) | TLR8 IC$_{50}$ (μM) |
| --- | --- | --- | --- |
| 16 | 0.014 | 2.0 | >50 |
| 17 | 0.022 | 2.3 | >50 |
| 18 | 0.048 | 3.3 | >50 |
| 19 | 0.058 | 2.4 | >50 |
| 20 | 0.023 | 1.5 | >50 |
| 21 | 0.126 | 3.0 | >50 |
| 22 | 0.030 | 1.2 | >50 |
| 23 | 0.242 | 31 | >50 |
| 24 | 0.102 | 2.9 | >50 |
| 25 | 0.016 | 3.5 | 20 |
| 26 | 0.086 | 2.0 | >50 |
| 27 | 0.017 | 1.4 | >50 |
| 28 | 0.0079 | n.d. | n.d. |
| 29 | 0.010 | n.d. | n.d. |
| 30 | 0.037 | 1.4 | >50 |
| 31 | 0.026 | 4.6 | >50 |
| 32 | 0.038 | 2.8 | >50 |
| 33 | 0.056 | 3.1 | >50 |
| 34 | 0.037 | 12 | >50 |
| 35 | 0.042 | 13 | >50 |
| 36 | 0.057 | 7.8 | >50 |
| 37 | 0.062 | 4.0 | >50 |
| 38 | 0.045 | 6.0 | >50 |
| 39 | 0.141 | 43 | >50 |
| 40 | 0.185 | 38 | >50 |
| 41 | 0.161 | >50 | >50 |
| 42 | 0.080 | 19 | >50 |
| 43 | 0.375 | 45 | >50 |
| 44 | 0.314 | 45 | >50 |
| 45 | 0.090 | 2.1 | >50 |
| 46 | 0.272 | 30 | >50 |
| 47 | 0.047 | >50 | >50 |
| 48 | 0.112 | 2.0 | >50 |
| 49 | 0.022 | 1.8 | >50 |
| 50 | 0.040 | 5.3 | >50 |
| 51 | 0.068 | >50 | >50 |
| 52 | 0.114 | 18 | >50 |
| 53 | 0.022 | 2.6 | >50 |
| 54 | 0.0015 | 0.83 | >50 |
| 55 | 0.038 | 1.6 | >50 |
| 56 | 0.54 | 3.8 | >50 |
| 57 | 0.036 | 4.2 | >50 |
| 58 | 0.060 | 13 | 15 |
| 59 | 0.205 | 7.7 | >50 |
| 60 | 1.10 | 29 | >50 |
| 61 | 1.24 | 11 | >50 |
| 62 | 0.098 | n.d. | n.d. |
| 63 | 0.097 | 5.8 | 9.5 |
| 64 | 2.38 | >25 | >25 |
| 65 | 0.670 | 4.8 | >50 |
| 66 | 0.062 | 14.3 | >50 |
| 67 | 0.043 | 19.2 | >50 |
| 68 | 0.110 | 8.2 | >50 |
| 69 | 0.026 | 3.4 | >50 |
| 70 | 0.303 | 22.9 | >50 |
| 71 | 0.039 | 3.0 | >50 |
| 72 | 0.0026 | 3.0 | >50 |
| 73 | 0.106 | >50 | 23 |
| 74 | 0.055 | 2.4 | n.d. |
| 75 | 0.034 | 2.9 | >25 |
| 76 | 0.052 | 1.6 | >25 |
| 77 | 0.064 | 3.6 | >25 |
| 78 | 0.108 | 8.6 | >25 |
| 79 | 0.171 | 16.7 | 16.7 |
| 80 | 0.052 | >50 | >50 |
| 81 | 0.0091 | n.d. | n.d. |
| 82 | 0.021 | 9.2 | >50 |
| 83 | 0.012 | n.d. | n.d. |
| 84 | 0.021 | n.d. | n.d. |
| 85 | 0.027 | n.d. | n.d. |
| 86 | 0.102 | n.d. | n.d. |
| 87 | 0.028 | 4.4 | >25 |
| 88 | 0.120 | n.d. | n.d. |
| 89 | 0.329 | 2.2 | >50 |
| 90 | 0.104 | n.d. | n.d. |
| 91 | 0.019 | n.d. | n.d. |
| 92 | 0.050 | 3.5 | >25 |
| 93 | 0.083 | n.d. | n.d. |
| 94 | 0.220 | >50 | >50 |
| 95 | 0.531 | 1.0 | >50 |
| 96 | 0.232 | 2.1 | 15 |
| 97 | 2.10 | >50 | >25 |
| 98 | 0.456 | 1.0 | 25 |
| 99 | 0.624 | >50 | >50 |
| 100 | 0.329 | 13.4 | 14.9 |
| 101 | 0.803 | 18.4 | 14 |
| 102 | 0.710 | 6.3 | 17 |
| 103 | 9.20 | 38.5 | >50 |
| 104 | 0.451 | 5.1 | >50 |
| 105 | 1.00 | n.d. | n.d. |
| 106 | 0.205 | 12 | >50 |
| 107 | 0.100 | 11 | >50 |
| 108 | 0.313 | 29.5 | >50 |
| 109 | 0.0043 | 1.3 | >50 |
| 110 | 0.0046 | 2.4 | >50 |
| 111 | 0.235 | 13 | >50 |
| 112 | 0.098 | 4.5 | >50 |
| 113 | 0.031 | 0.6 | >50 |
| 114 | 0.066 | 2.0 | 17 |
| 115 | 0.043 | 1.7 | 49 |
| 116 | 0.0039 | 0.7 | 14 |
| 117 | 0.022 | 1.5 | 20 |
| 118 | 0.021 | 1.1 | 17.1 |
| 119 | 0.030 | 10.6 | >50 |
| 120 | 0.709 | 16.7 | >50 |
| 121 | 0.011 | 3.4 | >50 |
| 122 | 0.0078 | 1.3 | 27 |
| 123 | 0.496 | >50 | >50 |
| 124 | 0.158 | n.d. | n.d. |
| 125 | 0.020 | 12.7 | 47.4 |
| 126 | 0.0078 | 7.4 | 46.7 |
| 127 | 0.0097 | 1.6 | 36 |
| 128 | 0.0084 | 2.4 | >50 |
| 129 | 0.020 | >50 | >50 |
| 130 | 0.010 | >50 | 22.5 |
| 131 | 0.058 | 18.1 | 16.7 |
| 132 | 0.300 | 4.0 | >50 |
| 133 | 0.0060 | 1.9 | >50 |
| 134 | 0.067 | >50 | >50 |
| 135 | 0.042 | 3.9 | >25 |
| 136 | 0.078 | 15.2 | >25 |
| 137 | 0.046 | 3.0 | >25 |
| 138 | 0.381 | >50 | >50 |
| 139 | 0.033 | 10.7 | >50 |
| 140 | 0.352 | >50 | >50 |
| 141 | 0.023 | 15.8 | >50 |
| 142 | n.d. | n.d. | n.d. |
| 143 | 7.33 | n.d. | n.d. |
| 144 | 1.46 | n.d. | n.d. |
| 145 | 0.342 | n.d. | n.d. |
| 146 | 0.769 | n.d. | n.d. |
| 147 | 0.909 | n.d. | n.d. |
| 148 | 0.303 | n.d. | n.d. |
| 149 | 0.217 | n.d. | n.d. |
| 150 | 20.9 | n.d. | n.d. |
| 151 | 1.37 | n.d. | n.d. |
| 152 | 0.357 | >50 | >50 |
| 153 | 0.659 | n.d. | n.d. |
| 154 | 7.74 | n.d. | n.d. |
| 155 | 0.214 | n.d. | n.d. |
| 156 | 0.234 | n.d. | n.d. |
| 157 | 0.232 | n.d. | n.d. |
| 158 | 0.152 | n.d. | n.d. |
| 159 | 0.594 | n.d. | n.d. |
| 160 | 0.044 | 6.9 | >50 |
| 161 | 0.270 | n.d. | n.d. |
| 162 | 0.079 | 6.9 | >50 |
| 163 | 0.034 | >50 | >50 |
| 164 | 0.390 | n.d. | n.d. |
| 165 | 0.113 | n.d. | n.d. |
| 166 | 0.628 | n.d. | n.d. |
| 167 | 1.63 | n.d. | n.d. | n.d.: not determined

What is claimed is:

1. A compound of Formula (II):

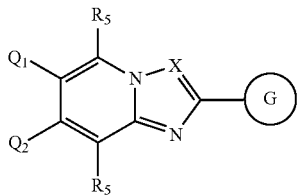

(II)

or stereoisomer, tautomer, solvate or salt thereof, wherein:
X is N or $CR_3$;
one of $Q_1$ and $Q_2$ is A and the other of $Q_1$ and $Q_2$ is $R_5$;
G is phenyl substituted with —$S(O)_2CH_3$, —$S(O)_2$(phenyl), —$S(O)_2NR_xR_x$, or —$S(O)(NH)NR_xR_x$;
A is cyclohexyl, piperidinyl, phenyl, pyridinyl, pyrimidinyl, 6-azabicyclo[3.2.1]octanyl, or azabicyclo[3.2.1]octanyl, each substituted with -L-$R_4$ and zero to 1 $R_{4b}$;
L is a bond, —$CR_xR_x$— or —$C(O)(CR_xR_x)_{0-2}$—;
$R_3$ is hydrogen, F, Cl, $C_{1-3}$ alkyl, $C_{1-2}$ fluoroalkyl, or $C_{3-4}$ cycloalkyl;
$R_4$ is:
 (i) —$N(CH_3)_2$;
 (ii) pyrrolidinyl, piperidinyl, piperazinyl, azepanyl, pyridinyl, azaspiro[3.3]heptanyl, azabicyclo[3.2.1]octanyl, or diazabicyclo[3.2.1]octanyl, each substituted with zero to 2 $R_{4a}$; or (iii)

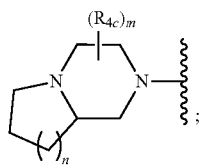

each $R_{4a}$ is independently $C_{1-6}$ alkyl, $C_{1-3}$ fluoroalkyl, —$(CH_2)_{0-2}O(C_{1-2}$ alkyl), $C_{3-6}$ cycloalkyl, —$CH_2(C_{3-6}$ cycloalkyl), —$C(O)(C_{1-4}$ alkyl), —$C(O)(C_{3-6}$ cycloalkyl), —$C(O)$(phenyl), —$C(O)CH_2(C_{3-6}$ cycloalkyl), —$C(O)CH_2$(phenyl), —$C(O)O(C_{1-4}$ alkyl), oxetanyl, tetrahydrofuran, or tetrahydropyranyl;
$R_{4b}$ is F, Cl, or —$CH_3$;
each $R_{4c}$ is independently $C_{1-6}$ alkyl, $C_{1-3}$ fluoroalkyl, —$CH_2(C_{3-6}$ cycloalkyl), —$C(O)(C_{1-4}$ alkyl), —$C(O)$(phenyl), —$C(O)CH_2$(phenyl), —$C(O)OCH_2CH_3$, or $C_{3-6}$ cycloalkyl;
each $R_5$ is independently hydrogen, F, Cl, $C_{1-3}$ alkyl, $C_{1-2}$ fluoroalkyl, or $C_{3-4}$ cycloalkyl;
each $R_x$ is independently hydrogen or —$CH_3$;
m is zero, 1, or 2;
n is zero, 1, or 2; and
q is 1 or 2.

2. The compound according to claim 1 or stereoisomer, tautomer, solvate or salt thereof, wherein X is $CR_3$.

3. The compound according to claim 1 or stereoisomers, tautomers, solvates or salts thereof, wherein X is N.

4. The compound according to claim 1 or stereoisomer, tautomer, solvate or salt thereof, wherein:
G is phenyl substituted —$S(O)_2CH_3$;
A is cyclohexyl, piperidinyl, phenyl, or 6-azabicyclo [3.2.1]octanyl, each substituted with -L-$R_4$;
L is a bond;
$R_3$ is hydrogen;
$R_4$ is piperidinyl, piperazinyl, azepanyl, azaspiro[3.3] heptanyl, azabicyclo[3.2.1]octanyl, or diazabicyclo [3.2.1]octanyl, each substituted with $R_{4a}$;
$R_{4a}$ is —$CH(CH_3)_2$, —$CH_2CH(CH_3)_2$, —$CH_2CH_2OCH_3$, —$C(O)CH(CH_3)_2$, —$C(O)$(cyclopropyl), —$CH_2$(cyclopropyl), —$CH_2$(cyclobutyl), cyclopropyl, cyclobutyl, oxetanyl, or tetrahydropyranyl; and
each $R_5$ is hydrogen, F, or —$CH_3$.

5. The compound according to claim 1 or stereoisomer, tautomer, solvate or salt thereof, wherein:
G is

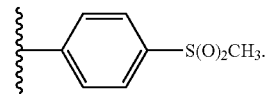

6. The compound according to claim 1 or stereoisomer, tautomer, solvate or salt thereof, wherein said compound is:
6-(1'-cyclopropyl-[1,4'-bipiperidin]-4-yl)-8-methyl-2-(4-(methylsulfonyl)phenyl) imidazo[1,2-a]pyridine (7);
6-(1'-isopropyl-[1,4'-bipiperidin]-4-yl)-8-methyl-2-(4-(methylsulfonyl)phenyl) imidazo[1,2-a]pyridine (8);
6-(1'-isobutyl-[1,4'-bipiperidin]-4-yl)-8-methyl-2-(4-(methylsulfonyl)phenyl) imidazo[1,2-a]pyridine (9);
6-(1-(8-isopropyl-8-azabicyclo[3.2.1]octan-3-yl)piperidin-4-yl)-8-methyl-2-(4-(methylsulfonyl)phenyl)imidazo[1,2-a]pyridine (62-63);
7-(1'-isopropyl-[1,4'-bipiperidin]-4-yl)-5-methyl-2-(4-(methylsulfonyl)phenyl) imidazo[1,2-a]pyridine (66);
8-fluoro-6-(1'-isopropyl-[1,4'-bipiperidin]-4-yl)-2-(4-(methylsulfonyl)phenyl) imidazo[1,2-a]pyridine (67);
8-fluoro-6-(1-(8-isopropyl-8-azabicyclo[3.2.1]octan-3-yl)piperidin-4-yl)-2-(4-(methylsulfonyl)phenyl)imidazo[1,2-a]pyridine (68-69);
7-fluoro-6-(1'-isopropyl-[1,4'-bipiperidin]-4-yl)-2-(4-(methylsulfonyl)phenyl) imidazo[1,2-a]pyridine (70);
8-fluoro-6-(1-(1-isopropylazepan-4-yl)piperidin-4-yl)-2-(4-(methylsulfonyl) phenyl)imidazo[1,2-a]pyridine (71-72);
5-fluoro-6-(1'-isopropyl-[1,4'-bipiperidin]-4-yl)-2-(4-(methylsulfonyl)phenyl) imidazo[1,2-a]pyridine (73);
8-fluoro-7-(1'-isobutyl-[1,4'-bipiperidin]-4-yl)-2-(4-(methylsulfonyl)phenyl) imidazo[1,2-a]pyridine (74);
6-(1-(8-cyclobutyl-8-azabicyclo[3.2.1]octan-3-yl)piperidin-4-yl)-8-methyl-2-(4-(methylsulfonyl)phenyl)imidazo[1,2-a]pyridine (83-84);
6-(1-(8-isobutyl-8-azabicyclo[3.2.1]octan-3-yl)piperidin-4-yl)-8-methyl-2-(4-(methylsulfonyl)phenyl)imidazo[1,2-a]pyridine (85-86);
6-(1-(8-(cyclopropylmethyl)-8-azabicyclo[3.2.1]octan-3-yl)piperidin-4-yl)-8-methyl-2-(4-(methylsulfonyl)phenyl)imidazo[1,2-a]pyridine (87-88);
6-(1-(8-(cyclobutylmethyl)-8-azabicyclo[3.2.1]octan-3-yl)piperidin-4-yl)-8-methyl-2-(4-(methylsulfonyl)phenyl)imidazo[1,2-a]pyridine (89-90);
6-(1'-cyclobutyl-[1,4'-bipiperidin]-4-yl)-8-methyl-2-(4-(methylsulfonyl)phenyl) imidazo[1,2-a]pyridine (91);

6-(1'-(cyclopropylmethyl)-[1,4'-bipiperidin]-4-yl)-8-methyl-2-(4-(methylsulfonyl) phenyl)imidazo[1,2-a]pyridine (92);
6-(1'-(cyclobutylmethyl)-[1,4'-bipiperidin]-4-yl)-8-methyl-2-(4-(methylsulfonyl) phenyl)imidazo[1,2-a]pyridine (93);
6-(4-(4-isobutylpiperazin-1-yl)phenyl)-8-methyl-2-(4-(methylsulfonyl)phenyl) imidazo[1,2-a]pyridine (99);
6-(4-(4-(cyclopropylmethyl) piperazin-1-yl)phenyl)-8-methyl-2-(4-(methylsulfonyl)phenyl)imidazo[1,2-a]pyridine (100);
6-(4-(4-(cyclobutylmethyl) piperazin-1-yl)phenyl)-8-methyl-2-(4-(methylsulfonyl) phenyl)imidazo[1,2-a]pyridine (101);
6-(4-(4-cyclobutylpiperazin-1-yl)phenyl)-8-methyl-2-(4-(methylsulfonyl)phenyl) imidazo[1,2-a]pyridine (102);
8-methyl-2-(4-(methylsulfonyl)phenyl)-6-(4-(4-(oxetan-3-yl) piperazin-1-yl) phenyl)imidazo[1,2-a]pyridine (103);
8-methyl-2-(4-(methylsulfonyl)phenyl)-6-(4-(4-(tetrahydro-2H-pyran-4-yl) piperazin-1-yl)phenyl)imidazo[1,2-a]pyridine (104);
6-(4-(4-(2-methoxyethyl) piperazin-1-yl)phenyl)-8-methyl-2-(4-(methylsulfonyl) phenyl)imidazo[1,2-a]pyridine (105);
7-(1'-isobutyl-[1,4'-bipiperidin]-4-yl)-5-methyl-2-(4-(methylsulfonyl)phenyl) imidazo[1,2-a]pyridine (106);
8-fluoro-6-(1'-isobutyl-[1,4'-bipiperidin]-4-yl)-2-(4-(methylsulfonyl)phenyl) imidazo[1,2-a]pyridine (107);
6-(1'-cyclopropyl-[1,4'-bipiperidin]-4-yl)-8-fluoro-2-(4-(methylsulfonyl)phenyl) imidazo[1,2-a]pyridine (108);
6-(1'-(cyclopropylmethyl)-[1,4'-bipiperidin]-4-yl)-8-fluoro-2-(4-(methylsulfonyl) phenyl)imidazo[1,2-a]pyridine (109);
6-(1'-cyclobutyl-[1,4'-bipiperidin]-4-yl)-8-fluoro-2-(4-(methylsulfonyl)phenyl) imidazo[1,2-a]pyridine (110);
8-fluoro-2-(4-(methylsulfonyl)phenyl)-6-(1'-(oxetan-3-yl)-[1,4'-bipiperidin]-4-yl) imidazo[1,2-a]pyridine (111);
8-fluoro-2-(4-(methylsulfonyl)phenyl)-6-(1'-(tetrahydro-2H-pyran-4-yl)-[1,4'-bipiperidin]-4-yl)imidazo[1,2-a]pyridine (112);
8-fluoro-6-(1-(8-isobutyl-8-azabicyclo[3.2.1]octan-3-yl)piperidin-4-yl)-2-(4-(methylsulfonyl)phenyl)imidazo[1,2-a]pyridine (113-114);
6-(1-(8-(cyclopropylmethyl)-8-azabicyclo[3.2.1]octan-3-yl)piperidin-4-yl)-8-fluoro-2-(4-(methylsulfonyl)phenyl)imidazo[1,2-a]pyridine (115-116);
6-(1-(8-cyclobutyl-8-azabicyclo[3.2.1]octan-3-yl)piperidin-4-yl)-8-fluoro-2-(4-(methylsulfonyl)phenyl)imidazo[1,2-a]pyridine (117);
6-(1-(8-cyclobutyl-8-azabicyclo[3.2.1]octan-3-yl)piperidin-4-yl)-8-fluoro-2-(4-(methylsulfonyl)phenyl)imidazo[1,2-a]pyridine (118);
8-fluoro-2-(4-(methylsulfonyl)phenyl)-6-(1-(8-(oxetan-3-yl)-8-azabicyclo[3.2.1]octan-3-yl)piperidin-4-yl)imidazo[1,2-a]pyridine (119-120);
8-fluoro-2-(4-(methylsulfonyl)phenyl)-6-(1-(8-(tetrahydro-2H-pyran-4-yl)-8-azabicyclo[3.2.1]octan-3-yl)piperidin-4-yl)imidazo[1,2-a]pyridine (121-122);
7-fluoro-6-(1'-isobutyl-[1,4'-bipiperidin]-4-yl)-2-(4-(methylsulfonyl)phenyl)imidazo[1,2-a]pyridine (123);
6-(1'-cyclopropyl-[1,4'-bipiperidin]-4-yl)-7-fluoro-2-(4-(methylsulfonyl)phenyl)imidazo[1,2-a]pyridine (124);
8-fluoro-6-(1-(1-isobutylazepan-4-yl)piperidin-4-yl)-2-(4-(methylsulfonyl)phenyl) imidazo[1,2-a]pyridine (125-126);
6-(1-(1-(cyclopropylmethyl) azepan-4-yl)piperidin-4-yl)-8-fluoro-2-(4-(methylsulfonyl)phenyl)imidazo[1,2-a]pyridine (127-128);
8-fluoro-2-(4-(methylsulfonyl)phenyl)-6-(1-(1-(tetrahydro-2H-pyran-4-yl) azepan-4-yl)piperidin-4-yl)imidazo[1,2-a]pyridine (129-130);
5-fluoro-6-(1'-isobutyl-[1,4'-bipiperidin]-4-yl)-2-(4-(methylsulfonyl)phenyl) imidazo[1,2-a]pyridine (131);
8-fluoro-7-(1'-isopropyl-[1,4'-bipiperidin]-4-yl)-2-(4-(methylsulfonyl)phenyl) imidazo[1,2-a]pyridine (132);
8-fluoro-2-(4-(methylsulfonyl)phenyl)-7-(1'-(tetrahydro-2H-pyran-4-yl)-[1,4'-bipiperidin]-4-yl)imidazo[1,2-a]pyridine (133);
6-(4-(4-isopropylpiperazin-1-yl)phenyl)-8-methyl-2-(4-(methylsulfonyl)phenyl)-[1,2,4]triazolo[1,5-a]pyridine (147);
6-(4-(8-isopropyl-3,8-diazabicyclo[3.2.1]octan-3-yl)phenyl)-8-methyl-2-(4-(methylsulfonyl)phenyl)-[1,2,4]triazolo[1,5-a]pyridine (153);
6-(8-(1-cyclopropylpiperidin-4-yl)-8-azabicyclo[3.2.1]octan-3-yl)-8-methyl-2-(4-(methylsulfonyl)phenyl)-[1,2,4]triazolo[1,5-a]pyridine (159);
6-(8-(1-isopropylpiperidin-4-yl)-8-azabicyclo[3.2.1]octan-3-yl)-8-methyl-2-(4-(methylsulfonyl)phenyl)-[1,2,4]triazolo[1,5-a]pyridine (160);
6-(1'-cyclopropyl-[1,4'-bipiperidin]-4-yl)-8-methyl-2-(4-(methylsulfonyl)phenyl)-[1,2,4]triazolo[1,5-a]pyridine (161);
6-(1'-isopropyl-[1,4'-bipiperidin]-4-yl)-8-methyl-2-(4-(methylsulfonyl)phenyl)-[1,2,4]triazolo[1,5-a]pyridine (162);
6-(1'-isobutyl-[1,4'-bipiperidin]-4-yl)-8-methyl-2-(4-(methylsulfonyl)phenyl)-[1,2,4]triazolo[1,5-a]pyridine (163); or
6-(4-(4-isopropylpiperazin-1-yl)phenyl)-2-(4-(methylsulfonyl)phenyl)-[1,2,4]triazolo[1,5-a]pyridine (167).

7. A compound of Formula (III):

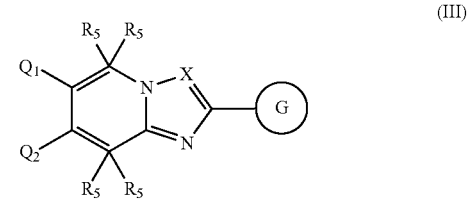

(III)

or stereoisomer tautomer, solvate or salt thereof, wherein:
X is N or $CR_3$;
one of $Q_1$ and $Q_2$ is A and the other of $Q_1$ and $Q_2$ is $R_5$;
G is phenyl substituted with 1 to 3 substituents independently selected from F, Cl, Br, $C_{1-2}$ alkoxy, $C_{1-2}$ fluoroalkoxy, $C_{3-4}$ cycloalkyl, —C(O)$NR_yR_y$, —S(O)$_2CH_3$, —S(O)$_2$(phenyl), —S(O)$_2NR_xR_x$, and —S(O)(NH) $NR_xR_x$;
A is cyclohexyl, piperidinyl, phenyl, pyridinyl, pyrimidinyl, 6-azabicyclo[3.2.1]octanyl, or azabicyclo[3.2.1]octanyl, each substituted with -L-$R_4$ and zero to 1 $R_{4b}$;
L is a bond, —$CR_xR_x$— or —C(O)$(CR_xR_x)_{0-2}$—;
$R_3$ is hydrogen, F, Cl, $C_{1-3}$ alkyl, $C_{1-2}$ fluoroalkyl, or $C_{3-4}$ cycloalkyl;
$R_4$ is:
(i) —N(CH$_3$)$_2$;
(ii) pyrrolidinyl, piperidinyl, piperazinyl, azepanyl, pyridinyl, azaspiro[3.3]heptanyl, azabicyclo[3.2.1]

octanyl, or diazabicyclo[3.2.1]octanyl, each substituted with zero to 2 $R_{4a}$; or (iii)

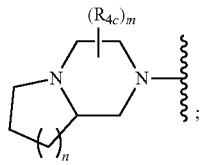

each $R_{4a}$ is independently $C_{1-6}$ alkyl, $C_{1-3}$ fluoroalkyl, —(CH$_2$)$_{0-2}$O(C$_{1-2}$ alkyl), $C_{3-6}$ cycloalkyl, CH$_2$(C$_{3-6}$ cycloalkyl), —C(O)(C$_{1-4}$ alkyl), —C(O)(C$_{3-6}$ cycloalkyl), —C(O)(phenyl), —C(O)CH$_2$(C$_{3-6}$ cycloalkyl), —C(O)CH$_2$(phenyl), —C(O)O(C$_{1-4}$ alkyl), oxetanyl, tetrahydrofuran, or tetrahydropyranyl;

$R_{4b}$ is F, Cl, or —CH$_3$;

each $R_{4c}$ is independently $C_{1-6}$ alkyl, $C_{1-3}$ fluoroalkyl, —CH$_2$(C$_{3-6}$ cycloalkyl), —C(O)(C$_{1-4}$ alkyl), —C(O)(phenyl), —C(O)CH$_2$(phenyl), —C(O)OCH$_2$CH$_3$, or $C_{3-6}$ cycloalkyl;

each $R_5$ is independently hydrogen, F, Cl, $C_{1-3}$ alkyl, $C_{1-2}$ fluoroalkyl, or $C_{3-4}$ cycloalkyl;

each $R_x$ is independently hydrogen or —CH$_3$;

each $R_y$ is independently hydrogen or $C_{1-6}$ alkyl;

m is zero, 1, or 2;

n is zero, 1, or 2; and q is 1 or 2.

8. The compound according to claim 7 or stereoisomer, tautomer, solvate or salt, wherein X is CR$_3$.

9. The compound according to claim 7 or stereoisomer, tautomer, solvate or salt, wherein X is N.

10. The compound according to claim 7 or stereoisomer, tautomer, solvate or salt thereof, wherein:

G is phenyl substituted with 1 to 2 substituents independently selected from F, —OCH$_3$, and —S(O)$_2$CH$_3$;

A is cyclohexyl, piperidinyl, phenyl, or 6-azabicyclo[3.2.1]octanyl, each substituted with -L-R$_4$;

L is a bond;

R$_3$ is hydrogen;

R$_4$ is piperidinyl, piperazinyl, azepanyl, azaspiro[3.3]heptanyl, azabicyclo[3.2.1]octanyl, or diazabicyclo[3.2.1]octanyl, each substituted with $R_{4a}$;

$R_{4a}$ is —CH(CH$_3$)$_2$, —CH$_2$CH(CH$_3$)$_2$, —CH$_2$CH$_2$OCH$_3$, —C(O)CH(CH$_3$)$_2$, —C(O)(cyclopropyl), CH$_2$(cyclopropyl), CH$_2$(cyclobutyl), cyclopropyl, cyclobutyl, oxetanyl, or tetrahydropyranyl; and each R$_5$ is hydrogen, F, or —CH$_3$.

11. The compound according to claim 7 or stereoisomer, tautomer, solvate or salt thereof, wherein:

G is

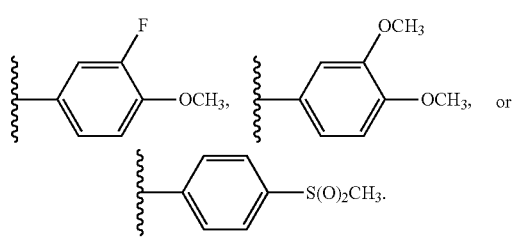

12. The compound according to claim 7 or stereoisomer, tautomer, solvate or salt thereof, wherein said compound is:

2-(3,4-dimethoxyphenyl)-6-(1'-isobutyl-[1,4'-bipiperidin]-4-yl)-5,6,7,8-tetrahydroimidazo[1,2-a]pyridine (31-33);

2-(3,4-dimethoxyphenyl)-6-(1'-isopropyl-[1,4'-bipiperidin]-4-yl)-5,6,7,8-tetrahydroimidazo[1,2-a]pyridine (34-36);

6-(1'-cyclopropyl-[1,4'-bipiperidin]-4-yl)-2-(3,4-dimethoxyphenyl)-5,6,7,8-tetrahydroimidazo[1,2-a]pyridine (37-38);

1-(4-(2-(3,4-dimethoxyphenyl)-5,6,7,8-tetrahydroimidazo[1,2-a]pyridin-6-yl)-[1,4'-bipiperidin]-1'-yl)-2-methylpropan-1-one (39-41);

cyclopropyl(4-(2-(3,4-dimethoxyphenyl)-5,6,7,8-tetrahydroimidazo[1,2-a]pyridin-6-yl)-[1,4'-bipiperidin]-1'-yl) methanone (42-44);

–(3,4-dimethoxyphenyl)-6-(1-(2-isopropyl-2-azaspiro[3.3] heptan-6-yl)piperidin-4-yl)-5,6,7,8-tetrahydroimidazo[1,2-a]pyridine (45-47);

6-(1-(2-cyclobutyl-2-azaspiro[3.3] heptan-6-yl)piperidin-4-yl)-2-(3,4-dimethoxyphenyl)-5,6,7,8-tetrahydroimidazo[1,2-a]pyridine (48-50);

6-(1-(2-(cyclopropylmethyl)-2-azaspiro[3.3] heptan-6-yl)piperidin-4-yl)-2-(3,4-dimethoxyphenyl)-5,6,7,8-tetrahydroimidazo[1,2-a]pyridine (51);

2-(3,4-dimethoxyphenyl)-6-(1-(2-isobutyl-2-azaspiro[3.3] heptan-6-yl)piperidin-4-yl)-5,6,7,8-tetrahydroimidazo[1,2-a]pyridine (52-54);

6-(1'-(cyclopropylmethyl)-[1,4'-bipiperidin]-4-yl)-2-(3,4-dimethoxyphenyl)-5,6,7,8-tetrahydroimidazo[1,2-a]pyridine (55-57);

2-(3,4-dimethoxyphenyl)-7-(1'-isopropyl-[1,4'-bipiperidin]-4-yl)-5,6,7,8-tetrahydroimidazo[1,2-a]pyridine (58);

2-(3,4-dimethoxyphenyl)-7-(1'-isobutyl-[1,4'-bipiperidin]-4-yl)-5,6,7,8-tetrahydroimidazo[1,2-a]pyridine (59);

(6R)-2-(3,4-dimethoxyphenyl)-6-(1-(8-isobutyl-8-azabicyclo[3.2.1]octan-3-yl) piperidin-4-yl)-5,6,7,8-tetrahydroimidazo[1,2-a]pyridine (75-76);

(6S)-2-(3,4-dimethoxyphenyl)-6-(1-(8-isobutyl-8-azabicyclo[3.2.1]octan-3-yl) piperidin-4-yl)-5,6,7,8-tetrahydroimidazo[1,2-a]pyridine (77-78);

(6R)-6-(1-(8-isobutyl-8-azabicyclo[3.2.1]octan-3-yl)piperidin-4-yl)-2-(4-(methylsulfonyl)phenyl)-5,6,7,8-tetrahydroimidazo[1,2-a]pyridine (79-80);

(6S)-6-(1-(8-isobutyl-8-azabicyclo[3.2.1]octan-3-yl)piperidin-4-yl)-2-(4-(methylsulfonyl)phenyl)-5,6,7,8-tetrahydroimidazo[1,2-a]pyridine (81-82);

(6R)-2-(3,4-dimethoxyphenyl)-6-(1-(8-isopropyl-8-azabicyclo[3.2.1]octan-3-yl) piperidin-4-yl)-5,6,7,8-tetrahydroimidazo[1,2-a]pyridine (134-135);

(6S)-2-(3,4-dimethoxyphenyl)-6-(1-(8-isopropyl-8-azabicyclo[3.2.1]octan-3-yl) piperidin-4-yl)-5,6,7,8-tetrahydroimidazo[1,2-a]pyridine (136-137);

(6R)-6-(1-(8-(cyclopropylmethyl)-8-azabicyclo[3.2.1]octan-3-yl)piperidin-4-yl)-2-(4-(methylsulfonyl)phenyl)-5,6,7,8-tetrahydroimidazo[1,2-a]pyridine (138-139);

(6S)-6-(1-(8-(cyclopropylmethyl)-8-azabicyclo[3.2.1]octan-3-yl)piperidin-4-yl)-2-(4-(methylsulfonyl)phenyl)-5,6,7,8-tetrahydroimidazo[1,2-a]pyridine (140-141);

2-(3,4-dimethoxyphenyl)-6-(4-(4-isopropylpiperazin-1-yl) cyclohexyl)-8-methyl-5,6,7,8-tetrahydro-[1,2,4]triazolo[1,5-a]pyridine (143);

2-(3,4-dimethoxyphenyl)-6-(4-(4-isopropylpiperazin-1-yl)phenyl)-8-methyl-5,6,7,8-tetrahydro-[1,2,4]triazolo[1,5-a]pyridine (144);
6-(8-(1-cyclopropylpiperidin-4-yl)-8-azabicyclo[3.2.1]octan-3-yl)-2-(3,4-dimethoxyphenyl)-5,6,7,8-tetrahydro-[1,2,4]triazolo[1,5-a]pyridine (145);
2-(3,4-dimethoxyphenyl)-6-(8-(1-isopropylpiperidin-4-yl)-8-azabicyclo[3.2.1]octan-3-yl)-5,6,7,8-tetrahydro-[1,2,4]triazolo[1,5-a]pyridine (148);
6-(4-(4-isopropylpiperazin-1-yl)phenyl)-8-methyl-2-(4-(methylsulfonyl)phenyl)-5,6,7,8-tetrahydro-[1,2,4]triazolo[1,5-a]pyridine (150);
2-(3,4-dimethoxyphenyl)-6-(4-(8-isopropyl-3,8-diazabicyclo[3.2.1]octan-3-yl) phenyl)-8-methyl-5,6,7,8-tetrahydro-[1,2,4]triazolo[1,5-a]pyridine (152); or
6-(4-(8-isopropyl-3,8-diazabicyclo[3.2.1]octan-3-yl)phenyl)-8-methyl-2-(4-(methylsulfonyl)phenyl)-5,6,7,8-tetrahydro-[1,2,4]triazolo[1,5-a]pyridine (154).

13. A compound of Formula (IIb):

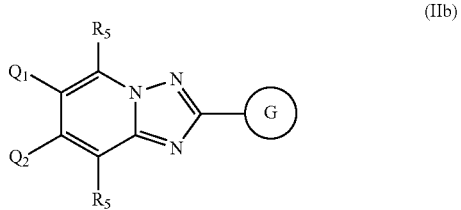

(IIb)

or stereoisomer, tautomer, solvate or salt thereof, wherein:
one of $Q_1$ and $Q_2$ is A and the other of $Q_1$ and $Q_2$ is $R_5$;
G is phenyl substituted with 1 to 3 substituents independently selected from F, Cl, Br, $C_{1-2}$ alkoxy, $C_{1-2}$ fluoroalkoxy, $C_{3-4}$ cycloalkyl, or —C(O)NR$_y$R$_y$;
A is cyclohexyl, piperidinyl, phenyl, pyridinyl, pyrimidinyl, 6-azabicyclo[3.2.1]octanyl, or azabicyclo[3.2.1]octanyl, each substituted with -L-R$_4$ and zero to 1 R$_{4b}$;
L is a bond, —CR$_x$R$_x$— or —C(O)(CR$_x$R$_x$)$_{0-2}$—;
$R_3$ is hydrogen, F, Cl, $C_{1-3}$ alkyl, $C_{1-2}$ fluoroalkyl, or $C_{3-4}$ cycloalkyl;
$R_4$ is:
  (i) —N(CH$_3$)$_2$;
  (ii) pyrrolidinyl, piperidinyl, piperazinyl, azepanyl, pyridinyl, azaspiro[3.3]heptanyl, azabicyclo[3.2.1]octanyl, or diazabicyclo[3.2.1]octanyl, each substituted with zero to 2 R$_{4a}$; or (iii)

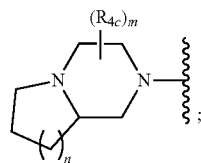

each $R_{4a}$ is independently $C_{1-6}$ alkyl, $C_{1-3}$ fluoroalkyl, —(CH$_2$)$_{0-2}$O(C$_{1-2}$ alkyl), $C_{3-6}$ cycloalkyl, —CH$_2$(C$_{3-6}$ cycloalkyl), —C(O)(C$_{1-4}$ alkyl), —C(O)(C$_{3-6}$ cycloalkyl), —C(O)(phenyl), —C(O)CH$_2$(C$_{3-6}$ cycloalkyl), —C(O)CH$_2$(phenyl), —C(O)O(C$_{1-4}$ alkyl), oxetanyl, tetrahydrofuran, or tetrahydropyranyl;

$R_{4b}$ is F, Cl, or —CH$_3$;
each $R_{4c}$ is independently $C_{1-6}$ alkyl, $C_{1-3}$ fluoroalkyl, —CH$_2$(C$_{3-6}$ cycloalkyl), —C(O)(C$_{1-4}$ alkyl), —C(O)(phenyl), —C(O)CH$_2$(phenyl), —C(O)OCH$_2$CH$_3$, or $C_{3-6}$ cycloalkyl;
each $R_5$ is independently hydrogen, F, Cl, $C_{1-3}$ alkyl, $C_{1-2}$ fluoroalkyl, or $C_{3-4}$ cycloalkyl;
each $R_x$ is independently hydrogen or —CH$_3$;
m is zero, 1, or 2;
n is zero, 1, or 2; and
q is 1 or 2.

14. The compound according to claim 13 or stereoisomer, tautomer, solvate or salt thereof, wherein:
G is phenyl substituted with 1 to 2 substituents independently selected from F or —OCH$_3$;
A is cyclohexyl, piperidinyl, phenyl, or 6-azabicyclo[3.2.1]octanyl, each substituted with -L-R$_4$;
L is a bond;
$R_3$ is hydrogen;
$R_4$ is piperidinyl, piperazinyl, azepanyl, azaspiro[3.3]heptanyl, azabicyclo[3.2.1]octanyl, or diazabicyclo[3.2.1]octanyl, each substituted with R$_{4a}$;
$R_{4a}$ is —CH(CH$_3$)$_2$, —CH$_2$CH(CH$_3$)$_2$, —CH$_2$CH$_2$OCH$_3$, —C(O)CH(CH$_3$)$_2$, —C(O)(cyclopropyl), CH$_2$(cyclopropyl), CH$_2$(cyclobutyl), cyclopropyl, cyclobutyl, oxetanyl, or tetrahydropyranyl; and
each $R_5$ is hydrogen, F, or —CH$_3$.

15. The compound according to claim 14 or stereoisomer, tautomer, solvate or salt thereof, wherein:
G is

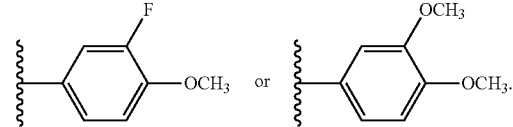 [SMILES: *c1ccc(OC)c(F)c1 ; *c1ccc(OC)c(OC)c1]

16. The compound according to claim 14 or stereoisomer, tautomer, solvate or salt thereof, wherein said compound is:
2-(3,4-dimethoxyphenyl)-7-(1'-isopropyl-[1,4'-bipiperidin]-4-yl)-[1,2,4]triazolo[1,5-a] pyridine (60);
2-(3,4-dimethoxyphenyl)-7-(1'-isobutyl-[1,4'-bipiperidin]-4-yl)-[1,2,4]triazolo[1,5-a] pyridine (61);
2-(3,4-dimethoxyphenyl)-6-(4-(4-isopropylpiperazin-1-yl)phenyl)-8-methyl-[1,2,4]triazolo[1,5-a]pyridine (142);
6-(8-(1-cyclopropylpiperidin-4-yl)-8-azabicyclo[3.2.1]octan-3-yl)-2-(3,4-dimethoxyphenyl)-[1,2,4]triazolo[1,5-a]pyridine (146);
2-(3,4-dimethoxyphenyl)-6-(8-(1-isopropylpiperidin-4-yl)-8-azabicyclo[3.2.1]octan-3-y1)-[1,2,4]triazolo[1,5-a]pyridine (149);
2-(3,4-dimethoxyphenyl)-6-(4-(8-isopropyl-3,8-diazabicyclo[3.2.1]octan-3-yl)phenyl)-8-methyl-[1,2,4]triazolo[1,5-a]pyridine (151);
6-(8-(1-cyclopropylpiperidin-4-yl)-8-azabicyclo[3.2.1]octan-3-yl)-2-(3,4-dimethoxyphenyl)-8-methyl-[1,2,4]triazolo[1,5-a]pyridine (155);
2-(3,4-dimethoxyphenyl)-6-(8-(1-isopropylpiperidin-4-yl)-8-azabicyclo[3.2.1]octan-3-y1)-8-methyl-[1,2,4]triazolo[1,5-a]pyridine (156);
6-(1'-cyclopropyl-[1,4'-bipiperidin]-4-yl)-2-(3,4-dimethoxyphenyl)-8-methyl-[1,2,4]triazolo[1,5-a]pyridine (157);

2-(3,4-dimethoxyphenyl)-6-(1'-isopropyl-[1,4'-bipiperidin]-4-yl)-8-methyl-[1,2,4]triazolo[1,5-a]pyridine (158);

6-(1'-cyclopropyl-[1,4'-bipiperidin]-4-yl)-2-(3,4-dimethoxyphenyl)-[1,2,4]triazolo[1,5-a]pyridine (164);

2-(3,4-dimethoxyphenyl)-6-(1'-isopropyl-[1,4'-bipiperidin]-4-yl)-[1,2,4]triazolo[1,5-a] pyridine (165); or 2-(3,4-dimethoxyphenyl)-6-(4-(8-isopropyl-8-azabicyclo[3.2.1]octan-3-yl)phenyl)-[1,2,4]triazolo[1,5-a]pyridine (166).

17. A pharmaceutical composition comprising a compound according to claim 1 or stereoisomer, tautomer, solvate or salt thereof; and a pharmaceutically acceptable carrier.

18. A pharmaceutical composition comprising a compound according to claim 7 or stereoisomer, tautomer, solvate or salt thereof; and a pharmaceutically acceptable carrier.

19. A pharmaceutical composition comprising a compound according to claim 13 or stereoisomer, tautomer, solvate or salt thereof; and a pharmaceutically acceptable carrier.

\* \* \* \* \*